(12) United States Patent
Iyer et al.

(10) Patent No.: US 7,837,975 B2
(45) Date of Patent: Nov. 23, 2010

(54) HIGH PURITY, HIGH PRESSURE HYDROGEN PRODUCTION WITH IN-SITU $CO_2$ AND SULFUR CAPTURE IN A SINGLE STAGE REACTOR

(75) Inventors: Mahesh V. Iyer, Houston, TX (US); Liang-Shih Fan, Columbus, OH (US); Shwetha Ramkumar, Columbus, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 12/409,843

(22) Filed: Mar. 24, 2009

(65) Prior Publication Data

US 2009/0263316 A1 Oct. 22, 2009

Related U.S. Application Data

(63) Continuation of application No. PCT/US2007/079432, filed on Sep. 25, 2007.

(60) Provisional application No. 60/826,809, filed on Sep. 25, 2006.

(51) Int. Cl.
*C01B 3/12* (2006.01)
*C01B 3/16* (2006.01)
*C01B 3/22* (2006.01)
*C01B 3/24* (2006.01)
*C01B 3/26* (2006.01)

(52) U.S. Cl. ............... 423/652; 423/648.1; 423/650; 423/651; 423/655; 423/656

(58) Field of Classification Search .......... 423/650, 423/651, 652, 653, 654, 648.1, 655, 656; 252/373

See application file for complete search history.

(56) References Cited

U.S. PATENT DOCUMENTS

1,798,802 A 3/1931 Niles (Continued)

FOREIGN PATENT DOCUMENTS

CA 2401279 A1 8/2001

(Continued)

OTHER PUBLICATIONS

Sakadjian, B.B. et al., Kinetics and Structural Characterization of Calcium-Based Sorbents Calcined under Subatmospheric Conditions for the High-Temperature CO2 Capture Process, Ind. Eng. Chem. Res., 2007, pp. 35-42, 46.

(Continued)

*Primary Examiner*—Wayne Langel
(74) *Attorney, Agent, or Firm*—Standley Law Group LLP

(57) ABSTRACT

A process for producing hydrogen, comprising the steps of: (a) gasifying a fuel into a raw synthesis gas comprising CO, hydrogen, steam and sulfur and halide contaminants in the form of $H_2S$, COS and HX, where X is a halide; (b) passing the raw synthesis gas through a water gas shift reactor (WGSR) into which CaO and steam are injected, the CaO reacting with the shifted gas to remove $CO_2$, sulfur and halides in a solid-phase calcium-containing product comprising $CaCO_3$, CaS and $CaX_2$; (c) separating the solid-phase calcium-containing product from an enriched gaseous hydrogen product; and (d) regenerating the CaO by calcining the solid-phase calcium-containing product at a condition selected from the group consisting of: in the presence of steam, in the presence of $CO_2$, in the presence of synthesis gas, in the presence of $H_2$ and $O_2$, under partial vacuum, and combinations thereof. The CaO may have a surface area of at least 12.0 m2/g and a pore volume of at least 0.015 cm3/g, the CaO having a sorption capacity of at least about 70 grams of CO2 per kilogram of CaO.

21 Claims, 86 Drawing Sheets

U.S. PATENT DOCUMENTS

| | | | |
|---|---|---|---|
| 3,194,732 | A | 7/1965 | Neuhauser |
| 3,749,380 | A | 7/1973 | Strom et al. |
| 3,864,450 | A | 2/1975 | Takeyama et al. |
| 4,081,522 | A | 3/1978 | Hubble et al. |
| 4,088,736 | A | 5/1978 | Courty et al. |
| 4,115,518 | A | 9/1978 | Delmon et al. |
| 4,174,373 | A | 11/1979 | Yoshida et al. |
| 4,212,854 | A | 7/1980 | Maki et al. |
| 4,215,096 | A | 7/1980 | Sinha et al. |
| 4,226,839 | A | 10/1980 | O'Neill et al. |
| 4,312,280 | A | 1/1982 | Shearer et al. |
| 4,409,124 | A | 10/1983 | Robinson et al. |
| 4,433,981 | A | 2/1984 | Slaugh et al. |
| 4,442,078 | A | 4/1984 | Jalan et al. |
| 4,442,221 | A | 4/1984 | Bishop, III et al. |
| 4,468,376 | A * | 8/1984 | Suggitt ................ 588/316 |
| 4,533,532 | A | 8/1985 | Gebhard et al. |
| 4,544,542 | A | 10/1985 | Angevine et al. |
| 4,613,487 | A | 9/1986 | Yoon et al. |
| 4,729,889 | A | 3/1988 | Flytani-Stephanopoulos et al. |
| 4,748,010 | A | 5/1988 | Walker |
| 4,772,455 | A | 9/1988 | Izumi et al. |
| 4,855,276 | A | 8/1989 | Osborne et al. |
| 4,871,522 | A | 10/1989 | Doyle |
| 4,937,059 | A | 6/1990 | Kolts et al. |
| 4,950,409 | A | 8/1990 | Stanforth |
| 5,053,238 | A | 10/1991 | Zeidler et al. |
| 5,078,973 | A | 1/1992 | Kuroda et al. |
| 5,084,256 | A | 1/1992 | McElroy et al. |
| 5,087,597 | A | 2/1992 | Leal et al. |
| 5,130,106 | A | 7/1992 | Koves et al. |
| 5,160,715 | A | 11/1992 | Pinnavaia et al. |
| 5,186,914 | A | 2/1993 | Yoshihiro et al. |
| 5,232,793 | A | 8/1993 | Miyauchi et al. |
| 5,275,739 | A | 1/1994 | Grant et al. |
| 5,334,564 | A | 8/1994 | Pinnavaia et al. |
| 5,492,676 | A | 2/1996 | Katatani et al. |
| 5,520,894 | A | 5/1996 | Heesink et al. |
| 5,525,317 | A | 6/1996 | Bhat et al. |
| 5,585,081 | A | 12/1996 | Chu et al. |
| 5,653,785 | A | 8/1997 | Horio et al. |
| 5,779,464 | A | 7/1998 | Fan et al. |
| 5,895,634 | A | 4/1999 | Mitsuoka et al. |
| 5,902,561 | A | 5/1999 | Carrea et al. |
| 5,939,118 | A | 8/1999 | Cox et al. |
| 6,224,839 | B1 | 5/2001 | Fan et al. |
| 6,309,996 | B1 | 10/2001 | Fan et al. |
| 6,358,554 | B1 | 3/2002 | Hagiwara et al. |
| 6,569,388 | B1 | 5/2003 | Fan et al. |
| 6,669,917 | B2 | 12/2003 | Lyon |
| 6,682,838 | B2 | 1/2004 | Stevens |
| 6,692,545 | B2 | 2/2004 | Gittleman et al. |
| 6,723,230 | B1 | 4/2004 | Chen et al. |
| 6,737,031 | B2 | 5/2004 | Beal et al. |
| 6,790,430 | B1 | 9/2004 | Lackner et al. |
| 6,834,623 | B2 | 12/2004 | Cheng |
| 6,880,635 | B2 | 4/2005 | Vinegar et al. |
| 6,911,057 | B2 | 6/2005 | Lyon |
| 7,008,967 | B2 | 3/2006 | Keyser et al. |
| 7,067,456 | B2 * | 6/2006 | Fan et al. .................. 502/400 |
| 7,618,606 | B2 | 11/2009 | Fan et al. |
| 7,678,351 | B2 | 3/2010 | Iyer et al. |
| 2002/0085961 | A1 | 7/2002 | Morin et al. |
| 2002/0197199 | A1 | 12/2002 | Fan et al. |
| 2003/0007918 | A1 | 1/2003 | Fan et al. |
| 2003/0113239 | A1 | 6/2003 | Pahlman et al. |
| 2003/0224932 | A1 | 12/2003 | Saaski et al. |
| 2004/0237404 | A1 | 12/2004 | Andrus, Jr. et al. |
| 2004/0261617 | A1 | 12/2004 | Stewart |
| 2005/0042166 | A1 | 2/2005 | Kindig et al. |
| 2005/0175533 | A1 | 8/2005 | Thomas et al. |
| 2005/0197411 | A1 | 9/2005 | Lowe et al. |
| 2006/0039853 | A1 | 2/2006 | Fan et al. |
| 2006/0093540 | A1 | 5/2006 | Fan et al. |
| 2006/0177546 | A1 | 8/2006 | Hoehne |
| 2006/0211571 | A1 | 9/2006 | Iyer et al. |
| 2006/0233687 | A1 * | 10/2006 | Hojlund Nielsen .......... 423/210 |
| 2007/0092427 | A1 | 4/2007 | Anthony et al. |
| 2007/0283812 | A1 | 12/2007 | Liu et al. |
| 2008/0233029 | A1 | 9/2008 | Fan et al. |

FOREIGN PATENT DOCUMENTS

| | | |
|---|---|---|
| CA | 2613698 A1 | 1/2007 |
| CA | 2626772 A1 | 4/2007 |
| DE | 3335499 A1 | 4/1985 |
| DE | 3512169 A | 10/1986 |
| DE | 265559 A1 | 3/1989 |
| EP | 0467526 A2 | 1/1992 |
| EP | 1251948 | 10/2002 |
| EP | 1332783 A1 | 8/2003 |
| EP | 1899049 A2 | 3/2008 |
| EP | 1948349 A2 | 7/2008 |
| JP | 49-84956 A | 8/1974 |
| JP | 59-52516 A | 3/1984 |
| JP | 10-15353 A | 1/1988 |
| JP | 63-171623 A | 7/1988 |
| JP | 2005-239954 A | 9/2005 |
| KR | 2002-0040234 A | 5/2002 |
| WO | 97/25138 A1 | 7/1997 |
| WO | 99/56868 A1 | 11/1999 |
| WO | 01/08785 A1 | 2/2001 |
| WO | 01/56689 A1 | 8/2001 |
| WO | 01/74491 A2 | 10/2001 |
| WO | 2006/099599 A2 | 9/2006 |
| WO | 2007/002792 A2 | 1/2007 |
| WO | 2007/002882 A2 | 1/2007 |
| WO | 2007/046815 A2 | 4/2007 |
| WO | 2007/082089 A2 | 7/2007 |
| WO | 2010/059882 A2 | 5/2010 |

OTHER PUBLICATIONS

Hartman, M. et al., "Reaction of Sulfur Dioxide with Limestone and the Grain Model", AIChE Journal, 22(3), May 1976, pp. 490-498.

Hartman, M. et al., "Reaction of Sulfur Dioxide with Limestone and the Influence of Pore Structure", Ind. Eng. Chem., Process Des. Develop, 13(3), 1974, pp. 248-253.

Hartman, M. et al., "Reactions between Calcium Oxide and Flue Gas Containing Sulfur Dioxide at Lower Temperatures", AIChE Journal, 39(4), Apr. 1993, pp. 615-624.

Herzog, H. et al., "CO2 Capture, Reuse, and Storage Technologies for Mitigating Global Climate Change", A White Paper, Final Report, Energy Laboratory, DOE Order No. DE-AF22-96PC01257, Jan. 1997, 70 pages.

Herzog, H. et al., "Feasibility, Modeling and Economics of Sequestering Power Plant CO2 Emissions in the Deep Ocean", Environmental Progress, 10(1), Feb. 1991, pp. 64-74.

Heuchel, M. et al., "Adsorption of Carbon Dioxide and Methane and Their Mixtures on an Activated Carbon: Simulation and Experiment", Langmuir, 15(25), 1999, pp. 8695-8705.

Ho, T.C. et al., "Lead and Cadmium Capture by Various Sorbents During Fluidized Bed Combustion/Incineration", Fluidization VIII, International Symposium of the Engineering Foundation, Tours, France, May 14-19, 1995, pp. 899-906.

Ho, T.C. et al., "Metal Behavior and Metal Capture by Sorbents During Fluidized Bed Coal Combustion", Department of Chemical Engineering, Lamar University, pp. 281-286.

Hufton, J.R. et al., "Sorption-Enhanced Reaction Process for Hydrogen Production", AIChE Journal, 45(2), Feb. 1999, pp. 248-256.

Ida, J.I. et al., "Mechanism of High-Temperature CO2 Sorption on Lithium Zirconate", Environ. Sci. Technol., 37(9), 2003, pp. 1999-2004.

Iyer, M. et al., "Calcium Looping process for high temperature high presser hydrogen production with in-situ CO2 and sulfur capture", National Symposium on Chemical Reaction Engineering, Feb. 2007, 1 page, Houston, Texas.

Iyer, M. et al., "Enhanced Hydrogen Production with in-situ CO2 capture in a Single Stage Reactor", Proc. 23rd Annu. Int. Pittsburgh Coal Conference, Sep. 2006, 17 pages, Pittsburgh, Pennsylvania.

Iyer, M.V. et al., "Multicyclic Study on the Simultaneous Carbonation and Sulfation of High Reactivity CaO", Ind. Eng. Chem. Res., 43(14), 2004, pp. 3939-3947.

Iyer, M. et al., "Novel Calcium-based Reactive Separation of CO2 from Flue Gas: Effect of SO2", Presented at the 20th Annual International Pittsburgh Coal Conference, Pittsburgh, PA, Paper S-1, 2003, pp. 1-11.

Jadhav, R.A. et al., "Mechanism of Selenium Sorption by Activated Carbon", The Canadian Journal of Chemical Engineering, 78, Feb. 2000, pp. 168-174.

Jia, C.Q. et al., "A kinetic study of the generation of hydrogen sulphide from aqueous calcium sulphide slurry with carbon dioxide", Waste Process. Recycl. Min. Metall. Ind., Proc. Int. Symp., 1992, pp. 215-227.

Jozewicz, W. et al., "Fly Ash Recycle in Dry Scrubbing", Environmental Progress, 5(4), Nov. 1986, pp. 219-224.

Jozewicz, W. et al., "Reaction Mechanisms of Dry Ca-Based Sorbents with Gaseous HCl", Ind. Eng. Chem. Res., 34(2), 1995, pp. 607-612.

Jozewicz, W. et al., "Reactivation of Solids from Furnace Injections of Limestone for SO2 Control", Environ. Sci. Technol., 21(7), 1987, pp. 664-670.

Kaplan, L.J., Cost-saving process recovers CO2 from power-plant fluegas, Chemical Engineering, 89(24), 1982, pp. 30-31.

Kato, M. et al., "Carbon dioxide absorption by lithium orthosilicate in a wide range of temperature and carbon dioxide concentrations", Journal of materials Science Letters, 21, 2002, pp. 485-487.

Kato, Y. et al., "Kinetic feasibility of a chemical heat pump for heat utilization of high-temperature processes", Applied Thermal Engineering, 19, 1999, pp. 239-254.

Kato, Y. et al., "Utilization of High Temperature Heat From Nuclear Reactor Using Inorganic Chemical Heat Pump", Progress in Nuclear Energy, 32(3/4), 1998, pp. 563-570.

Keairns, D.L. et al., "Sulfur Emission Control With Limestone/Dolomite in Advanced Fossil Fuel-Processing Systems", Environmental Aspects of Fuel Conversion Technology, St. Louis, MO, 1974; Research Triangle Institute: Research Triangle Park, NC, 1974, pp. 135-146.

Keeling, C.D., Atmospheric CO2 concentrations (ppmv) derived from in situ ari samples collected at Mauna Loa Observatory, Hawaii, http://cdiac.esd.ornl.gov/ftp/maunaloa-co2/maunaloa.co2, Jul. 25, 2003, 2 pages.

Khan, T. et al., "Improving Limestone Utilization in Circulating Fluidized Bed Combustors Through the Reactivation and Recycle of Partially Utilized Limestone in the Ash", Fluidized Bed Combustion, 2, ASME, 1995, pp. 831-840.

Kikkinides, E.S. et al., "Concentration and Recovery of CO2 From Flue Gas by Pressure Swing Adsorption", Ind. Eng. Chem. Res., 32(11), 1993, pp. 2714-2720.

Kirchgessner, D.A., et al., "Enhancement of Reactivity in Surfactant-Modified Sorbents for Sulfur Dioxide Control", Ind. Eng. Chem. Res., 28(4), 1989, pp. 413-418.

Kirchgessner, D.A. et al., "Lignosulfonate-Modified Calcium Hydroxide for Sulfur Dioxide Control", Ind. Eng. Chem. Res., 26(11), 1987, pp. 2397-2400.

Li, G.G. et al., "CO2 reaction with Ca(OH)2 during SO2 removal with convective pass sorbent injection and high temperature filtration", Environ Eng Policy, 2, 2000, pp. 47-56.

Li, Y.U. et al., "The effect of the binder on the manufacture of a 5A zeolite monolith", Powder Technology, 116, 2001, pp. 85-96.

Lin, S.Y. et al., "Developing an innovative method, HyPr-RING, to Product Hydrogen from hydrocarbons", Energy Conversion and Management, 43, 2002, pp. 1283-1290.

Lin, S. et al., "Process analysis for hydrogen production by reaction integrated novel gasification (HyPr-RING)", Energy Conversion and Management, 46, 2005, pp. 869-880.

Mahuli, S. et al., "Mechanism of Arsenic Sorption by Hydrated Lime", Environ. Sci. Technol., 31(11), 1997, pp. 3226-3231.

Mahuli, S.K. et al., "Pore-Structure Optimization of Calcium Carbonate for Enhanced Sulfation", AIChE Journal, 43 (9), 1997, pp. 2323-2335.

Manovic, V. et al., "Parametric Study on the CO2 Capture Capacity of a CaO-Based Sorbents in Looping Cycles", Energy & Fuels, 22(3), 2008, 1851-1857.

Manovic, V. et al., "Sequential SO2/CO2 capture enhanced by steam reactivation of a CaO-based sorbent", Fuel, 87, 2008, pp. 1564-1573.

Manovic, V. et al., "Steam hydration of sorbents from a dual fluidized bed CO2 looping cycle reactor", Fuel, 87, 2008, pp. 3344-3352.

Manovic, V. et al., "Sulphation and carbonation properties of hydrated sorbents from a fluidized bed CO2 looping cycle reactor", Fuel, 87, 2008, pp. 2923-2931.

Manovic, V. et al., "Thermal Activation of CaO-Based Sorbent and Self-Reactivation during CO2 Capture Looping Cycles", Environmental Science & Technology, 42(11), 2008, pp. 4170-4174.

Markowski, G.R. et al., "Trace Element Concentration as a Function of Particle Size in Fly Ash from a Pulverized Coal Utility Boiler", Env. Sci. Tech., 19(9), 1985, pp. 796-804.

Martinez, J.C. et al., Reactivation of Fly Ash and Ca(OH)2 Mixtures for SO2 Removal of Flue Gas, Ind. Eng. Chem. Res., 30(9), 1991, pp. 2143-2147.

Marquis, D.L., "Reactivation of Spent CFB Limestone by Hydration", Master of Science in Engineering Thesis, The University of New Brunswick, Fredericton, NB, Sep. 1992, 179 pages.

Mess, D. et al., "Product Layer Diffusion during the Reaction of Calcium Oxide With Carbon Dioxide", Energy & Fuels, 13(5), 1999, pp. 999-1005.

Milne, C.R. et al., "High-Temperature, Short-Time Sulfation of Calcium-Based Sorbents. 2. Experimental Data and Theoretical Model Predictions", Ind. Eng. Chem. Res., 29(11), 1990, pp. 2201-2214.

Mimura, T. et al., "Development of Energy Saving Technology for Flue Gas Carbon Dioxide Recovery in Power Plant by Chemical Absorption Method and Steam System", Energy Convers. Manage, 38, Suppl. P, 1997, pp. S57-S62.

Newsome, D.S., "The Water-Gas Shift Reaction", Catal. Rev. Sci. Eng., 21(2), 1980, pp. 275-318.

Nishev, T. et al., "Kinetics of Carbonization of Calcium Sulfide in Water Suspension", J. Chem. Tech. Biotechnol., 56, 1993, pp. 271-272.

Oakeson, W.G. et al., "Effect of CO2 Pressure on the Reaction with CaO", Journal of The American Ceramic Society, 62(11-12), 1979, pp. 556-558.

Ondov, J.M. et al., "Emissions and Particle-Size Distributions of Minor and Trace Elements at Two Western Coal-Fired Power Plants Equipped with Cold-Side Electrostatic Precipitators", Environmental Science & Technology, 13(8), Aug. 1979, pp. 946-953.

Abanades, J.C., "The maximum capture efficiency of CO2 using a carbonation/calcinations cycle of CaO/CaCO3", Chemical Engineering Journal, 90, 2002, pp. 303-306.

Abanades, J.C. et al., "Conversion Limits in the Reaction of CO2 with Lime", Energy and Fuels, 17(2), 2003, pp. 308-315.

Abanades, J.C. et al., "Capture of CO2 from Combustion Gases in a Fluidized Bed of CaO", AIChE Journal, 50(7), Jul. 2004, pp. 1614-1622.

Abanades, J.C. et al., "Sorbent Cost and Performance in CO2 Capture Systems", Ind. Eng. Chem. Res., 43(13), 2004, pp. 3462-3466.

Adánez, J. et al., "Regeneration of Sulfided Dolomite with Steam and Carbon Dioxide", Energy & Fuels, 15(1), 2001, pp. 85-94.

Agnihorti, R. et al., "Influence of Surface Modifiers on the Structure of Precipitated Calcium Carbonate", Ind. Eng. Chem. Res., 38(6), 1999, pp. 2283-2291.

Agnihotri, R. et al., "Sorbent/Ash Reactivation for Enhanced SO2 Capture Using a Novel Carbonation Technique", Ind. Eng. Chem. Res., 38(3), 1999, pp. 812-819.

Al-Shawabkeh et al., Enhanced SO2 Abatement with Water-Hydrated Dolomitic Particles, AIChE Journal, 43(1), Jan. 1997, 173-179.

Balasubramanian, B. et al., "Hydrogen from methane in a single-step process", Chemical Engineering Science, 54, 1999, pp. 3534-3552.

Barker, R., "The Reactivity of Calcium Oxide Towards Carbon Dioxide and Its Use for Energy Storage", J. Appl. Chem. Biotechnol., 24, 1974, pp. 221-227.

Barker, R., The Reversibility of the Reaction CaCO3 <— —> CaCO+CO2, J. Appl. Chem. Biotechnol., 23, 1973, pp. 733-742.

Beruto, D. et al., "Calcium oxides of high reactivity", Nature, 263, Sep. 16, 1976, pp. 221-222.

Beruto, D. et al., "Characterization of the Porous CaO Particles Formed by Decomposition of CaCO3 and Ca(OH)2 in Vacuum", Journal of the American Ceramic Society, 63(7/8), 1980, pp. 439-443.

Bhatia, S.K. et al., "The Effect of Pore Structure on Fluid-Solid Reactions: Application to the SO2-Lime Reaction", AIChE Journal, 27(2), Mar. 1981, pp. 226-234.

Bhatia, S.K. et al., "Effect of the Product Layer on the Kinetics of the CO2-Lime Reaction", AIChE Journal, 29(1), Jan. 1983, pp. 79-86.

Biswas, S.C. et al., "Hydrogen Sulphide from Reduced Gypsum", Fert. Technol., 13(4), 1976, pp. 255-258.

Blauwhoff, P.M.M. et al., "A Study on the Reaction Between CO2 and Alkanolamines in Aqueous Solutions", Chemical Engineering Science, 39(2), 1984, pp. 207-225.

Borgwardt, R.H., "Sintering of Nascent Calcium Oxide", Chemical Engineering Science, 44(1), 1989, pp. 53-60.

Bortz, S. et al., "Recent IFRF Fundamental and Pilot Scale Studies on the Direct Sorbent Injection Process", International Flame Research Foundation, 1985, pp. 17-1-17-22.

Brooks, M.W. et al., "Recovery of Calcium Carbonate and Hydrogen Sulfide from Waste Calcium Sulfide", Ind. Eng. Chem. Res., 36(10), 1997, pp. 4236-4242.

Bruce, K.R. et al., "Comparative SO2 Reactivity of CaO Derived from CaCO3 and Ca(OH)2", AIChE Journal, 35(1), Jan. 1989, pp. 37-41.

Butt, D.P. et al., "Kinetics of Thermal Dehydroxylation and Carbonation of Magnesium Hydroxide", J. Am. Ceram. Soc., 79(7), 1996, pp. 1892-1898.

Chauk, S.S. et al., "Kinetics of High-Pressure Removal of Hydrogen Sulfide Using Calcium Oxide Powder", AIChE Journal, 46(6), Jun. 2000, pp. 1157-1167.

Couturuer, M.F. et al., "Reactivation of Partially-Sulphated Limestone Particles form a CFB Combustor by Hydration", The Canadian Journal of Chemical Engineering, 72, Feb. 1994, pp. 91-97.

Dash, S. et al., "Nanocrystalline and metastable phase formation in vacuum thermal decomposition of calcium carbonate", Thermochimica Acta, 363, 2000, pp. 129-135.

Davis, C. et al., "High value opportunities from the chicken egg", RIRDC Publication No. 02/094, Aug. 2002, 69 pages.

Davison, R.L. et al., "Trace Elements in Fly Ash", Environmental Science & Technology, 8(13), Dec. 1974, pp. 1107-1113.

Dedman, A.J. et al., "Calcium Cyanamide Synthesis, Part 4. The Reaction CaO +CO2 =CaCO3" Trans. Faraday Soc., 58, 1962, pp. 2027-2035.

Denton, L. et al., "Simultaneous Production of High-Purity Hydrogen and Sequestration-Ready CO2 From Syngas", GE Final Technical Report, Dec. 2003, 108 pages.

Deshmukh, A.C. et al., "Preservation of Hatchery Waste by Lactic Acid Fermentation. 2. Large Scale Fermentation and Feeding Trial to Evaluate Feeding Value.", Poultry Science, 76, 1997, pp. 1220-1226.

Dismukes, E.B., "Trace element control in electrostatic precipitators and fabric filters", Fuel Processing Technology, 39, 1994, pp. 403-416.

Doong, S. et al., "A Novel Membrane Reactor for Direct Hydrogen Production From Coal", DOE Final Technical Report, http://www.osti.gov/bridge/servlets/purl/876470-v2hbxY/876470.PDF, Jan. 2006, 58 pages.

Fan, L.S. et al., "Clean Coal Technologies: OSCAR and CARBONOX Commercial Demonstrations", AIChE Journal, 48(10), Oct. 2002, pp. 2115-2123.

Fenouil, L.A. et al., "Study of Calcium-Based Sorbents for High-Temperature H2S Removal. 1. Kinetics of H2S Sorption by Uncalcined Limestone", Ind. Eng. Chem. Res., 34(7), 1995, pp. 2324-2333.

Fenouil, L.A. et al., "Study of Calcium-Based Sorbents for High-Temperature H2S Removal. 2. Kinetics of H2S Sorption by Calcined Limestone", Ind. Eng. Chem. Res., 34(7), 1995, pp. 2334-2342.

Fernández, A.I. et al., "Kinetic study of carbonation of MgO slurries", Hydrometallurgy, 53, 1999, pp. 155-167.

Froning, G.W., "Recent Advances in Egg Products Research and Development", University of California Egg Processing Workshop, Jun. 2-3, 1998, 7 pages.

Froning, G.W. et al., "Research Note: Utilisation of Inedible Eggshells and Technical Egg White Using Extrusion Technology", Poultry Science, 69, 1990, pp. 2051-2053.

Germani, M.S. et al., "Vapor-Phase Concentrations of Arsenic, Selenium, Bromine, Iodine, and Mercury in the Stack of a Coal-Fired Power Plant", Environ. Sci. Technol., 22(9), 1988, pp. 1079-1085.

Ghosh-Dastidar, A. et al., "Investigation of High-Reactivity Calcium Carbonate Sorbent for Enhanced SO2 Capture", Ind. Eng. Chem. Res., 35(2), 1996, pp. 598-606.

Ghosh-Dastidar, A. et al., "Selenium Capture Using Sorbent Powders: Mechanisms of Sorption by Hydrated Lime", 1995, 5 pages (also published as Environ. Sci. Technol., 30, 1996, pp. 447-452).

Ghosh-Dastidar, A. et al., "Ultrafast Calcination and Sintering of Ca(OH)2 Powder: Experimental & Modeling", Chemical Engineering Science, 50(13), 1995, pp. 2029-2040.

Gittins, J. et al., "Utilisation of Egg Shell Waste from UK Egg Processing and Hatchery Establishments", ADAS report, http://www.defra.gov.uk.foodrin/poultry/utilisation.htm, May 2002, 7 pages.

Gullett, B.K. et al., "Pore Distribution Changes of Calcium-Based Sorbents Reacting with Sulfur Dioxide", AIChE Journal, 33(10), Oct. 1987, pp. 1719-1726.

Gullett, B.K. et al., "Reduction of Coal-Based Metal Emissions by Furnace Sorbent Injection", Energy and Fuels, 8(5), 1994, pp. 1068-1076.

Gupta, H. et al., "Carbonation-Calcination Cycle Using High Reactivity Calcium Oxide for Carbon Dioxide Separation from Flue Gas", Ind. Eng. Chem. Res., 41(1)6, 2002, pp. 4035-4042.

Gupta, H., "NOx Reduction by Carbonaceous Materials and CO2 Separation Using Regenerative Metal Oxides From Fossil Fuel Based Flue Gas", Dissertation, The Ohio State University, cataloged Oct. 1, 2001, 75 pages.

Gupta, H. et al., "Reactive separation of CO2 using pressure pelletized limestone", Int. J. Environmental Technology and Management, 4,(1/2), 2004, pp. 3-20.

Gupta, H. et al., The Role of CaO in Maximizing Hydrogen Production from Fossil Fuels, Proceedings from Fuel Cell Seminar, San Antonio, Texas, 2004, 4 pages.

Hajaligol, M.R. et al., "Analysis and Modeling of the Direct Sulfation of CaCo3", Ind. Eng. Chem. Res., 27(12), 1988, pp. 2203-2210.

Ortiz, L.A. et al., "Hydrogen Production Using Sorption Enhanced Reaction", Ind. Eng. Chem. Res., 40(23), 2001, pp. 5102-5109.

Pauley, C.P. et al., "N-ReN Recovers CO2 from flue gas economically", Technology, Oil Gas Journal, 82(20), May 14, 1984, pp. 87-92.

Qiu, K. et al., "Oxidation behaviour of desulphurization residues from gasification and fuel-rich combustion", Fuel, 78, 1999, pp. 225-231.

Raghunathan, K. et al., "A technique for the study of ultrafast gas-solid reactions for residence times less than 100 ms", Rev. Sci. Instrum., 63(11), 1992, 5469-5471.

Rao, A.B. et al., "A Technical, Economic, and Environmental Assessment of Amine-Based CO2 Capture Technology for Power Plant Greenhouse Gas Control", Environ. Sci. Technol., 36(20), 2002, pp. 4467-4475.

Reimer, P. et al., "CO2 Capture from Power Generation", IEA Greenhouse Gas R&D Programme, Cheltenham, Gloucester, U.K., www.ieagreen.org.uk, 2001, 2 pages.

Roark, S.E. et al., "Hydrogen Separation Membranes for Vision 21 Energy Plants", Proceedings of the International Technical Conference on Coal Utilization & Fuel Systems, 27(1), 2002, 11 pages.

Rosen, M.A. et al., "Comparative Efficiency Assessments for a Range of Hydrogen Production Processes", Int. J. Hydrogen Energy, 23(8), 1998, pp. 653-659.

Rosen, M.A. et al., "Thermodynamic Comparison of Hydrogen Production Processes", Int. J. Hydrogen Energy, 21 (5), 1996, pp. 349-365.

Ruth, L.A. et al., "Developing Regenerable SO2 Sorbents for Fluidized Bed Coal Combustion Using Thermogravimetric Analysis", Thermochimica Acta, 26, 1978, pp. 241-255.

Sasaoka, E. et al., "Novel Preparation Method of Macroporous Lime from Limestone for High-Temperature Desulfurization", Ind. Eng. Chem. Res., 36(9), 1997, pp. 3639-3646.

Sawada, Y. et al., "Thermal analysis of basic zinc carbonate, Part 1. Carbonation process of zinc oxide powders at 8 and 13° C.", Thermochimic. Acta, 273, 1996, pp. 95-102.

Schubert, H., "Grudlagen des Agglomerierens", Chem.-Ing.-Tech., 51(4), 1979, pp. 266-277.

Shaheen, W.M. et al., "Effect of thermal treatment on physiocochemical properties of pure and mixed manganese carbonate and basic copper carbonate", Thermochimic. Acta, 322, 1998, pp. 117-128.

Shearer, J.A. et al., "Hydration Enhanced Sulfation of Limestone and Dolomite in the Fluidized-Bed Combustion of Coal", Journal of the Air Pollution Control Association, 30(6), Jun. 1980, pp. 684-688.

Simbeck, D.R., "CO2 Mitigation Economics for Existing Coal-fired Power Plants", First National Conference on Carbon Sequestration, Washington DC, May 14-17, 2001, pp. 1-12.

Snow, M.J.H. et al., "Direct Sulfation of Calcium Carbonate", Ind. Eng. Chem. Res., 27(2), 1988, pp. 268-273.

Song, J.H. et al., "Solubility of Carbon Dioxide in Monoethanolamine + Ethylene Glycol + Water and Monoethanolamine + Poly(ethylene glycol) + Water", J. Chem. Eng. Data, 41(3), 1996, pp. 497-499.

Stiegel, G.J. et al., "Hydrogen from coal gasification: An economical pathway to a sustainable energy future", International Journal of Coal Geology, 65, 2006, pp. 173-190.

Sun, P. et al., "The Effect of CaO Sintering on Cyclic CO2 Capture in Energy Systems", Environmental and Energy Engineering, 53(9), Sep. 2007, pp. 2432-2442.

Sun, P. et al., "Removal of CO2 by Calcium-Based Sorbents in the Presence of SO2", Energy & Fuels, 21(1), 2007, pp. 163-170.

Tacon, A.G.J., "Utilisation of Chick Hatchery Waste: The Nutritional Characterizes of Day Old Chicks and Egg Shells", Agricultural Wastes, 4, 1982, 335-343.

Thurnau, R.C. et al., "The Behavior of Arsenic in a Rotary Kiln Incinerator", Air Waste Manage. Assoc., 42(2), 1992, pp. 179-184.

Tinkler, M.J. et al., "Towards a Coal-Capable Solid Oxide Fuel Cell System", Proceedings of the 26th International Technical Conference on Coal Utilization and Fuel Systems, Clearwater, Florida, Mar. 5-8, 2001, pp. 569-570.

Tsuchiai, H. et al., "Highly Active Absorbent for SO2 Removal Prepared from Coal Fly Ash", Ind. Eng. Chem. Res., 34(4), 1995, pp. 1404-1411.

Tullin, C. et al., "Direct Sulfation of CaCO3: The Influence of CO2 Partial Pressure", Energy & Fuels, 7(4), 1993, pp. 512-519.

Tullin, C. et al., "Reaction between Calcium Carbonate and Sulfur Dioxide", Energy & Fuels, 3(3) 1989, pp. 284-287.

Uberoi, M. et al., "High-Temperature Removal of Cadmium Compounds Using Solid Sorbents", Environ. Sci. Technol., 25(7), 1991, pp. 1285-1289.

Uberoi, M. et al., "Sorbents for Removal of Lead Compounds from Hot Flue Gases", AIChE Journal, 36(2), 1990, pp. 307-309.

U.S. Department of Energy, "Carbon Sequestration R & D Program Plan: FY 1999-FY 2000", Office of Fossil Energy, Federal Energy Technology Center, www.fetc.doe.gov, Jun. 1999, 28 pages.

Vincent Corporation, Tampa Florida, press release, www.vincentcorp.com, Issue 77, May 19, 1998, 1 page.

Wang, J. et al., "On the Decay Behavior of the CO2 Absorption Capacity of CaO-Based Sorbents", Ind. Eng. Chem. Res., 44(3), 2005, pp. 627-629.

Wei, S.H. et al., "High Surface Area Calcium Carbonate: Pore Structural Properties and Sulfation Characteristics", Ind. Eng. Chem. Res., 36(6), 1997, pp. 2141-2148.

White, C.M. et al., "Separation and Capture of CO2 from Large Stationary Sources and Sequestration in Geological Formations-Coalbeds and Deep Saline Aquifers", J. Air & Waste Manage. Assoc., 53, 2003, pp. 645-715.

Wouterlood, H.J. et al., "Removal and Recovery of Arsenious Oxide from Flue Gases", Environmental Science & Technology, 13(1), Jan. 1979, pp. 93-97.

Wu, B. et al., "Multi-Functional Sorbents for the Removal of Sulfur and metallic Contaminants from High Temperature Gases", Environ. Sci. Technol., 29, 1995, pp. 1660-1665.

Wu, S. et al., "Effect of Pore-Size Distribution of Lime on the Reactivity for the Removal of SO2 in the Presence of High-Concentration CO2 at High Temperature", Ind. Eng. Chem. Res., 41(22), 2002, pp. 5455-5458.

Zeman, F., "Effect of steam hydration on performance of lime sorbent for CO2 capture", International Journal of Greenhouse Gas Control, 2, 2008, pp. 203-209.

Zhang, Z. et al., "Separation of Nitrogen-Carbon Dioxide Mixture by Rapid Pressure Swing Adsorption", Adsorption, 4, 1998, pp. 173-177.

Zheng, L. et al., "Comparison of Shell, Texaco, BGL and KRW gasifiers as part of IGCC plant computer simulations", Energy Conversion and Management, 46, 2005, pp. 1767-1779.

Ziock, H.J. et al., "Zero Emission Coal Power, a New Concept", http://www.netl.doe.gov/publications/proceedings/01/carbon_seq/2b2.pdf, 9 pages.

Fan, L. et al., "Ultilization of chemical looping strategy in coal gasification processes", Particuology, 6, 2008, pp. 131-142.

* cited by examiner

CaO + H₂S ⟷ CaS + H₂O

CaO + COS ⟷ CaS + CO₂

$$CaO + 2HCl \longleftrightarrow CaCl_2 + H_2O$$

- ✓ In-situ removal of $H_2S$ from fuel gas from coal gasifier
- ✓ Application
  - Hot gas clean-up in IGCC's
- ✓ Reaction temperature: 800°C
- ✓ $P_T$ = 1 MPa, 3 kPa
- ✓ Strong effect of surface area on reactivity of $CaCO_3$ particles $$CaO + H_2S \longleftrightarrow CaS + H_2O$$

T=650°C, 10.3% CO, 31% H$_2$O, 20 atm

T=650°C, 10.3% CO, 31% H$_2$O, 20 atm

T=600°C, P=0 psig, 10.3% CO, Total flow=0.725 slpm (N₂/Steam free)

Enhance the efficiency of the Synfuels (CTL Technology)

C1-C4 conversion

Carbonation

WGSR

Sulfidation

▷ Simultaneous Reforming, WGSR, $CO_2$ and Sulfur capture integrated in one module ▷ Produce a 2:1 ration of $H_2$:CO for FT synthesis ▷ Remove $H_2S$ to ppb levels ▷ Produce a sequestrable $CO_2$ stream ▷ Reduce excess steam requirement

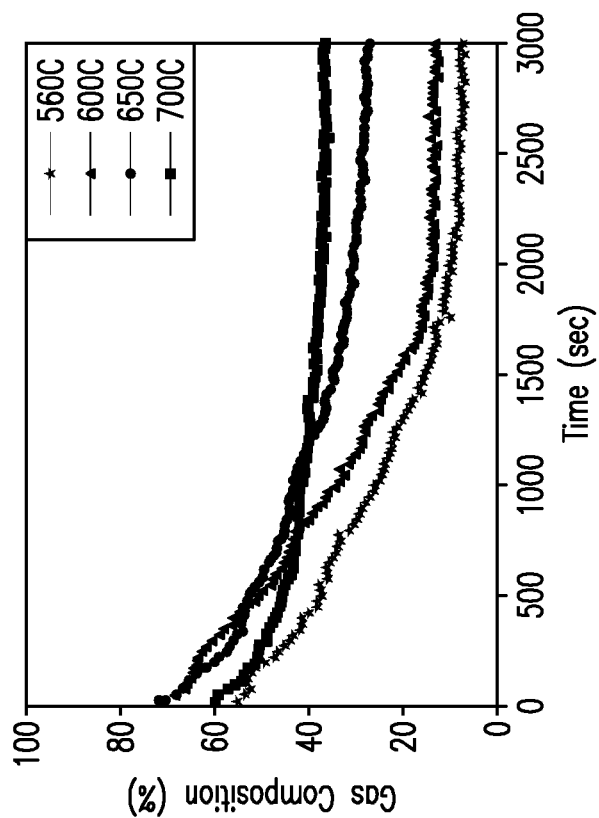
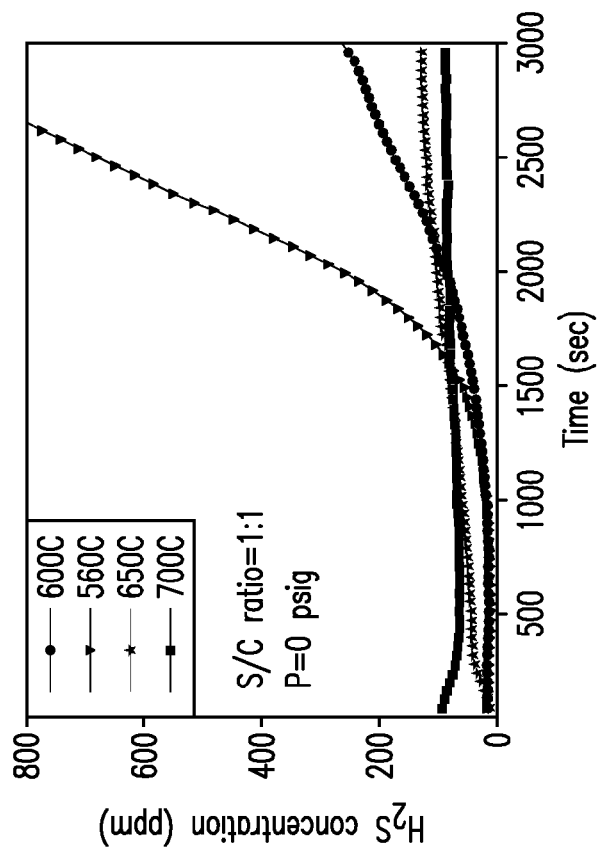
FIG-56

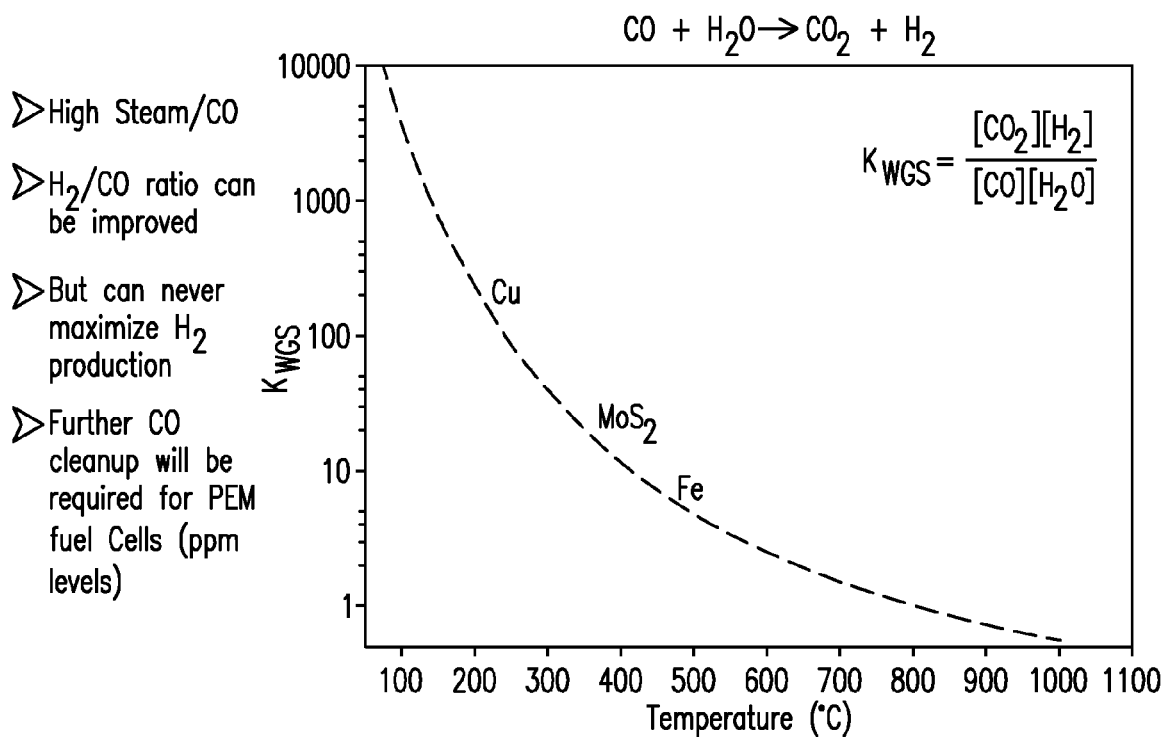

FIG-57

- All temperature ranges
  - ✓ High temperature: Palladium 1mm thick 350-900°C
  - ✓ Low temperature: Polymer membranes
  - ✓ Hydrogen separated is at low pressure
- Drawbacks of Catalysis/Membranes
  - ✓ High Pressure, High purity and High Temperature $H_2$ not achieved

FIG-58

- Sulfur impurities in the form of $H_2S$ and COS
- Typical concentration in the gasifier
  - $H_2S$: 0.5-1.5%
  - COS: 50-450 ppm
- Conventional amine processes
  - Energy intensive
  - High pressure high temperature hydrogen cannot be produced
- A separate clean up unit is required

FIG-59

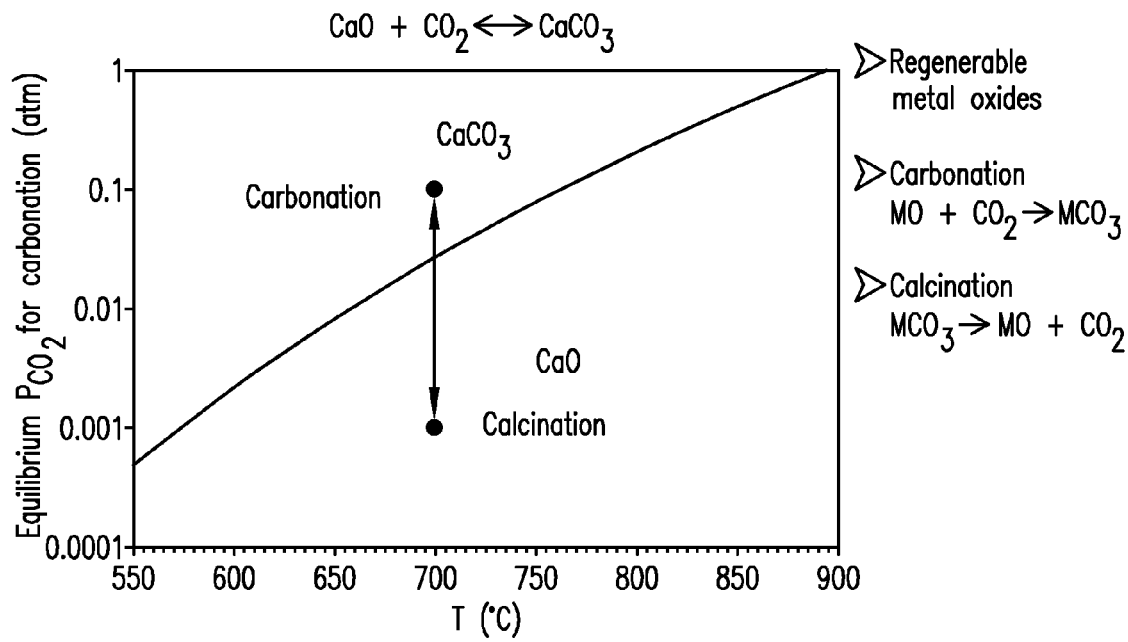

FIG-60

Fuel Gas Compositions

|  | Moving Bed, dry | Moving Bed slagging | Fluidized Bed | Entrained Flow, slurry | Entrained Flow, dry |
|---|---|---|---|---|---|
| Oxidant | air | Oxygen | Oxygen | Oxygen | Oxygen |
| Fuel | Sub Bituminous | Bituminous | Lignite | Bituminous | Bituminous |
| Pressure (psi) | 295 | 465 | 145 | 615 | 365 |
| CO | 17.4 | 46 | 48.2 | 41 | 60.3 |
| H2 | 23.3 | 26.4 | 30.6 | 29.8 | 30 |
| CO2 | 14.8 | 2.9 | 8.2 | 10.2 | 1.6 |
| H2O | ... | 16.3 | 9.1 | 17.1 | 2 |
| N2 | 38.5 | 2.8 | 0.7 | 0.8 | 4.7 |
| CH4 + HCs | 5.8 | 4.2 | 2.8 | 0.3 | ... |
| H2S + COS | 0.2 | 1.1 | 0.4 | 1.1 | 1.3 |

▷ Typical gasifier $P_{CO_2}$ : 0.4 − 4.3 atm
▷ Equilibrium Temperature: 830−1000°C
▷ Operate below $T_{eq}$ for carbonation to occur
▷ Typical gasifier $P_{H_2O}$ : 12−20 atm
▷ Equilibrium Temperatures: 550−575°C
▷ Operate above $T_{eq}$ to prevent hydration of CaO

FIG-61

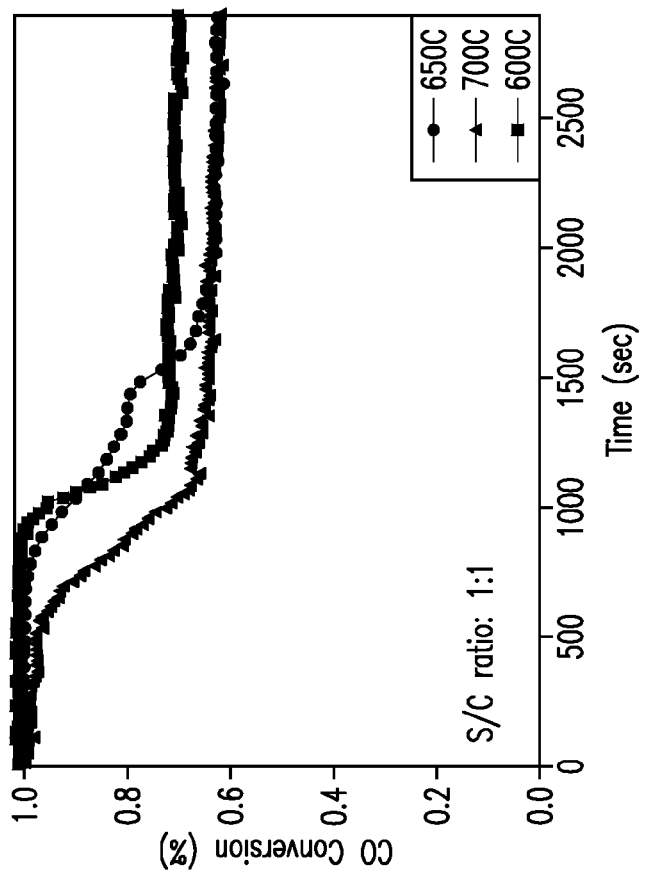
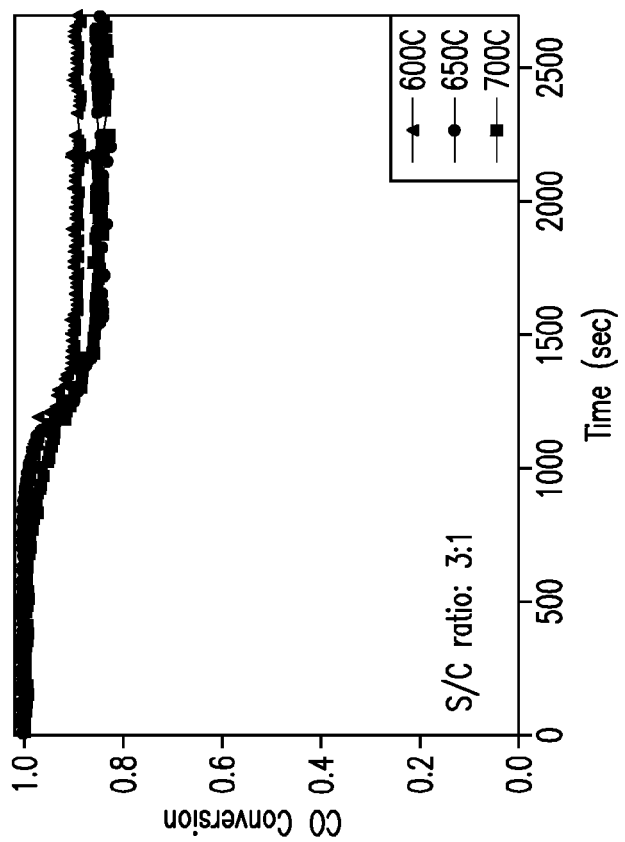
FIG-68

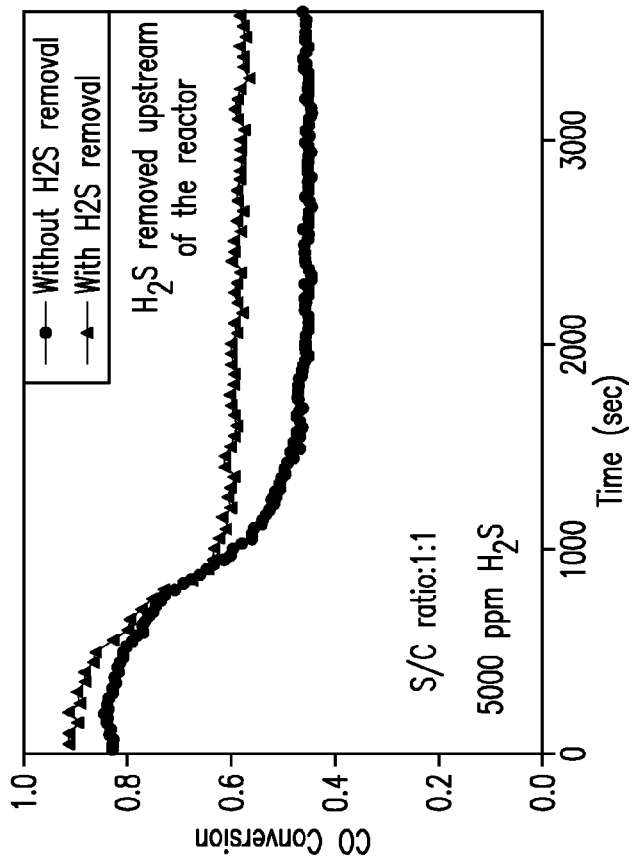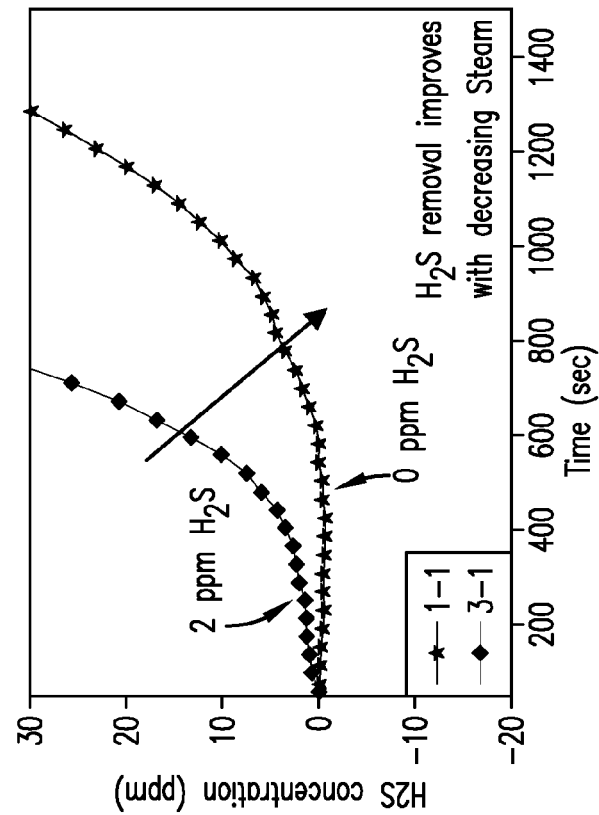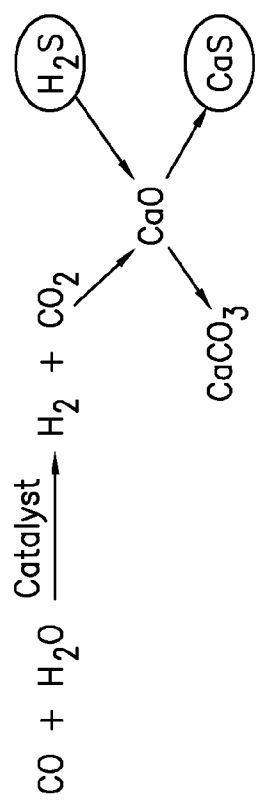
FIG-69

T=650°C, P=300 psig, 10.3% CO, Total flow=0.725 slpm (N$_2$/Steam free)

P=0 psig, 10.3% CO, Total flow=0.725 slpm (N$_2$/Steam free)

PCC

PCC-Calcined

PCC-Carbonated and sulfided at 0 psig

PCC-Carbonated and sulfided at 300 psig (1) Reduce excess steam requirement and operate at near-stoichiometric steam consumption
(2) Simultaneously remove $CO_2$ as well as sulfur and halides
(3) Produce a sequestrable $CO_2$ stream by sorbent regeneration
(4) to produce either a 90–95% $H_2$ stream (without WGS catalyst)
(5) 99+% high purity $H_2$ stream (with WGS catalyst) at high temperatures and pressures
(6) Evaluate process integration concepts such as sorbent–catalyst separation, in-situ sulfur capture, and sorbent regeneration
(7) Techno-economic feasibility study of various options for OSU process integration

FIG-75

Reaction phase:

C1–C4 conversion: $C_xH_y + H_2O \rightarrow CO + H_2$

WGSR: $CO + H_2O \rightarrow CO_2 + H_2$

Carbonation: $CaO + CO_2 \rightarrow CaCO_3$

Sulfidation: $CaO + H_2S \rightarrow CaS + H_2O$

Boudouard Reaction: $2CO \rightarrow CO_2 + C$

Regeneration phase:
Calcination: $CaCO_3 \rightarrow CaO + CO_2$

FIG-76

|  | Wabash River | Texaco | Koppers-Totzek | Shell (Lurgi) | Winkler | Possible NETL Compact Gasifier Composition |
|---|---|---|---|---|---|---|
| Nitrogen | 5.0% | 5.8% | 1.4% | 5.1% | 3.0% |  |
| Hydrogen | 26.0% | 27.0% | 32.8% | 29.7% | 49.5% | 32.5% |
| Carbon monoxide | 45.0% | 35.6% | 58.7% | 60.0% | 25.0% | 16.7% |
| Carbon dioxide | 14.0% | 12.6% | 7.1% | 2.3% | 18.0% | 11.1% |
| Water | 6.7% | 18.6% |  | 2.1% |  |  |
| Methane | 2.0% | 0.1% |  |  | 3.0% | **37.4% |
| $H_2S$ | 1.3% |  |  | 0.8% | 1.5% | 2.0% |
| Ammonia |  | 0.1% |  |  |  |  |
| Total | 100.0% | 99.8% | 100.0% | 100.0% | 100.0% | 99.7% |

** Methane, Ethane, Ethylene

T=600°C, 3% CO, 9% $H_2O$, Total flow=1.5 slpm

GTL & CTL: Current Status
- ▷ Gas to Liquids (GTL) is commercial
  - Approximately $25,000/bbl construction cost
  - Natural gas at $0.50–$1.0/MM Btus
  * RSP~$20–25/BBL
  - Exxon–Mobil, Shell and Sasol plants planned in Qatar and Nigeria
- ▷ Coal to Liquids (CTL) is technology
  - Sasol 150,000 BPD FT plants in South Africa
    (last plant built in 1980)
  * China Shenhua Sasol feasibility studies for 2 large FT plants
  - China Shenhua direct liquefaction plant
  - No large scale integrated plants built with advanced technology

FIG-84

What is CTL?
- ▷ Direct Coal Liquefaction
  - Bergius 1900
  - Many demo and pilot projects in 70's and 80's
  - Shenhua Project in China (HTI/Headwaters/Axens)
- ▷ Indirect Liquefaction
  - Fischer–Tropsch 1920's
  - Sasol 1 1950's
  - Sasols 2 & 3 1980's
  - Feasibility studies in China

FIG-85

- ▷ Chemical Processes (to generate syngas)
  - ✓ Steam Gasification: $C + H_2O \rightarrow CO + H_2$
  - ✓ Steam Methane Reforming: $CH_4 + H_2O \rightarrow CO + 3H_2$
  - ✓ Partial oxidation of HC: $C_xH_y + O_2 \rightarrow CO + H_2$
- ▷ Water Gas Shift Reaction (enhance $H_2$ production)
  - ✓ $CO + H_2O \rightarrow CO_2 + H_2$

FIG-86

▷ Sulfur impurities in the form of $H_2S$ and COS
▷ Typical concentration in the gasifier
  ▷ $H_2S$: 0.5–1.5%
  ▷ COS: 50–450 ppm
▷ Conventional amine processes
  ▷ Energy intensive
  ▷ High pressure high temperature hydrogen cannot be produced
▷ A separate clean up unit is required

FIG-87

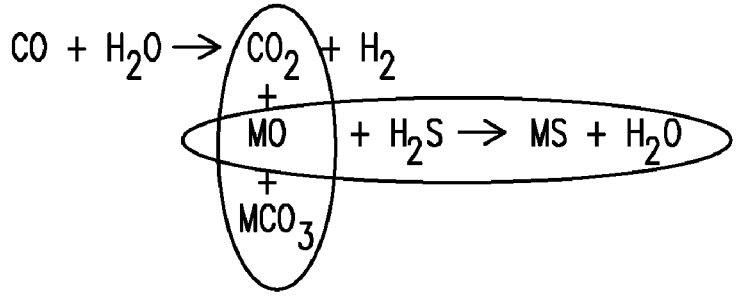

▷ Simultaneous WGSR, $CO_2$ removal, and Sulfur capture integrated in one module ▷ High purity $H_2$ production ▷ Reduce excess steam requirement ▷ Remove $H_2S$ to ppm levels

FIG-88

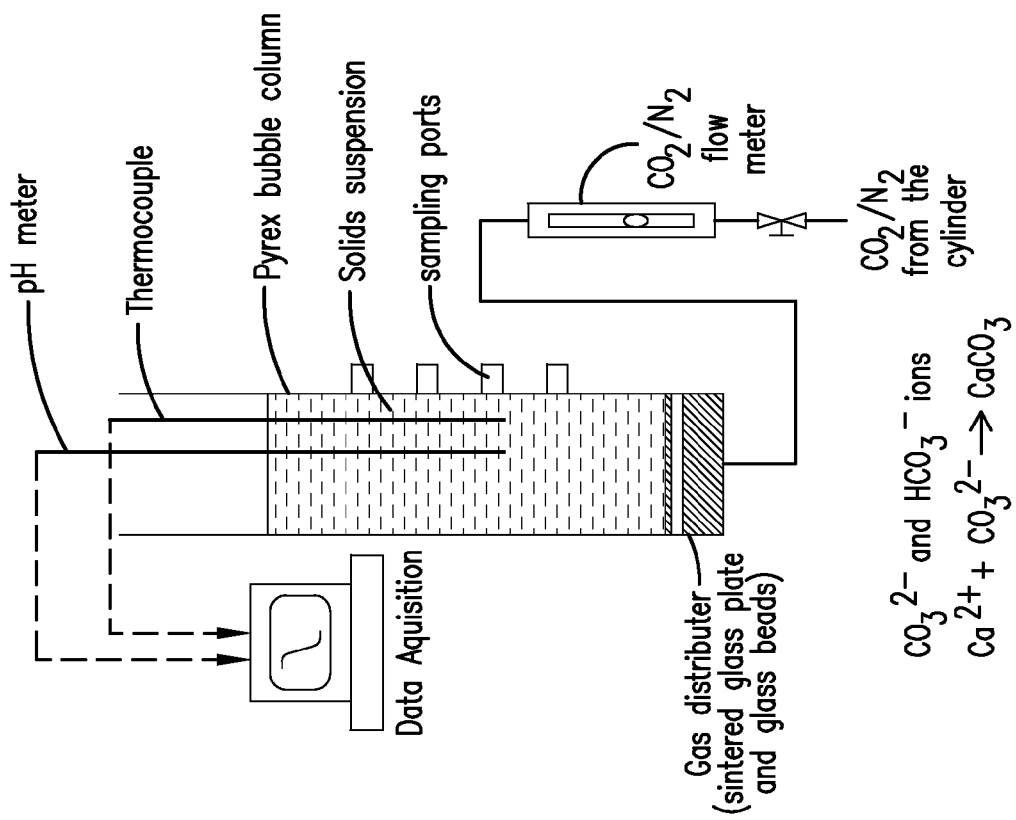
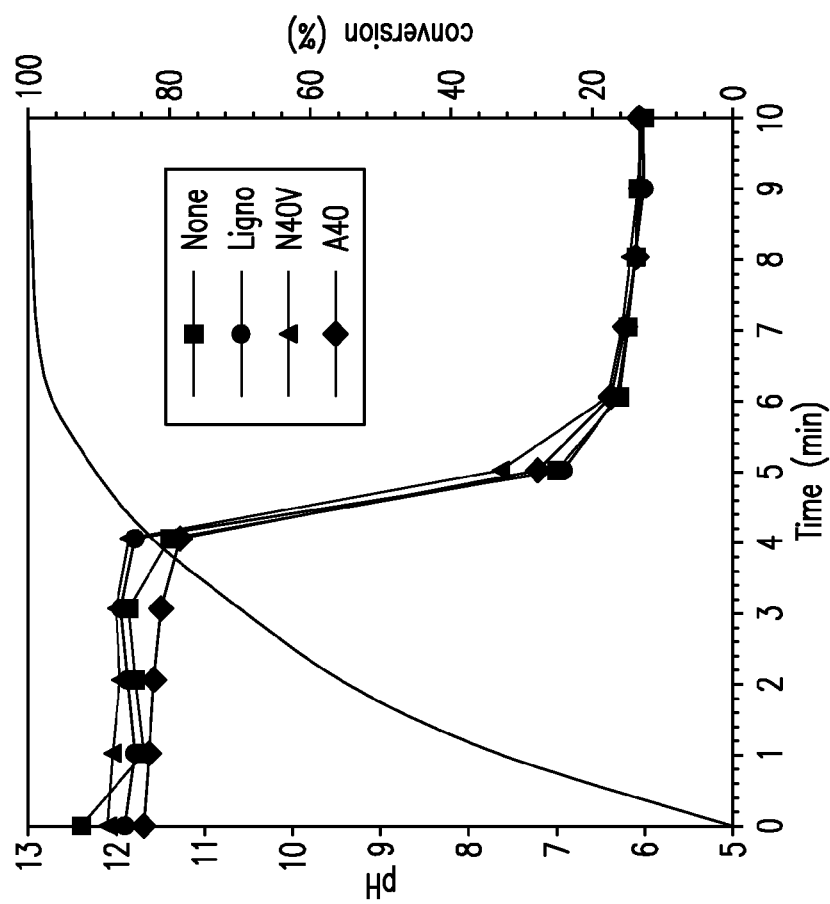
FIG-90

▷ Comparison of Surface Area, Pore Volume and Pore Size Distribution of PCC with other lime based sorbents ▷ PCC has mesoporous PSD with the highest SA and PV ▷ Two-regime heterogeneous
  Gas-Solid reaction
  ✓ Rapid kinetic regime
  ✓ Slow product layer
    diffusion regime Carbonation in TGA under 100% $CO_2$ Reaction phase:

WGSR: $CO + H_2O \rightarrow CO_2 + H_2$

Carbonation: $CaO + CO_2 \rightarrow CaCO_3$ $H_2S$ removal: $CaO + H_2S \rightarrow CaS + H_2O$ COS removal: $CaO + COS \rightarrow CaS + CO_2$ HCl removal: $CaO + 2HCl \rightarrow CaCl_2 + H_2O$ Regeneration phase:

Calcination: $CaCO_3 \rightarrow CaO + CO_2$

FIG-94

T=650°C, P=0 psig, 10.3% CO, S/C=3:1, Total flow=0.725 slpm ($N_2$/Steam free)

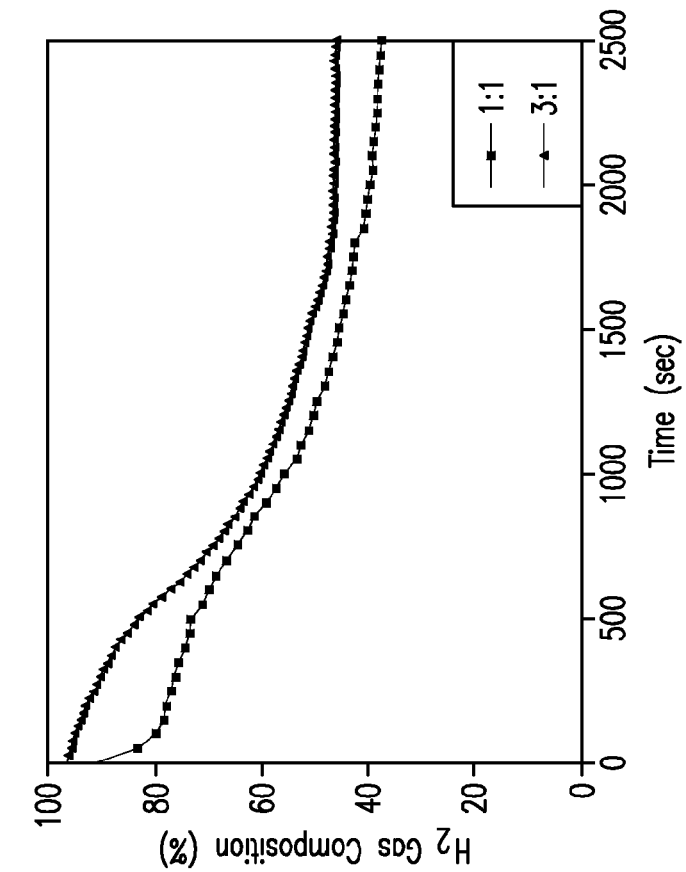
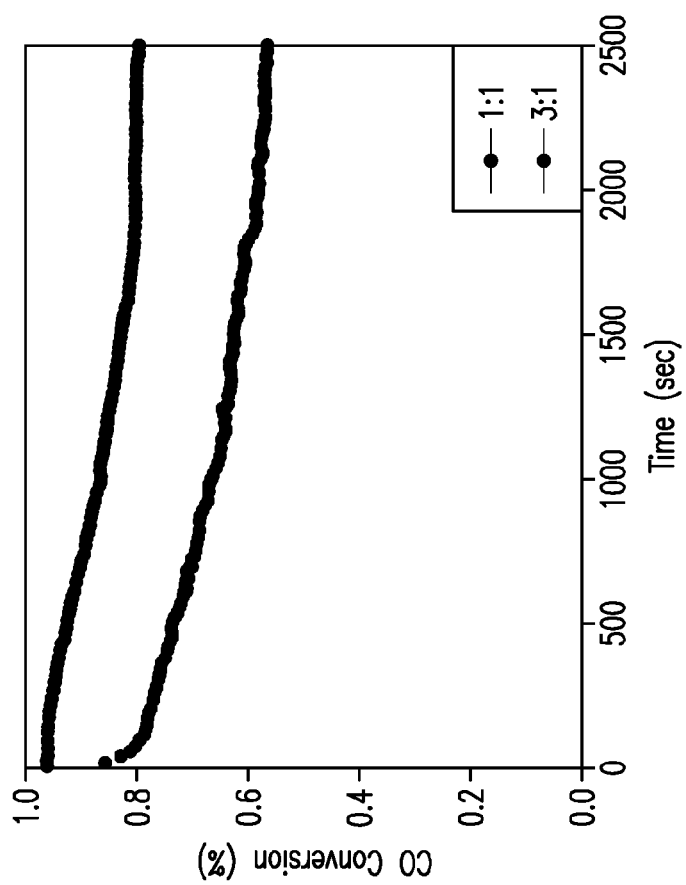
FIG-97
T=650°C, P=0 psig, 10.3% CO, Total flow=0.725 slpm ($N_2$/Steam free)

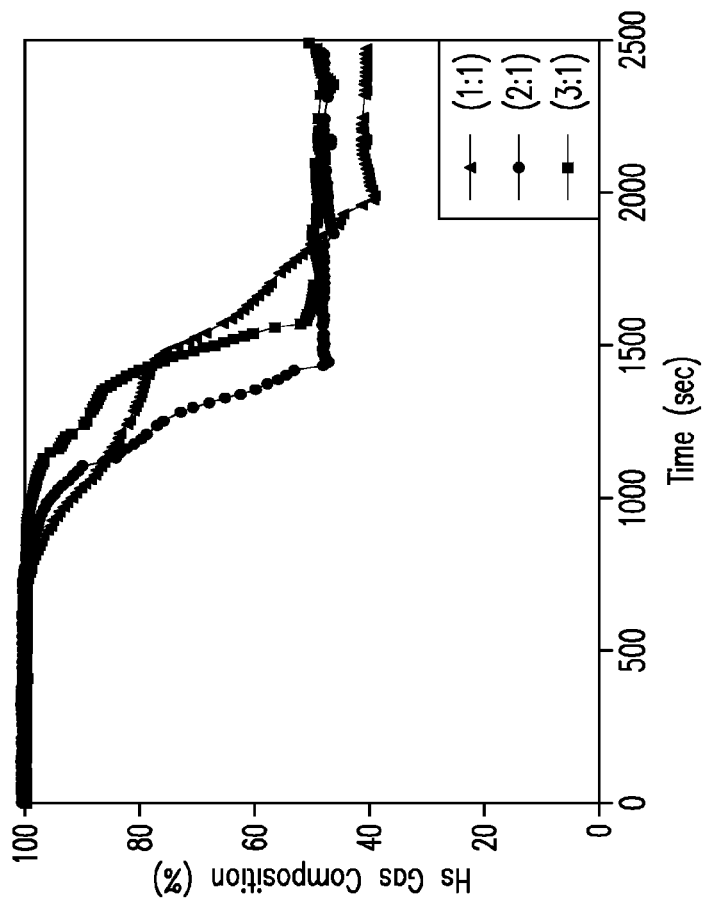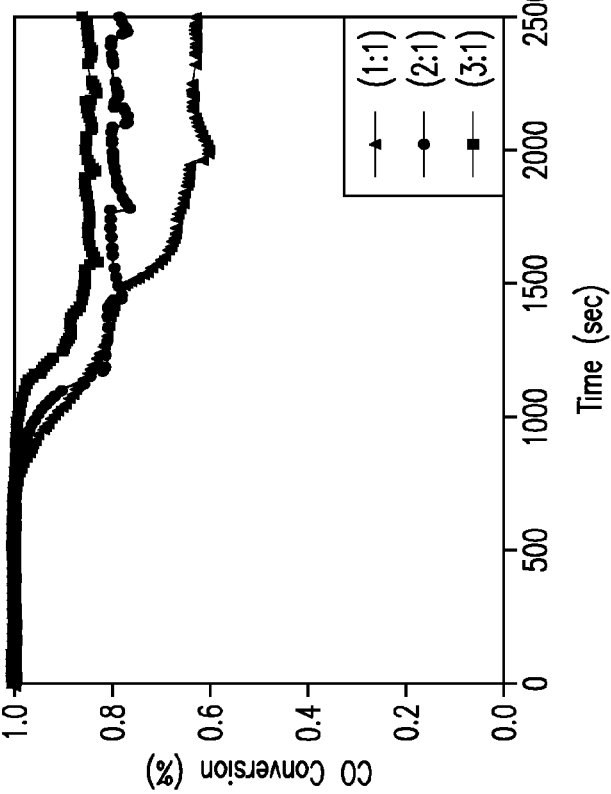
FIG-99
T=650°C, P=300 psig, 10.3% CO, Total flow=0.725 slpm ($N_2$/Steam free)

T=650°C, P=300 psig, 10.3% CO, Total flow=0.725 slpm (N$_2$/Steam free)

Integrated H$_2$ Production
CO$_2$ Capture and
H$_2$S removal
via PCC-WGS System -With HTS Catalyst
-Non catalytic

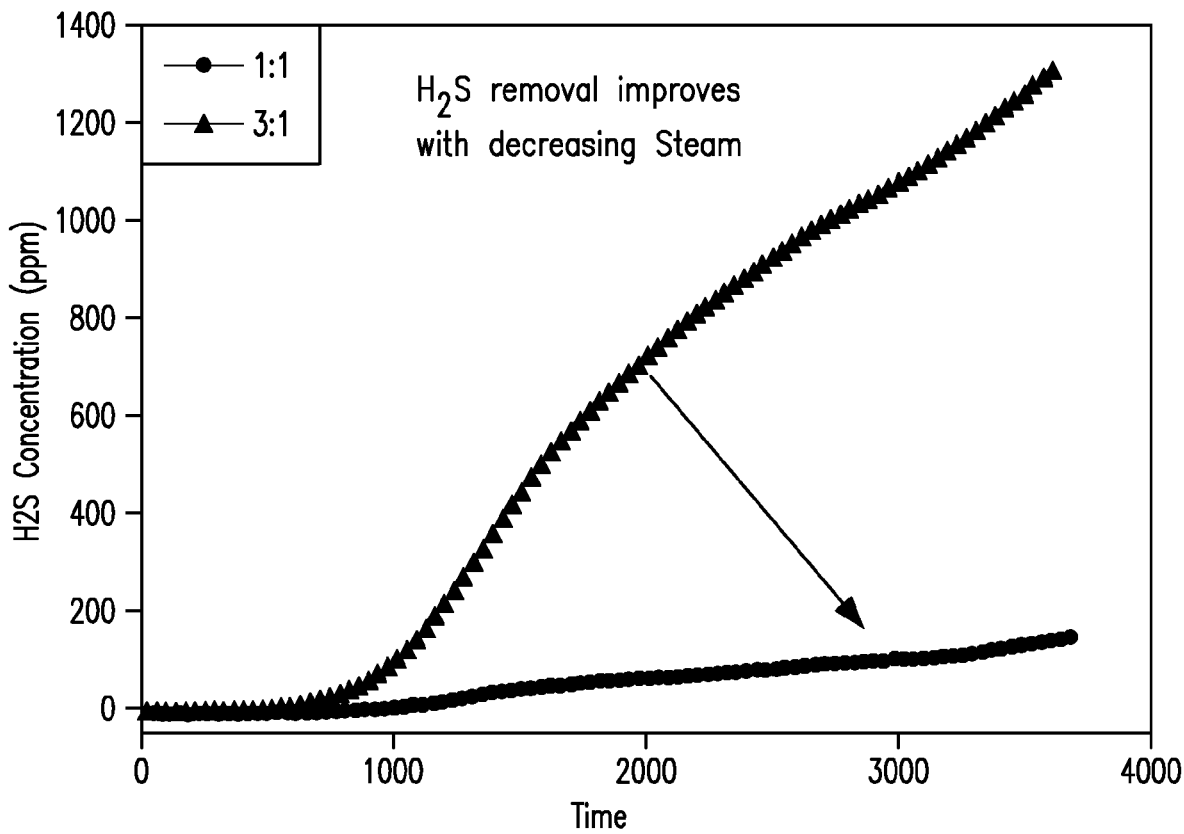

T=600°C, P=0 psig, 10.3% CO, Total flow=0.725 slpm (N$_2$/Steam free)

FIG-102

▷ High purity hydrogen can be produced using the calcium looping process
▷ By operating at high pressures and temperature of 600°C it is possible to reduce the steam requirement
▷ By reducing the steam requirement H$_2$S concentration in the outlet stream can be reduced to ppb levels
▷ High purity hydrogen production, sulfur removal and CO$_2$ separation achieved in the same reactor

FIG-103

▷ In-situ $CO_2$ removal from the Water gas mixture
▷ Drive the equilibrium limited WGS reaction forward ✓ Maximize $H_2$ production
✓ Reduce Steam consumption
✓ Remove CO and $CO_2$ to ppm levels
✓ Integrated $CO_2$ separation making this $H_2$ Production process $CO_2$ sequestration ready as well

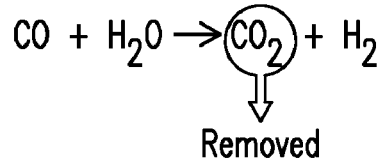

Removed

FIG-104

▷ High Pressure, Purity and Temperature $H_2$ possible

▷ In membrane reactors, $H_2$ production limited by WGS catalysis and not $H_2$ diffusion ▷ A lower temperature MO can provide high pressure and purity Hydrogen to be sold as a commodity (PEM applications)

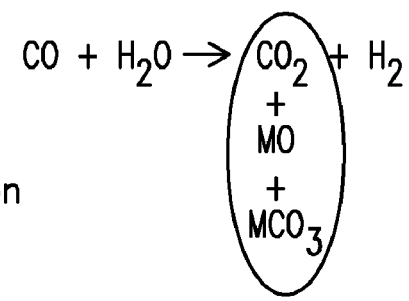

FIG-105

Reaction phase:

WGSR: $CO + H_2O \rightarrow CO_2 + H_2$

Carbonation: $CaO + CO_2 \rightarrow CaCO_3$

Regeneration phase:

Calcination: $CaCO_3 \rightarrow CaO + CO_2$

Parasitic Reactions:

Hydration: $CaO + H_2O \rightarrow Ca(OH)_2$

Sufidation: $CaO + H_2S \rightarrow CaS + H_2O$

FIG-107

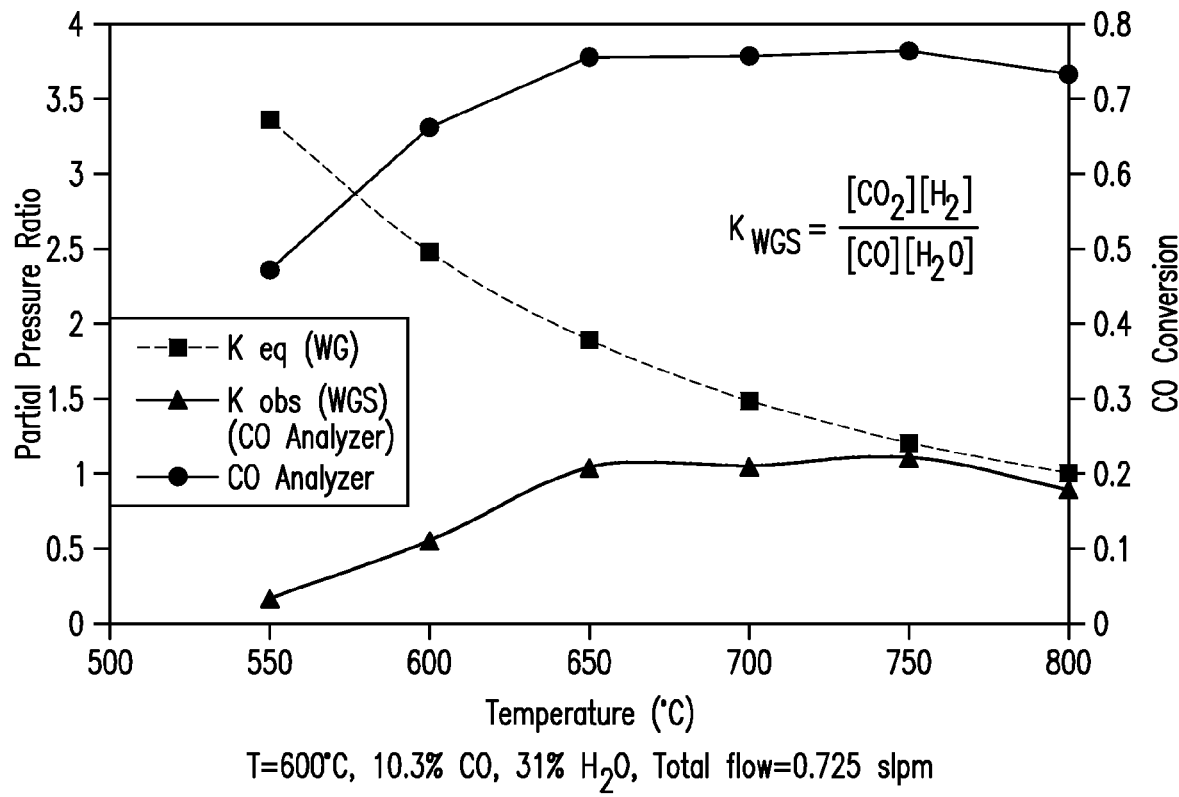

T=600°C, 10.3% CO, 31% H₂O, Total flow=0.725 slpm

FIG-109

▷ Variety of CaO provides a breakthrough
  ▷ HTS Catalyst initiates WGS reaction
  ▷ CaO removes $CO_2$ from the gas mixture
▷ PCC-CaO is more effective than "natural" CaO and dominates the performance over LH-CaO, LC-CaO
▷ 100% hydrogen stream obtained during initial part
▷ HTS catalyst reduces in its activity
  ▷ High temperature $CO_2$ interaction (from $CaCO_2$ calcination at 700°C).
  ▷ Catalyst pretreatment after regeneration prevents deactivation

FIG-110

✓ In-situ removal of $H_2S$ from fuel gas from coal gasifier

✓ Application
 −Hot gas clean-up in IGCC's

✓ Primary Reaction
 $CaCO_3 + H_2S = CaS + H_2O + CO$

✓ Reaction temperature: 900°C

✓ Strong effect of surface area on reactivity of $CaCO_3$ particles
 −PCC w/ 0.05% Dispex N 40V: 56 m2/g
 −PCC w/o surfactant: 40 m2/g
 −Linwood carbonate: 2 m2/g

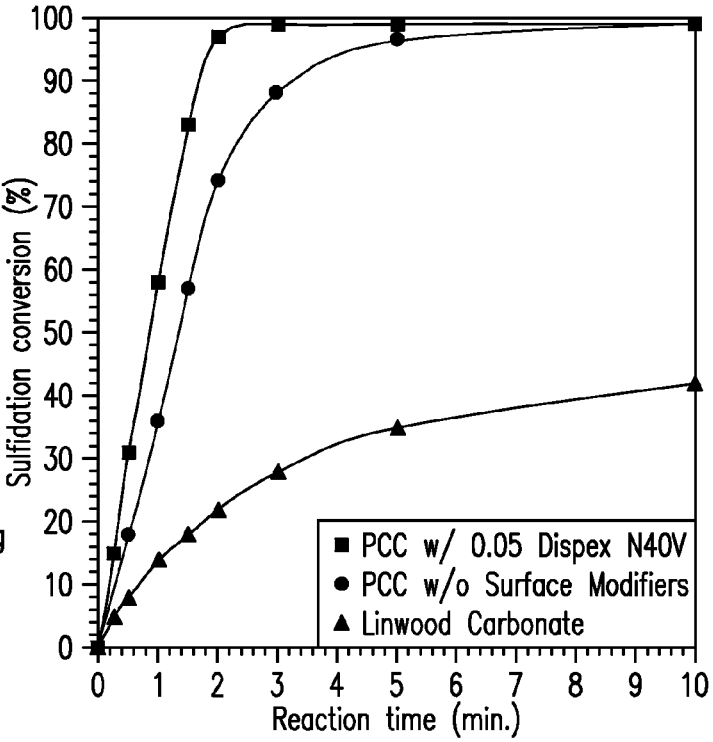

FIG-111

▷ Temperature of Hydrogen
 ✓ SOFC: $H_2$ assisted fossil fuel gasification (ZECA)

▷ Pressure of Hydrogen
 ✓ High Pressure Hydrogen used in chemical synthesis
  Fischer-Tropsch Reaction: 10-30 atm, 300-350°C
 ✓ Haber's Ammonia Synthesis: 100-300 atm, 400-450°C
  (global production: 140 million tons/yr)
 ✓ Compression Cost depends on $P_2/P_1$ and nor $\Delta P$ ▷ Purity of Hydrogen
 ✓ Selexol Process very pure H2 at room temperature for ammonia synthesis

FIG-112

HIGH PURITY, HIGH PRESSURE HYDROGEN PRODUCTION WITH IN-SITU $CO_2$ AND SULFUR CAPTURE IN A SINGLE STAGE REACTOR

CROSS-REFERENCE TO RELATED APPLICATIONS

This application is a continuation under 35 USC §120 of PCT/US2007/079432, filed Sep. 25, 2007, which is in turn entitled to benefit of a right of priority under 35 USC §119 from U.S. Ser. No. 60/826,809, filed Sep. 25, 2006, the contents of each of which is incorporated by reference as if fully recited herein.

TECHNICAL FIELD OF THE INVENTION

The disclosed embodiments are in the field of hydrogen production.

BACKGROUND AND SUMMARY OF THE INVENTION

The disclosed embodiments includes a process for producing hydrogen, comprising the steps of: (a) gasifying a fuel into a raw synthesis gas comprising CO, hydrogen, steam and sulfur and halide contaminants in the form of $H_2S$, COS and HX, where X is a halide; (b) passing the raw synthesis gas through a water gas shift reactor (WGSR) into which CaO and steam are injected, the CaO reacting with the shifted gas to remove $CO_2$, sulfur and halides in a solid-phase calcium-containing product comprising $CaCO_3$, CaS and $CaX_2$; (c) separating the solid-phase calcium-containing product from an enriched gaseous hydrogen product; and (d) regenerating the CaO by calcining the solid-phase calcium-containing product at a condition selected from the group consisting of: in the presence of steam, in the presence of $CO_2$, in the presence of synthesis gas, in the presence of $H_2$ and $O_2$, under partial vacuum, and combinations thereof.

The fuel could be coal, biomass, oil sands, coke, tar, wax oil shales, or combinations of these materials.

Although the steam may be injected into the WGSR in any functional quantity, it is preferred that the steam injected is in the range of from about the stoichiometric requirement to about 3 times the stoichiometric requirement.

In one embodiment, the enriched hydrogen product has a purity of at least 60%. In one embodiment, the H2:CO ratio of the enriched hydrogen product is in the range of from about 0.5:1 to about 1000:1. In some embodiments the enriched hydrogen product has a purity in the range of from about 70% to about 99.99%, at temperature in the range of from about 400-1000 C, and a pressure in the range of from about 1 to about 100 atmospheres.

The WGSR may be of a type selected from the group consisting of: fixed bed reactors, fluidized bed reactors, entrained flow reactors, moving bed reactors rotary kilns, or combinations thereof. Additionally, the calcinations step may be performed in a calcinations reactor of a type selected from the group consisting of: fixed bed reactors, fluidized bed reactors, entrained flow reactors, moving bed reactors rotary kilns, or combinations thereof.

In some embodiments, the WGSR does not have a catalyst disposed therein. As such the WGSR operates at a temperature in the range of from about 550-750 C, in the pressure range of from about 1 to about 60 atm, it is preferred that the WGSR reactor operate in a temperature range of from about 600-700 C and at a pressure in the range of from about 20 to about 30 atm. In some embodiments, the enriched hydrogen product is 99% pure when 3 times the stoichiometric steam requirement is used. At the stoichiometric steam requirement the process produces an enriched hydrogen product that is 90% pure. In another catalytic embodiment, the enriched hydrogen product has a H2/Co ration of at least 2.5 and a maximum sulfur (H2S/COS) concentration of less than 10 ppm using only the stoichiometric requirement of steam.

In some embodiments, a catalyst may be used in the WGSR. A suitable high temperature shift catalyst which may include: Fe, Cu, Co, Mo, W, Cs, Pt, Ph, Pd, and other precious metal catalysts or their oxides or sulfides or combinations thereof. Suitable supports for use with the foregoing high temperature shift catalysts include: $Cr_2O_3$, ZnO, MgO, ceria, alumina, silica, zirconia and combinations thereof.

A WGSR reactor with a catalyst operates in the temperature range of from about 550-750 C and at a pressure in the range of from about 1 to about 100 atm. It is preferred that the WGSR reactor operate in the temperature range of from about 600-700 C and at a pressure of from about 20 to about 30 amt. When a catalyst is used the enriched hydrogen product may achieve 99.99% purity when 3× the stoichiometric requirement of steam is used in the WGSR. The enriched hydrogen product may achieve 98% purity when the stoichiometric requirement of steam is used. Some embodiments may attain a purity of at least 80% with a maximum sulfur (H2S/COS) concentration of less than 10 ppm when 3× the stoichiometric requirement of steam is used and at least 70% purity with a maximum sulfur concentration of less than 1 ppm when the stoichiometric requirement of steam is used.

The process may also comprise the step of (e) recycling at least a portion of a product stream from a Fischer-Tropsch reactor, fed by the WGSR, so as to introduce a chemical species selected from the group consisting of: methane, C1-C4 hydrocarbons, CO, hydrogen and combinations thereof back into the WGSR.

In all embodiments, the CaO may have a surface area of at least 12.0 m2/g and a pore volume of at least 0.015 cm3/g, said CaO having a sorption capacity of at least about 70 grams of CO2 per kilogram of CaO.

The CaO may be provided in any usable form including, but not limited to, pellets, granules, fines, monoliths and combinations thereof. The CaO may be obtained by processing chicken eggshells.

Although the regeneration of CaO step may be performed any functional process, it is preferred that it is conducted by a process selected from the group consisting of: (a) calcining in the presence of steam and/or CO2 and/or H2 with O2, and/or synthesis gas with O2 and/or under partial vacuum or combinations thereof; (b) a process in which the heat is added to the calciner using steam and a combination of calciner fuel and oxidant; (c) a process in which the calciner fuel is H2 or natural gas or synthesis gas or coal or combinations thereof; (d) a process in which the oxidant is air or oxygen or combinations thereof; (e) a process in which heat is provided to the calciner directly or indirectly; (f) calciner reactor temperatures ranging from about 700-1100 C; and (a process for adjusting the calciner temperature by modifying the CaO to CaCO3 ratio in the calciner. The gas phase product from the calciner may comprise pure CO2 and could also contain trace amounts of H2S.

The disclosed embodiments also includes a process for producing hydrogen, comprising the steps of: (a) reforming a gaseous hydrocarbon fuel in the presence of CaO and steam to remove CO2, sulfur and halide contaminants in the form of $H_2S$, COS and HX, where X is a halide, in a solid-phase calcium-containing product comprising $CaCO_3$, CaS and $CaX_2$, thereby producing a mixture of CO and hydrogen; (b) separating the solid-phase calcium-containing product from an enriched gaseous hydrogen product; and (c) regenerating the CaO by calcining the solid-phase calcium-containing product at a condition selected from the group consisting of: in the presence of steam, in the presence of $CO_2$, in the presence of synthesis gas, in the presence of $H_2$ and $O_2$, under partial vacuum, and combinations thereof.

The gaseous fuel may be natural gas, C1-C4 hydrocarbons, or mixtures thereof. The reforming step may involve the introduction of CO2, so called dry reforming.

The reforming step may involve a reforming catalyst. Suitable reforming catalysts include those comprising: Ni, Pt, Rh, Pd, Ru, W, Mo, their oxide or carbides or sulfides. The reforming catalyst may use a support. Suitable supports for use with the foregoing reforming or pre-reforming catalysts include: alumina, silica, titania, zirconia, and combinations thereof. It is preferred that the reforming catalyst is sulfur intolerant.

The reforming operation may occur in a temperature range of from about 550 to about 750 C. and at a pressure in the range of from about 1 to about 60 atm. Preferably, it operates in the temperature range of from about 600 to about 70° C. and at a pressure in the range of from about 20 to about 30 atm.

The enriched hydrogen product produced may be as pure as 99.9% when 3× the stoichiometric requirement of steam is used and 95% pure when the stoichiometric requirement of steam is used.

This process may additionally comprise the step of: (d) recycling at least a portion of a product stream from a Fischer-Tropsch reactor, fed by the reformer, so as to introduce a chemical species selected from the group consisting of: methane, C1-C4 hydrocarbons, CO, hydrogen and combinations thereof back into the reformer.

In all embodiments, the CaO may have a surface area of at least 12.0 m2/g and a pore volume of at least 0.015 cm3/g, said CaO having a sorption capacity of at least about 70 grams of CO2 per kilogram of CaO.

The CaO may be provided in any usable form including, but not limited to, pellets, granules, fines, monoliths and combinations thereof. The CaO may be obtained by processing chicken eggshells.

When a catalyst is used the enriched hydrogen product may achieve 99.99% purity when 3× the stoichiometric requirement of steam is used. The enriched hydrogen product may achieve 98% purity when the stoichiometric requirement of steam is used. Some embodiments may attain a purity of at least 80% with a maximum sulfur (H2S/COS) concentration of less than 10 ppm when 3× the stoichiometric requirement of steam is used and at least 70% purity with a maximum sulfur concentration of less than 1 ppm when the stoichiometric requirement of steam is used. The process allows for a hydrogen purity of at least 80% with a maximum sulfur (H2S/COS) concentration of less than 10 ppm when 3× the stoichiometric requirement of steam is used and at least 70% purity with a maximum sulfur concentration of less than 1 ppm when the stoichiometric requirement of steam is used.

Another process of the disclosed embodiments for producing hydrogen, comprising the steps of: (a) at least partially oxidizing a fuel into a raw gas comprising CO, hydrogen, steam and sulfur and halide contaminants in the form of $H_2S$, COS and HX, where X is a halide; (b) passing the raw gas through a water gas shift reactor (WGSR) into which CaO and steam are injected, the CaO reacting with the shifted gas to remove $CO_2$, sulfur and halides in a solid-phase calcium-containing product comprising $CaCO_3$, CaS and $CaX_2$; (c) separating the solid-phase calcium-containing product from an enriched gaseous hydrogen product; and (d) regenerating the CaO by calcining the solid-phase calcium-containing product at a condition selected from the group consisting of: in the presence of steam, in the presence of $CO_2$, in the presence of synthesis gas, in the presence of $H_2$ and $O_2$, under partial vacuum, and combinations thereof.

In all embodiments, the CaO may have a surface area of at least 12.0 m2/g and a pore volume of at least 0.015 cm3/g, said CaO having a sorption capacity of at least about 70 grams of CO2 per kilogram of CaO.

The CaO may be provided in any usable form including, but not limited to, pellets, granules, fine, monoliths and combinations thereof. The CaO may be obtained by processing chicken eggshells.

Although the steam may be injected into the WGSR in any functional quantity, it is preferred that the steam injected is in the range of from about the stoichiometric requirement to about 3 times the stoichiometric requirement.

The WGSR may be of a type selected from the group consisting of: fixed bed reactors, fluidized bed reactors, entrained flow reactors, moving bed reactors rotary kilns, or combinations thereof. Additionally, the calcinations step may be performed in a calcinations reactor of a type selected from the group consisting of: fixed bed reactors, fluidized bed reactors, entrained flow reactors, moving bed reactors rotary kilns, or combinations thereof.

In some embodiments, the WGSR does not have a catalyst disposed therein. As such the WGSR operates at a temperature in the range of from about 550-750 C, in the pressure range of from about 1 to about 60 atm, it is preferred that the WGSR reactor operate in a temperature range of from about 600-700 C and at a pressure in the range of from about 20 to about 30 atm. In some embodiments, the enriched hydrogen product is 99% pure when 3 times the stoichiometric steam requirement is used. At the stoichiometric steam requirement the process produces an enriched hydrogen product that is 90% pure. In another catalytic embodiment, the enriched hydrogen product has a H2/Co ratio of at least 2.5 and a maximum sulfur (H2S/COS) concentration of less than 10 ppm using only the stoichiometric requirement of steam.

In some embodiments, a catalyst may be used in the WGSR. A suitable high temperature shift catalyst which may include: Fe, Cu, Co, Mo, W, Cs, Pt, Ph, Pd, and other precious metal catalysts or their oxides or sulfides or combinations thereof. Suitable supports for use with the foregoing high temperature shift catalysts include: $Cr_2O_3$, ZnO, MgO, ceria, alumina, silica, zirconia and combinations thereof.

A WGSR reactor with a catalyst operates in the temperature range of from about 550-750 C and at a pressure in the range of from about 1 to about 100 atm. It is preferred that the WGSR reactor operate in the temperature range of from about 600-700 C and at a pressure of from about 20 to about 30 atm. When a catalyst is used the enriched hydrogen product may achieve 99.99% purity when 3× the stoichiometric requirement of steam is used in the WGSR. The enriched hydrogen product may achieve 98% purity when the stoichiometric requirement of steam is used. Some embodiments may attain a purity of at least 80% with a maximum sulfur (H2S/COS) concentration of less than 10 ppm when 3× the stoichiometric requirement of steam is used and at least 70% purity with a maximum sulfur concentration of less than 1 ppm when the stoichiometric requirement of steam is used.

BRIEF DESCRIPTION OF THE DRAWINGS

FIG. 56 is a graphical representation of the non-catalytic effect of temperature on a PCC-WGS system with $H_2S$ removal.

FIG. 57 is a graphical representation of equilibrium limited WGSR.

FIG. 58 is a graphical representation detailing the WGS shift with Hydrogen separating membrane.

FIG. 59 is a chart commenting on Sulfur impurities.

FIG. 60 is a graphical representation of a Carbonation Calcination Reaction System.

FIG. 61 is a chart detailing fuel gas compositions.

FIG. 68 is a graphical comparison of a PCC-Sorbent WGS system at 3:1 S/C ratio and a 1:1 S/C ratio.

FIG. 69 is a graphical representation of a PCC-WGS system with $H_2S$ removal.

FIG. 75 is a graphical representation of the technical objectives of an embodiment of the present invention.

FIG. 76 is an illustration of reaction schemes.

FIG. 77 is graphical representation of typical gasifier syngas compositions.

FIG. 84 is a list detailing the current status of GTL and CTL.

FIG. 85 is a comment on CTL.

FIG. 86 is an illustration of a reaction involved in Hydrogen synthesis from fossil fuels.

FIG. 87 addresses sulfur impurities.

FIG. 88 addresses objectives of dislcosed embodiments.

FIG. 90 addresses PCC synthesis.

FIG. 94 shows the reaction schemes employed in the disclosed embodiments.

FIG. 97 shows the behavior of the PCC-sorbent WGS system at ambient pressure.

FIG. 99 shows the behavior of the PCC-sorbent WGS system at 300 psig.

FIG. 102 shows the behavior of the PCC-WGS system with H2S removal, varying S/C ratios (HTS-sorbent).

FIG. 103 shows the effects of the present invention.

FIG. 104 addresses the concept behind the present invention.

FIG. 105 addresses the synergistic advantages behind the present invention.

FIG. 107 provides the reaction schemes used in the practice of the disclosed embodiments.

FIG. 109 shows data related to WGS catalyst testing without a sorbent.

FIG. 110 summarizes the H2 production achieved by the present invention.

FIG. 111 is a comparison of performance of various sorbent reacting with H2S.

FIG. 112 addresses various characteristics of hydrogen production.

Figure 113:
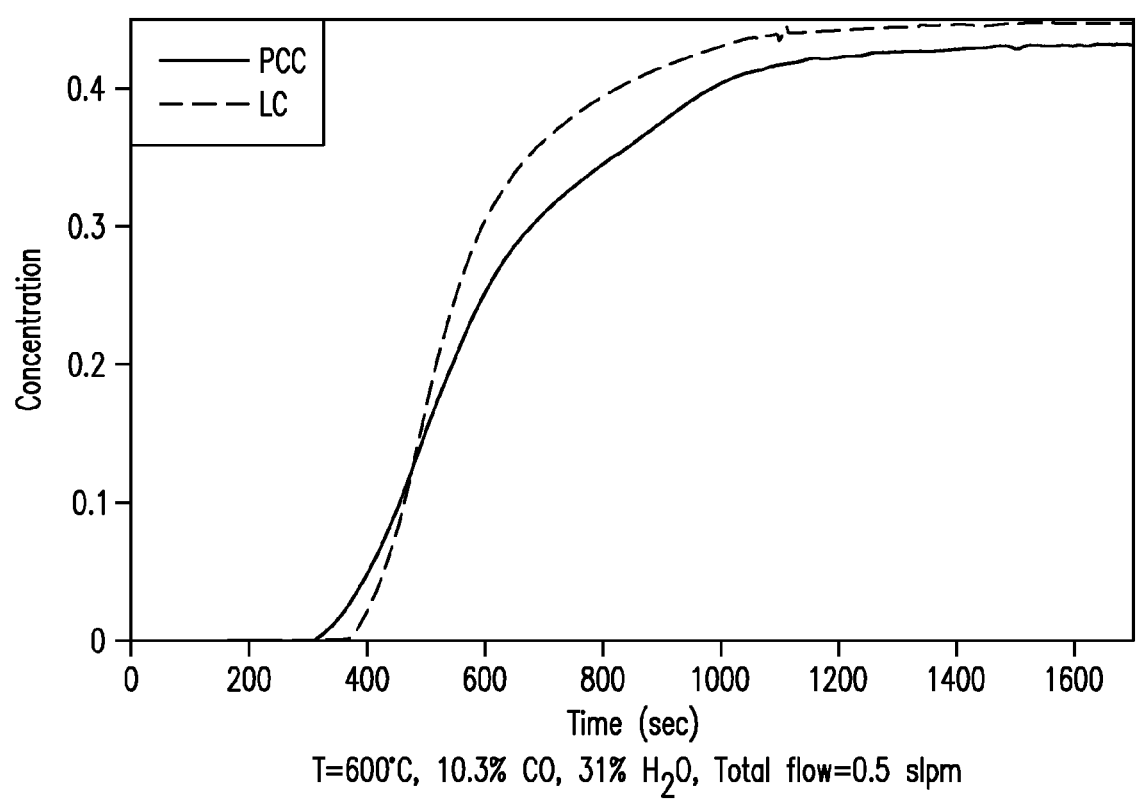

FIG. 113 provides CO2 concentration profiles for various sorbents.

Figure 114:
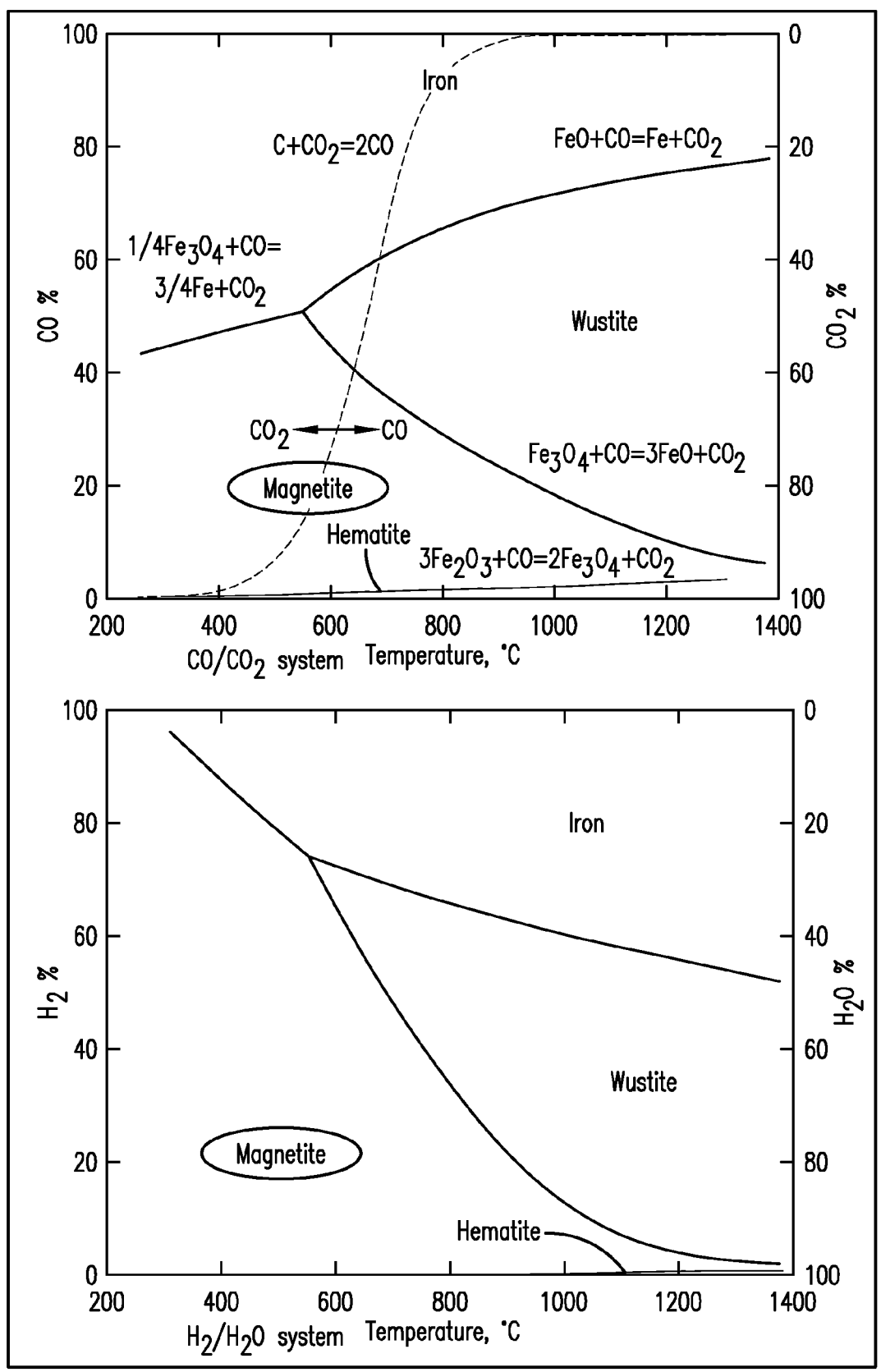

FIG. 114 provides phase diagrams for iron oxide in CO/CO2 and H2/H2O systems.

Figure 115:
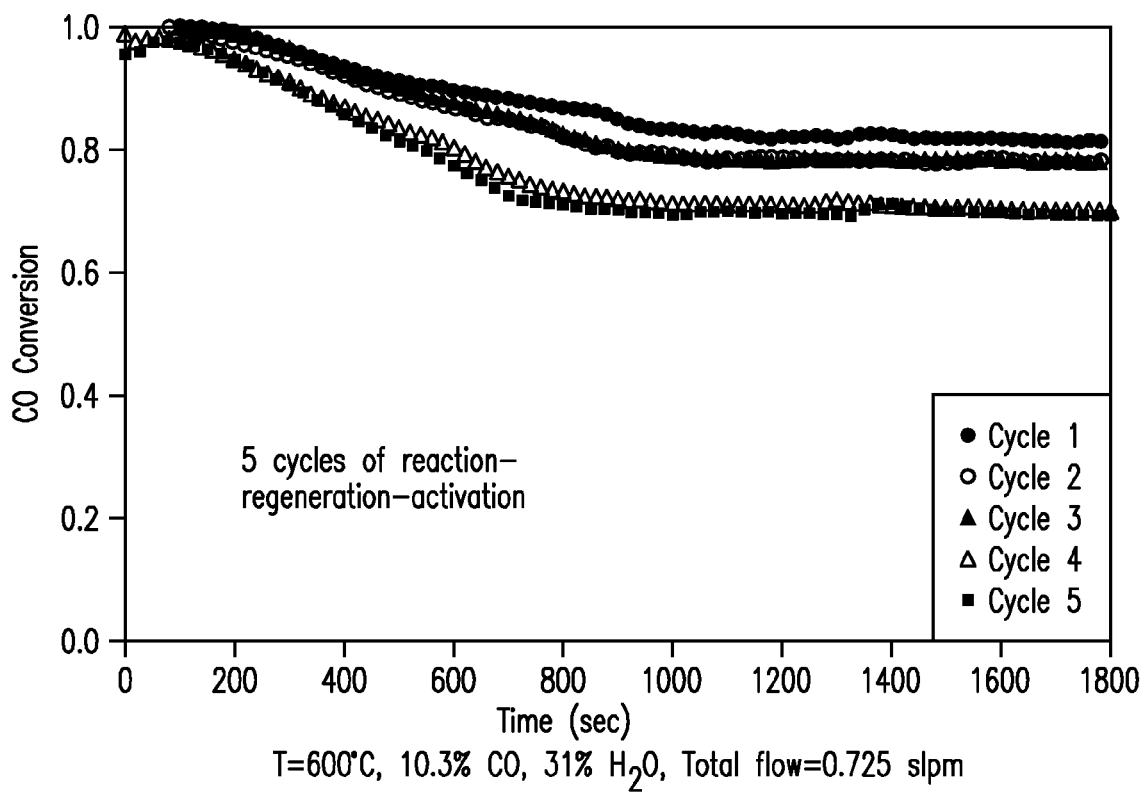

FIG. 115 compares cycles of reaction-regeneration-reaction for the PCC-sorbent WGS system.

Figure 116:
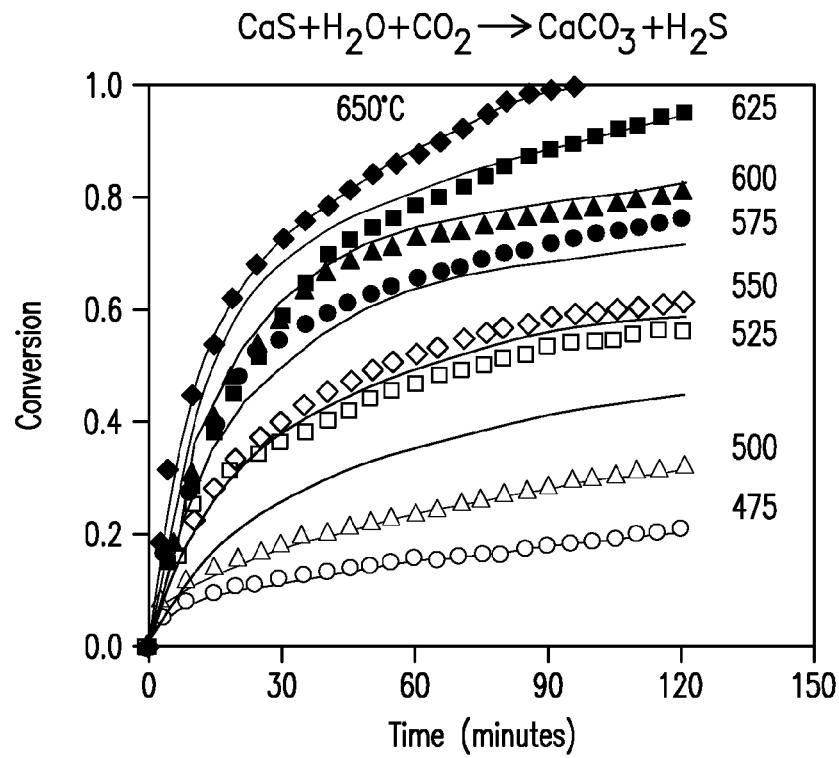

FIG. 116 shows a CaS regeneration scheme.

Figure 117:
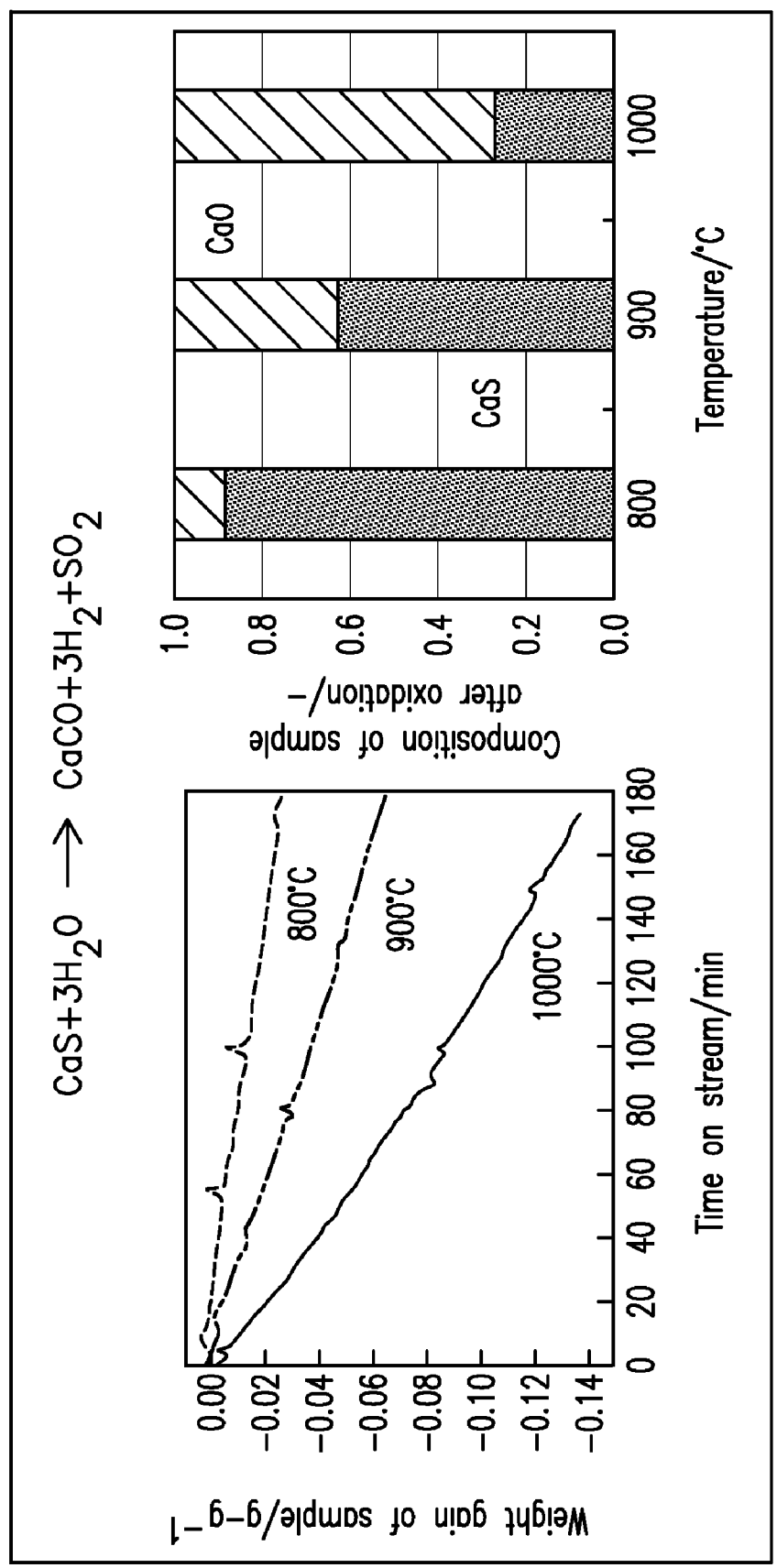

FIG. 117 shows an alternative CaS regeneration scheme.

DETAILED DESCRIPTION OF THE PREFERRED EMBODIMENT(S)

In accordance with the foregoing summary, the following presents a detailed description of the preferred embodiments of the invention that is currently considered to be the best mode.

Enhancement in the production of high purity hydrogen (H2) from synthesis gas, obtained by coal gasification, is limited by the thermodynamics of the water-gas shift reaction WGSR). However, this constraint can be overcome by concurrent WGSR and carbonation (of calcium oxide) reaction to enhance H2 production. The carbonation of any typical metal oxide (eg. calcium oxide) forming metal carbonate (eg. calcium carbonate) incessantly drives the equilibrium-limited WGSR forward by removing the carbon dioxide ($CO_2$) product from the reaction mixture. The metal carbonate (calcium carbonate) can be separately calcined to yield a pure $CO_2$ stream for its subsequent sequestration and the calcium oxide recycled back. This calcium looping scheme not only improves the hydrogen yield and purity but also integrates a $CO_2$ management scheme and gas cleanup in the hydrogen production process.

The proposed scheme simplifies high purity $H_2$ production by integrating the water gas shift reaction (WGSR) with in-situ $CO_2$, sulfur ($H_2S$+COS) and hydrogen halide removal from the synthesis gas at high temperatures in a single stage reactor process while eliminating the need for WGS catalyst requirement. We have identified our high reactivity OSU patented, mesoporous calcium oxide sorbent for the in-situ $CO_2$ capture as well as $H_2S$/COS and halides (HCl/HBr etc) removal. The morphological properties of our patented calcium sorbent (PCC) can be tailored using surface modifiers to demonstrate a high $CO_2$ capture capacity of about 70% by weight (~700 g of CO2/kgsorbent), yield a high calcium conversion of above 80% while removing H2S at high temperatures (700-900° C.) and producing H2 with purity greater than 95% without the WGS catalyst. The process highlights include:

(1) reduction in excess steam requirement and for operating at near-stoichiometric steam consumption (2) simultaneous removal of $CO_2$ as well as sulfur ($H_2S$+COS) and halides (HCl/HBr etc) impurities (3) production of either a 90-95% $H_2$ stream (without WGS catalyst) or a 99+% high purity $H_2$ stream (with WGS catalyst) at high temperatures (400-1000° C.) and pressures (1-40 atmospheres). The $H_2$ concentrations can vary all the way from 60 to 99+% purity.

(4) Flexibility in carbon monoxide conversion to produce $H_2$:CO ratios of varying composition which can range from 0.5 to 20, while capturing sulfur and halide impurities resulting in minimal impurity levels in the product gas stream (ppm to ppb levels), suitable for fuels/chemical synthesis from Fischer Tropsch reactions (5) production of a sequestrable $CO_2$ stream by spent sorbent regeneration at high temperatures (700-1100° C.). Sorbent regeneration includes calcining the carbonated sorbent ($CaCO_3$) using $H_2$ and oxygen and/or steam to generated calcium oxide. The calcium sulfide sorbent can be regenerated to calcium oxide by treatment with steam and carbon dioxide. The calcium halide (for example calcium chloride) can be regenerated to calcium oxide using hydrogen and oxygen mixtures.

The various reaction schemes being integrated in the process are:

| Reaction phase | | | |
|---|---|---|---|
| Coal Gasification: | $C_xH_yO + H_2O$ | → | $xCO + (y/2 + 1) H_2$ |
| WGSR: | $CO + H_2O$ | ⇔ | $H_2 + CO_2$ |
| Carbonation: | $CaO + CO_2$ | → | $CaCO_3$ |
| Sulfur capture ($H_2S$): | $CaO + H_2S$ | → | $CaS + H_2O$ |
| Sulfur capture (COS): | $CaO + COS$ | → | $CaS + CO_2$ |
| Halide capture (HCl): | $CaO + 2HCl$ | → | $CaCl_2 + H_2O$ |

| Regeneration phase | | | |
|---|---|---|---|
| $CaCO_3$ regeneration: | $CaCO_3$ | → | $CaO + CO_2$ |
| CaS regeneration: | $CaS + H_2O + CO_2$ | → | $CaCO_3 + H_2S$ |
| Halide ($CaCl_2$) regeneration: | $CaCl_2 + H_2 + ½ O_2$ | → | $CaO + 2HCl$ |

The proposed technology aims on enhancing $H_2$ production, from a typical coal gasification stream, by integrating the water gas shift reaction (WGSR) through in-situ $CO_2$, sulfur and hydrogen halide removal from the synthesis gas at high temperatures in a single stage reactor process while eliminating the need for a WGS catalyst. Thus, this integrated process indeed consolidates several unit operations viz. WGS reactor, $CO_2$ capture, sulfur removal, halide removal and hydrogen production in one process module, downstream of a coal gasification system to produce a pure hydrogen stream. The goals of this calcium looping process are (1) to reduce the excess steam requirement and operate at near-stoichiometric steam consumption (2) to simultaneously remove $CO_2$ as well as sulfur and halides (3) to produce a sequestrable $CO_2$ stream by sorbent regeneration, (4) to produce either a 90-95% $H_2$ stream (without WGS catalyst) or a 99+% high purity $H_2$ stream (with WGS catalyst) at high temperatures and pressures. This integrated "one box" process depicts the potential to achieve higher system efficiencies with lower overall footprint by combining different process units in one stage. The envisioned system has the flexibility and the potential to produce hydrogen of different purity levels by reducing the amount of WGS catalyst and reducing the excess steam requirement. This novel process removes the need for hydrogen separation membranes and the high temperature operation increases the overall conversion and process efficiency.

Background

Catalytic Hydrogen Production Processes

Hydrogen is a useful fuel and a feedstock for various other fuels, processes and commodities. The future role of hydrogen in the world energy cycle might gain critical significance. Economical hydrogen production from fossil fuels in a sequestration ready manner remains a challenge. It is envisaged that hydrogen would be used to carry the energy contained in fossil fuels for numerous mobile applications while the $CO_2$ generated from the fossil fuels would be safely sequestered from these large local facilities. The major processes for hydrogen production from fossil fuels involve steam reforming of methane (SMR), coal gasification, catalytic cracking of natural gas, and partial oxidation of heavy oils (Rosen and Scott, 1998; Rosen, 1996).

$$\text{Coal Gasification: } CxHy+H_2O \rightarrow xCO+(\tfrac{1}{2}+1)H_2 \quad (1)$$

$$\text{Steam Methane Reforming (SMR): } CH_4+H_2O \rightarrow CO+3H_2 \quad (2)$$

$$\text{Partial oxidation of hydrocarbons: } CxHy+O_2 \rightarrow xCO+(\tfrac{1}{2}+1)H_2 \quad (3)$$

The gases coming from these reactions are then sent to the downstream water gas shift (WGS) reactors to enhance the hydrogen production by the WGS reaction given as:

$$(\text{WGSR}) CO+H_2O \Longleftrightarrow CO_2+H_2 (\Delta H=-40.6 \text{ kJ/mol}) \quad (4)$$

To obtain high purity $H_2$, the WGS reaction is generally carried out in two stages for: (1) high temperature shift (250-500° C.) using iron catalysts and (2) low temperature shift (210-270° C.) using copper-based catalysts (Gerhartz, 1993; Bohlbro, 1969). The shortcomings of the current reaction scheme are:

1. Copper based catalysts are extremely intolerant to small quantities of sulfur (<0.1 ppm) and hence the fuel gases need to be desulfurized upstream of the WGS reactor.

2. A high steam:CO ratio is required to enhance CO conversion and the consequent hydrogen production. The steam to CO ratio at 550° C. can be as high as 50 in a single-stage operation or 7.5 for a more expensive dual-stage process to obtain 99.5% pure $H_2$ (David, 1980). For example, to lower the CO content of the typical fuel gas from 45% (inlet) to 3% (outlet) a total steam addition of 1.18 kg/m³ of the gas is required, at a total pressure of 60 bars and 410° C. (Gerhartz, 1993).

3. While higher temperature enhances the kinetics of the WGSR, thermodynamics adversely affects the hydrogen production due to the equilibrium limitation of the WGSR with the $H_2$ yield falling with rising temperature.

Enhancing the Water gas Shift Reaction and Hydrogen Purification

An effective technique to shift the WGSR to the right for enhanced hydrogen generation has been to remove hydrogen from the reaction mixture. This premise has lead to the development of hydrogen separation membranes. However, membranes cannot completely remove hydrogen from the mixture and there is also the effect of a considerable pressure drop across them (Roark, et al 2002). In addition, any remaining hydrogen in the main stream would dilute $CO_2$ and would lead to poor process economics.

The other option is to remove the $CO_2$ from the reaction gas mixture. Various solvents such as amines, Selexol, Rectisol etc have been used to scrub the $CO_2$ from the WGS reaction gas mixture (Steigel and Ramezan, 2006) between two stages. However, these solvents operate at ambient temperatures and consequently this method involves severe energy penalties due to cooling and reheating of the reaction gas mixture. Hence, high temperature $CO_2$ membranes were developed (US DOE, 2005) which operate in the same temperature range as that of the WGSR. Thus the development of these membranes has led to the concept of membrane reactors. However, the use of these membranes leads to the development of a pressure drop and the costs associates with these membranes make the overall process expensive.

Calcium Assisted Hydrogen Production

There are several processes that enhance hydrogen production using limestone sorbents such as the ZECA process and the HyPr-RING Process (Lin et al., 2002; Ziock et al., 2001). However, these processes operate at very high pressures (12-100 MPa) to produce $H_2$, which is not economically viable. On the other hand processes such as HyPr-RING result in the gasification of coal with in-situ $CO_2$ capture using CaO/Ca(OH)$_2$ systems (Lin et al., 2005). However, these systems operate at very high pressures (70 bar) and require excess steam and produce only 91% pure hydrogen. In addition, there have been several reports on sorption enhanced hydrogen production by coupling SMR and in-situ $CO_2$ capture using a sorbent (Hufton et al., 1999; Akiti 2004; Balasubramanian et al., 1999; Lopez Ortiz and Harrison, 2001). Calcium oxide assisted steam methane reforming (SMR) was attempted in earlier studies (Balasubramanian et al., 1999; Lopez Ortiz and Harrison, 2001). They detailed the performance of a single-step sorption-enhanced process using a Ni-based catalyst to produce hydrogen. However they also mixed dolomite-CaO powder with the Ni-based catalyst to separate $CO_2$ and enhance $H_2$ concentration to 97%.

Our proposed process under consideration involves removing $CO_2$ from the gas mixture by reacting it with CaO (carbonation). The exothermic carbonation reaction can be given as:

$$CaO(s)+CO_2(g) \rightarrow CaCO_3(s)(\Delta H=-183 \text{ kJ/mol}) \quad (5)$$

The continuous removal of the $CO_2$ product from the WGS reactor will incessantly drive the equilibrium-limited water-gas shift reaction in the forward direction. This will ensure a high yield and purity of $H_2$ with near stoichiometric amounts of steam needed for the reaction. Besides, the reaction can now be carried out at higher temperatures leading to superior kinetics in the forward direction. Thus the major equilibrium related drawback in this process could be overcome. The spent calcium sorbent (CaCO$_3$) can then be regenerated separately by calcining it at high temperatures (660-900° C.) to obtain back the calcium oxide and a pure sequestration ready $CO_2$ stream (eqn. 3), separated from the fuel gas mixture (Gupta and Fan, 2002) completing the calcium looping process.

$$CaCO_3(s) \rightarrow CaO(s)+CO_2(g)(\Delta H=+183 \text{ kJ/mol}) \quad (6)$$

This calcium oxide assisted WGS process offers the following advantages over the catalytic and other membrane processes:

1. High temperatures/pressures characterizing the syngas/fuel gas are beneficial to the carbonation reaction kinetics. Hence we can remove $CO_2$ from the gas mixture at high temperatures (500-800° C.), enabling a more efficient hot gas cleanup. Catalyst based processes or $CO_2$ removal membranes do not operate >700° C. and thereby necessitate lowering the gas temperature, leading to slower kinetics as well.

2. The removal of $CO_2$ would not require drastically high steam:CO ratio necessary for the catalyst based processes described above. This would lead to lower costs due to the management of a smaller quantity of steam.

3. Calcium based processes are not adversely affected by sulfur gases such as $H_2S$ and COS. In fact, calcium has been actively used for the removal of $H_2S$ and COS.

4. The use of calcium-based processes has lead to the generation of gas streams with purities as high as 97% hydrogen purity at high temperature, a feat not achievable by catalytic processes.

5. CaO also separates $CO_2$ from the gas mixture and generates a pure stream of $CO_2$ upon calcination of the resulting $CaCO_3$. $CO_2$ separation cannot be achieved by catalytic system. Thus, this process can be integrated in a carbon management scheme.

Shortcomings of Previous Studies on Calcium Assisted Processes

The calcium conversion in the dolomite was only about 50%. On a weight basis, the $CO_2$ capture capacity achieved by their sorbent would be lower than 35%. Lower conversions would translate to higher sorbent requirement and higher reactor volumes.

They regenerated the sorbent in streams of $N_2$, 4% $O_2$ in $N_2$ and pure $CO_2$. Providing heat to the $CaCO_3$ sorbent in the form of hot $CO_2$ maintains the high purity of the $CO_2$ stream. However, thermodynamics necessitates higher calcination temperature that leads to the sintering of CaO and a subsequent loss in its reactivity. They had to use high regeneration temperatures of 800-950° C. They observed a decrease in "calcium" conversion from 83% in the $1^{st}$ cycle to about 69% in the $10^{th}$ cycle and to 27% conversion after 148 cycles.

Exposure of the reforming catalyst to an oxidizing atmosphere (viz. $O_2/N_2$ or $CO_2$) during the regeneration phase oxidizes Ni in the catalyst to NiO. Since the metallic form is the active form for WGS catalysis, the catalyst requires an additional processing step, besides the calcination step required for $CaCO_3$ regeneration, where NiO could be reduced to Ni.

Calcination in nitrogen would lower the operating temperature. However, it would not solve the problem of $CO_2$ separation due to the formation of a $CO_2/N_2$ gas mixture.

In addition, the effect of fuel gas impurities (sulfur, halides) in the feed stream on the sorbent performance as well as the hydrogen production capability has not been reported.

Hydrogen Production using the Calcium Looping Process

This process overcomes these operational hurdles by the implementation of the following practices:

1. Use of High Reactivity PCC-CaO Sorbent Synthesized at OSU

Figure 1:
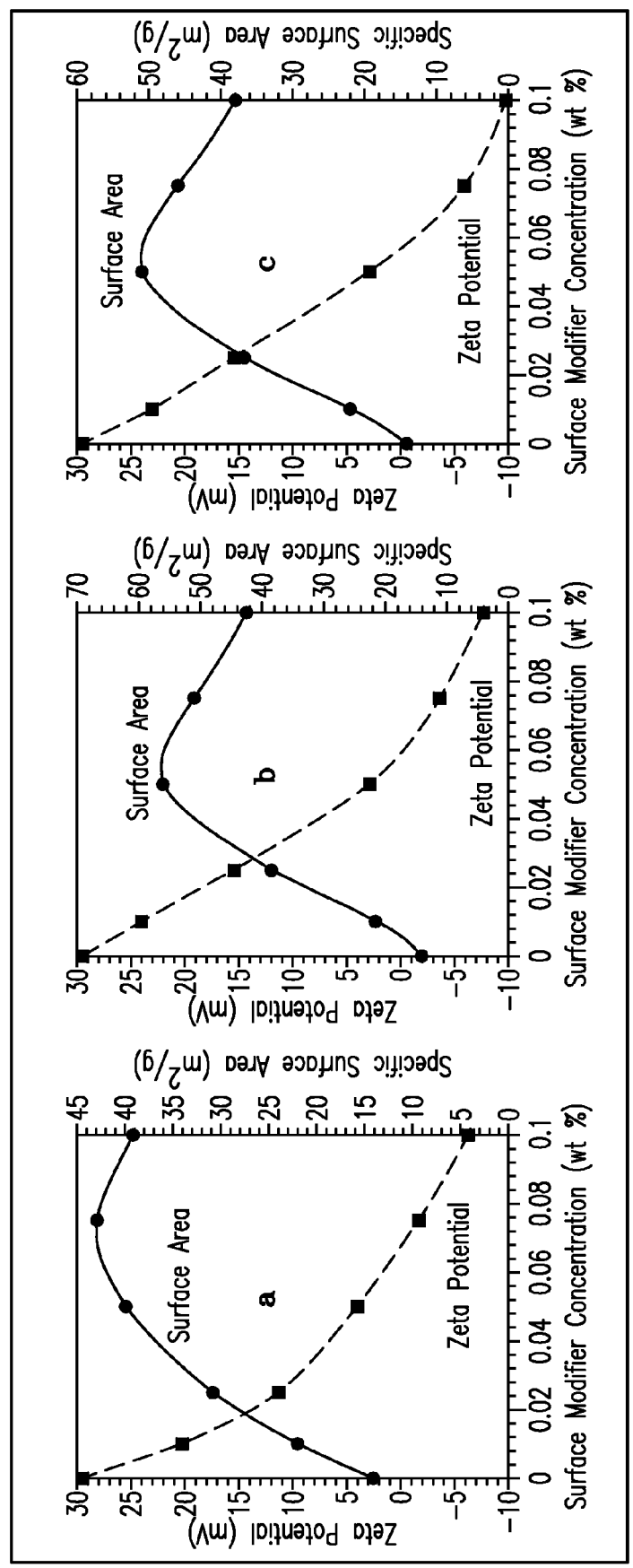
FIG. 1 shows the effect of concentrations of different surface modifiers on the zeta potential and specific surface area of the sorbent (a) Ligno-sulfonate (b) Dispex N40V (c) Dispex A40 (adapted from Agnihotri et al., 1999).

The OSU patented PCC-CaO sorbent can achieve almost complete conversions (>95%) unlike those observed by Harrison and co-workers for dolomite (~50% calcium conversion). Besides, it has a very high $CO_2$ capture capacity of about 700 g/kg of the sorbent. This is in contrast to dolomite, which has a substantial amount of unreacted magnesium component (nearly 50%). We will be using the pure calcium oxide sorbent obtained from a patented mesoporous $CaCO_3$ structure. This CaO has captured 70% by weight of $CO_2$ over multiple cycles. This would ensure minimal sorbent usage and possibly smaller reactors. In retrospect, we have successfully identified our patented calcium carbonate precursor (Fan et al., 1998) for CaO, which is to be used for hydrogen production with in-situ $CO_2$ capture. Highly reactive Precipitated Calcium Carbonate (PCC) can be obtained by bubbling in $CO_2$ gas in a $Ca(OH)_2$ slurry. The surface properties of this novel calcium sorbent can be tailored by using specific surface modifying agents in the slurry (Agnihotri et al., 1999; Ghosh-Dastidar et al., 1996; Wei et al., 1997; Gupta and Fan, 2002). The surface area, pore size and the pore size distribution of PCC have been controlled to give an optimum internal structure for high gas solid reaction kinetics. The sorbent possesses a surface area of 60 $m^2$/g and a pore volume of 0.18 cc/g. The scientific principle of electric double layer (zeta potential) can help understand this sorbent structure optimization process. Without any surfactant in the slurry, the precipitated $CaCO_3$ particles have a high positive charge with a positive zeta potential. Different surface modifiers can then be added to the slurry in appropriate concentrations to neutralize the surface charges of the particles or the zeta potential. The system reaches an optimum only when the zeta potential equals zero depicting the maxima in the surface area as shown in FIG. 1 below.

Figure 2:
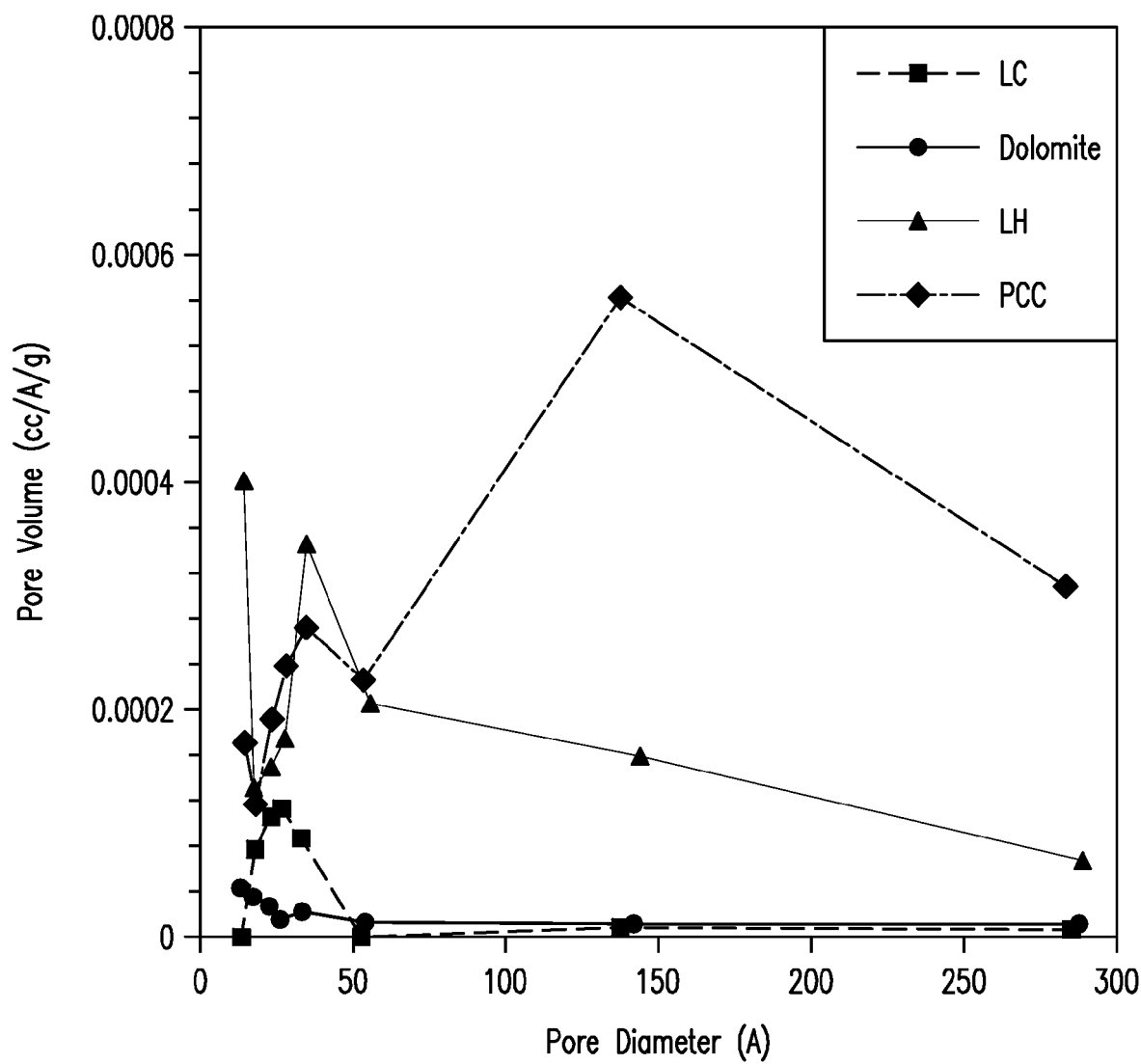
FIG. 2 provides pPore size distributions for various calcium sorbents (Gupta and Fan, 2002).

Besides, the structurally altered "PCC" has a unique mesoporous structure (5-30 nm) with a maximum pore size distribution occurring at 15 nm. In contrast, the pores of the naturally occurring or commercial calcium minerals were predominantly microporous (<5 nm) as seen in FIG. 2. The other CaO precursors are Linwood calcium carbonate (LC) and dolomite (DL). The mesoporous pores would make the sorbent less susceptible to pore pluggage and filling, a phenomenon observed due to the presence of microspores (as seen by Harrison and co-workers). This now leads to almost 100% sorbent conversions. PCC and, CaO obtained from PCC were found to have extraordinarily high reactivity towards $SO_2$, $H_2S$ and $CO_2$ (Ghosh-Dastidar et al., 1996; Chauk et al., 2000; Gupta and Fan, 2002) giving very high conversions.

Figure 3:
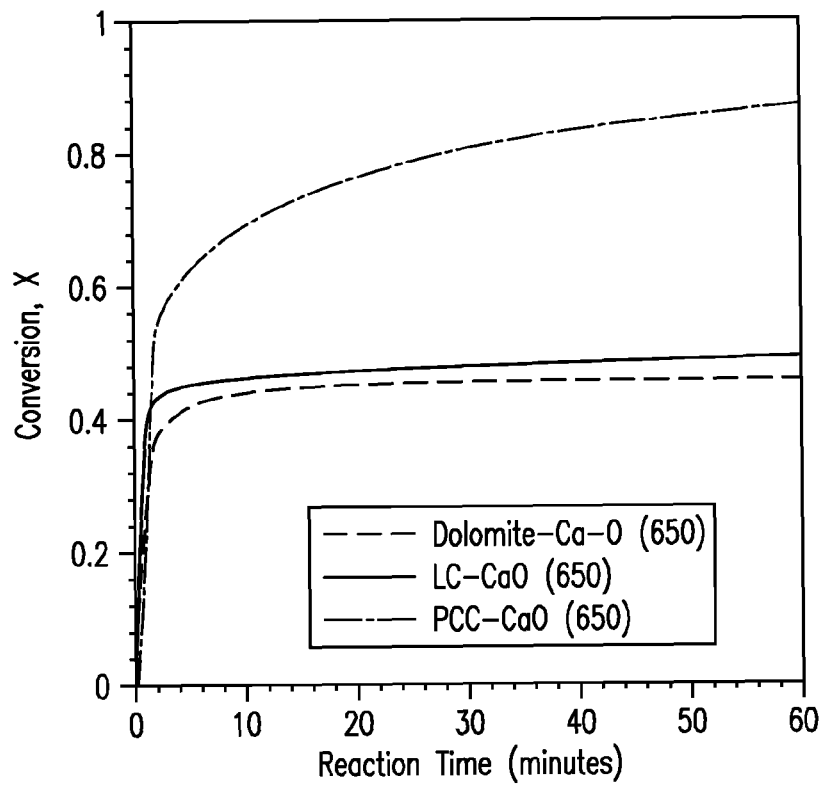
FIG. 3 shows the carbonation reactions of CaO obtained from different precursors at 650° C. (adapted from Gupta and Fan, 2002).
Figure 4:
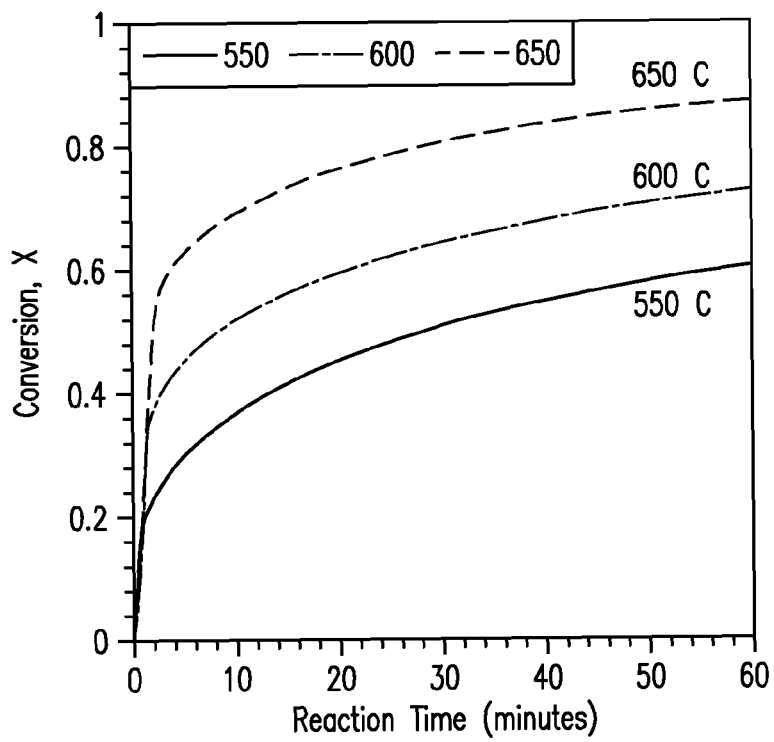
FIG. 4 presents the carbonation reactions of PCC-CaO at different temperatures (Gupta and Fan, 2002).

Commercial demonstration plants have been established for $SO_2$ control based on this sorbent, contributing to the Clean Coal Technology (Fan and Jadhav, 2002). The performance of CaO obtained from different precursors (PCC, LH, LC, dolomite) for carbonation reactions in a pure $CO_2$ stream is shown in FIG. 3. These experiments clearly show that the activity of PCC-CaO was remarkable in reaching high conversions (>90%) as compared to the other sorbents (Gupta and Fan, 2002). It can be observed that the reaction has an initial rapid kinetically controlled regime followed by a slow diffusion controlled regime. However, unlike other sorbents the PCC-CaO does not seems to taper off after 60 min of reaction. This can be further confirmed at different temperatures as shown in FIG. 4.

Extended Life Cycle Testing of the PCC Sorbent

Preliminary cyclical calcination-carbonation studies with PCC at 700° C. showed sustained reactivity (~90%) while those with commercial Aldrich $CaCO_3$ showed loss in reactivity over 2 cycles (Gupta and Fan, 2002). The calcination is carried out in a pure $N_2$ stream while the carbonation was carried out in pure $CO_2$. However, the cycles were carried out in isothermal conditions at 700° C. Extended life cycle studies with PCC were then carried out for 11 cycles in a TGA. The sorbent shows almost sustained reactivity in $N_2$ regeneration.

Figure 5:
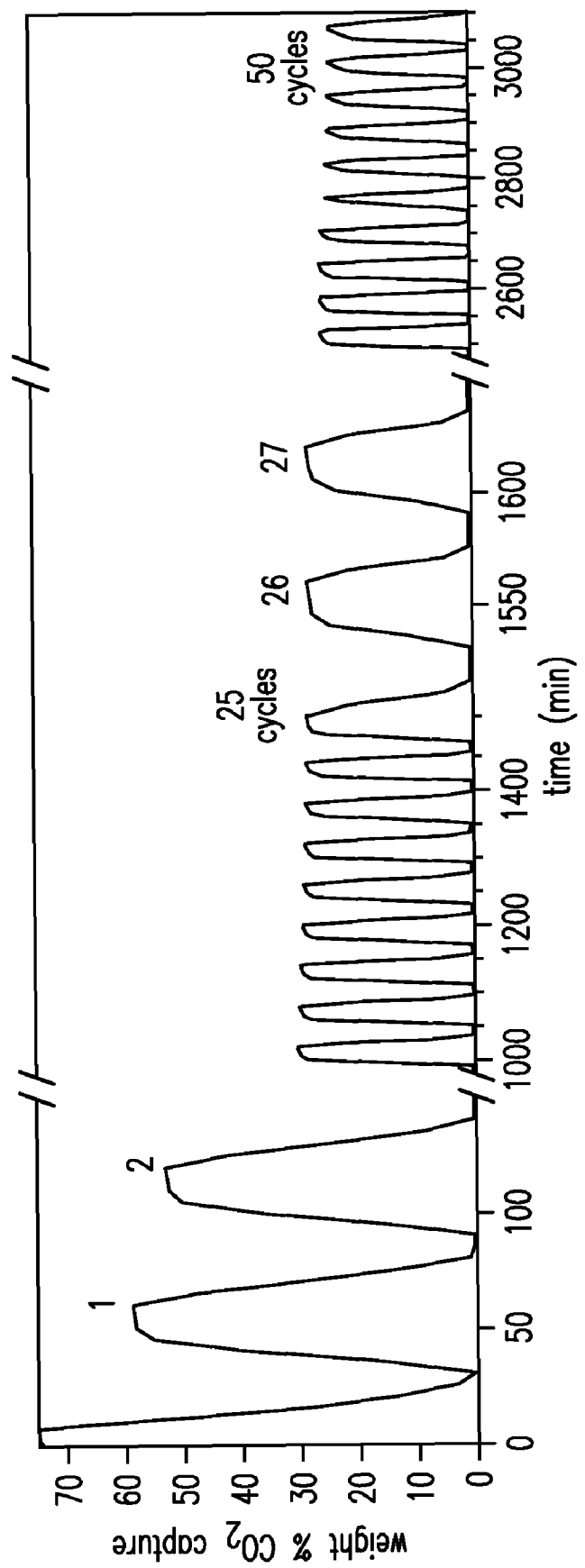
FIG. 5 provides the extended Calcination-Carbonation cycles with Linwood Carbonate (LC) fines at 700° C. in a TGA in a 10% $CO_2$ stream (Iyer et al., 2004).
Figure 6:
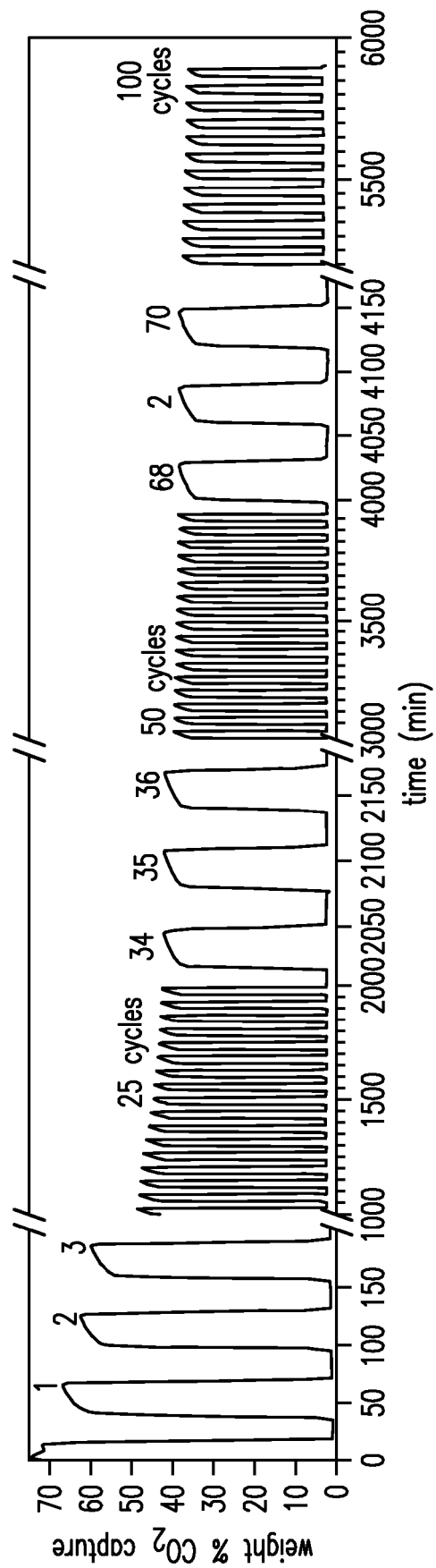
FIG. 6 provides the extended Calcination-Carbonation cycles with Precipitated Calcium (PCC) fines at 700° C. in a TGA in a 10% $CO_2$ stream (Iyer et al., 2004).

Earlier studies from our group have shown that PCC-CaO achieves high conversions (>90%) towards carbonation compared to ~45-60% attained by CaO derived from naturally occurring calcium sources (Gupta et al., 2002). Life cycle testing on PCC-CaO, carried out in 100% $CO_2$ for an hour, did not show a significant drop in reactivity for 2-3 CCR cycles. However, there is sufficient literature that mentions a loss in reactivity over a higher number of cycles. We carried out extended isothermal life cycle testing of naturally occurring limestone powder (LC) and PCC sorbent at 700° C. FIG. 5 gives the data collected for 50 cycles with LC sorbent while FIG. 6 shows that for 100 CCR cycles with the PCC sorbent. The carbonation was carried out in a 10% $CO_2$ stream while pure $N_2$ was used for calcination. Each of the carbonation-calcination steps was performed for 30 minutes.

FIGS. 5 and 6 depict the sorption capacity of the sorbent, quantified in kg $CO_2$ captured/kg sorbent. Theoretically, 56 grams of unsupported CaO sorbent should react with 44 grams of $CO_2$ corresponding to a maximum $CO_2$ sorption capacity of 78.6 wt % at 100% conversion. From FIG. 5 it is evident that the wt % capacity of the LC based sorbent towards $CO_2$ capture reduces from 58% in the first cycle to 20% at the end of the $50^{th}$ cycle, due to the dominant microporosity in the LC precursor, which makes the structure susceptible to pore pluggage and pore mouth closure (Gupta et al., 2002; Wu et al., 2002). This is due to the formation of $CaCO_3$, whose molar volume (36.9 cc/mol) is higher than that of the reactant CaO (16.9 cc/mol). In contrast, we see from FIG. 6 that the conversion of PCC-CaO over 100 cycles is distinctly higher. The capacity, which is ~68 wt % in the first cycle, drops to 40 wt % in the $50^{th}$ and slightly to 36 wt % by the $100^{th}$ cycle (~6000 minutes on stream). The high reactivity over multiple cycles can be attributed to the predominant mesoporous structure of PCC, which allows the reactant gases to access the entire surface of particle through the larger pores. The extent of carbonation continues to rise significantly beyond the kinetic controlled regime. This fact was ascertained by extending the carbonation reaction time to 120 minutes over 40 cycles. These results provide evidence that the reactivity of the PCC-CaO is governed solely by the reaction time provided and there is no structural limitation in attaining high conversion.

Figure 7:
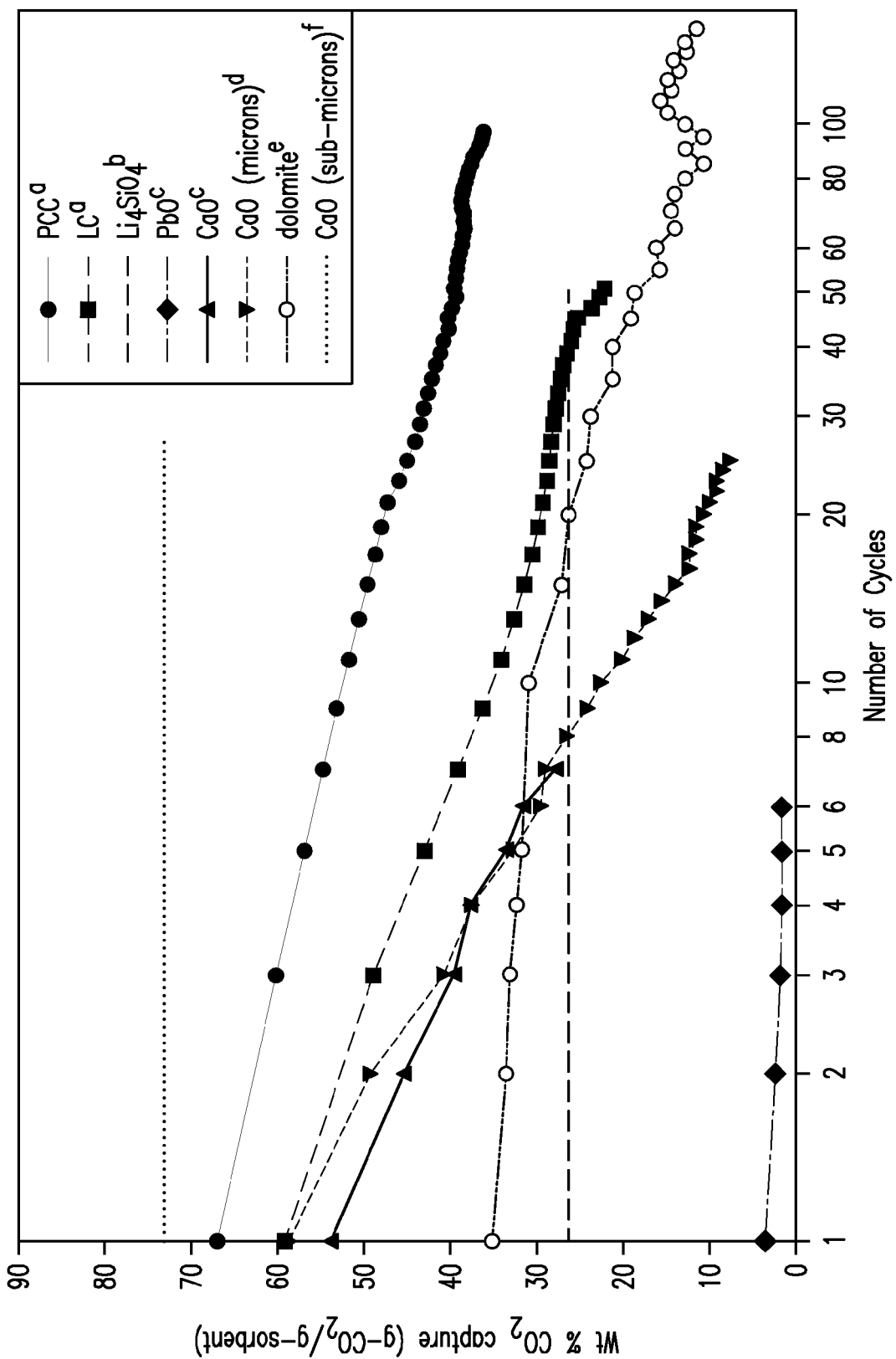
FIG. 7 shows the $CO_2$ capture capacity of various high temperature sorbents over multiple carbonation-regeneration cycles ([a]Iyer et al., 2004; [b]White et al., 2003; Kato et al., 2002; [c]Kato et al., 1999; [d]Barker 1973; [e]Ortiz 2001; [f]Barker 1974) (Iyer et al., 2004).

FIG. 7 depicts graphically the wt % $CO_2$ capture attained by LC, PCC and a host of other high temperature metal oxide sorbents reported in the literature for multiple CCR cycles (White et al., 2003). While numerous studies have been conducted on a variety of metal oxide based CCR process, a metal oxide that shows consistently high reactivity and sorption capacity over multiple cycles remains to be identified. The experimental conditions used in the studies referred to in FIG. 7 are detailed in a table elsewhere (Iyer et al., 2004). The table highlights important process conditions such as carbonation/calcination temperatures and residence times, number of cycles, sorption capacities, and the $CO_2$ concentration in the gas mixture during the reaction and regeneration steps. PCC-CaO attains a 66.8 wt % increase in 30 minutes and 71.5 wt % after 120 min at the end of the first cycle. In contrast, earlier studies (Gupta et al., 2002) have shown a sorption capacity of about 71 wt % (90% conversion) in a pure $CO_2$ stream after 60 mins at 650° C. Hence, factors like $CO_2$ concentration, temperature and cycle time play a significant role in determining the sorption capacity for the same sorbent.

The experiments conducted by Barker on 10 micron CaO powder demonstrate a drop in the sorption capacity from ~59 wt % in the first carbonation cycle to 8 wt % at the end of the $25^{th}$ cycle (Barker, 1973). This work suggests that due to the formation of a 22 nm thick product layer, particles smaller than 22 nm in diameter should be able to achieve stoichiometric conversion. The author later proved this hypothesis by obtaining repeated 93% conversion (73% weight capture) of 10 nm CaO particles over 30 cycles with a carbonation time of 24 hours under 100% $CO_2$ at 577° C. (Barker. 1974). In a PbO—CaO based chemical heat pump process, PbO attained 3.6 wt % $CO_2$ capture in the first cycle, decreasing to 1.6 wt % by the $6^{th}$ cycle and CaO showed a drop in $CO_2$ capture from 53 wt % in the $1^{st}$ cycle to 27.5 wt % by the $5^{th}$ cycle (Kato et al., 1998). A lithium zirconate ($Li_2ZrO_3$) based sorbent provided a 20 wt % capacity over two cycles (Ida et al., 2003). In another study, researchers at Toshiba Corp. observed that the reactivity of lithium orthosilicate was better than that of lithium zirconate (White et al., 2003; Kato et al., 2002). Extended cyclical studies performed on lithium orthosilicate samples revealed a consistent 26.5 wt % capacity over 25 cycles (Nakagawa et al., 2003). Harrison and coworkers, reported earlier, have been developing an enhanced hydrogen production process from the water gas shift reaction by removing $CO_2$ from the gas mixture through the carbonation of CaO from dolomite (Ortiz et al., 2001). Dolomitic limestone based CCR process yielded a 35 wt % capacity in the first cycle that fell to 11.4 wt % by the $148^{th}$ cycle when the carbonation experiments were performed in pure $CO_2$ at 800° C. and calcination was conducted at 950° C. They observed a decrease in calcium conversion from 83% in the 1st cycle to about 69% in the 10th cycle itself, followed by 27% conversion after 148 cycles (Ortiz et al., 2001).

Sorbent Regeneration by Vacuum/Steam/$CO_2$ Calcinations

We will be employing steam/$CO_2$ calcination, both of which lead to the regeneration of $CaCO_3$ at low enough temperatures that sintering is not in effect. Our prior investigation has focused on vacuum calcination, which results in a pure stream of $CO_2$. Steam Calcination can be quite suitable as the steam can be condensed out from the $CO_2$-steam mixture to yield pure $CO_2$ stream for sequestration. It has been suggested in literature that CaO procured from the calcination of limestone under vacuum has a higher reactivity (Beruto and Searcy, 1976; Dash et al., 2000; Beruto et al., 1980). Repeated calcination in $N_2$ leads to a loss in the surface area. Vacuum calcination of PCC followed by the carbonation of PCC-CaO was repeated over two cycles. PCC was first vacuum calcined to CaO-1 at 750° C. CaO-1 was then carbonated to CC-2 at 700° C. in pure $CO_2$ followed by its vacuum decomposition to CaO-2 which was then carbonated to CC-3. The values of surface area (SA) and pore volume (PV) of the sorbent at various stages are provided in Table 1. The extent of carbonation was beyond 90% for every vacuum calcination-carbonation cycle. Besides, these results prove that there is no systematic decline in SA and PV of sorbents with increasing cycles. This combination is also capable of providing a sustained conversion over many cycles due to effective retention of the sorbent morphology.

TABLE 1

Structural properties of Calcium based sorbents undergoing vacuum calcination at 750° C. and carbonation at 700° C.

| | SA (m2/g) | Pore Volume (cc/g) |
|---|---|---|
| PCC | 38.3 | 0.1416 |
| CaO-1 | 12.63 | 0.02409 |
| CC-2 | 6.5 | 0.0103 |
| CaO-2 | 15.93 | 0.04008 |
| CC-3 | 2.361 | 0.004483 |

Figure 8:
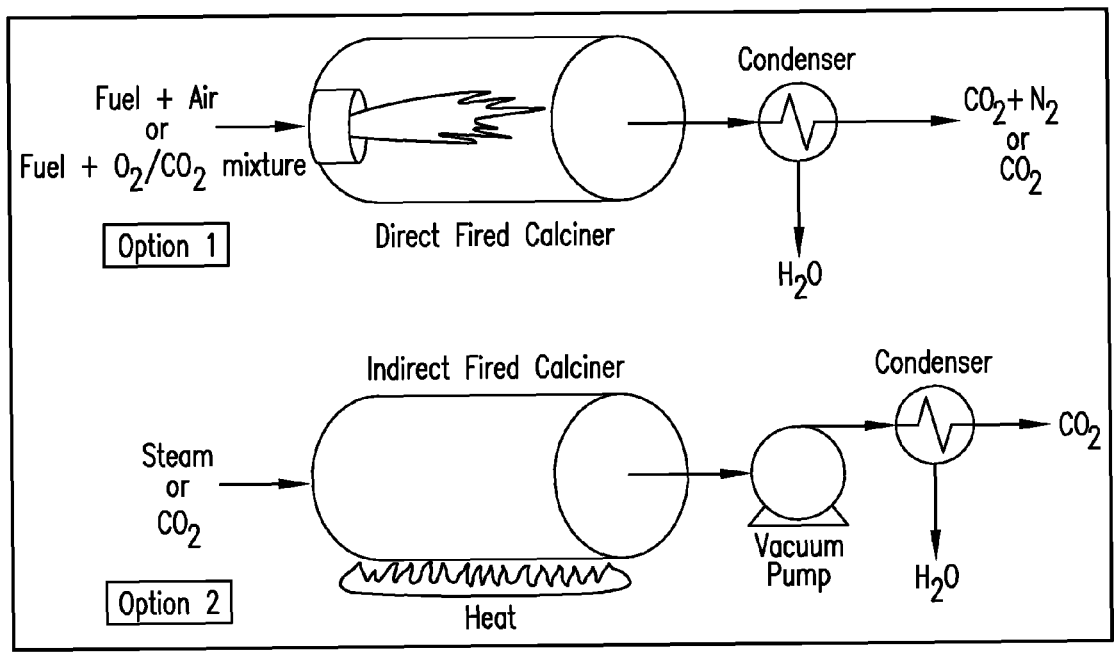
FIG. 8 illustrates the direct and indirect fired calcination options for designing a calciner.

FIG. 8 below gives the options for direct and indirect fired calciners to regenerate the $CaCO_3$ sorbent. The fuel in the direct calcination option could also be the hydrogen produced in the plant. Thus the heat for calcination could be obtained by $H_2$ combustion and the steam formed could be easily condensed out.

Thermodynamic Analyses of CaO—$CaCO_3$, CaO—CaS, CaO-COS, CaO-HCl and CaO—$Ca(OH)_2$ Systems Primarily three important gas-solid reactions can occur when calcium oxide (CaO) is exposed to a fuel gas mixture obtained from coal gasification. CaO can undergo hydration, carbonation and sulfidation reactions with $H_2O$, $CO_2$ and $H_2S$, respectively. These can be stoichiometrically represented as:

Hydration: $CaO + H_2O \rightarrow Ca(OH)_2$ (a)

Carbonation: $CaO + CO_2 \rightarrow CaCO_3$ (b)

Sulfur capture ($H_2S$): $CaO + H_2S \rightarrow CaS + H_2O$ (c)

Sulfur capture (COS): $CaO + COS \rightarrow CaS + CO_2$ (d)

Halide capture (HCl): $CaO + 2HCl \rightarrow CaCl_2 + H_2O$ (e)

All these reactions are reversible and the extent of each of these reactions depends on the concentrations of the respective gas species and the reaction temperature. Detailed thermodynamic calculations were performed to obtain equilibrium curves for the partial pressures of $H_2O(P_{H2O})$, $CO_2$ ($P_{CO2}$) and $H_2S(P_{H2S})$ as a function of temperature, for the hydration, carbonation, and sulfidation reactions using HSC Chemistry v 5.0 (Outokumpu Research Oy, Finland). The equilibrium calculations were based on the fuel gas compositions that are typical of the different types of coal gasifiers. The details of the fuel gas mixtures are illustrated in Table 2.

TABLE 2

Typical fuel gas compositions obtained from different gasifiers.

| | Moving Bed, dry | Moving Bed slagging | Fluidized Bed | Entrained Flow, slurry | Entrained Flow, dry |
|---|---|---|---|---|---|
| Oxidant | air | Oxygen | Oxygen | Oxygen | Oxygen |
| Fuel | Sub Bituminous | Bituminous | Lignite | Bituminous | Bituminous |
| Pressure(psi) | 295 | 465 | 145 | 615 | 365 |
| CO | 17.4 | 46 | 48.2 | 41 | 60.3 |
| H2 | 23.3 | 26.4 | 30.6 | 29.8 | 30 |
| CO2 | 14.8 | 2.9 | 8.2 | 10.2 | 1.6 |
| H2O | — | 16.3 | 9.1 | 17.1 | 2 |
| N2 | 38.5 | 2.8 | 0.7 | 0.8 | 4.7 |
| CH4 + HCs | 5.8 | 4.2 | 2.8 | 0.3 | — |
| H2S + COS | 0.2 | 1.1 | 0.4 | 1.1 | 1.3 |

(Stultz and Kitto, 1992)

Figure 9:
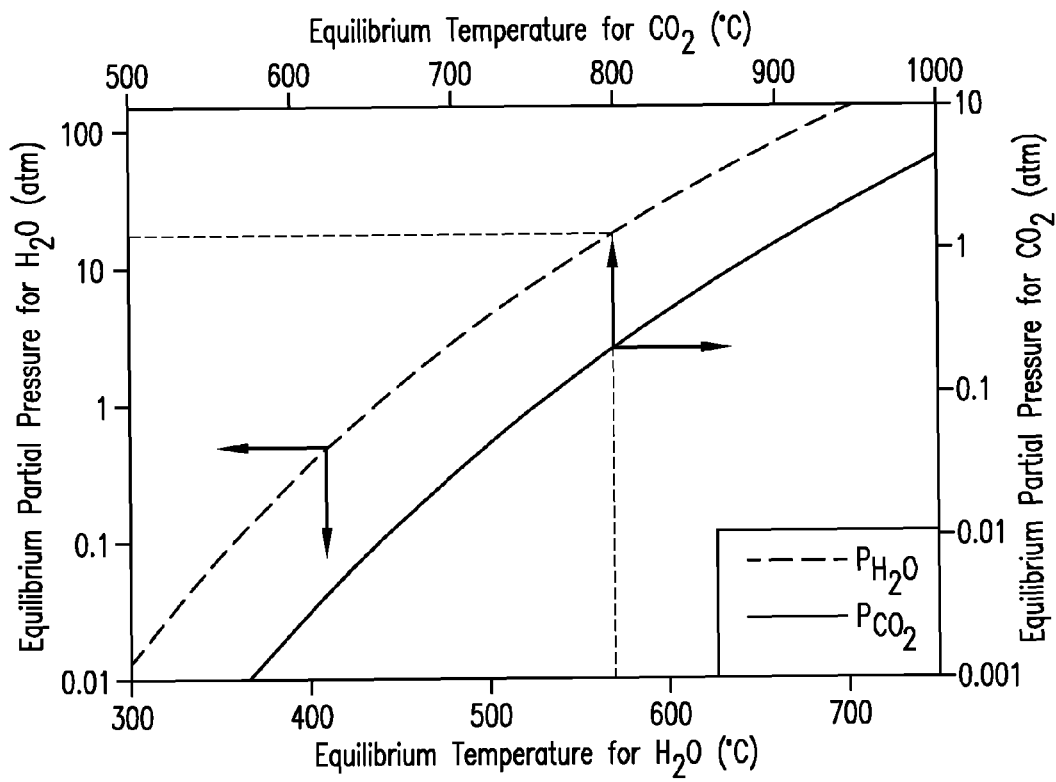
FIG. 9 provides thermodynamic data for predicting the temperature zones for hydration and carbonation of CaO in a fuel gas mixture.

The relationship between the reaction temperature and the equilibrium partial pressures of $H_2O$ and $CO_2$ for the hydration and carbonation reactions are shown in FIG. 9 (a). For a typical gasifier moisture composition ranging from 12-20 atm ($P_{H2O}$) the hydration of CaO occurs for all temperatures below 550-575° C., respectively. By operating above these temperatures, the CaO-hydration can be prevented. FIG. 9 shows the typical equilibrium $CO_2$ partial pressures ($P_{CO2}$) as a function of temperature. From the data in Table 2, it can be inferred that the typical $P_{CO2}$ in the gasifiers ranges from 0.4-4.3 atm for entrained flow (slurry) and entrained flow (dry) gasifier systems respectively. The equilibrium temperatures corresponding to those $P_{CO2}$ lie in the 830-1000° C. range as shown in FIG. 9. Thus, by operating below these temperatures, we can effect the carbonation of CaO.

For the reversible sulfidation of CaO (eqn c) the thermodynamic calculations depend on the concentration of moisture in the system as well as the $CO_2$ in the system. The thermodynamics of the sulfidation of $CaCO_3$ given below is not favorable for $H_2S$ removal as compared to CaO.

Sulfidation of $CaCO_3$: $CaCO_3 + H_2S \rightarrow CaS + H_2O + CO_2$

Figure 10A:
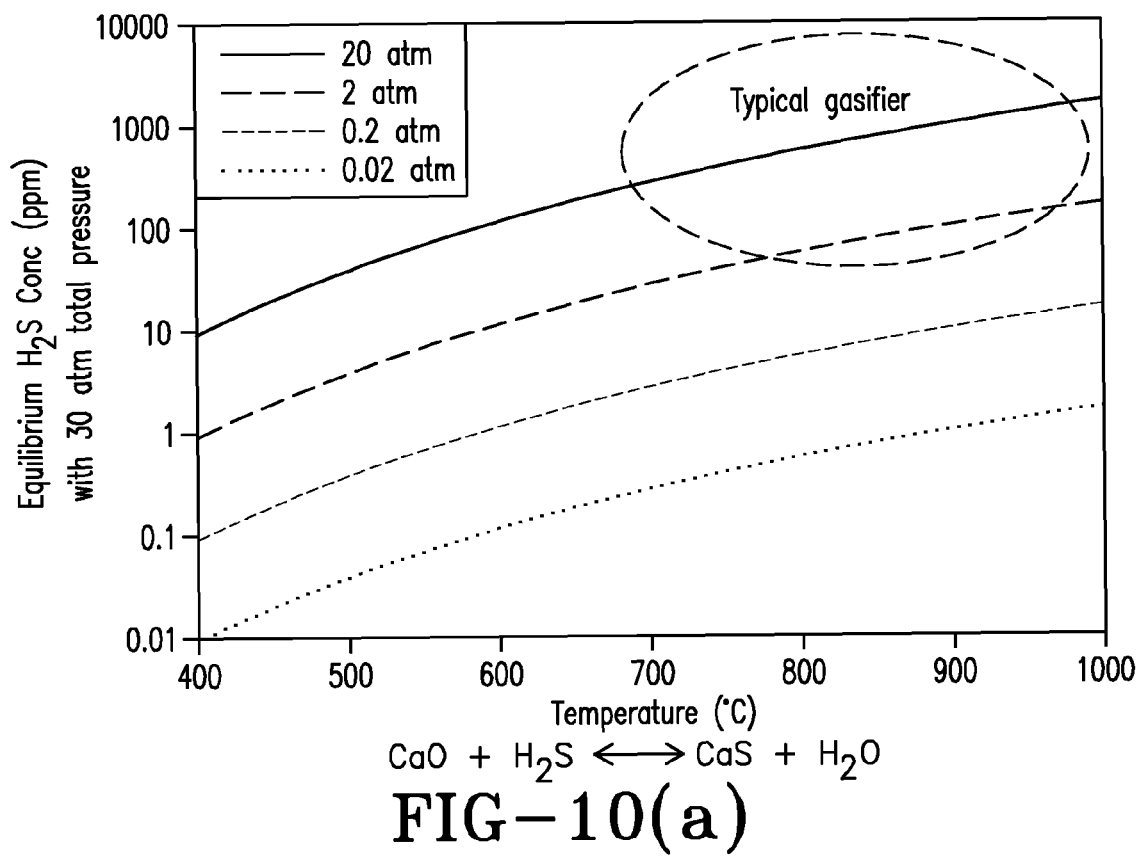
FIG. 10(a) provides thermodynamic data for predicting the equilibrium $H_2S$ concentration for CaO sulfidation with varying steam concentration ($P_{Total}$=30 atm).
Figure 10B:
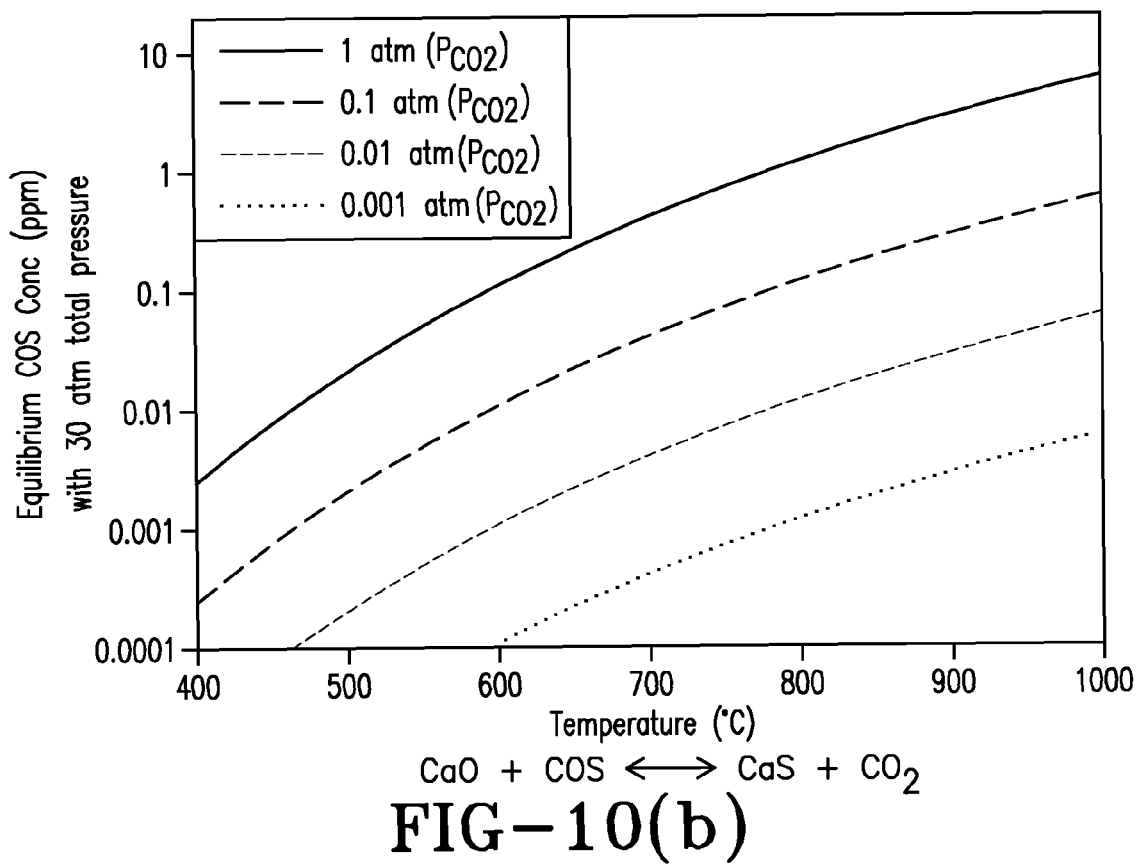
FIG. 10(b) provides thermodynamic data for predicting the equilibrium COS carbonyl sulfide concentration for CaO sulfidation with varying $CO_2$ concentration ($P_{Total}$=30 atm).
Figure 10C:
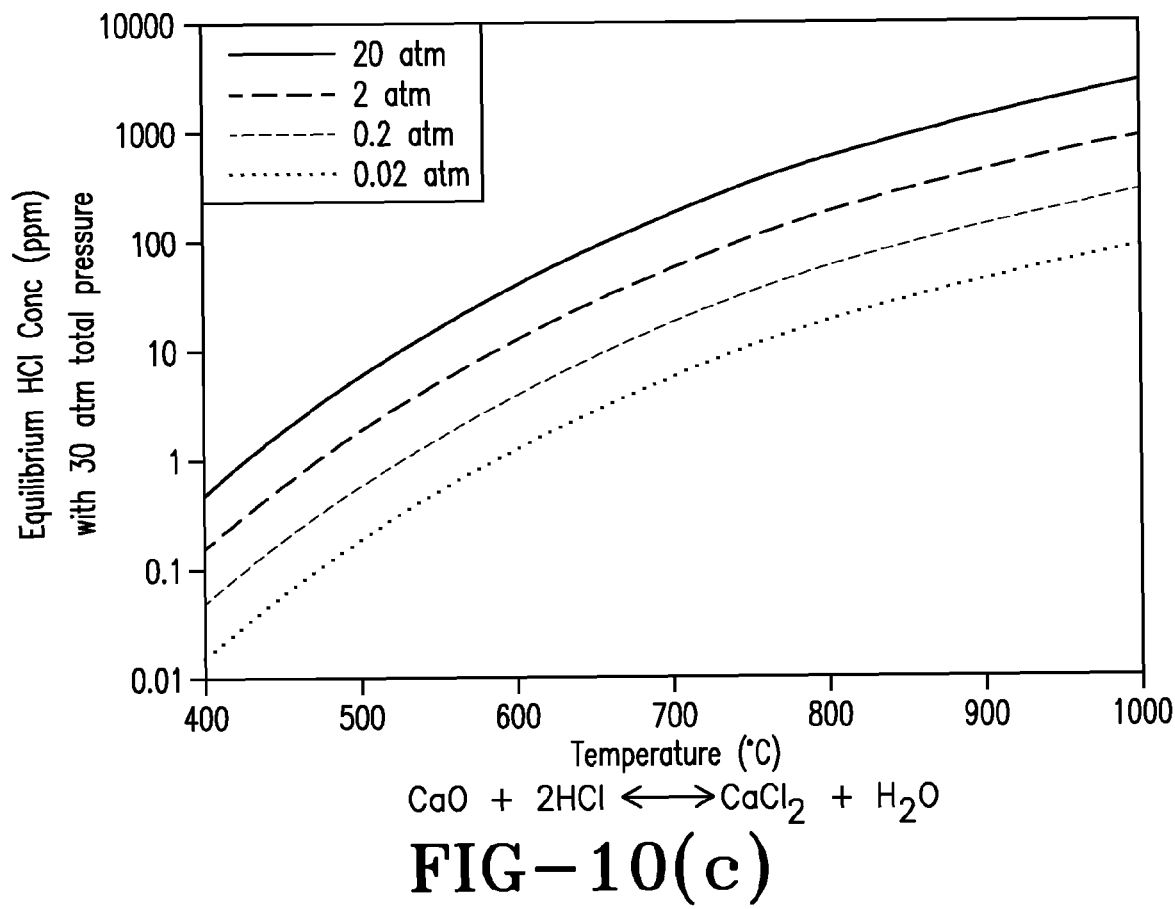
FIG. 10(c) provides thermodynamic data for predicting the equilibrium HCl concentration for CaO reaction with HCl with varying steam concentration ($P_{Total}$=30 atm).

Hence, based on CaO—$CaCO_3$ thermodynamics, it is imperative to operate under those $P_{CO2}$ such that carbonation of CaO does not occur and CaO is available for $H_2S$ capture. Hence, FIG. 10 (a) depicts the equilibrium $H_2S$ concentrations in ppm for varying moisture concentrations ($P_{H2O}$) and 30 atm total pressure. The proposed integrated WGS-carbonator reactor system will be operating at near-stoichiometric steam requirement resulting in low concentrations of steam in the reactor system. In addition, the $CO_2$ concentration will also be minimal due to the continuous removal of the $CO_2$ product via carbonation. Thus, the reactor system will now favor $H_2S$ removal using CaO at around 600-700° C. FIG. 10 shows the thermodynamic equilibrium $H_2S$ concentration for varying steam concentrations (0.02-20 atm). Thus, for a steam concentration of about 0.2 atm at 600° C., the equilibrium $H_2S$ concentration corresponds to about 1 ppm. Thus, the reactor system can achieve $CO_2$ as well as $H_2S$ removal while producing a pure $H_2$ stream. On the other hand, the typical gasifier conditions enable $H_2S$ removal to only 100-300 ppm. Similarly the concepts of COS capture and HCl capture by calcium oxide in a gas mixture with minimal $CO_2$ and steam can be explained via FIGS. 10 (b) and 10 (c).

Removal of Sulfur and Halides

The main drawback, which all the hydrogen production processes do not address, is the effect of sulfur ($H_2S$+COS) and halides (HCl) in the feed. Sulfur is present in syngas in the form of $H_2S$ and COS and halides such as HCl. These sulfur impurities are known to deactivate the reforming catalysts as well as react with CaO to form CaS as given by eqn (5) below. None of these technologies address sulfur removal schemes. Hence they might have to resort to conventional scrubbing techniques, upstream or downstream. This leads to additional steps as well as energy penalties in the hydrogen production process. This process aims at removing the sulfur ($H_2S$ and COS) in the system using the high reactivity calcium oxide sorbent, which is also used to capture $CO_2$ in the WGS reactor to produce hydrogen.

Synthesis gas obtained from the gasification of coal contains chloride impurities in the form of hydrogen chloride which causes severe corrosion in the equipment downstream of the gasifier. Although the concentration of hydrogen chloride in the gas stream from the gasifier depends on the type of coal, gasifier, temperature of operation used it typically varies within the range of 50 to 400 ppmv. Traditional methods of HCl removal include using a chloride guard which is expensive and can only be operated at temperatures below 450° C. resulting in severe energy penalities.

Reduction of Steam Requirements for Hydrogen Production

One of the major drawbacks to produce hydrogen using the conventional water gas shift catalyst reaction route is the excess steam requirement. The excess steam varies from 7 to 50 times the stoichiometric values. Hence, the main objective in developing this process is to reduce the excess steam requirement for hydrogen production. The excess steam is generally used to drive the equilibrium limited WGS reaction forward. However, due to in situ removal of $CO_2$ product, the WGS reaction proceeds in the forward direction to yield high conversions of CO to hydrogen. The high hydrogen yields make it possible to operate with a lower steam ratio in this process. Lowering the steam requirement will reduce the operating cost as well as favor $H_2S$ and COS removal as excess steam impedes sulfur ($H_2S$/COS) capture by CaO means of the sulfidation reaction mentioned earlier. Similarly, the presence of $CO_2$ impedes HCl capture as shown by thermodynamic analyses. Hence, by removing $CO_2$ in the system we can remove halides (HCl) to very low levels (ppbs).

Figure 11:
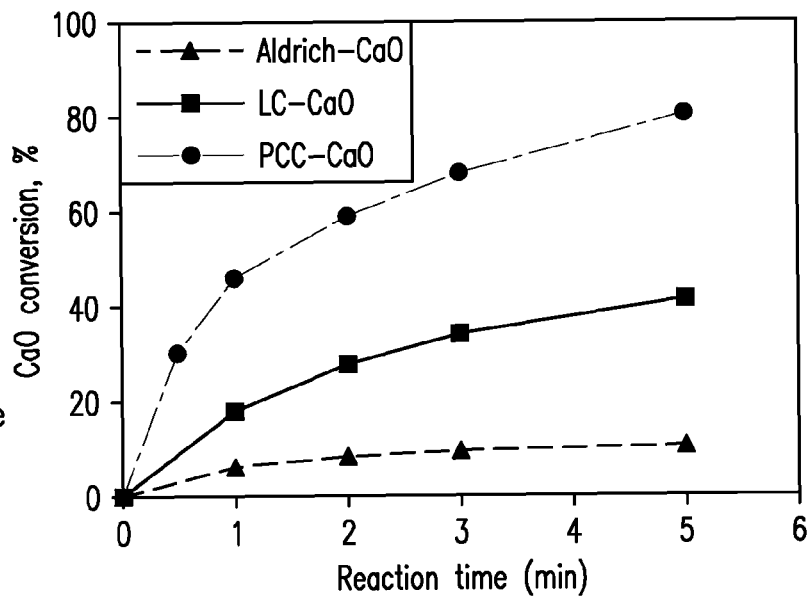
FIG. 11 shows the reactivity of different CaO sorbents towards $H_2S$ removal.

The effect of sulfidation reaction with three different CaO sorbents was studied (Chauk et al, 2000). CaO was obtained from Aldrich chemicals, PCC and Linwood calcium carbonate. The reaction was conducted at 800° C. with a total pressure of 1 MPa and $P_{H_2S}$ of 3 kPa (0.3%). FIG. 11 clearly points out the high reactivity of the PCC-CaO as compared to the other CaO sorbents. This can again be attributed to the superior sorbent morphology of PCC. Similar results have also been seen with this sorbent for $SO_2$ removal.

CaS Regeneration: Steam as well as $CO_2$ can also react with CaS to form CaO given by the reactions (Turgoden et al., 1973, Ruth et al., 1978) (Adanez, et al, 2001). These reactions can occur in the range of 400-900° C. and will be evaluated in this project.

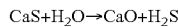

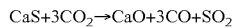

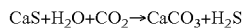

Combined WGS and Carbonation Reaction (without $H_2S$)

The combined carbonation and WGS reaction for enhanced $H_2$ production was conducted in an integral fixed bed reactor assembly described elsewhere (Gupta et al., 2004). Different calcium oxide precursors such as naturally occurring limestone: Linwood Carbonate (LC) and Linwood Hydroxide (LH) in addition to the structurally modified PCC were tested. The high temperature shift (HTS) iron oxide catalyst on chromium oxide support was procured from Süd-Chemie, Inc.

Figure 12A:
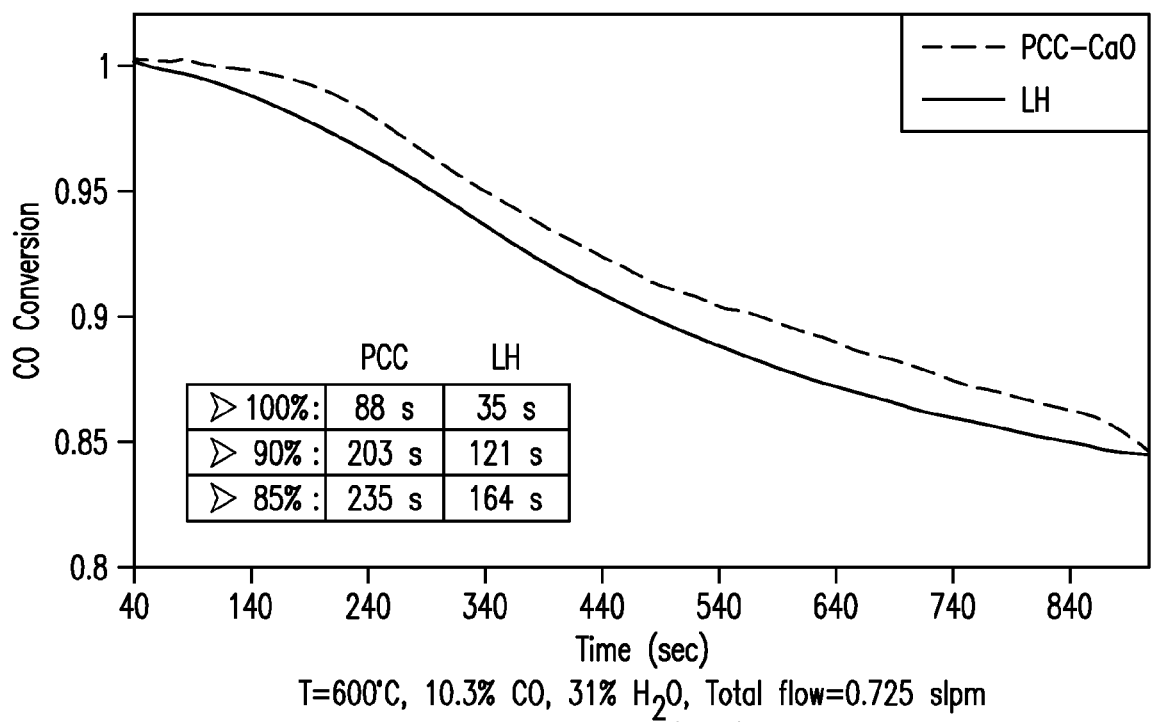
FIG. 12(a) is a comparison of breakthrough curves depicting CO conversion for PCC-HTS and LC-HTS systems.
Figure 12B:
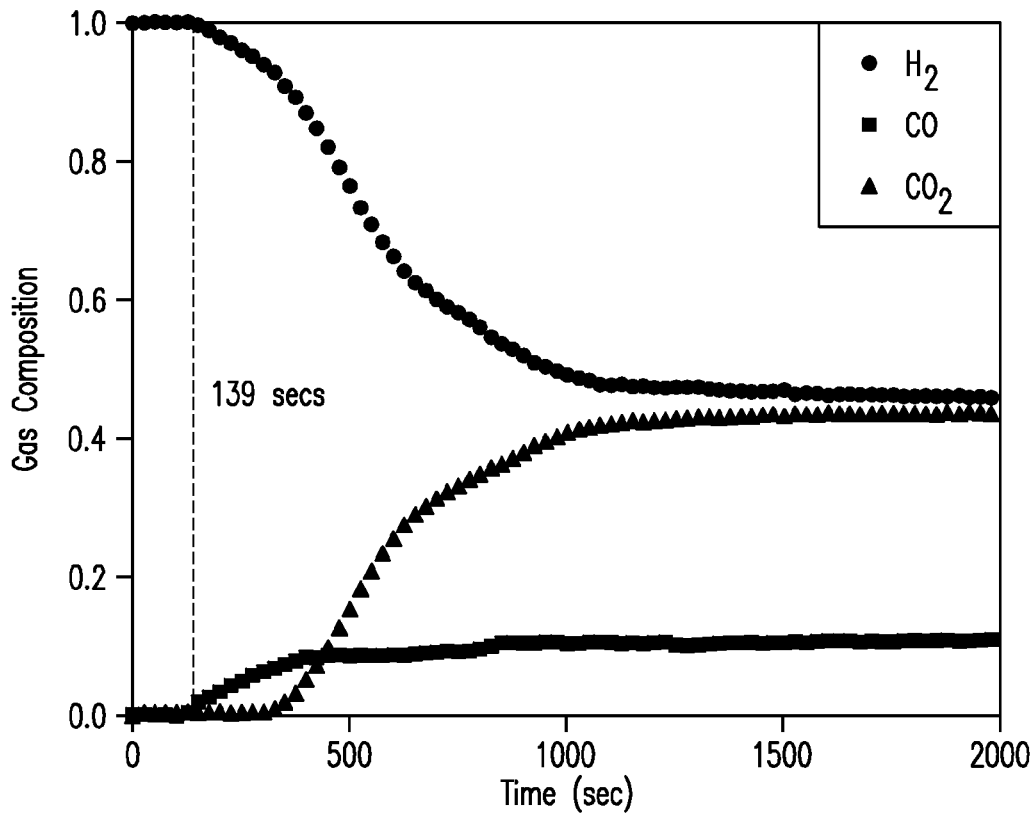
FIG. 12(b) shows the gas composition during the combined WGS carbonation reactions using PCC-HTS systems (T=600° C., 10.3% CO, 31% $H_2O$, Total flow=0.725 slpm).

FIG. 12(a) illustrates the CO conversion breakthrough curve for both the PCC and LC sorbent-catalyst systems. It is evident from the figure that the presence of CaO enhances the CO conversion and hence the hydrogen production. In both the systems we observe 100% initial conversion and the system finally reaches steady state. In addition, we observe that PCC-CaO system dominates over the LC-CaO system at any given time demonstrating the superior performance of the PCC sorbent towards hydrogen production. FIG. 12 (b) describes the nitrogen and steam free product gas compositions for a PCC-HTS system at 600° C. It is clear from this figure that during the initial breakthrough period the system demonstrates the production of a 100% pure hydrogen stream while the CO and $CO_2$ concentrations are negligible. As the system reaches steady state the $CO_2$ and $H_2$ concentrations tend to converge.

Effect of Pressure on $H_2$ Yield

Figure 13:
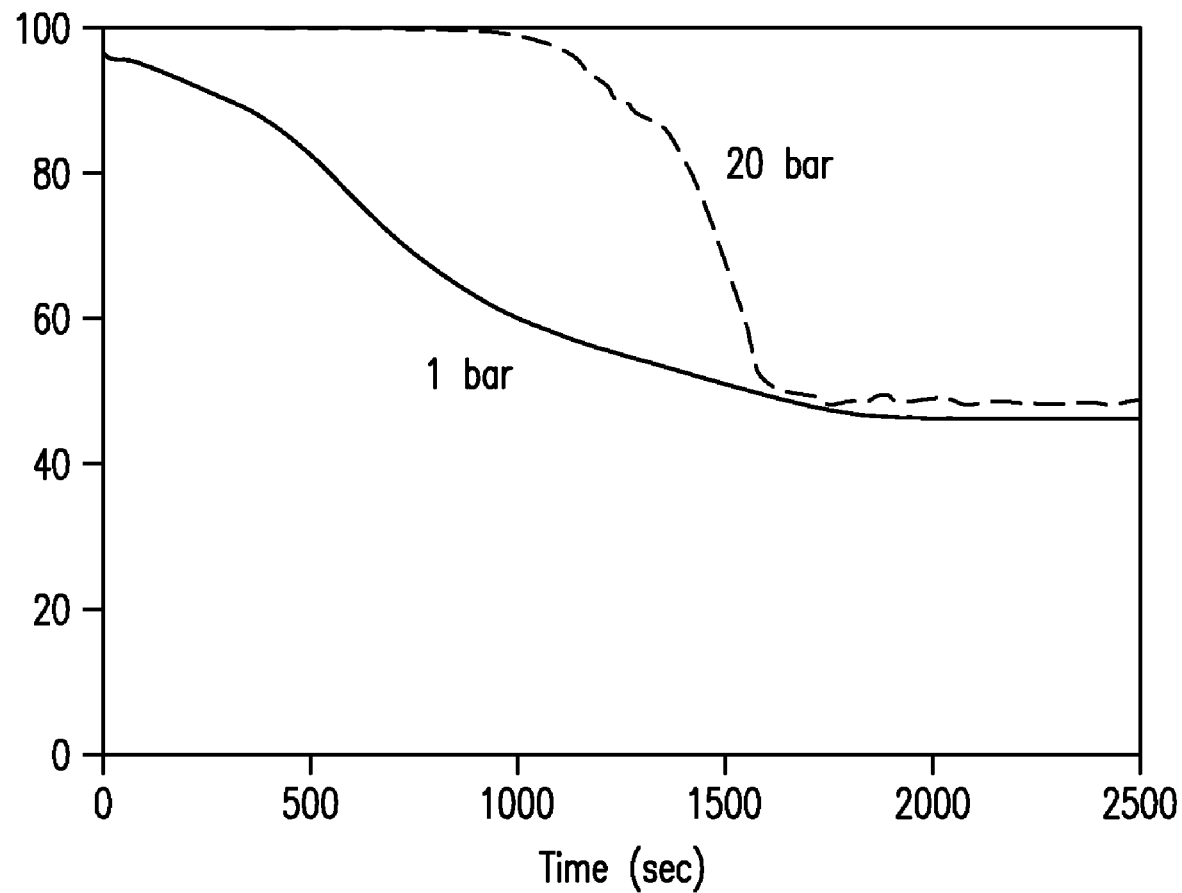
FIG. 13 is a comparison of $H_2$ gas composition at 1 and 20 bar for a 3:1 steam:CO ratio.

The combined water gas shift reaction and the carbonation reaction were carried out in a fixed bed reactor containing the calcined PCC sorbent and the HTS catalyst. The experiments were carried out at two pressures of 1 and 20 bar and this was done to study the performance of the combined reactions in a commercial setup where the fuel gas is typically around 20-30 bar. As shown in FIG. 13 the combined reactions demonstrated a superior performance at 20 bar as compared to ambient pressures, leading to the formation of 100% pure hydrogen during the initial stages of the reaction.

Effect of Reducing Excess Steam Requirement

Figure 14A:
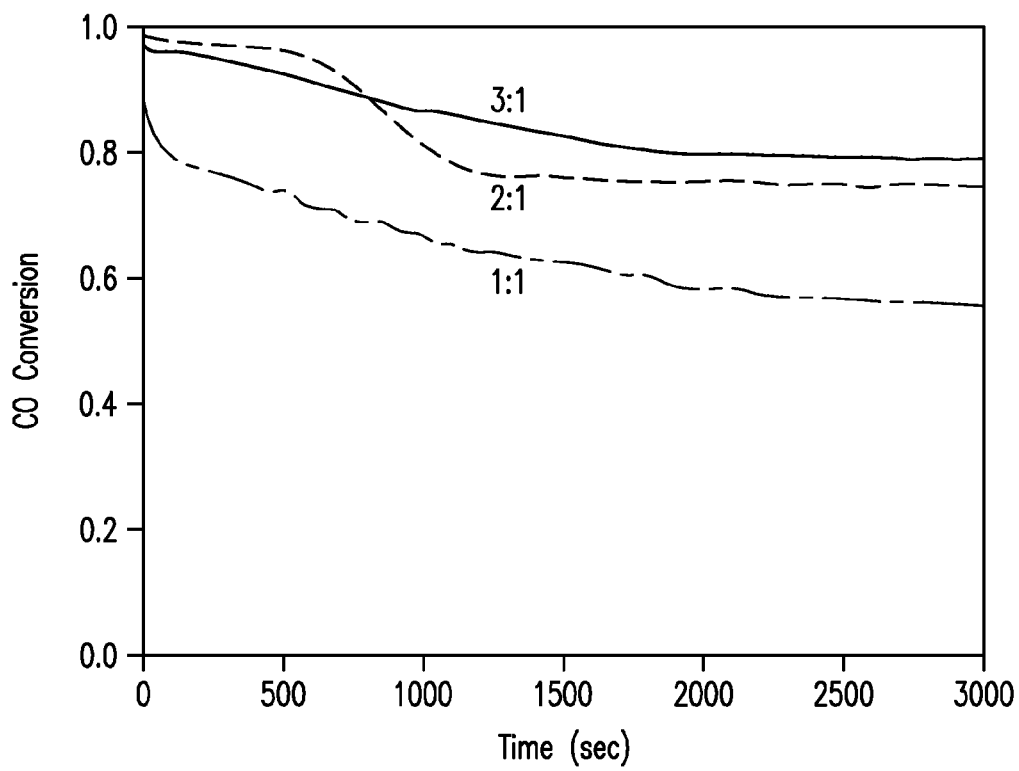
FIG. 14(a) is a comparison of CO conversion for different steam: CO ratios at 1 bar.
Figure 14B:
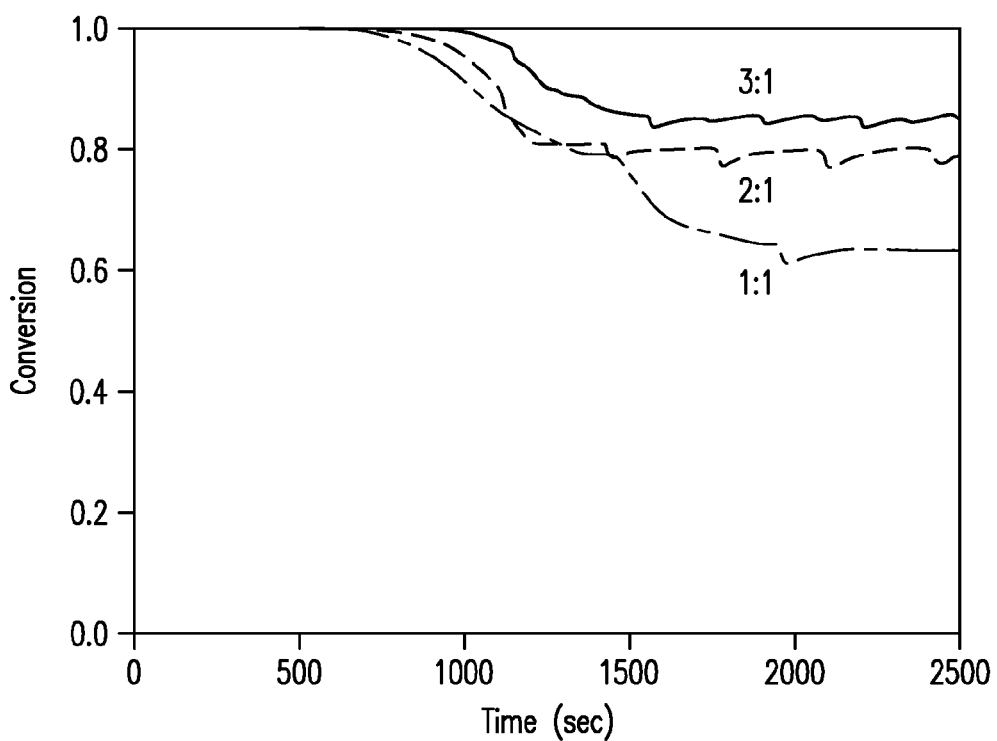
FIG. 14(b) is a comparison of CO conversion for different steam: CO ratios at 20 bar.
Figure 15A:
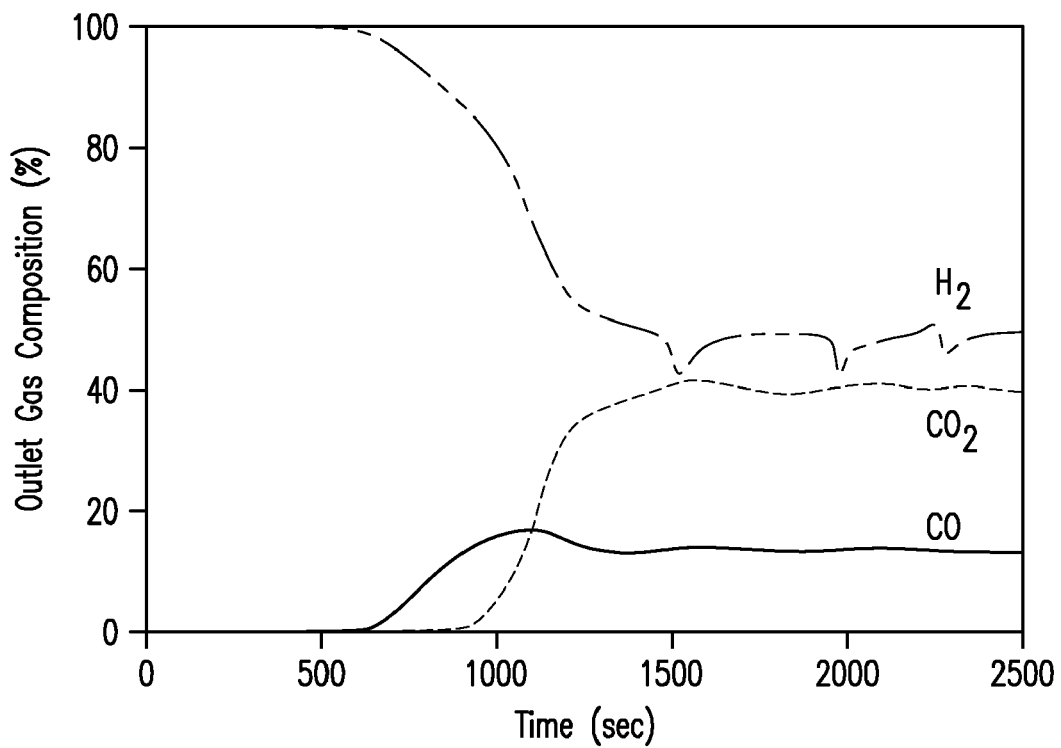
FIG. 15(a) shows the outlet gas composition from the reactor at 650° C. and 20 bar.
Figure 15B:
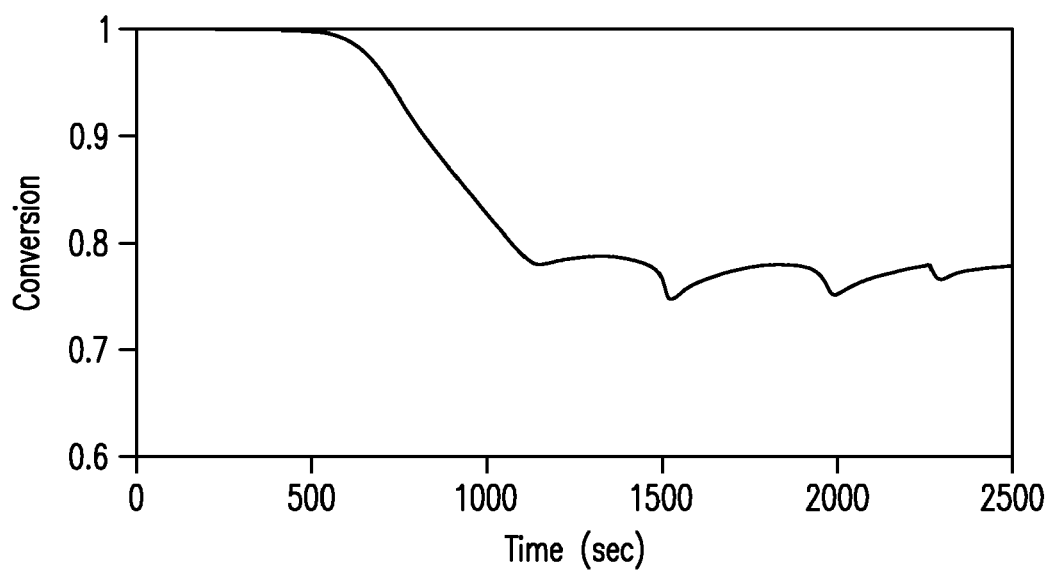
FIG. 15(b) provides the conversion achieved at 650° C. and 20 bar.

The combined reactions were also conducted at different steam: CO ratios of 3:1, 2:1 and 1:1. FIG. 14(a) below illustrates the CO conversion at 0 bar for different steam:CO ratios. FIG. 14(b) describes the CO conversion at 20 bar for different steam:CO ratios and it is evident that 100% conversion is achieved for all the three ratios for almost the same time in the initial stages of the reaction. This clearly demonstrates the ability to use a lower amount of steam at high pressures without altering the performance of the system.

Non-Catalytical Production of $H_2$

Due to the poisoning of the HTS (iron) catalysts in the presence of $H_2S$ impurities and the issues related to economics in using sulfur tolerant catalysts we conducted preliminary tests to determine the efficiency of the system to produce pure hydrogen in the absence of the catalyst. It was found from preliminary experiments that at a pressure of 20 bar in the presence of the sorbent the water gas shift reaction achieved 100% conversion and a 100% pure hydrogen stream was produced for 600 mins. Hence it is clear that the sorbent is effective in shifting the equilibrium of the WGSR to such an extent that pure hydrogen can be produced in the absence of a catalyst. Operating in this manner will eliminate the complexities and costs involved in the separation of the sorbent and catalyst mixture and in the regeneration of the catalyst.

Likelihood of Developing a Commercially Viable Technology

Figure 16:
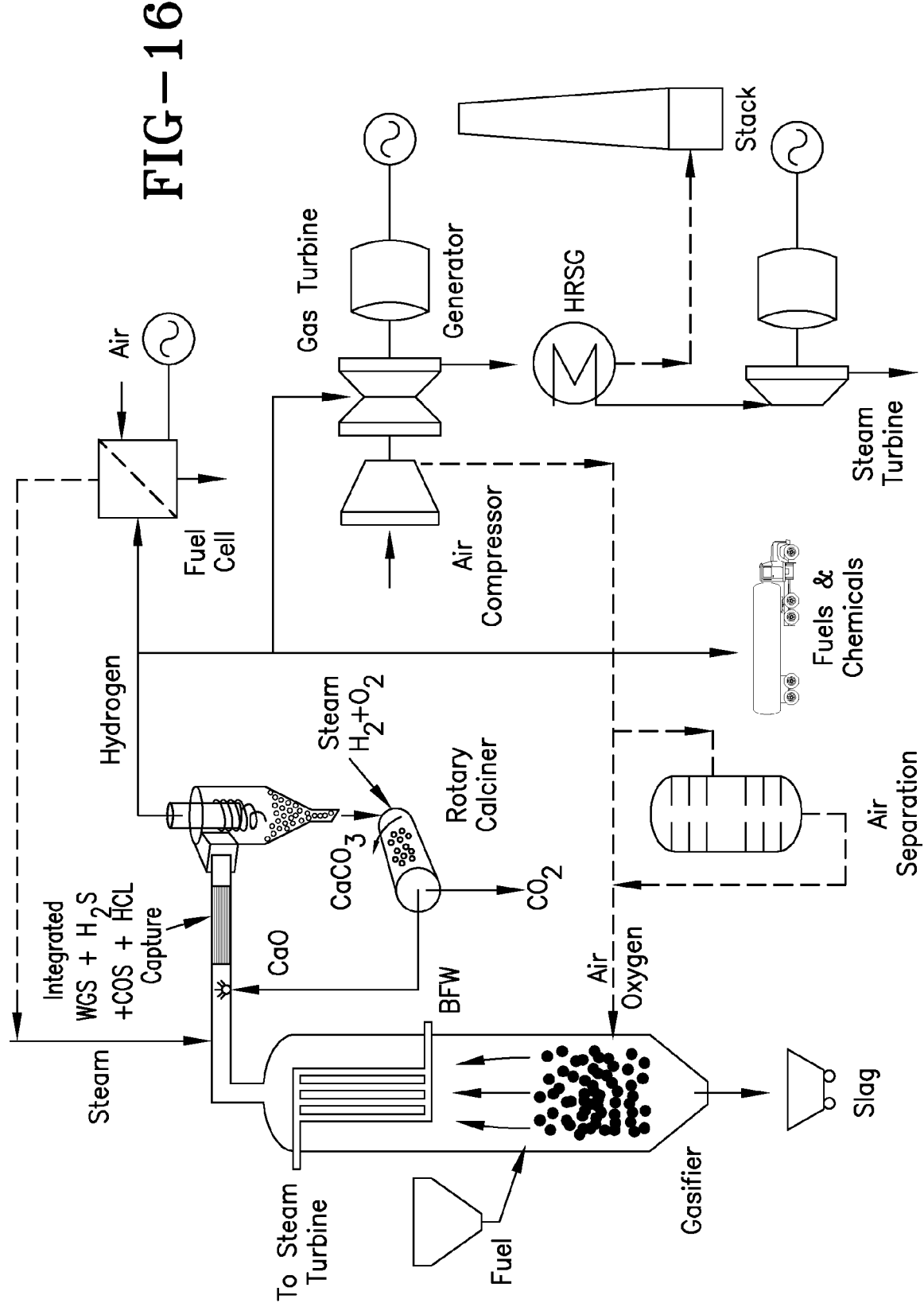
FIG. 16 presents a conceptual flowsheet depicting integration of various units in the Calcium Looping Processes for $H_2$ generation in typical coal-gasifier facility.

FIG. 16 below describes the integration of the proposed hydrogen production process in a typical coal gasifier. The syngas from the gasifier flows into the combined "one box" WGS-carbonator reactor where stoichiometric amount of steam is injected along with CaO leading to enhanced WGSR coupled with $CO_2$ and $H_2S$ capture in the system. The proposed integrated WGS-carbonator reactor system will be operating at near-stoichiometric steam requirement resulting in low concentrations of steam in the reactor system. In addition, the $CO_2$ concentration will also be minimal due to the continuous removal of the $CO_2$ product via carbonation. Thus, the reactor system will now favor sulfur ($H_2S$ and COS) removal using CaO at around 500-700° C. to about 10 ppb-–20 ppm. Thus, the reactor system can achieve $CO_2$ as well as $H_2S$ removal while producing a pure $H_2$ stream. Thus the proposed technology has an immense likelihood of success and this evident from the support letters from companies such as Shell Oil, American Electric Power, Sasol etc.

As described in earlier sections, the proposed technology has several benefits over current technology as it offers a novel integrated one stage process for producing high purity high temperature high-pressure hydrogen with carbon management incorporated in it. Besides, it also includes sulfur removal and halide removal from the system making the process economical and energy efficient.

The process can be optimized for various configurations such as:

1. Air blown gasification with sorbent (CaO) injection producing electrical power from an advanced turbine.

2. Oxygen blown gasification with sorbent (CaO) to produce greater than 90 percent purity hydrogen steam without any water gas shift catalyst.

3. Oxygen blown gasification with additional WGS catalysts (sulfur tolerant) and CaO produce hydrogen of purity compatible with solid oxide fuel cells and PEM fuel cells.

4. Oxygen blown gasification with sorbent (CaO) injection without catalyst to shift the fuel gas to a mixture of $H_2$: CO ranging from 0.5-20 for various fuels and chemical synthesis using Fischer Tropsch reactions.

Applications of Calcium Looping Process

A. High Temperature $CO_2$ Capture from Flue Gas Mixtures

Figure 17:
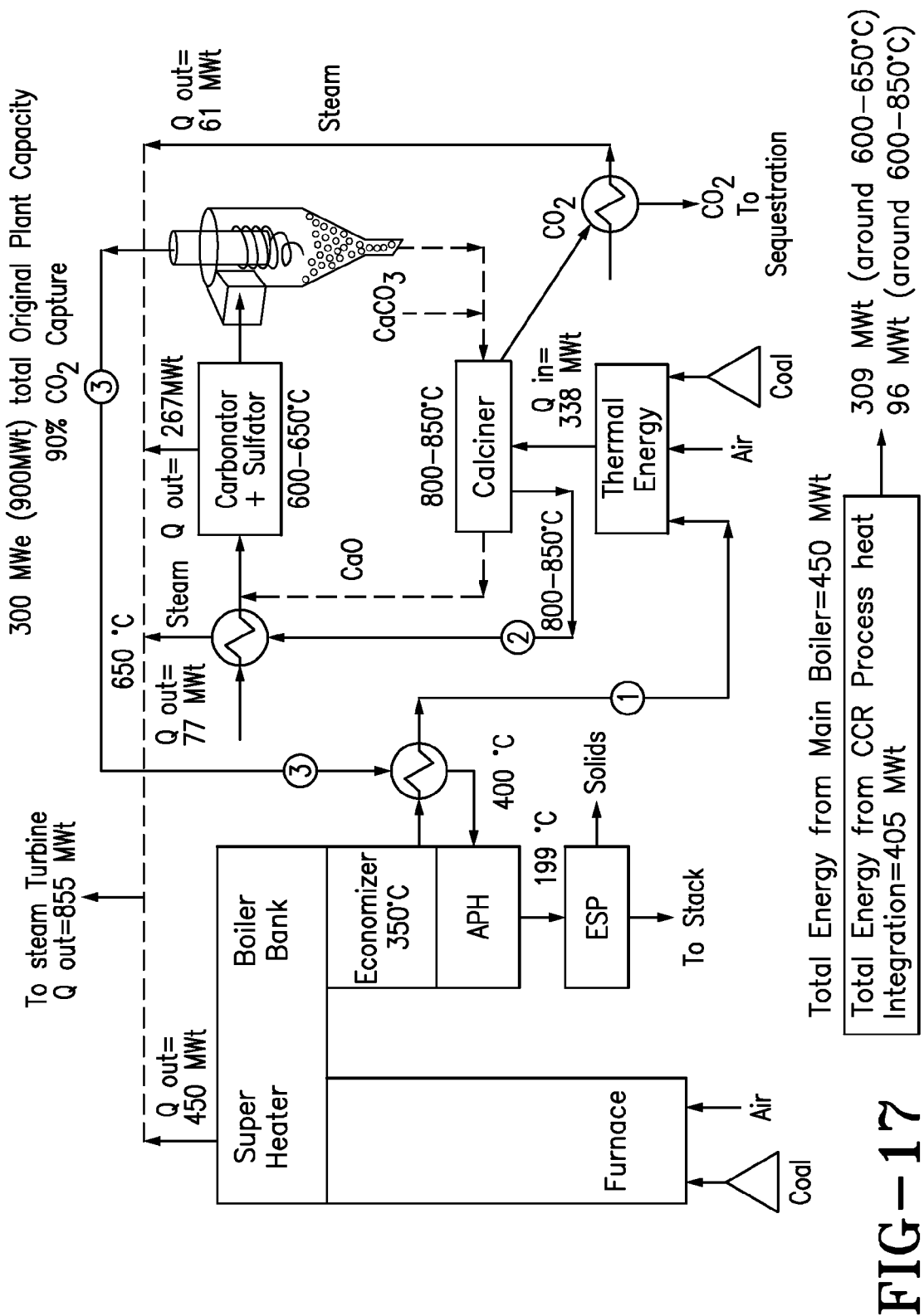
FIG. 17 presents a conceptual schematic of Carbonation-Calcination Reaction (CCR) process integration in a 300 MWe coal fired power plant depicting heat integration strategies (Fan and Iyer, 2006).

Implementing $CO_2$ capture technologies induces severe energy losses. For example, the parasitic energy consumption, which decreases the total power plant capacity, is 30% for the conventional amine scrubbing process while it improves to 28% for the oxy-combustion system (Châtel et al., 2005). In this regard, a successful alternative will require the incorporation of effective process integration schemes to minimize the parasitic energy requirement for $CO_2$ separation. One scheme for heat integration is based on the calcium based carbonation-calcination reaction (CCR) process which uses the re-engineered limestone sorbent mentioned earlier at 600-700° C. for efficient and economical $CO_2$ separation. FIG. 17 delineates the heat integration strategies for retrofitting the CCR process to an existing boiler without any significant modifications to the coal-based power plant. The flue gas that leaves the economizer of the boiler is routed to the CCR process system for $CO_2$ capture. This flue gas from the economizer (stream 1), is used to combust additional fuel with air to provide heat to the indirect calciner. Heat is extracted from the total flue gas mixture (stream 2), which contains all the $CO_2$ emitted by the entire plant, before it can be sent into the carbonator/sulfator system, to produce high quality steam. $CO_2$ and $SO_2$ are removed in the carbonator/sulfator system and the $CO_2$ free flue gas (stream 3), which is at ~650° C., is cooled before it is sent into the air pre-heater followed by ESP (electrostatic precipitator). The carbonated sorbent, $CaCO_3$, is sent to the calciner to regenerate the calcium oxide (CaO) sorbent for subsequent cycles while yielding a pure $CO_2$ stream. The sulfated sorbent and fly ash are removed from the system by means of a purge stream. This process is designed to capture both $CO_2$ and $SO_2$ simultaneously, rendering it a multi-pollutant control technology. The heat of carbonation can be as high as one-third of the total thermal capacity of a power plant. In the CCR process, steam is generated using high quality heat available from three different sources: (a) carbonator/sulfator (b) hot flue gas after supplying energy to calciner (between 600-850° C.) (c) a pure $CO_2$ stream from calciner at 800-850° C. This steam can be used in a secondary steam turbine system for additional electricity generation or in the existing plant steam cycle by offsetting the boiler load and in driving various feed water pumps in the plant. Thus, the total parasitic energy consumption of the plant is immensely reduced to 15%, including $CO_2$ compression (10%), which is half of that of the conventional amine scrubbing process.

Figure 18:
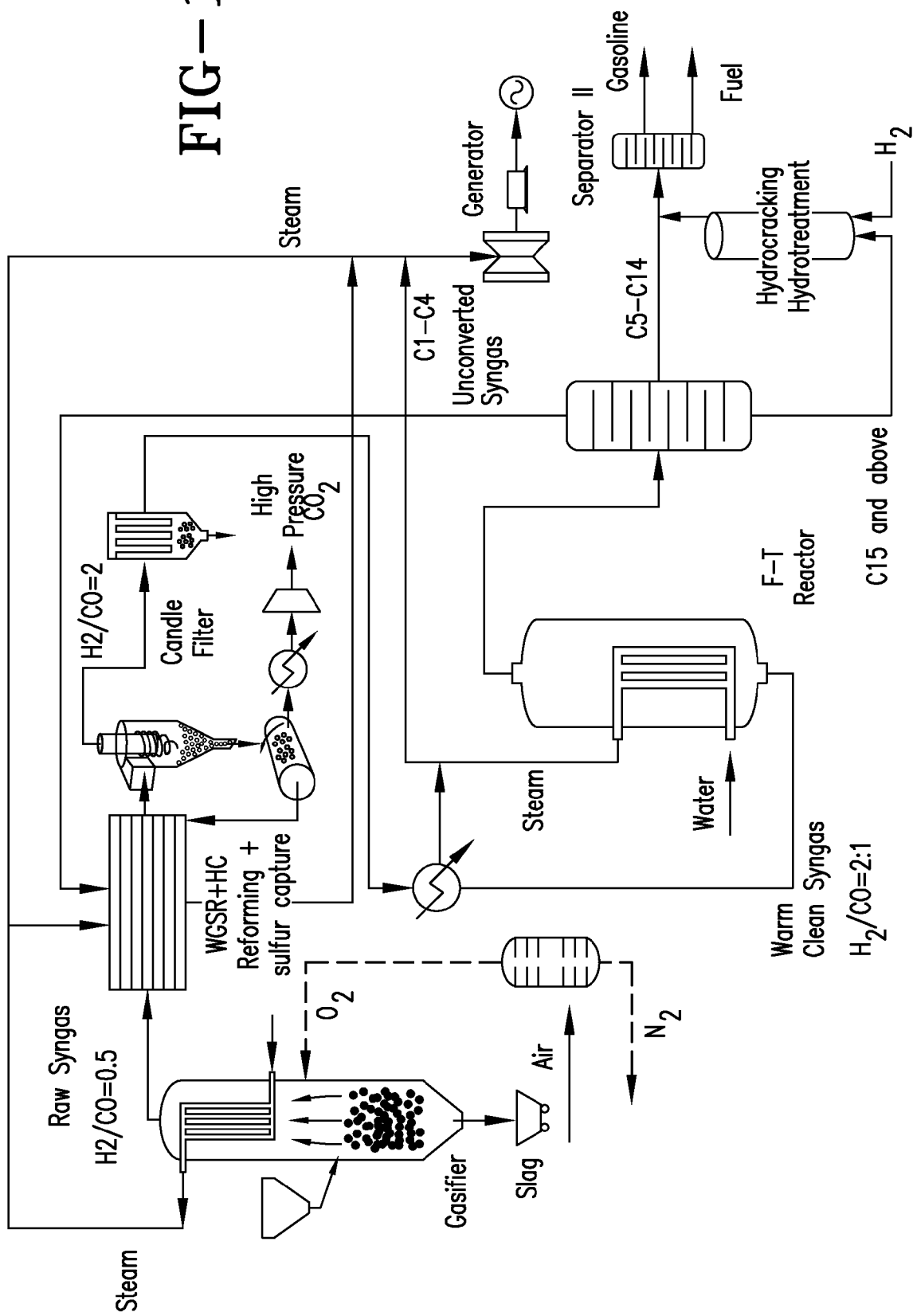
FIG. 18 illustrates a calcium looping system integrated in a coal to liquid plant.

B. Integrated $H_2$ Production, $CO_2$ Capture and Sulfur Removal in a Coal Gasification Process FIG. 18 below describes the integration of the proposed hydrogen production process in a typical coal gasifier. The syngas from the gasifier flows into the combined "one box" WGS-carbonator reactor where stoichiometric amount of steam is injected along with CaO leading to enhanced WGSR coupled with $CO_2$ and $H_2S$ capture in the system. The proposed integrated WGS-carbonator reactor system will be operating at near-stoichiometric steam requirement resulting in low concentrations of steam in the reactor system. In addition, the $CO_2$ concentration will also be minimal due to the continuous removal of the $CO_2$ product via carbonation. Thus, the reactor system will now favor sulfur ($H_2S$ and COS) removal using CaO at around 500-700° C. to about 10 ppb-- 20 ppm. Thus, the reactor system can achieve $CO_2$ as well as $H_2S$ removal while producing a pure $H_2$ stream.

As described in earlier sections, the proposed technology has several benefits over current technology as it offers a novel integrated one stage process for producing high purity high temperature high-pressure hydrogen with carbon management incorporated in it. Besides, it also includes sulfur removal and halide removal from the system making the process economical and energy efficient.

The process can be optimized for various configurations such as:

1. Air blown gasification with sorbent (CaO) injection producing electrical power from an advanced turbine.

2. Oxygen blown gasification with sorbent (CaO) to produce greater than 90 percent purity hydrogen steam without any water gas shift catalyst.

3. Oxygen blown gasification with additional WGS catalysts (sulfur tolerant) and CaO produce hydrogen of purity compatible with solid oxide fuel cells and PEM fuel cells.

4. Oxygen blown gasification with sorbent (CaO) injection without catalyst to shift the fuel gas to a mixture of $H_2$:CO ranging from 0.5-20 for various fuels and chemical synthesis using Fischer Tropsch reactions.

C. Enhanced Coal to Liquids (CTL) Process with Sulfur and $CO_2$ Capture

The rising energy demand coupled with the depleting global oil reserves and the dependence on foreign oil, has brought coal to liquid technologies, to the forefront. Currently, synthetic fuels are mainly produced via coal gasification and Fischer-Tropsch (F-T) synthesis process. A conventional coal to liquid plant consists of a gasifier which produces the syngas. The $H_2$/CO ratio of the syngas is around 0.63, which is much lower than the ratio of ~2, required for liquid fuel production. Hence, in order to modify the amount of hydrogen in the syngas, part of the syngas is introduced to a WGS reactor to be shifted into $H_2$. Since the gas stream contains sulfur impurities a sulfur tolerant WGS catalyst is used, which is expensive. The rest of the syngas stream passes through a hydrolysis unit where the COS is converted into $H_2S$.

The gas stream from the WGS reactor and the hydrolysis reactor are mixed together and passed through several gas cleanup units that consist of a mercury removal bed, bulk sulfur removal units, sulfur polishing unit, and $CO_2$ removal units. After the pollutants are removed, a clean syngas stream with a $H_2$ to CO ratio of around 2 is obtained which is sent to the F-T reactor for the production of liquid fuel. The F-T reactor is capable of converting more than 70% syngas into a wide range of hydrocarbons ranging from methane to wax. The products from the F-T reactor are sent to a product upgrader where the high molecular weight hydrocarbons are refined into liquid fuel or naphtha while the low molecular weight fuel gas stream is sent to a power generation block to generate electricity for the air separation unit and other parasitic energy consumption[1,13]. In this process, expensive gas cleanup units for sulfur and $CO_2$ removal are needed and the parasitic energy consumption for cooling and reheating the gas stream is very large. This parasitic energy consumption requires the off gases to be burnt in a turbine which reduces the total liquid fuel yield from the coal.

Figure 19:
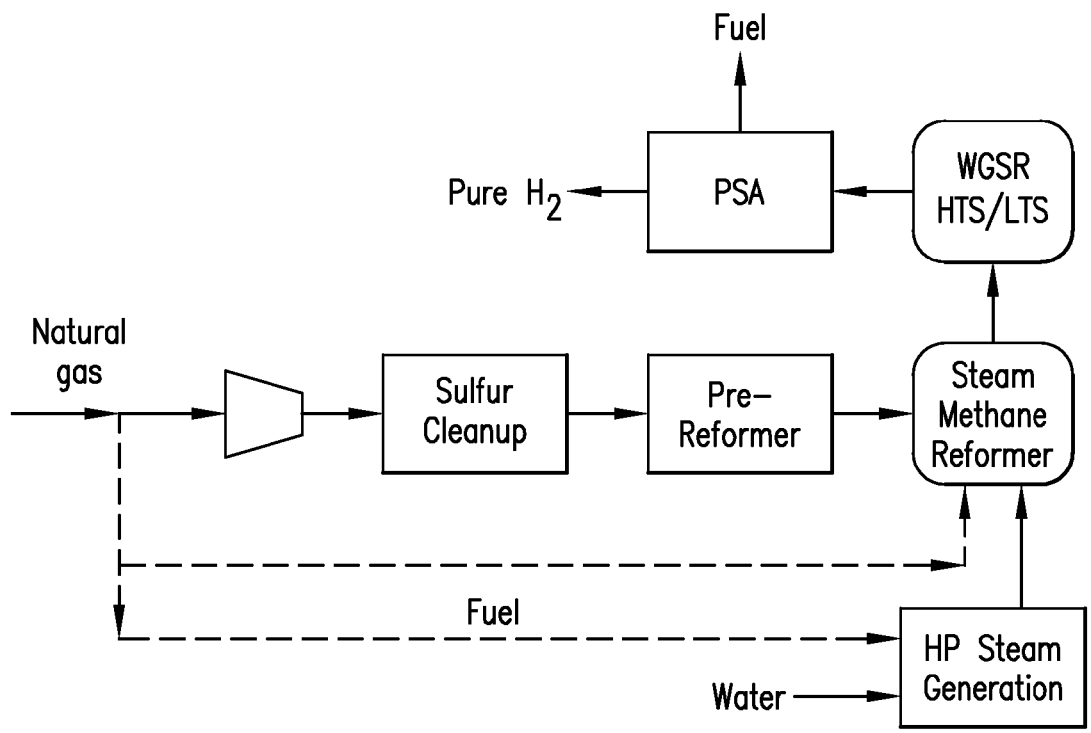
FIG. 19 provides a conventional hydrogen production from Steam Methane reforming and pressure swing adsorption.

In contrast when the calcium looping process is used in the production of liquid fuels, a $H_2$:CO ratio of the desired level can be obtained by converting the C1-C4 hydrocarbons and unconverted syngas produced from the FT reactor and the syngas from the gasifier in an efficient manner, while achieving $CO_2$ and $H_2S$ removal in the same reactor system. Since contaminant removal is achieved at high temperatures the parasitic energy requirement is greatly reduced and also the issues related to procurement and deactivation of the sulfur tolerant catalyst for the WGSR are eliminated. As shown in FIG. 19 the unreacted syngas and light hydrocarbons from the FT reactor are mixed with the syngas from the gasifier and sent into the single reactor system which adjusts the ratio of the $H_2$:CO in the syngas stream by reforming the hydrocarbons (eqn. (13)) and shifting the syngas (eqn. (14)) in the presence of CaO. The concomitant carbonation of the metal oxide (CaO) leading to the formation of the metal carbonate ($CaCO_3$) incessantly drives the equilibrium-limited WGSR and the reforming reaction forward by removing the $CO_2$ product from the gas mixture (eqn. (15)). The metal carbonate can then be regenerated by heating, to give back the metal oxide and a pure $CO_2$ stream (eqn. (17)). By improving the equilibrium conversion of the reforming and WGS reaction, steam addition can be greatly reduced. The reduction in steam consumption not only reduces energy consumption but also aids in the removal of $H_2S$ to ppb levels by the CaO (eqn. (16)) as steam poses an equilibrium constrain to the removal of $H_2S$. Various reactions occurring in this system are as follows:

Reforming: $C_xH_y + xH_2O \rightarrow xCO + (y/2+x)H_2$ (13)

WGSR: $CO + H_2O \rightarrow H_2 + CO_2$ (14)

Carbonation: $CaO + CO_2 \rightarrow CaCO_3$ (15)

Sulfidation: $CaO + H_2S \rightarrow CaS + H_2O$ (16)

Calcination: $CaCO_3 \rightarrow CaO + CO_2$ (17)

The calcium looping process aids in:

a) Converting all the C1-C4 hydrocarbons and unconverted syngas from the FT process, and syngas from the gasifier, into a 2:1 $H_2$:CO stream by shifting the equilibrium of the WGS and reforming reaction in the forward direction by removing the $CO_2$ product insitu, b) Achieving simultaneous $CO_2$ and $H_2S$ capture at high temperatures to ppb levels, c) Producing a sequestration ready $CO_2$ stream, d) Reducing the excess steam requirement which reduces the parasitic energy consumption and aids in higher levels of $H_2S$ removal, e) Reforming and reusing all the C1-C4 hydrocarbons produced from the FT reaction to produce more liquid fuel than the conventional process, for the same amount of coal consumed.

Hence by using the calcium looping process it is possible to combine various unit operations (reforming, WGS, $CO_2$ capture and $H_2S$ removal) into a single reactor system and to improve the overall efficiency of the coal to liquid technology.

D. Integrated $H_2$ Production Using SMR with $CO_2$ Capture and Sulfur Removal

Conventional Steam Methane Reforming without $CO_2$ Capture

Steam Methane Reforming (rxn 1) forms the industrial workhorse and is most widespread technology for hydrogen manufacture from natural gas (Bareli et al 2007[a,b], McHugh 2005). However, the reaction is highly endothermic (206 kJ/mol) and is equilibrium limited at lower temperatures. Hence, the SMR is usually conducted at high temperatures of 800-950° C. and pressures of about 20-30 atm. In addition, a minimum steam to carbon ratio of three or more is used to achieve reasonable methane conversions (65-90%). A simplified schematic of a conventional SMR to produce pure hydrogen is shown in FIG. 19 below.

The natural gas (NG) is initially split into two parts (a) for feed to the reformer to make hydrogen and (b) fuel for the reformer and steam generator. The natural gas feed is them compressed, cleaned of sulfur impurities and is then fed to a performer which operates at lower temperatures and catalytically converts all the C2-C5 streams in the NG to $CO_2$ or methane. The feed now enters the SMR unit at high temperatures which converts the NG to syngas. The commercial nickel alumina catalyst is the industry workhorse for SMR. Process. The process stream is now rich in CO and $H_2$ with a $H_2$/CO ratio of about 3. The stream then undergoes high and low temperature water gas shift reaction (WGSR) where all the CO gets converted to $H_2$. The stream is then fed to a pressure swing adsorption (PSA) unit where all the gases except $H_2$ get adsorbed in the beds leading to a pure $H_2$ product stream which can be more than 99.999% pure. The unconverted CO, $CO_2$ and $CH_4$ stream are subsequently desorbed from the PSA unit that forms the fuel stream to reformer burner.

The drawback of the SMR is the capital cost of the reformer due to the high temperature operation and heat integration requirements due the severe endothermicity of the reaction. Other approaches include partial oxidation (POX) where oxygen is used to partially oxidize natural gas to produce synthesis gas. This scheme results in in-situ combustion of the natural gas to provide heat for the reaction. Novel system includes autothermal reforming (ATR) which is a combination of partial oxidation and SMR to produce synthesis gas. These approaches result in almost complete methane conversions (95-99%) and better heat integration schemes due to in-situ combustion. While the SMR has better system efficiency of about 80% as compared to 72% for ATR, the capital costs for ATR units are about 75% of that of SMR. Further, the SMR process also produces the maximum $H_2$ per mole of natural gas used. Hence, we need a better system that has the efficiency of an SMR but has better heat integration and lower capital costs like that of an ATR. Finally, incorporation of $CO_2$ control technology would reduce the process efficiency and increase the capital cost of SMR process making hydrogen production via SMR uneconomical as the price of natural escalates.

Figure 20:
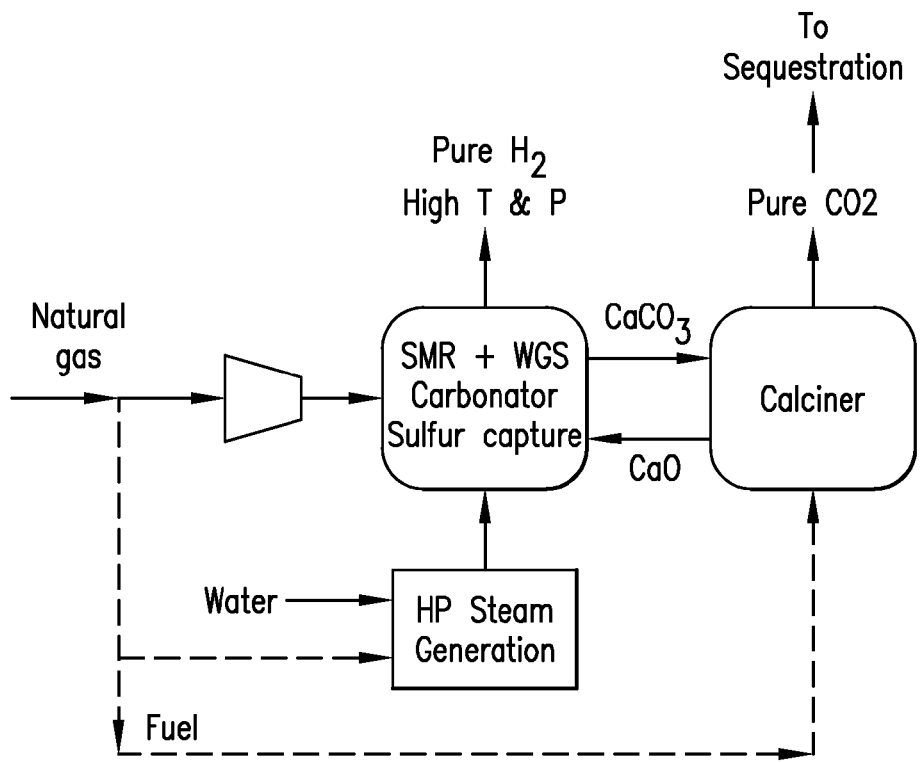
FIG. 20 is a schematic representation of calcium looping integrated with SMR to produce high purity hydrogen.
Figure 21:
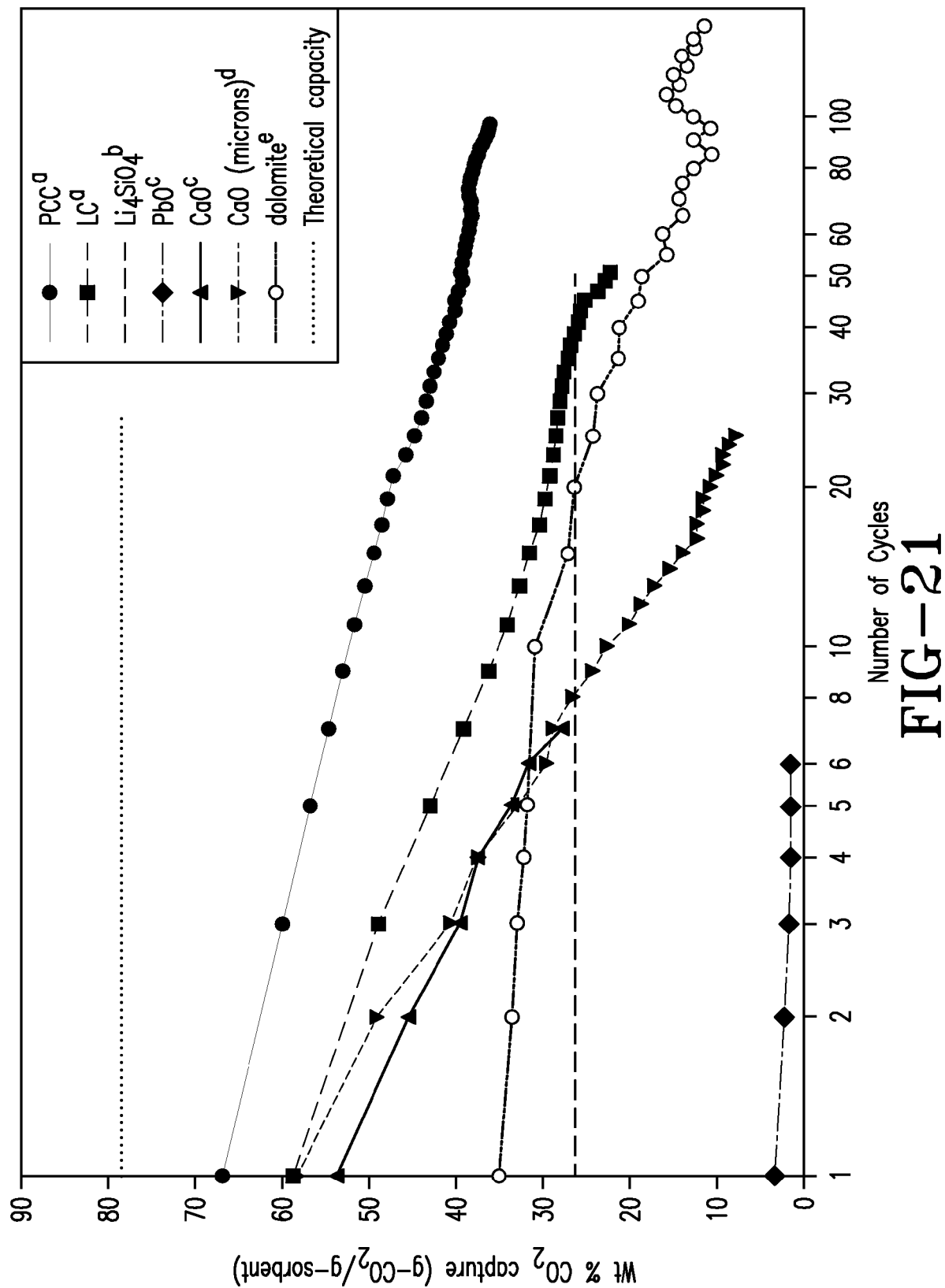
FIG. 21 is a comparison of the $CO_2$ capture capacity for various sorbents.

Integrated $H_2$ Production Using SMR with $CO_2$ Capture and Sulfur Removal Via Calcium Looping Process A simplified schematic of enhanced hydrogen production using steam methane reforming (SMR) coupled integrated with the calcium looping scheme is shown in FIG. 20. The reaction scheme which includes SMR, WGSR, carbonation, calcinations and sulfur capture is shown below.

SMR: $CH_4 + H_2O \rightarrow CO + 3H_2 (\Delta H = +206$ kJ/mol$)$ (13)

WGSR: $CO + H_2O \rightarrow H_2 + CO_2 (\Delta H = -41$ kJ/mol$)$ (14)

Carbonation: $CaO + CO_2 \rightarrow CaCO_3 (\Delta H = +178$ kJ/mol$)$ (15)

Overall: $CH_4 + 2H_2O + CaO \rightarrow CaCO_3 + 4H_2 (\Delta H = -13$ kJ/mol$)$ (13)

Calcination: $CaCO_3 \rightarrow CaO + CO_2 (\Delta H = +178$ kJ/mol$)$ (17)

Sulfidation: $CaO + H_2S \rightarrow CaS + H_2O$ (16)

As discussed earlier, the drawback of a conventional SMR process is the huge heat requirement due to the endothermic reaction (13) requiring higher temperature operation leading to operating temperatures of about 800-950° C. The integrated indirect heat transfer system coupled with high temperature operation leads to large capital costs for the reformer. On the other hand, the carbonation reaction is exothermic which also drives the equilibrium limited WGSR forward at high temperatures. Thus the SMR, WGSR and carbonation reactions can be conducted in one single step at a reaction temperature of about 550-700° C. at high operating pressures of 20 atm. Thus the overall heat balance for the reactions is almost neutral (−13 kJ/mol) and the process can be achieved at lower temperatures resulting in lower capital costs. In addition, the process results in complete carbon conversions, lower steam requirement, simultaneous in-situ sulfur removal and integrated $CO_2$ capture while producing high pressure hydrogen (20 bar). Compression of hydrogen is very expensive and this process obviates the need for first stage $H_2$ compression. Thus the incorporation of the calcium looping scheme results in integration of steam reforming, WGSR, $CO_2$ capture, sulfur removal and hydrogen separation in "one single step" while reducing excess steam requirement and producing high purity high pressure hydrogen resulting in improved process efficiency and reduced capital costs.

Conclusions on Calcium Looping Process

The calcium looping process simplifies the production of $H_2$ by integrating the water gas shift reaction (WGSR) with in-situ carbon dioxide, sulfur and hydrogen halide removal from the synthesis gas at high temperatures in a single stage reactor process while eliminating the need for WGSR catalyst requirement. This technology provides a "one box" mode of operation for production of high purity hydrogen with integrated $CO_2$, sulfur and chloride capture that integrates WGSR, hydrogen separation (PSA/membranes), $CO_2$ capture, and sulfur removal in one consolidated unit. Another advantage is that in addition to generating a pure hydrogen stream, it is also capable of adjusting the $H_2$ to CO ratio in the outlet to the required level while removing sulfur very low levels thus making it an attractive scheme for the production of liquid fuels by the Fisher Tropsch's reaction. This integrated "one box" process depicts the potential to achieve higher system efficiencies with lower overall footprint by combining different process units in one stage. The envisioned system has the flexibility and the potential to produce hydrogen of different purity levels by reducing the amount of WGS catalyst and reducing the excess steam requirement. This novel process which enables high temperature operation can also be deployed for reactive $CO_2$ capture from flue gases. Thus, the technology increases the overall conversion and process efficiency for various process applications.

A high reactivity mesoporous calcium oxide sorbent is described in U.S. Pat. Nos. 5,779,464 and 7,067,456 B2, each of which is incorporated by reference as if fully recited herein.

Objectives

The rising energy demand coupled with the depleting global oil reserves and the dependence on foreign oil, has brought coal to liquid technologies, to the forefront. Currently, synthetic fuels are mainly produced via coal gasification and Fischer-Tropsch (F-T) synthesis process. Syngas produced from gasifiers has a low $H_2/CO$ ratio ranging from 0.5 to 0.7 while a ratio of ~2 is required for liquid fuel synthesis through the FT process. The equilibrium limited water gas shift (WGS) process is utilized to meet this hydrogen deficit in the syngas. In addition the FT process usually has a conversion of only 78% and a selectivity of 87%[1]. Hence a process which can efficiently produce the required $H_2:CO$ ratio from the syngas produced in the gasifier and the unreacted as well as the undesirable products of the FT process would enhance the efficiency of the coal to liquid technology.

The disclosed embodiments combine various unit operations (reforming, WGS, $CO_2$ capture and $H_2S$ removal) into a single reactor system and to improve the overall efficiency of the coal to liquid technology by using the calcium looping process. The specific objectives are as follows a) To convert all the C1-C4 hydrocarbons and unconverted syngas from the FT process, and syngas from the gasifier, into a 2:1 $H_2:CO$ stream by shifting the equilibrium of the WGS and reforming reaction in the forward direction by removing the $CO_2$ product insitu, b)

To achieve simultaneous $CO_2$ and $H_2S$ capture at high temperatures to ppb levels, c) To produce a sequestration ready $CO_2$ stream, d) To reduce the excess steam requirement which aids in higher levels of $H_2S$ removal, e) To reform and reuse all the C1-C4 hydrocarbons produced from the FT reaction to produce more liquid fuel than the conventional process, for the same amount of coal consumed.

Background and Literature Review

A conventional coal to liquid plant consists of a gasifier which produces the syngas. The $H_2/CO$ ratio of the syngas is around 0.63, which is much lower than the ratio of ~2, required for liquid fuel production. Hence, in order to modify the amount of hydrogen in the syngas, part of the syngas is introduced to a WGS reactor to be shifted into $H_2$. Since the gas stream contains sulfur impurities a sulfur tolerant WGS catalyst is used, which is expensive. The rest of the syngas stream passes through a hydrolysis unit where the COS is converted into $H_2S$.

The gas stream from the WGS reactor and the hydrolysis reactor are mixed together and passed through several gas cleanup units that consist of a mercury removal bed, bulk sulfur removal units, sulfur polishing unit, and $CO_2$ removal units. After the pollutants are removed, a clean syngas stream with a $H_2$ to CO ratio of around 2 is obtained which is sent to the F-T reactor for the production of liquid fuel. The F-T reactor is capable of converting more than 70% syngas into a wide range of hydrocarbons ranging from methane to wax. The products from the F-T reactor are sent to a product upgrader where the high molecular weight hydrocarbons are refined into liquid fuel or naphtha while the low molecular weight fuel gas stream is sent to a power generation block to generate electricity for the air separation unit and other parasitic energy consumption[1,13]. In this process, expensive gas cleanup units for sulfur and $CO_2$ removal are needed and the parasitic energy consumption for cooling and reheating the gas stream is very large. This parasitic energy consumption requires the off gases to be burnt in a turbine which reduces the total liquid fuel yield from the coal.

In contrast if the calcium looping process is used in the production of liquid fuels, a $H_2:CO$ ratio of the desired level can be obtained by converting the C1-C4 hydrocarbons and unconverted syngas produced from the FT reactor and the syngas from the gasifier in an efficient manner, while achieving $CO_2$ and $H_2S$ removal in the same reactor system. Since contaminant removal is achieved at high temperatures the parasitic energy requirement is greatly reduced and also the issues related to procurement and deactivation of the sulfur tolerant catalyst for the WGSR are eliminated. As shown in FIG. 19 the unreacted syngas and light hydrocarbons from the FT reactor are mixed with the syngas from the gasifier and sent into the single reactor system which adjusts the ratio of the $H_2:CO$ in the syngas stream by reforming the hydrocarbons (eqn. (1)) and shifting the syngas (eqn. (2)) in the presence of CaO. The concomitant carbonation of the metal oxide (CaO) leading to the formation of the metal carbonate ($CaCO_3$) incessantly drives the equilibrium-limited WGSR and the reforming reaction forward by removing the $CO_2$ product from the gas mixture (eqn. (3)). The metal carbonate can then be regenerated by heating, to give back the metal oxide and a pure $CO_2$ stream (eqn. (5)). By improving the equilibrium conversion of the reforming and WGS reaction, steam addition can be greatly reduced. The reduction in steam consumption not only reduces energy consumption but also aids in the removal of $H_2S$ to ppb levels by the CaO (eqn. (4)) as steam poses an equilibrium constrain to the removal of $H_2S$. Various reactions occurring in this system are as follows Reforming: $C_xH_y + xH_2O \rightarrow xCO + (y/2+x)H_2$ (1)

WGSR: $CO + H_2O \rightarrow H_2 + CO_2$ (2)

Carbonation: $CaO + CO_2 \rightarrow CaCO_3$ (3)

Sulfidation: $CaO + H_2S \rightarrow CaS + H_2O$ (4)

Calcination: $CaCO_3 \rightarrow CaO + CO_2$ (5)

There are three main scenarios for the integration of the calcium looping process in coal to liquid technology. In the first scenario, the mixture of gases from the FT reactor and the gasifier are mixed and sent into a single reactor which contains a mixture of reforming catalyst and CaO. Here the steam injection rate and the calcium injection rate will be optimized such that the C1-C4 compounds are reformed and the syngas is shifted to the required extent to obtain a $H_2$:CO ratio of 2. In the second scenario, the single reactor contains a mixture of pre-reforming catalyst and sorbent which convert the C2-C4 hydrocarbons into $H_2$ and $CO_2$ due to the high selectivity of the catalyst and the $CO_2$ is removed by the CaO. Since the pre-reforming catalyst is resistant to carbon deposition, low quantities of steam injection can be used, which is beneficial for $H_2S$ removal. Also since the pre-reforming catalyst operates at lower temperatures of 500-600 C, which is the optimum temperature for carbonation and sulfidation, the amount of solid circulation is very low, making this scheme very attractive in all respects. Since methane is not reformed by the pre-reforming catalyst either a purge stream can be removed and used for power generation or a fixed bed of the reforming catalyst can be used downstream in the same reactor system. In the third scenario the reactor contains only calcium oxide sorbent which accelerates the reforming and the WGSR in the non catalytic mode, while removing the $CO_2$ and $H_2S$ impurities. This option is very attractive as it obviates the need for a catalyst which simplifies the operation of the reactor system and reduces the costs associated with the deactivation of the catalyst.

$CO_2$ Capture Testing:

Mesoporous $CaCO_3$ and CaO sorbents, synthesized by a wet precipitation technique under the influence of negatively charged sodium polyacrylate ions, show a 70 wt % capture capacity for $CO_2$ in a TGA. Carbonation experiments with commercial CaO under entrained flow conditions show a 27-55 wt % $CO_2$ capture in 140-160 milliseconds residence time. Multiple CCR cycle experiments reveal that our CaO sorbent retains 36 wt % $CO_2$ capture capacity even after 100 cycles which is higher than that achieved by all the other sorbents as shown in FIG. 2. The details about the synthesis procedure of mesoporous PCC and reactivity testing towards $CO_2$ capture are outlined elsewhere[7,8]

Combined WGS and Carbonation Reaction and $H_2S$ Removal:

The combined carbonation, WGS reaction and sulfidation for enhanced $H_2$ production from syngas was conducted in an integral fixed bed reactor assembly described elsewhere[9].

Figure 22A:
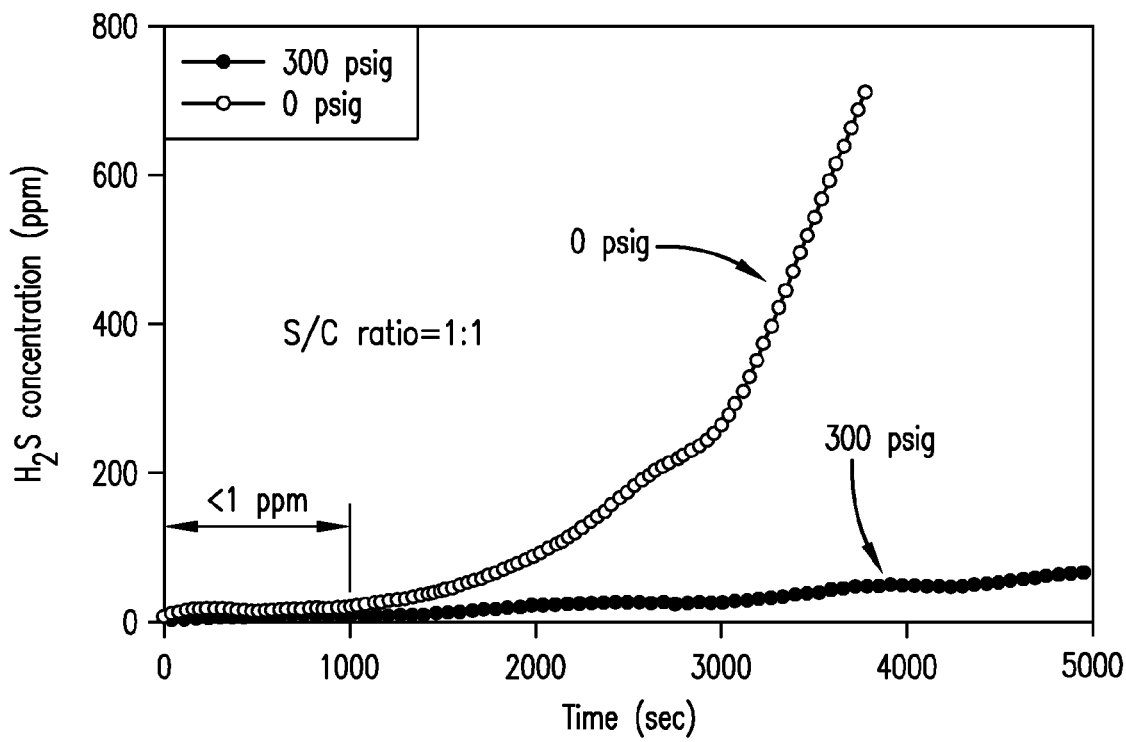
FIG. 22(a) shows the H2S concentration in the outlet gas stream with change in pressure.
Figure 22B:
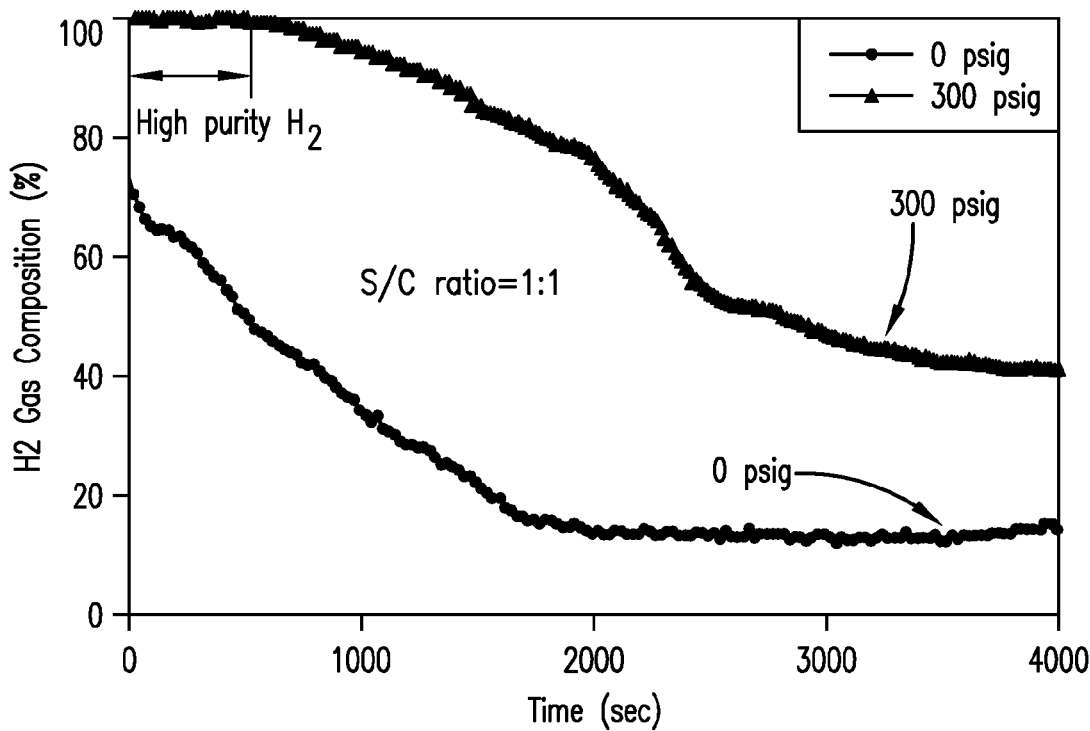
FIG. 22(b) shows the H2 gas composition (T=600° C., 10.3% CO, S/C:1:1, H2S=5000 ppm, Total flow=0.725 slpm).
Figure 23:
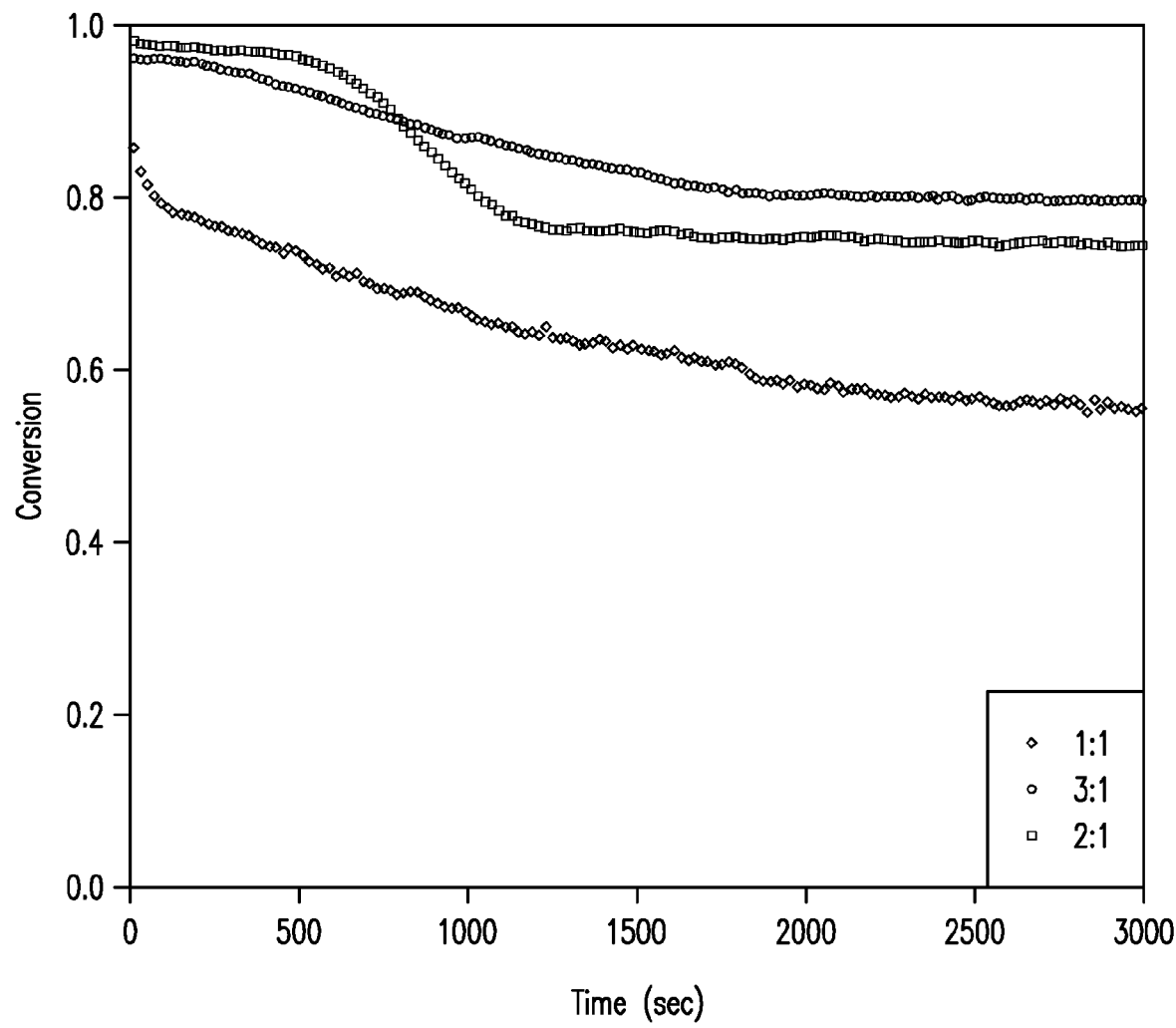
FIG. 23 illustrates the effect of steam:CO ratio on CO conversion during the combined WGS carbonation reaction using PCC-HTS system (T=650° C., P=0 psig, 10.3% CO, Total flow=0.725 slpm).
Figure 24:
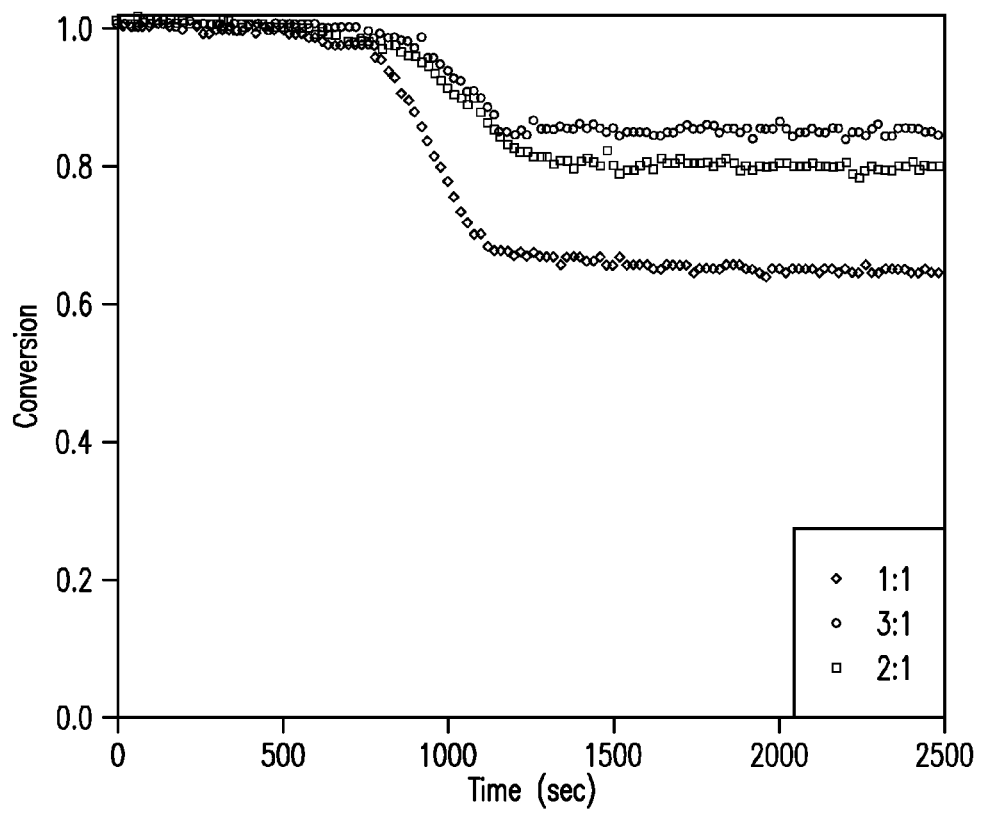
FIG. 24 illustrates the effect of steam:CO ratio on CO conversion during the combined WGS carbonation reaction using PCC-HTS system (T=650° C., P=150 psig, 10.3% CO, Total flow=0.725 slpm).
Figure 25:
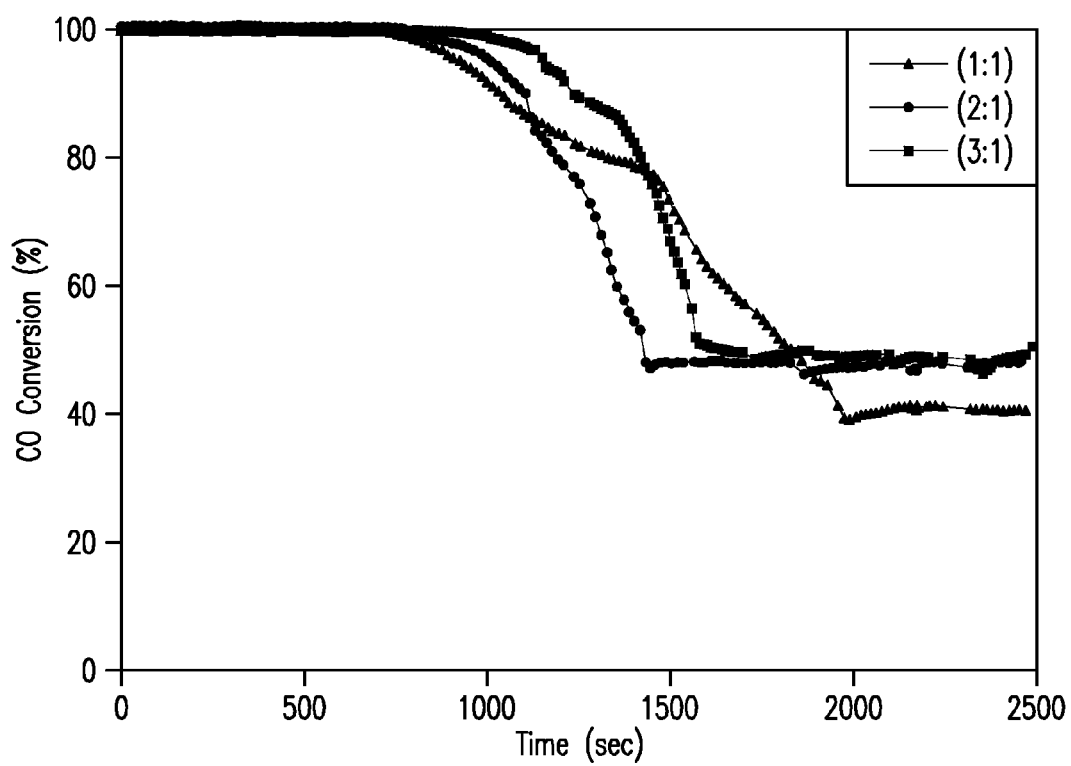
FIG. 25 shows the effect of steam:CO ratio on CO conversion during the combined WGS carbonation reaction using PCC-HTS system (T=650° C., P=300 psig, 10.3% CO, Total flow=0.725 slpm).
Figure 26:
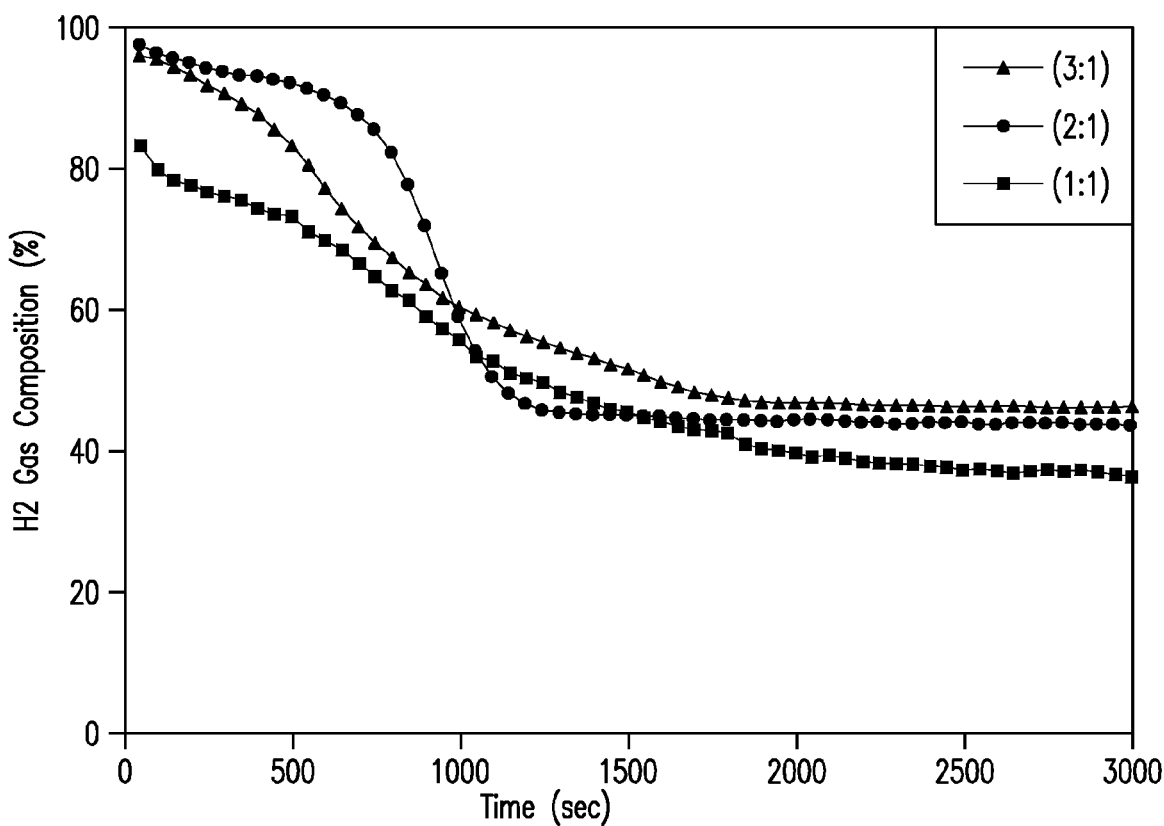
FIG. 26 shows the effect of steam:CO ratio on the purity of hydrogen produced during the combined WGS carbonation reaction using PCC-HTS system (T=650° C., P=0 psig, 10.3% CO, Total flow=0.725 slpm).
Figure 27:
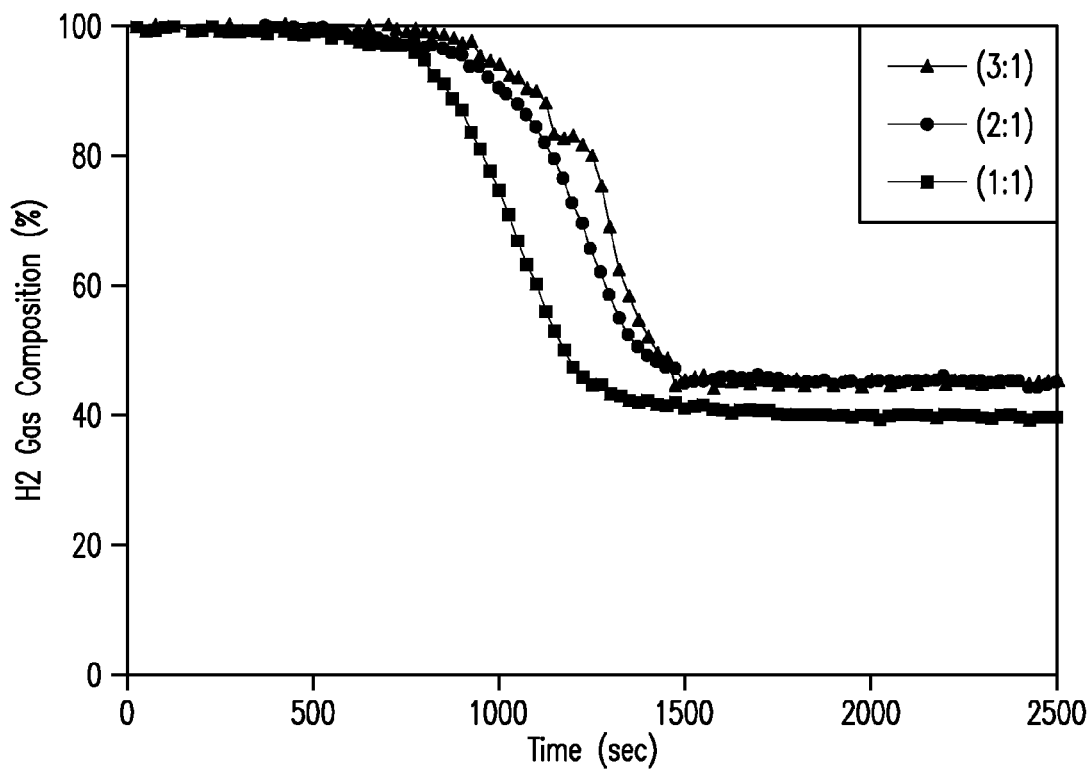
FIG. 27 illustrates the effect of steam:CO ratio on the purity of hydrogen produced during the combined WGS carbonation reaction using PCC-HTS system (T=650° C., P=150 psig, 10.3% CO, Total flow=0.725 slpm).
Figure 28:
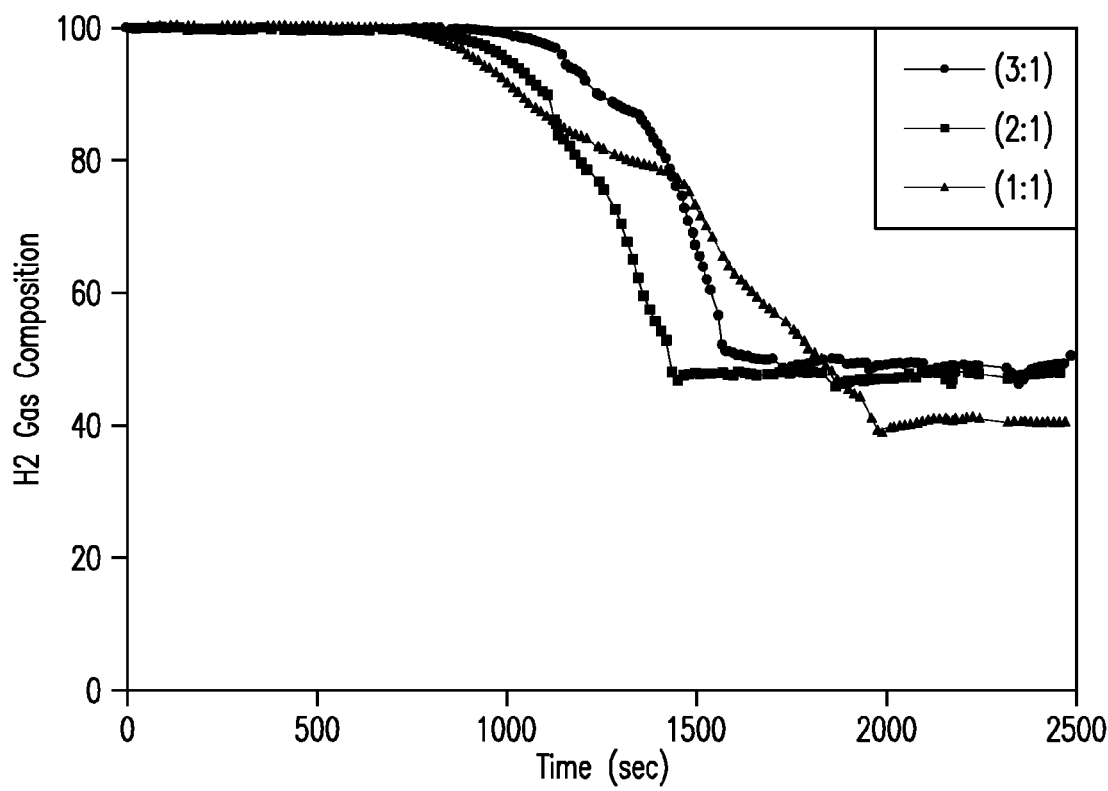
FIG. 28 shows the effect of steam:CO ratio on the purity of hydrogen produced during the combined WGS carbonation reaction using PCC-HTS system (T=650° C., P=300 psig, 10.3% CO, Total flow=0.725 slpm).
Figure 29:
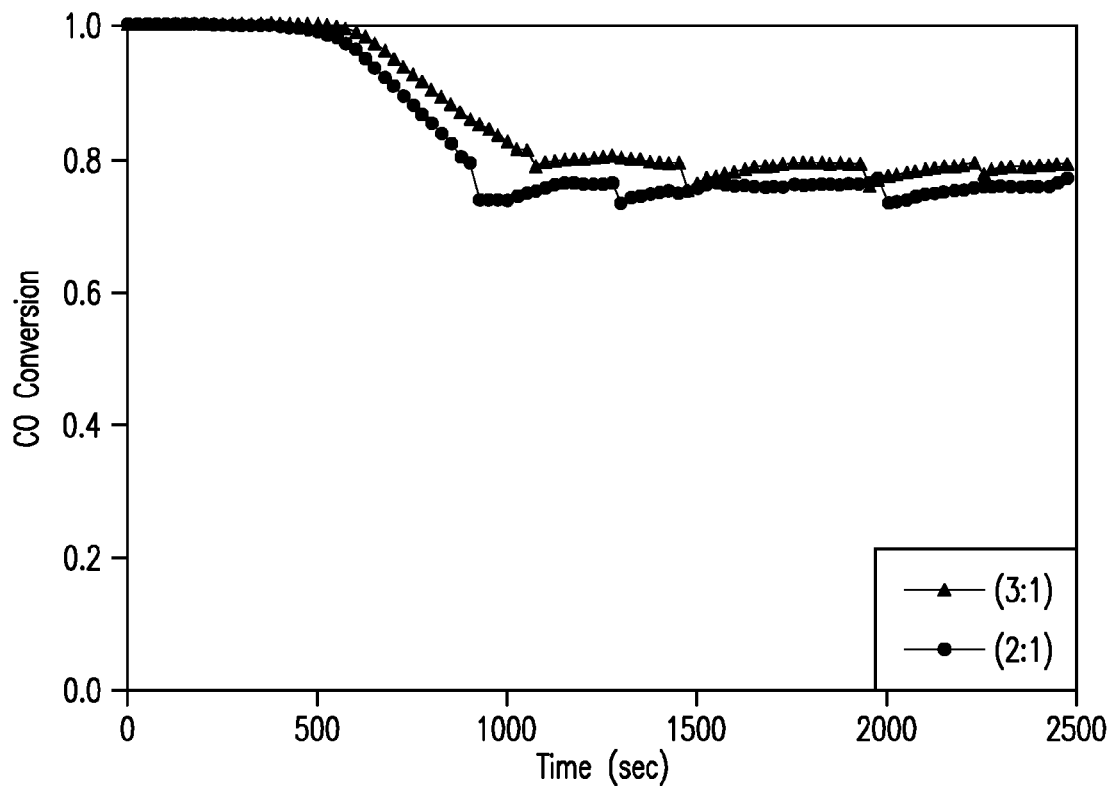
FIG. 29 shows the effect of steam:CO ratio on CO conversion during the combined WGS carbonation reaction using PCC sorbent without catalyst (T=650° C., P=300 psig, 10.3% CO, Total flow=0.725 slpm).
Figure 30:
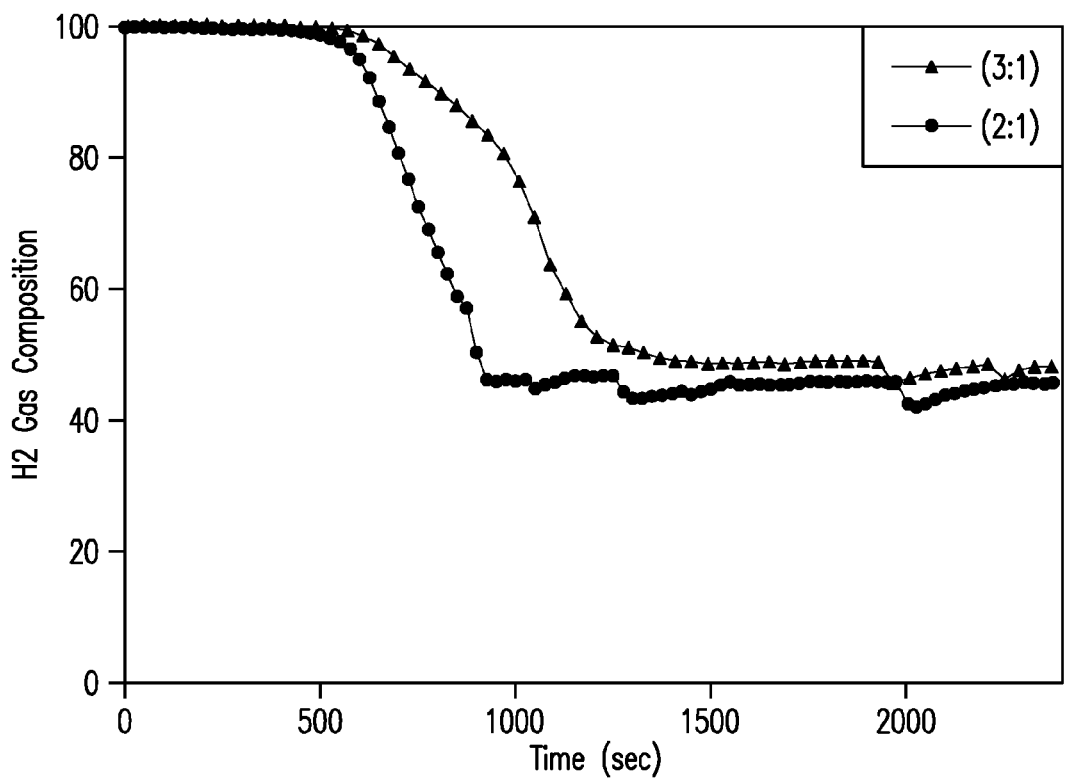
FIG. 30 shows the effect of steam:CO ratio on purity of hydrogen produced during the combined WGS carbonation reaction using PCC sorbent without catalyst (T=650° C., P=300 psig, 10.3% CO, Total flow=0.725 slpm).
Figure 31:
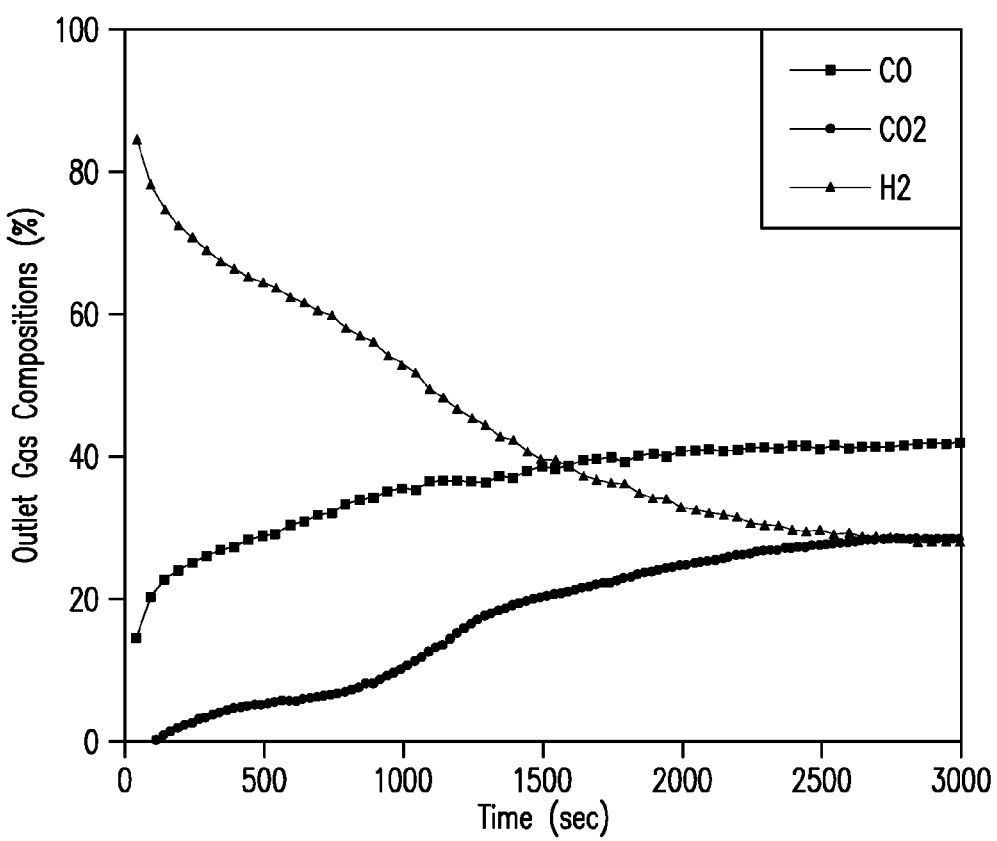
FIG. 31 illustrates the real time nitrogen and steam free gas composition at the outlet of the reactor system during the combined WGS-carbonation reaction using PCC sorbent without catalyst (T=650° C., P=0 psig, 10.3% CO, 10.3% $H_2O$, Total flow=0.725 slpm).
Figure 32:
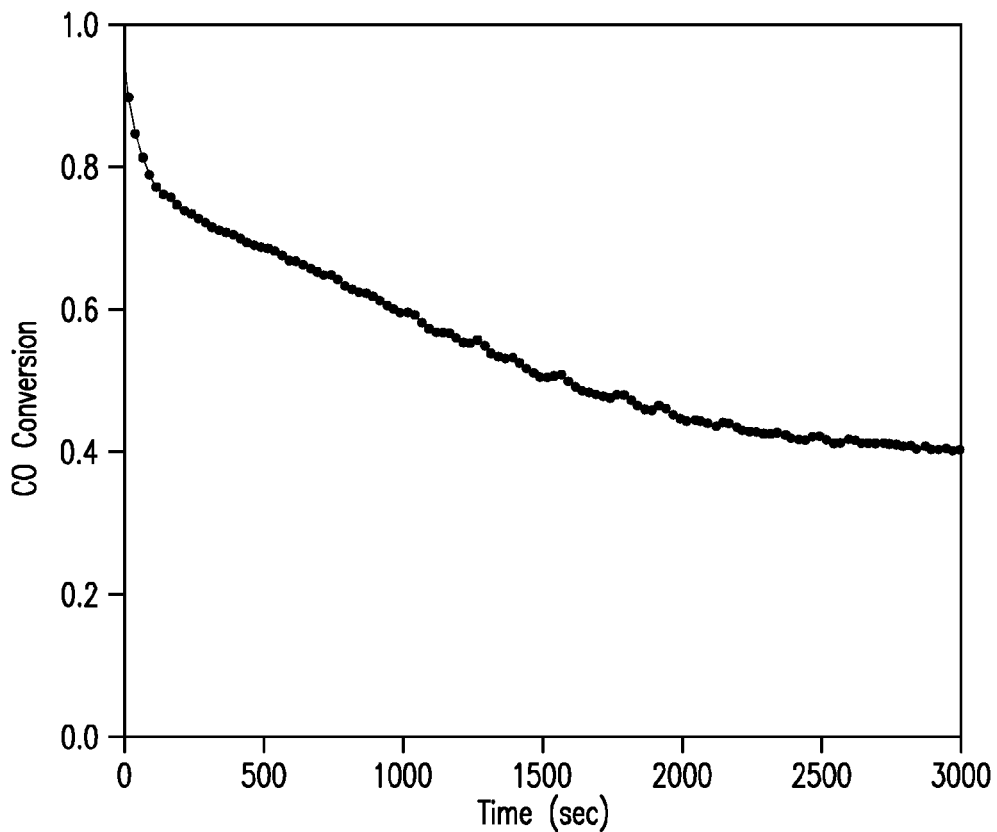
FIG. 32 presents the CO conversion in the reactor system during the combined WGS-carbonation reaction using PCC sorbent without catalyst (T=650° C., P=0 psig, 10.3% CO, 10.3% $H_2O$, Total flow=0.725 slpm).
Figure 33:
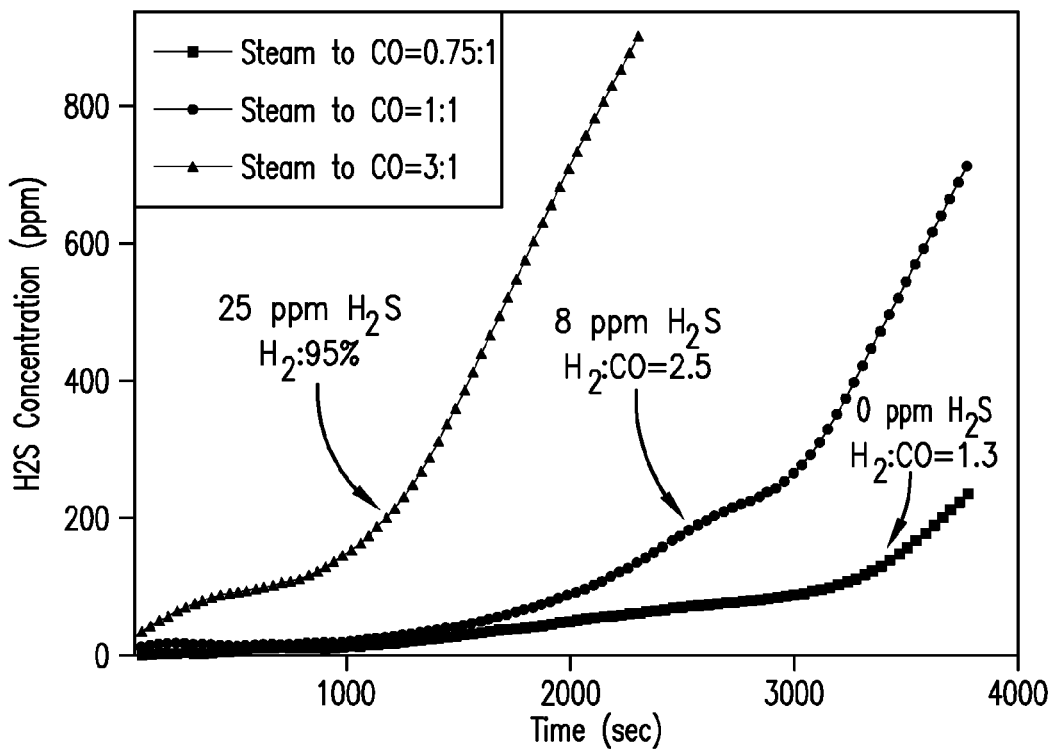
FIG. 33 shows the effect of steam:CO ratio on the concentration of $H_2S$ in the outlet of the reactor during the combined WGS carbonation reaction with insitu $H_2S$ removal using PCC sorbent without catalyst (T=600° C., P=0 psig, 10.3% CO, Total flow=0.725 slpm).
Figure 34:
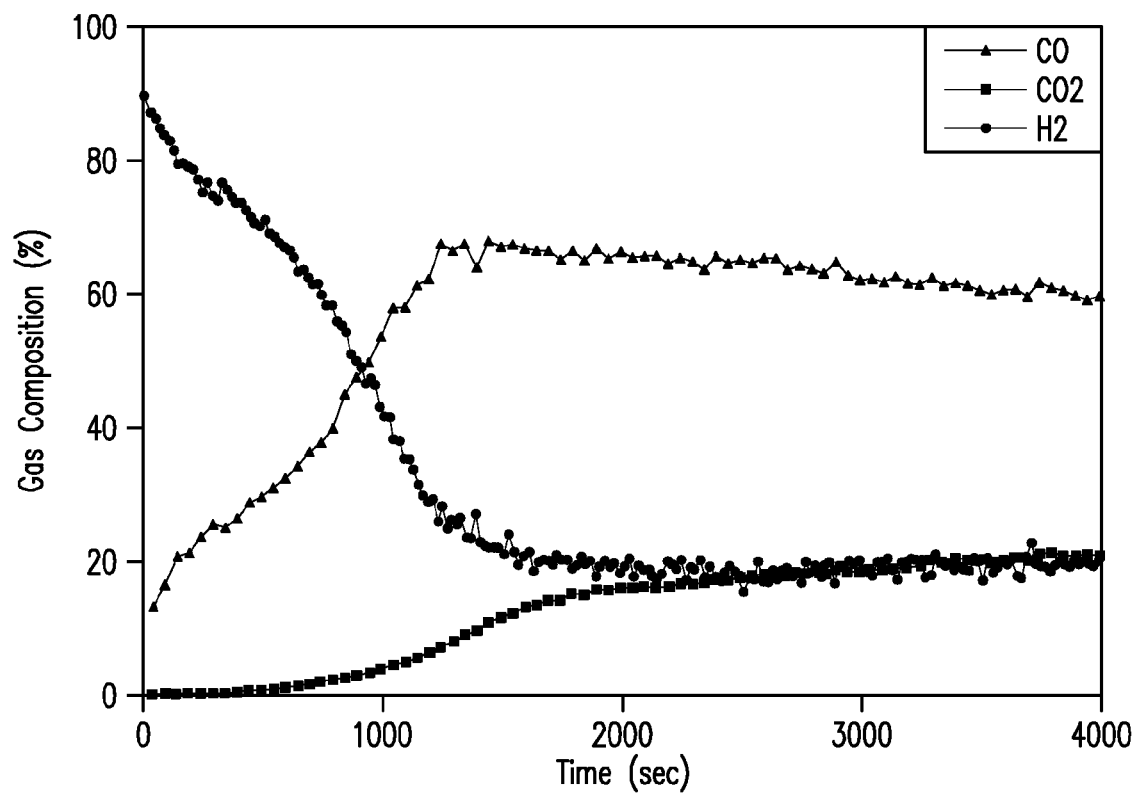
FIG. 34 shows the real time nitrogen and steam free gas composition at the outlet of the reactor system during the combined WGS-carbonation reaction with insitu $H_2S$ removal using PCC sorbent without catalyst (T=600° C., P=0 psig, 10.3% CO, 31% $H_2O$, Total flow=0.725 slpm).
Figure 35:
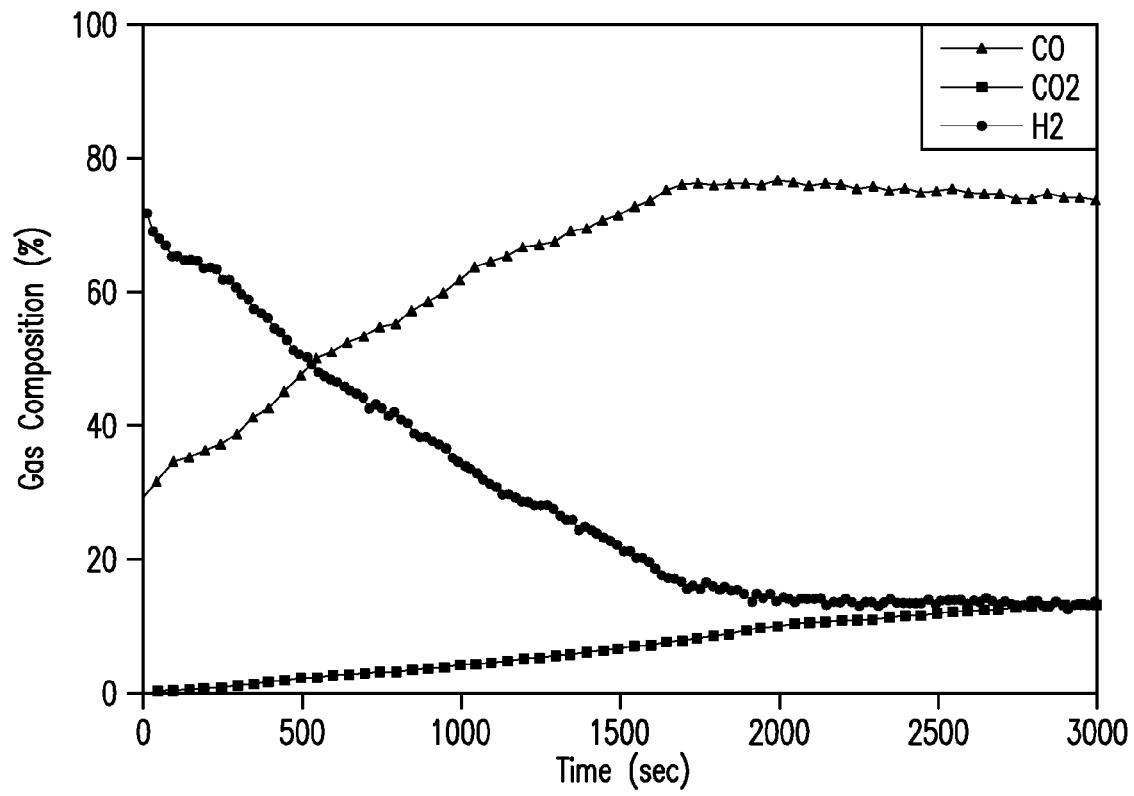
FIG. 35 shows the real time nitrogen and steam free gas composition at the outlet of the reactor system during the combined WGS-carbonation reaction with insitu $H_2S$ removal using PCC sorbent without catalyst (T=600° C., P=0 psig, 10.3% CO, 10.3% $H_2O$, Total flow=0.725 slpm).
Figure 36:
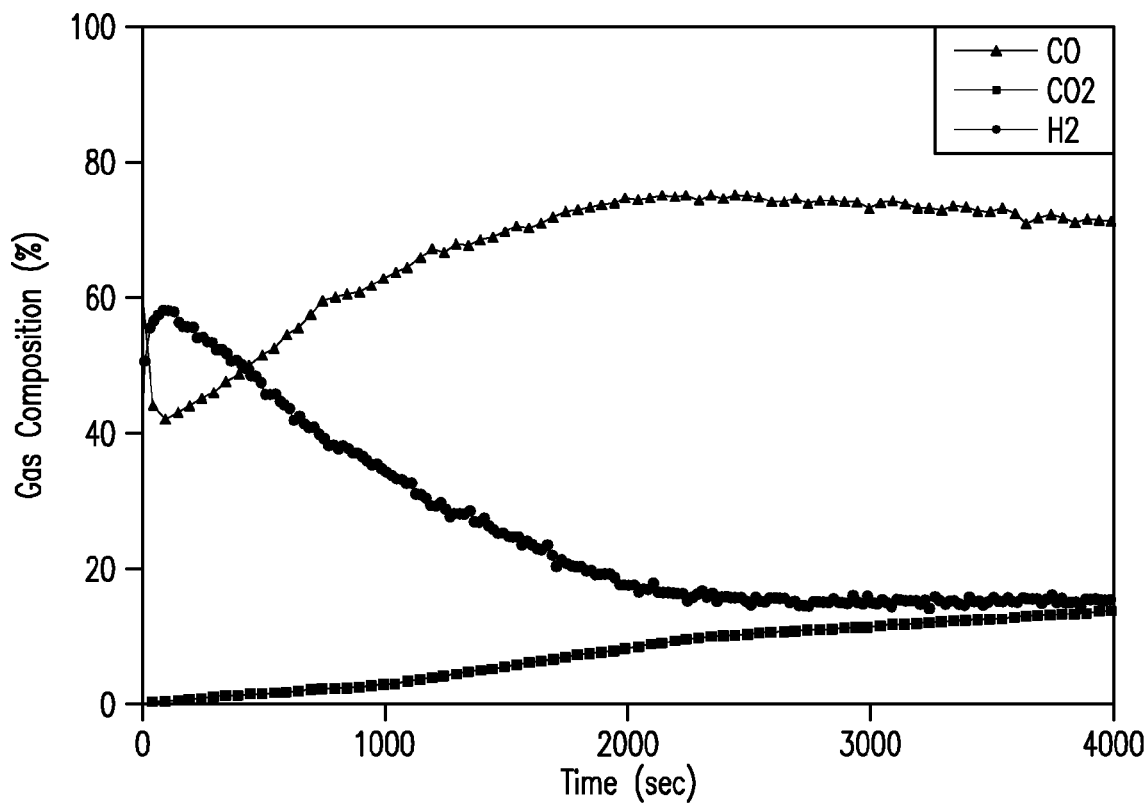
FIG. 36 provides the real time nitrogen and steam free gas composition at the outlet of the reactor system during the combined WGS-carbonation reaction with insitu $H_2S$ removal using PCC sorbent without catalyst (T=600° C., P=0 psig, 10.3% CO, 7.73% $H_2O$, Total flow=0.725 slpm).
Figure 37:
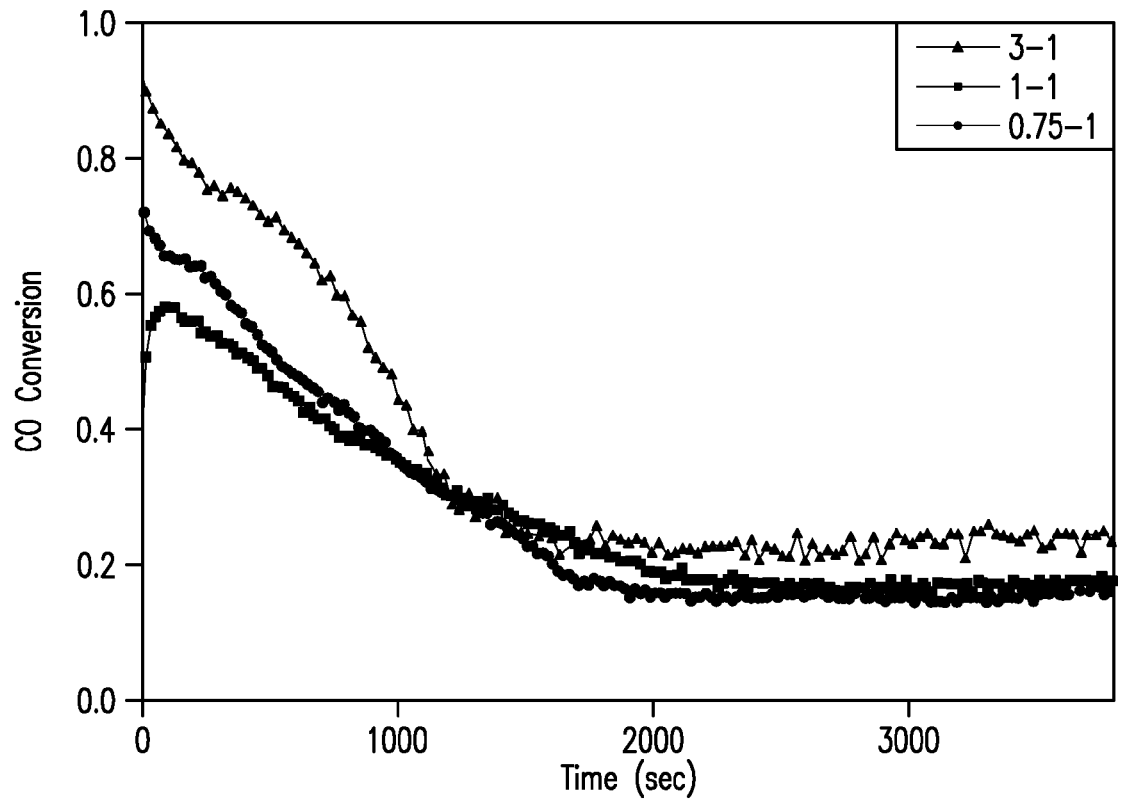
FIG. 37 shows the effect of steam:CO ratio on CO conversion during the combined WGS carbonation reaction with insitu $H_2S$ removal using PCC sorbent without catalyst (T=600° C., P=0 psig, 10.3% CO, Total flow=0.725 slpm).
Figure 38:
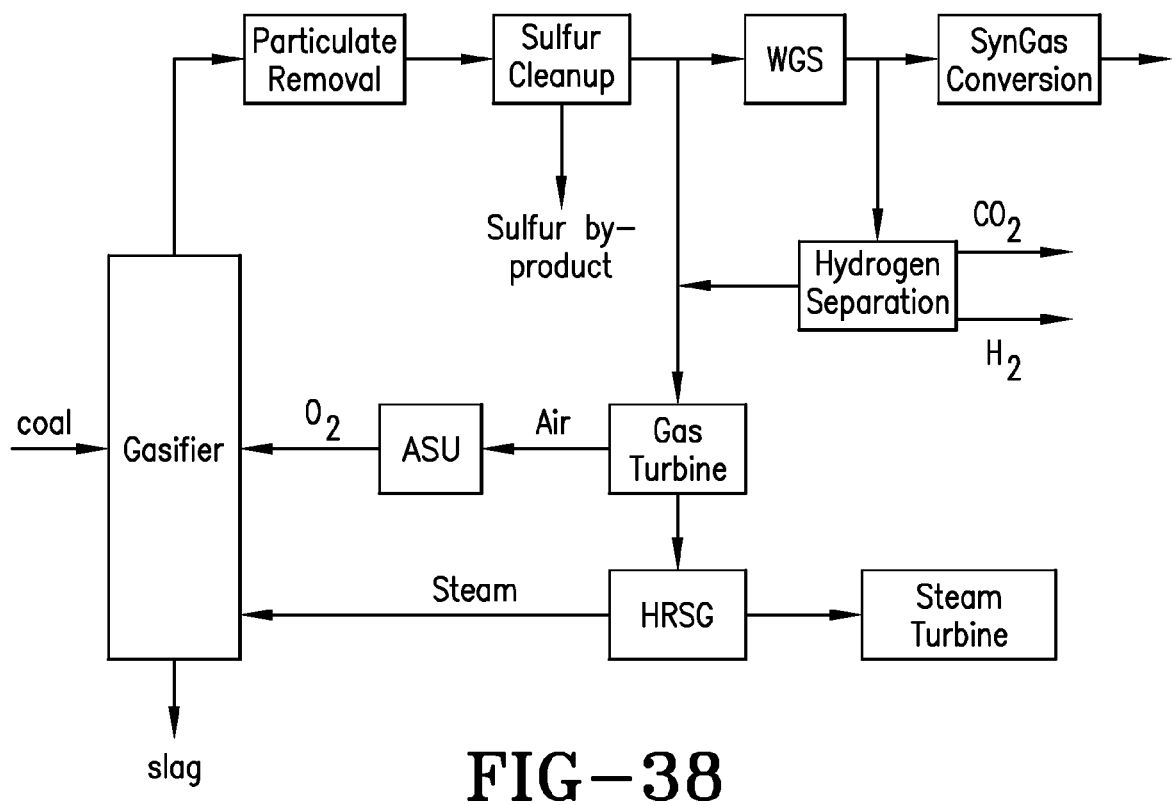
FIG. 38 is a schematic illustrating a conventional process for Hydrogen production.
Figure 39:
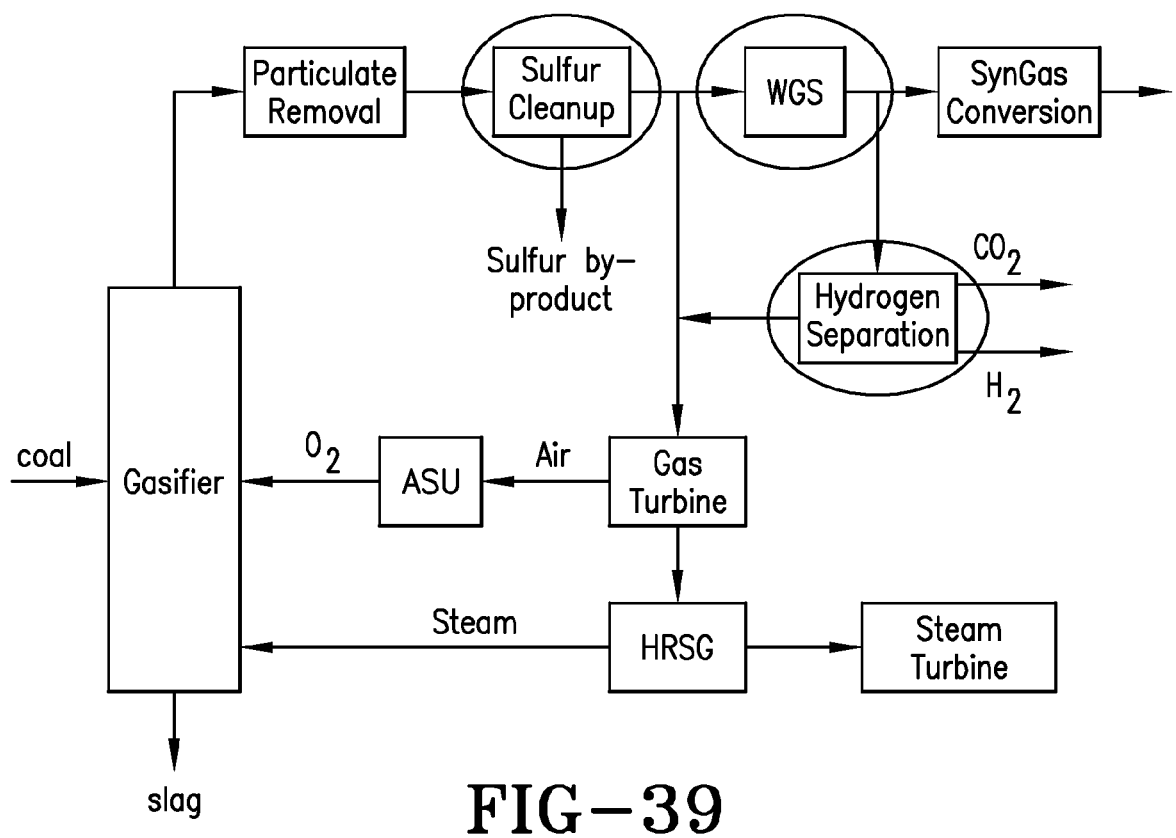
FIG. 39 is a schematic illustrating a conventional process for Hydrogen production.
Figure 40:
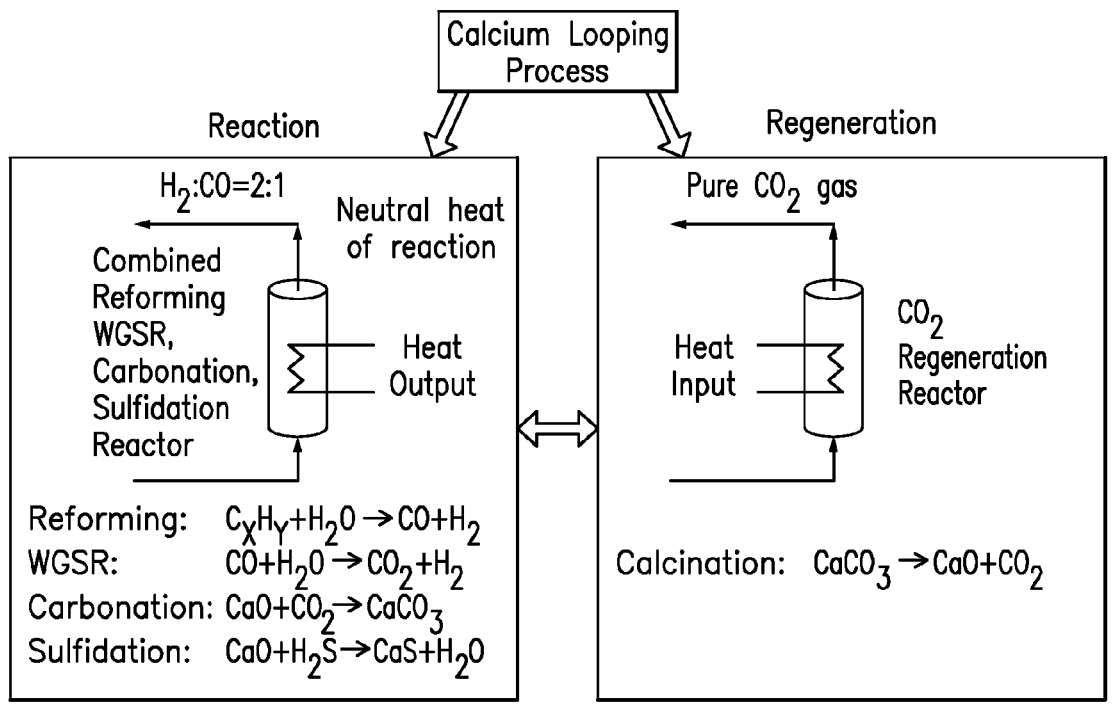
FIG. 40 is a schematic illustrating a Calcium looping process.
Figure 41:
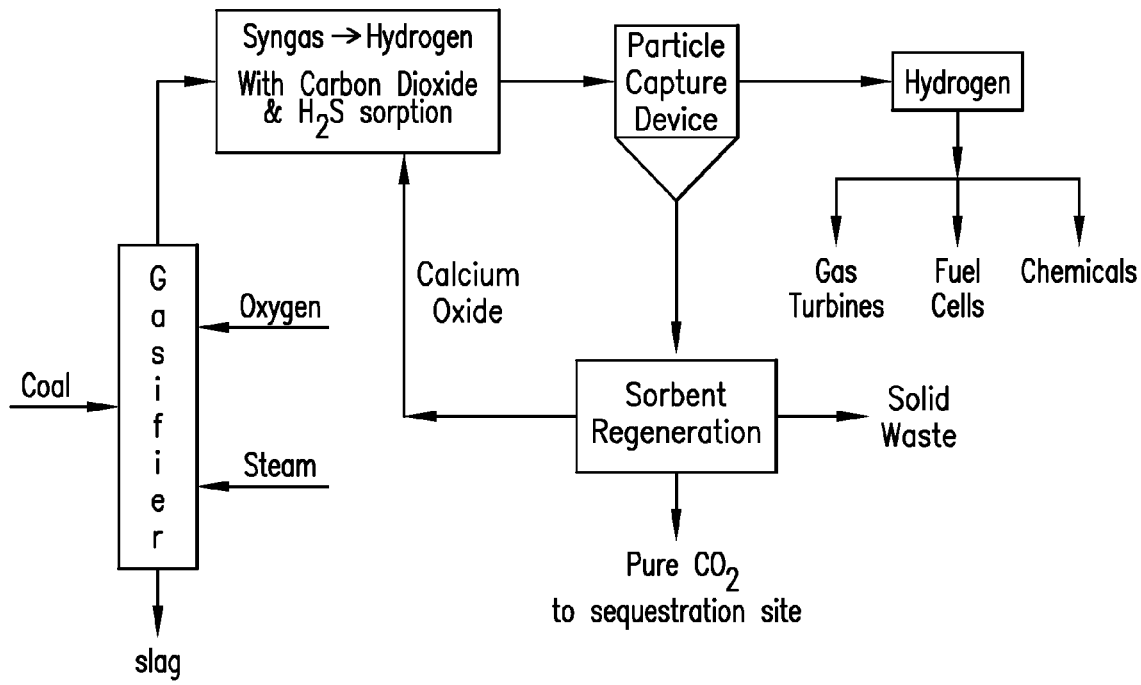
FIG. 41 is a schematic illustrating process for $H_2$ production.
Figure 42:
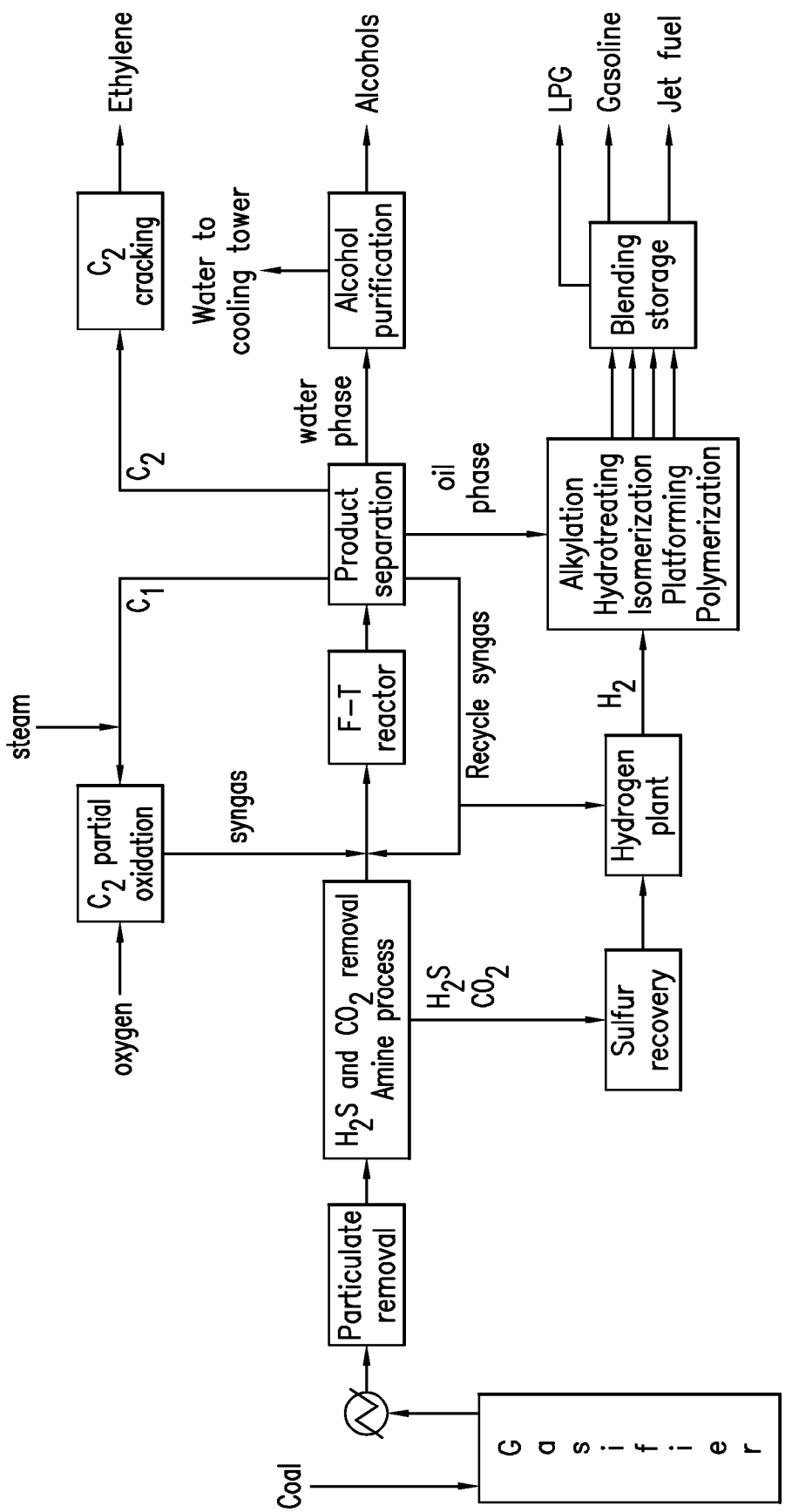
FIG. 42 is a schematic illustrating traditional liquid fuel production.
Figure 43:
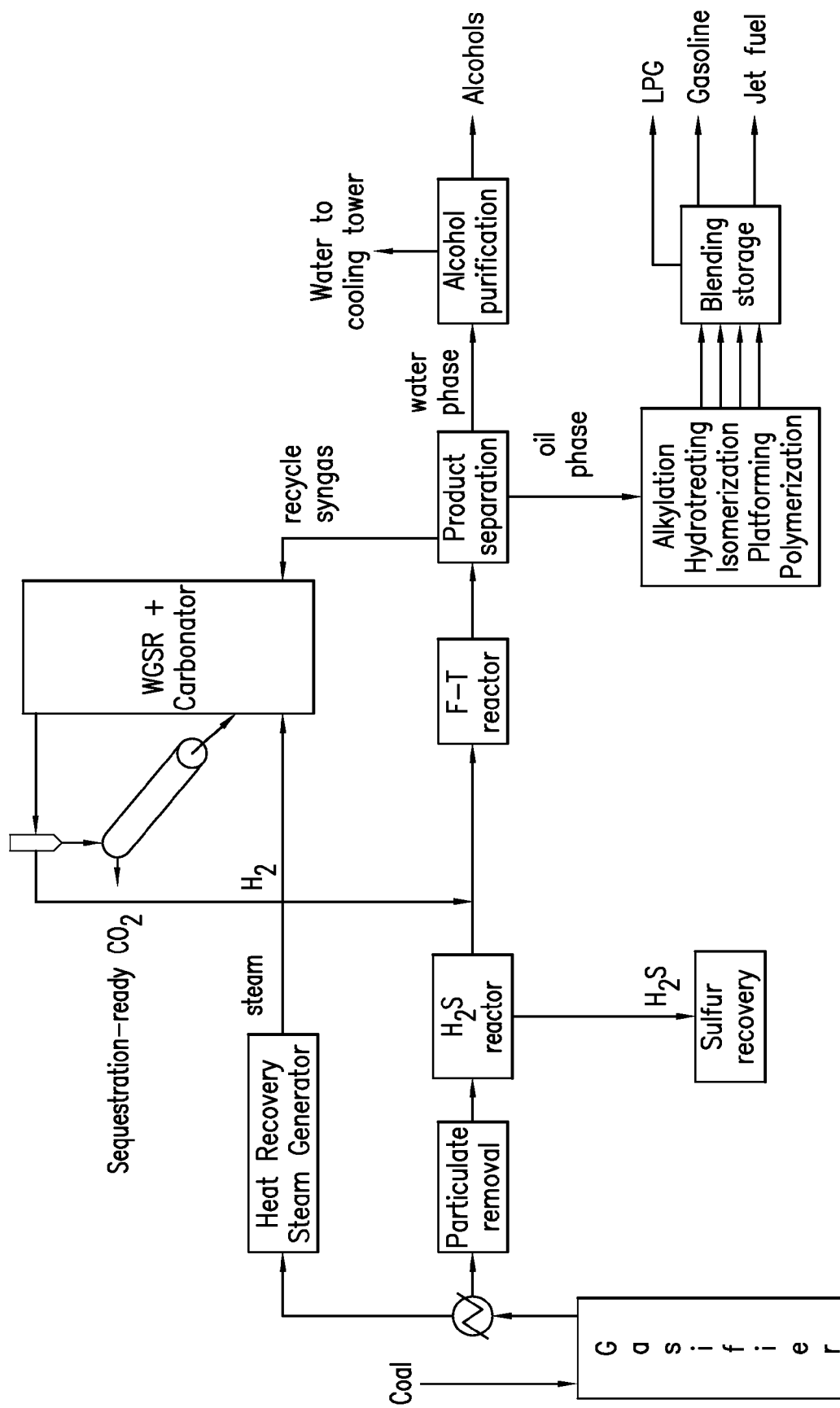
FIG. 43 is a schematic illustrating the combined process of WGS and carbonation for liquid fuel.
Figure 44:
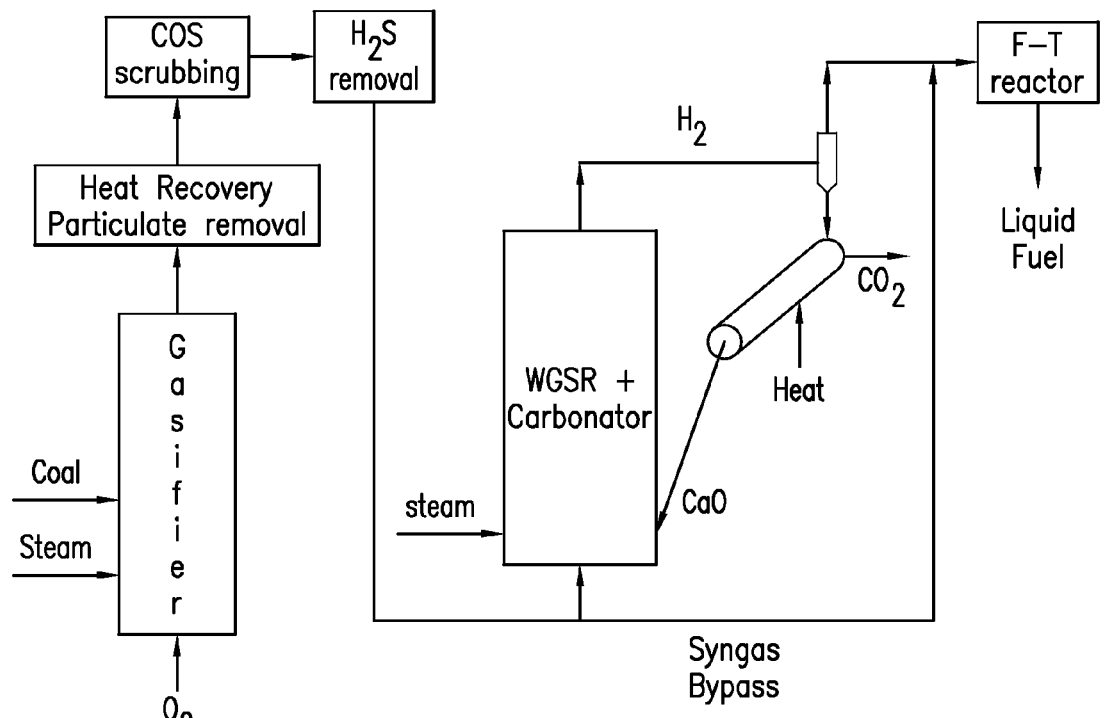
FIG. 44 is a schematic illustrating a combined process of WGS and carbonation for jet fuel production.
Figure 45:
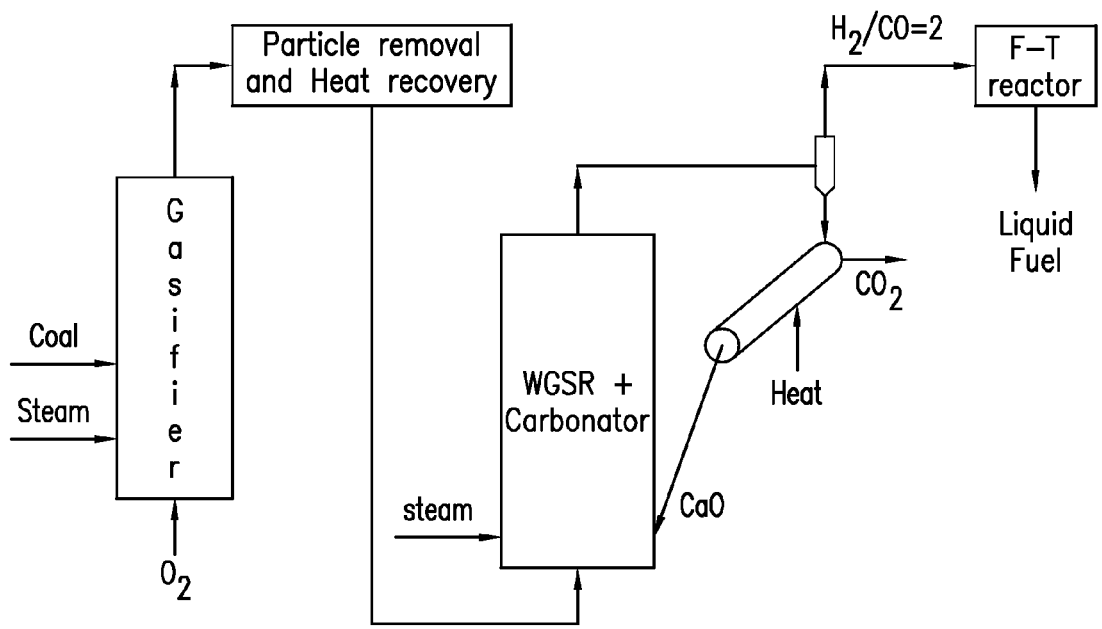
FIG. 45 is a schematic illustrating a combination process of WGS and Carbonation for jet fuel production.
Figure 46:
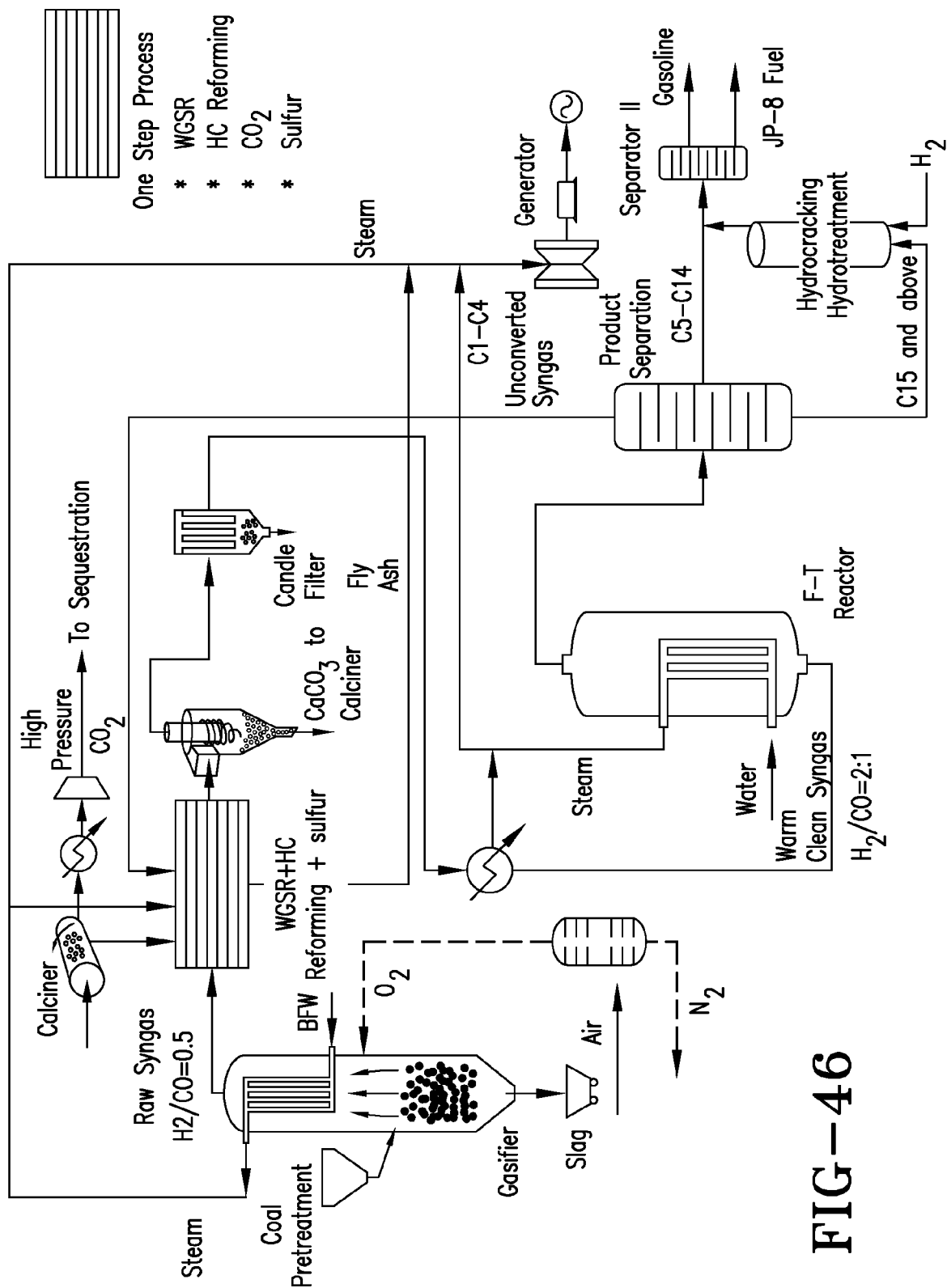
FIG. 46 is a schematic illustrating a Calcium looping enhanced coal to liquid process.
Figure 47:
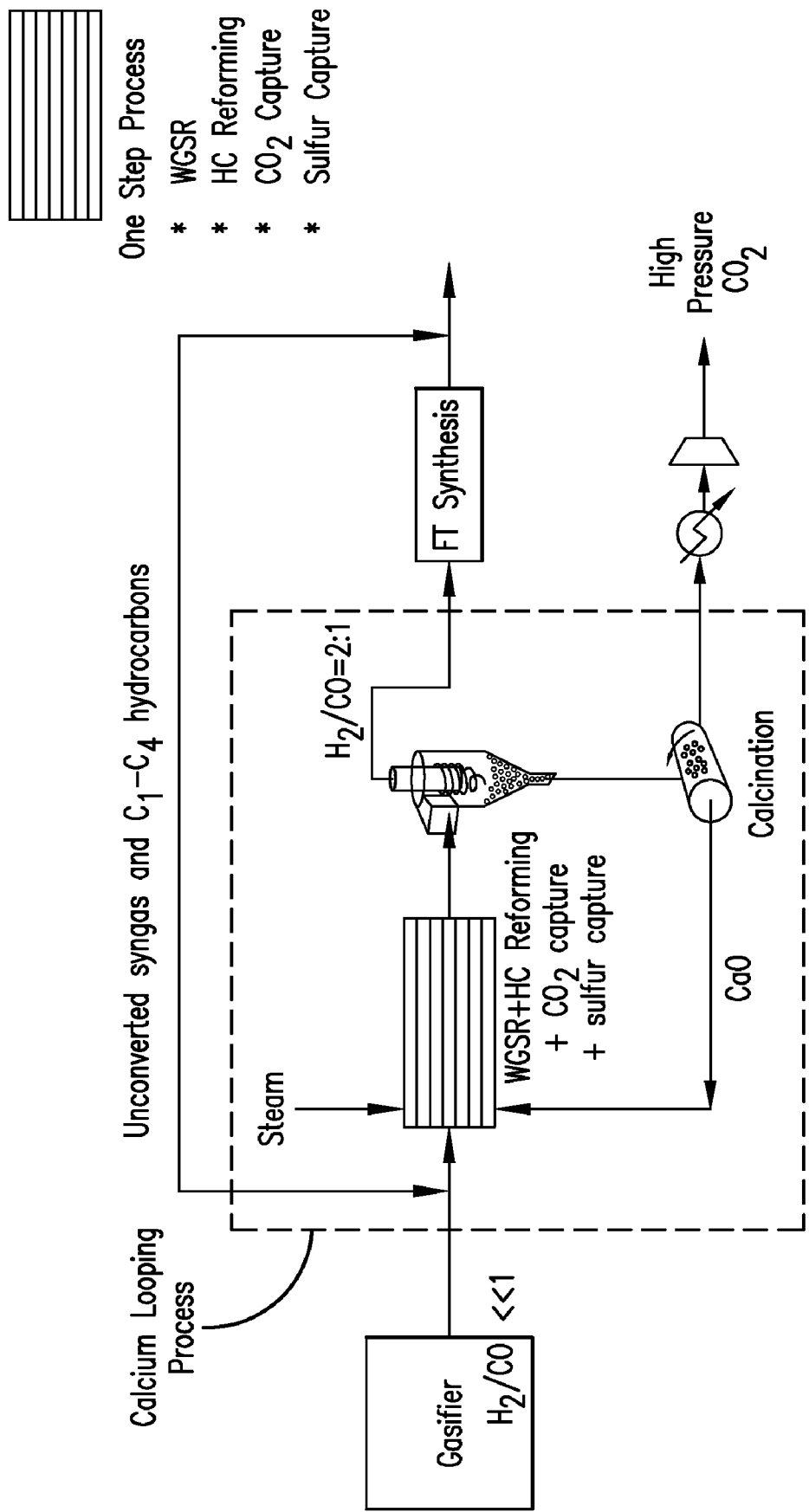
FIG. 47 is a schematic illustrating a Calcium looping enhanced coal to liquid process.
Figure 48:
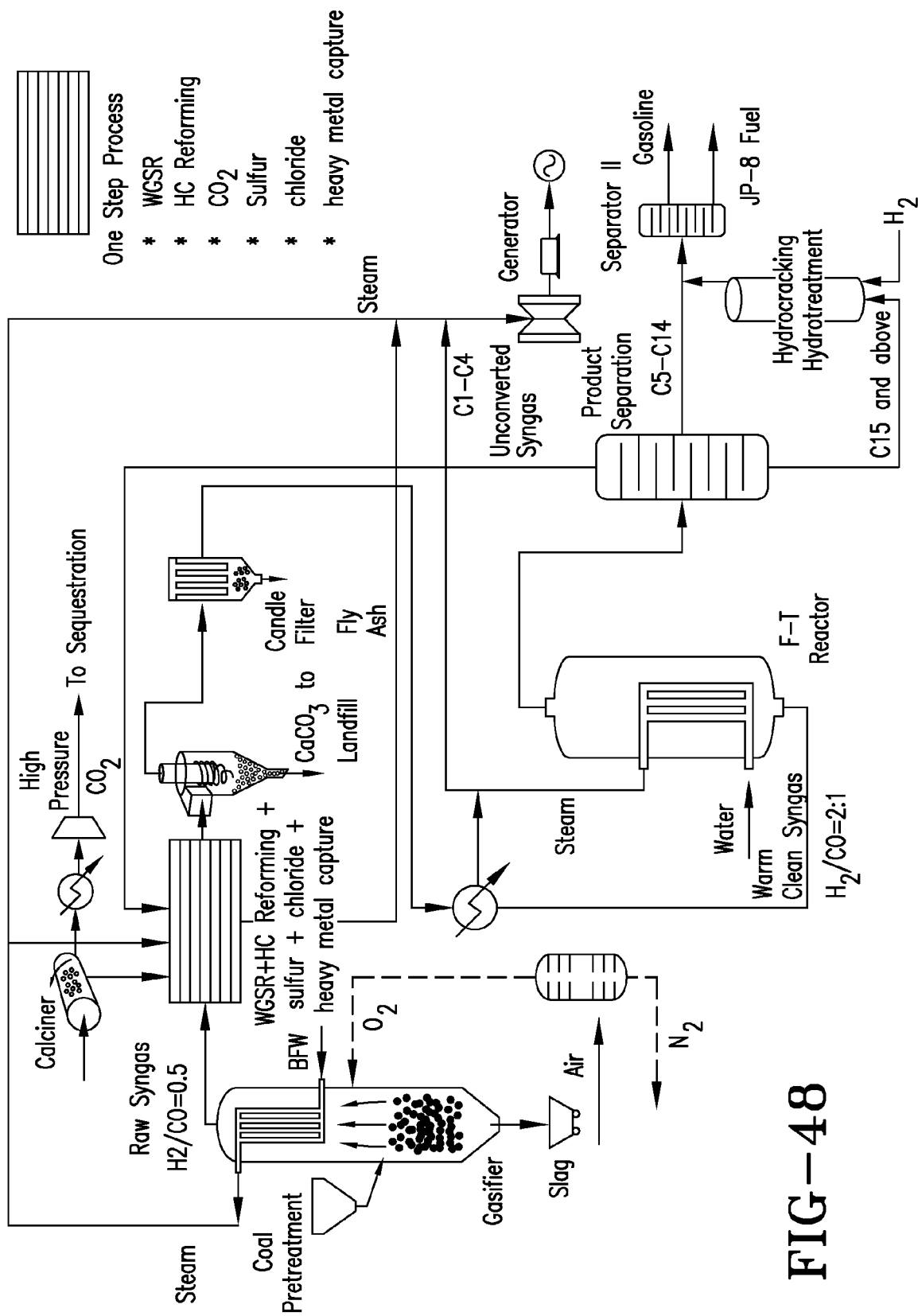
FIG. 48 is a schematic illustrating a Calcium looping enhanced coal to liquid process scheme A.
Figure 49:
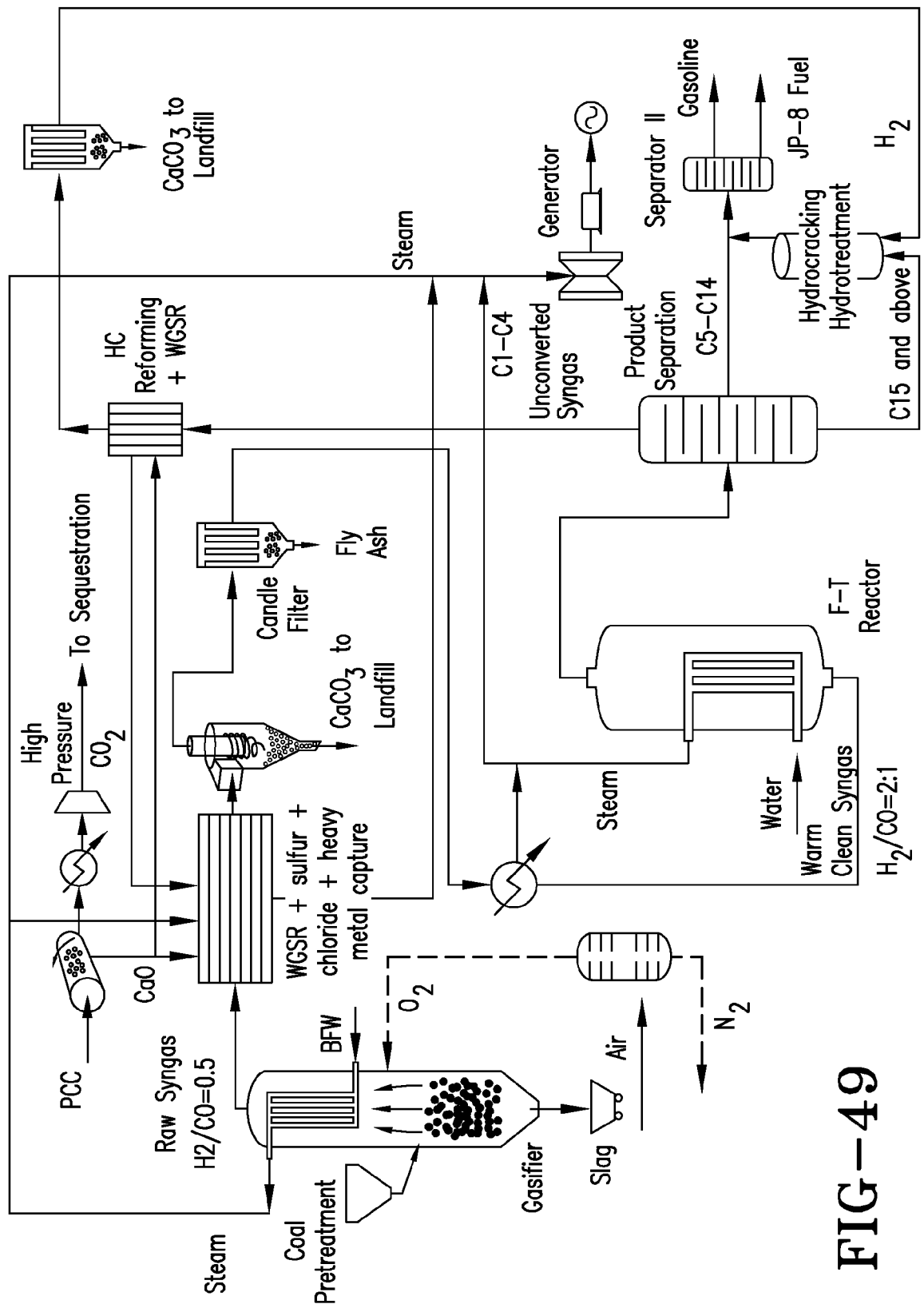
FIG. 49 is a schematic illustrating a Calcium looping enhanced coal to liquid process scheme B.
Figure 50:
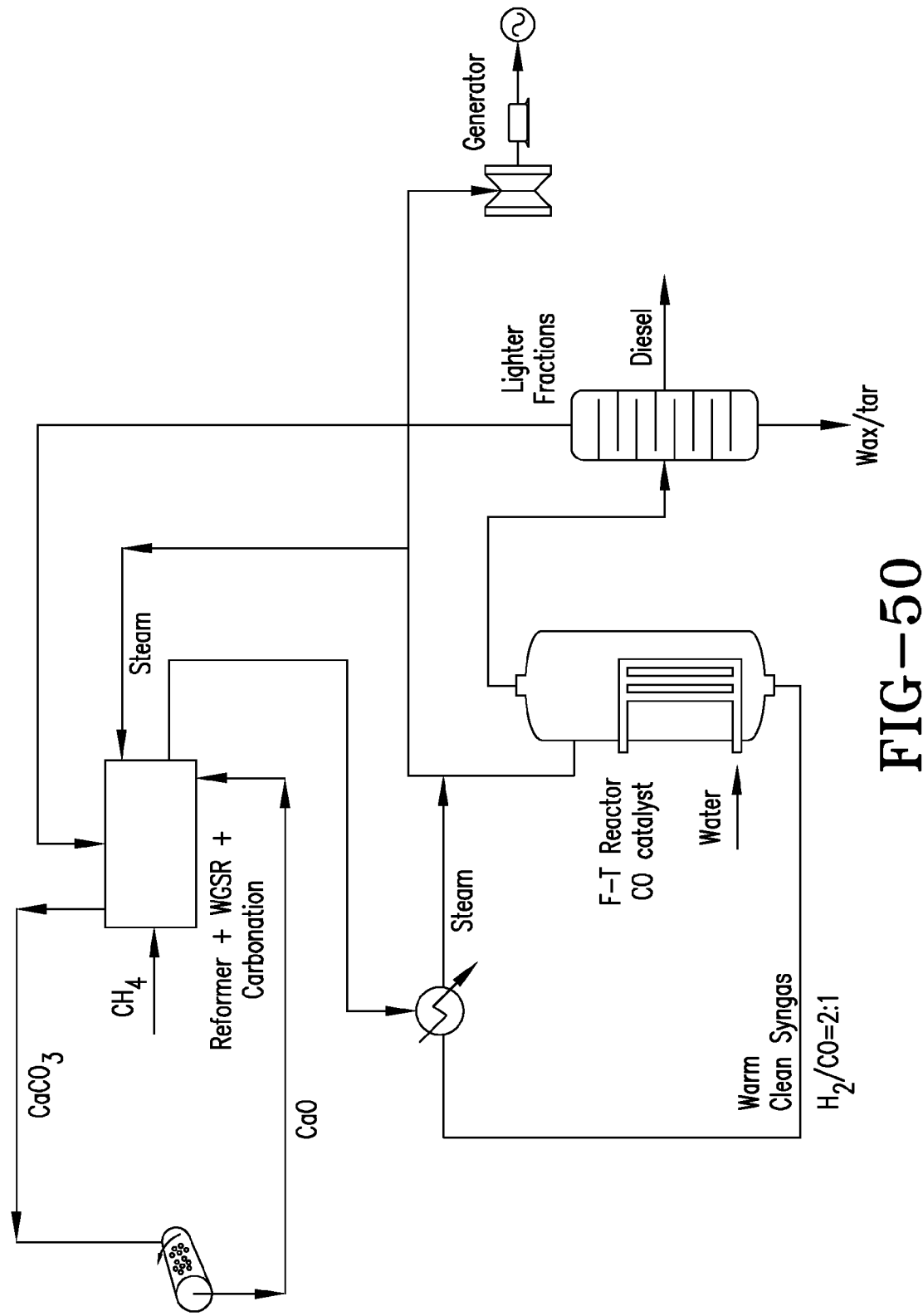
FIG. 50 is a schematic illustrating a combined process of reforming WGS and carbonation for liquid fuel production from natural gas scheme C.
Figure 51:
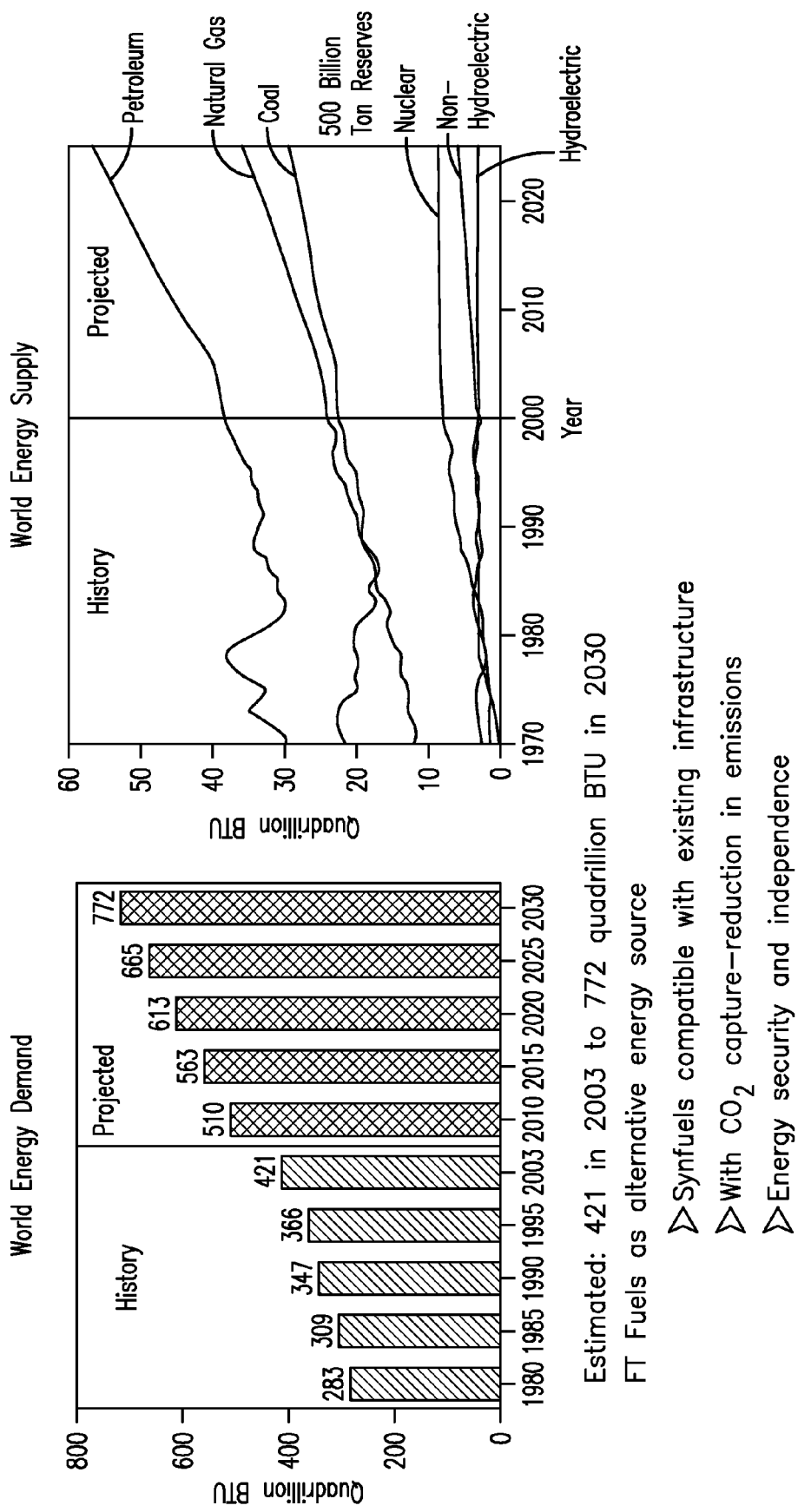
FIG. 51 is a graphical comparison of the international energy demands and the international energy supply.
Figure 52:
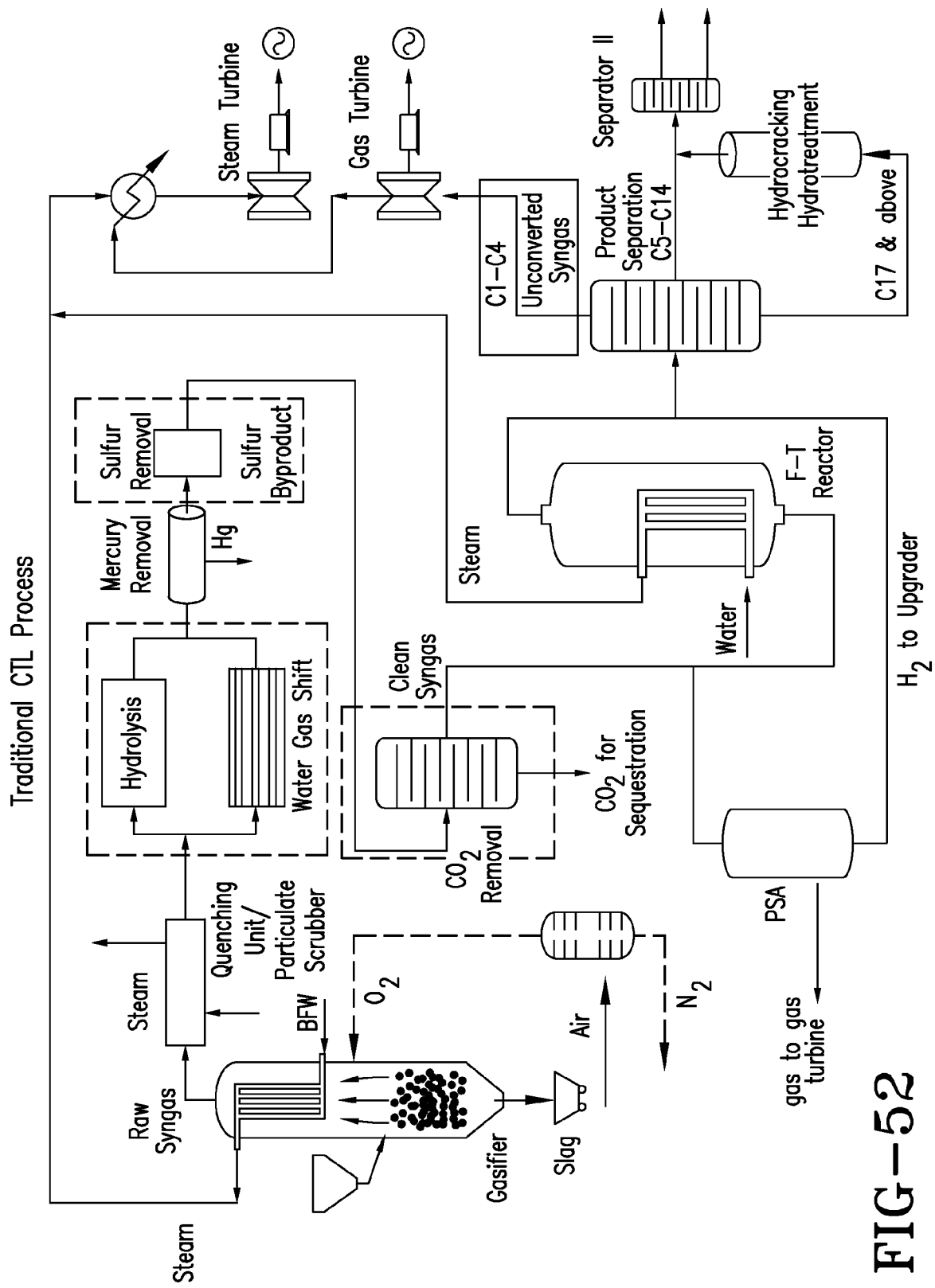
FIG. 52 is a schematic illustrating a traditional CTL process.
Figure 53:
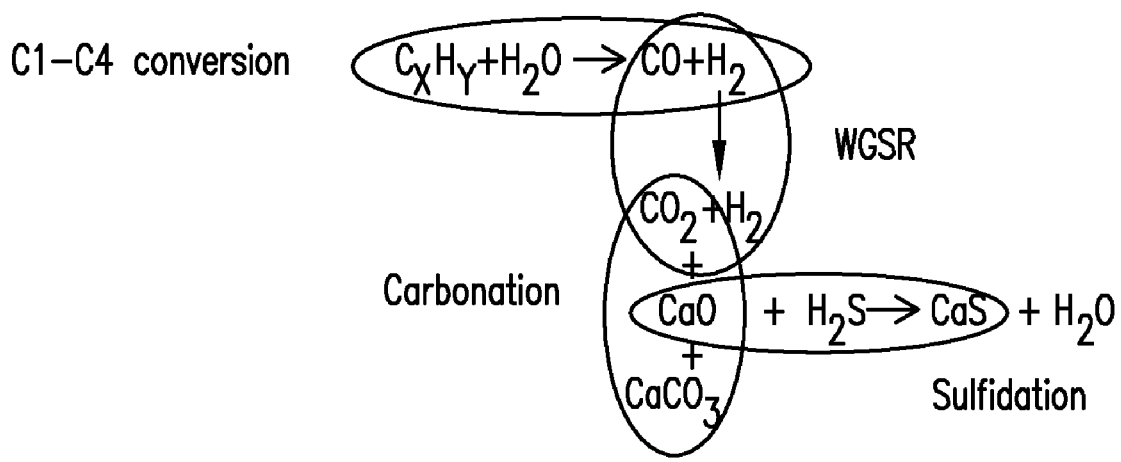
FIG. 53 a graphical representation of the advantages of an embodiment of the present invention.
Figure 54:
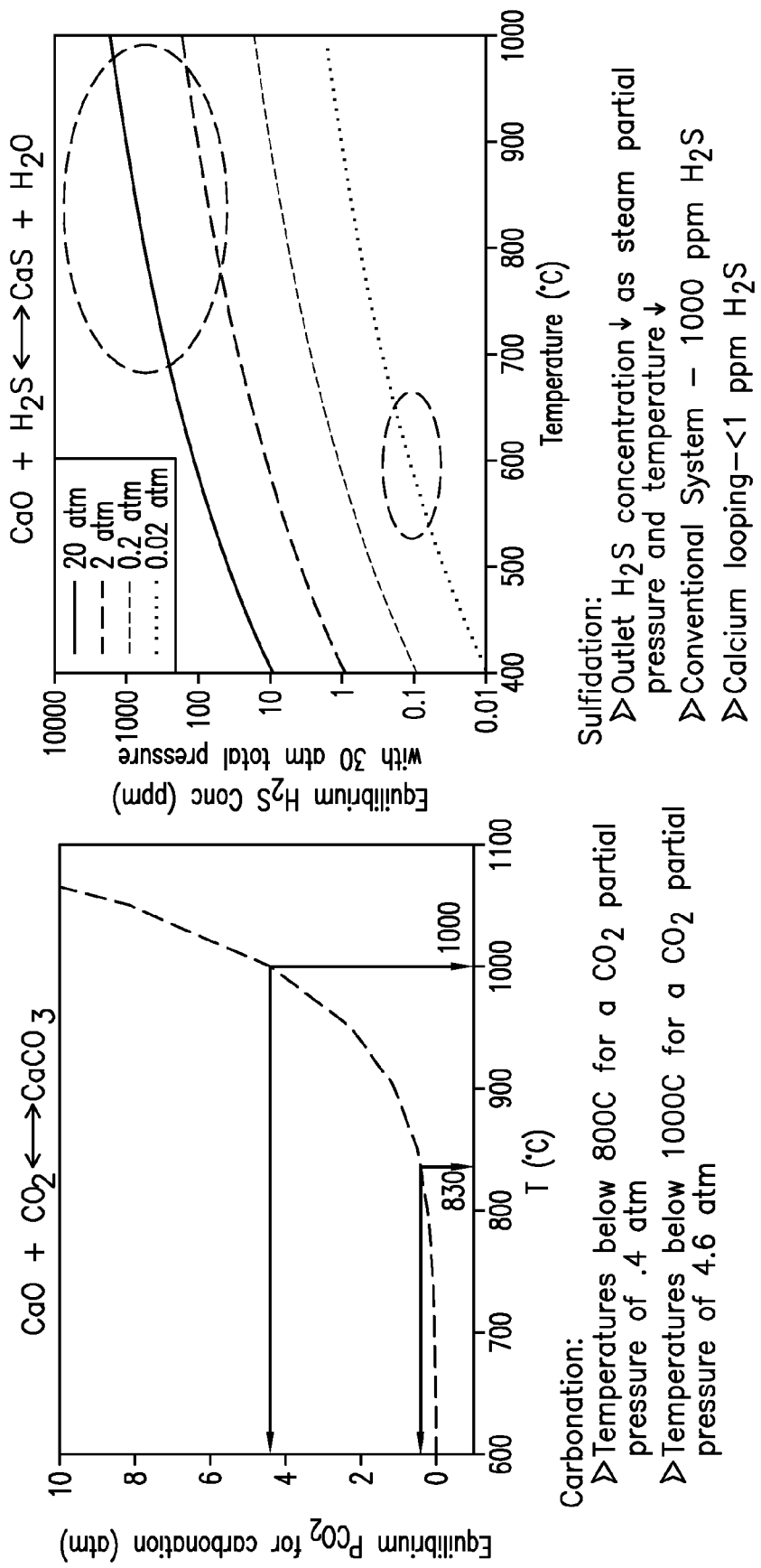
FIG. 54 is a graphical representation of a thermodynamic analysis of carbonation and sulfidation.
Figure 55:
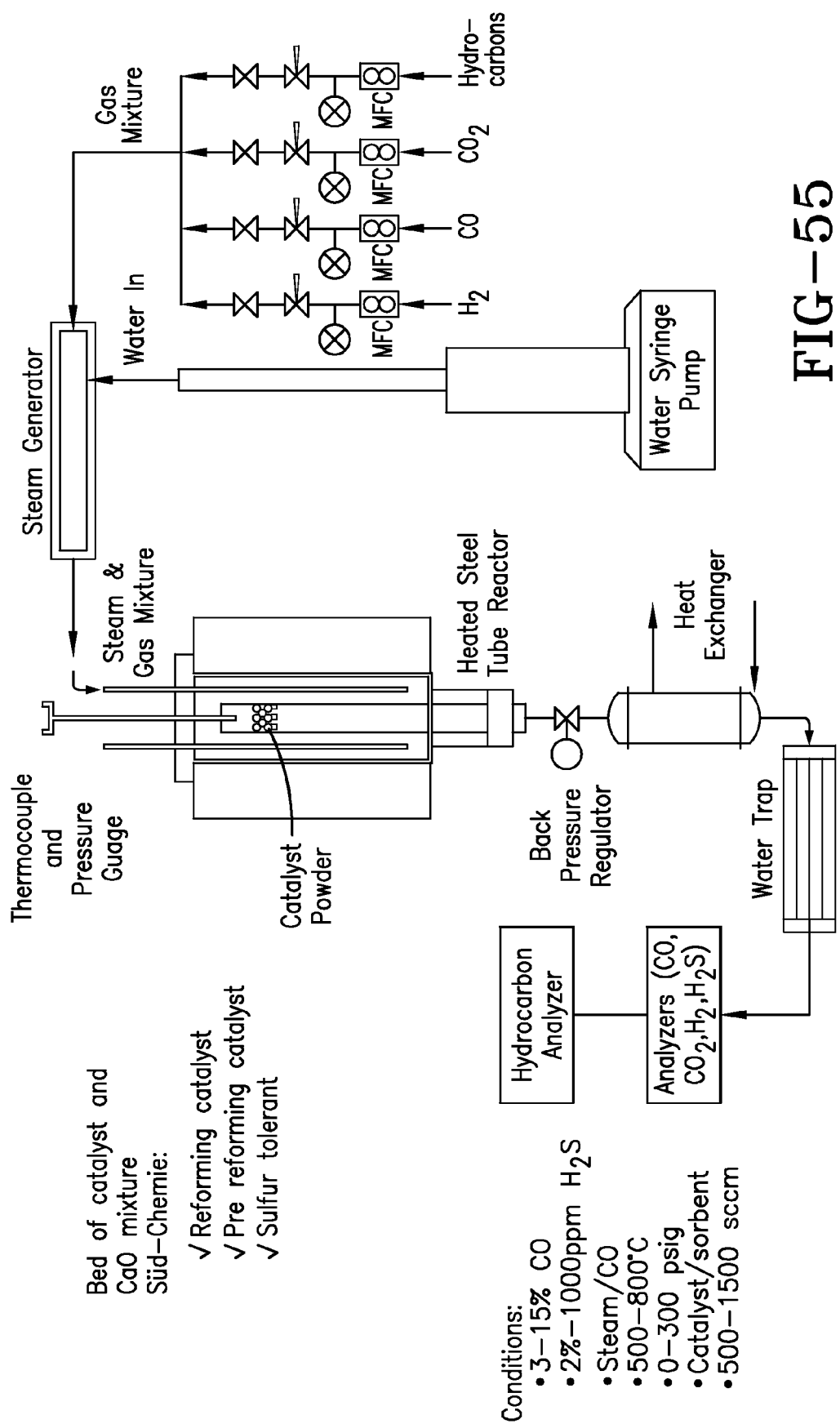
FIG. 55 is a schematic illustrating an experimental setup combining reforming, WGSR, carbonation, and sulfidation.
Figure 62:
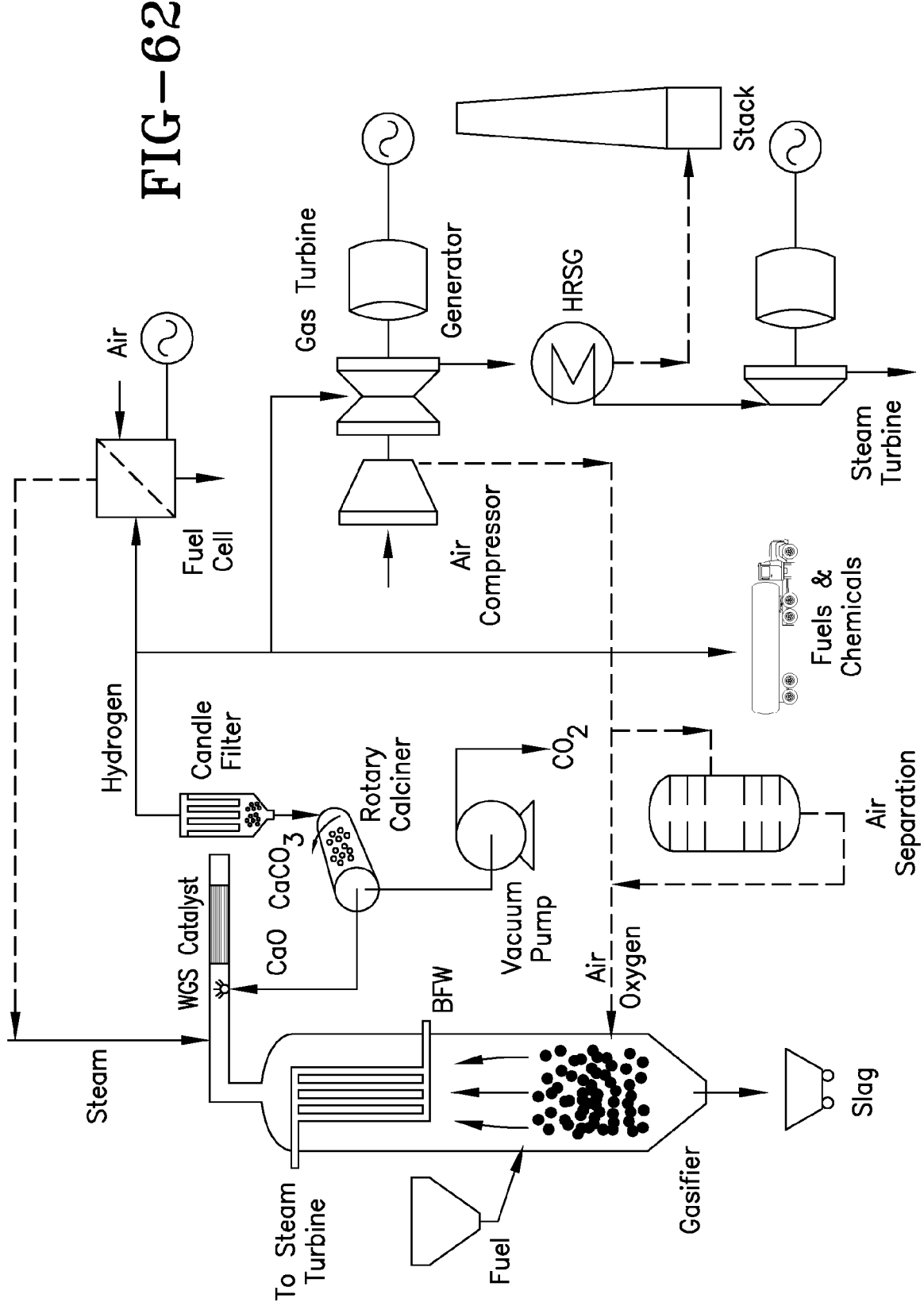
FIG. 62 is a schematic illustrating a process schematic
Figure 63:
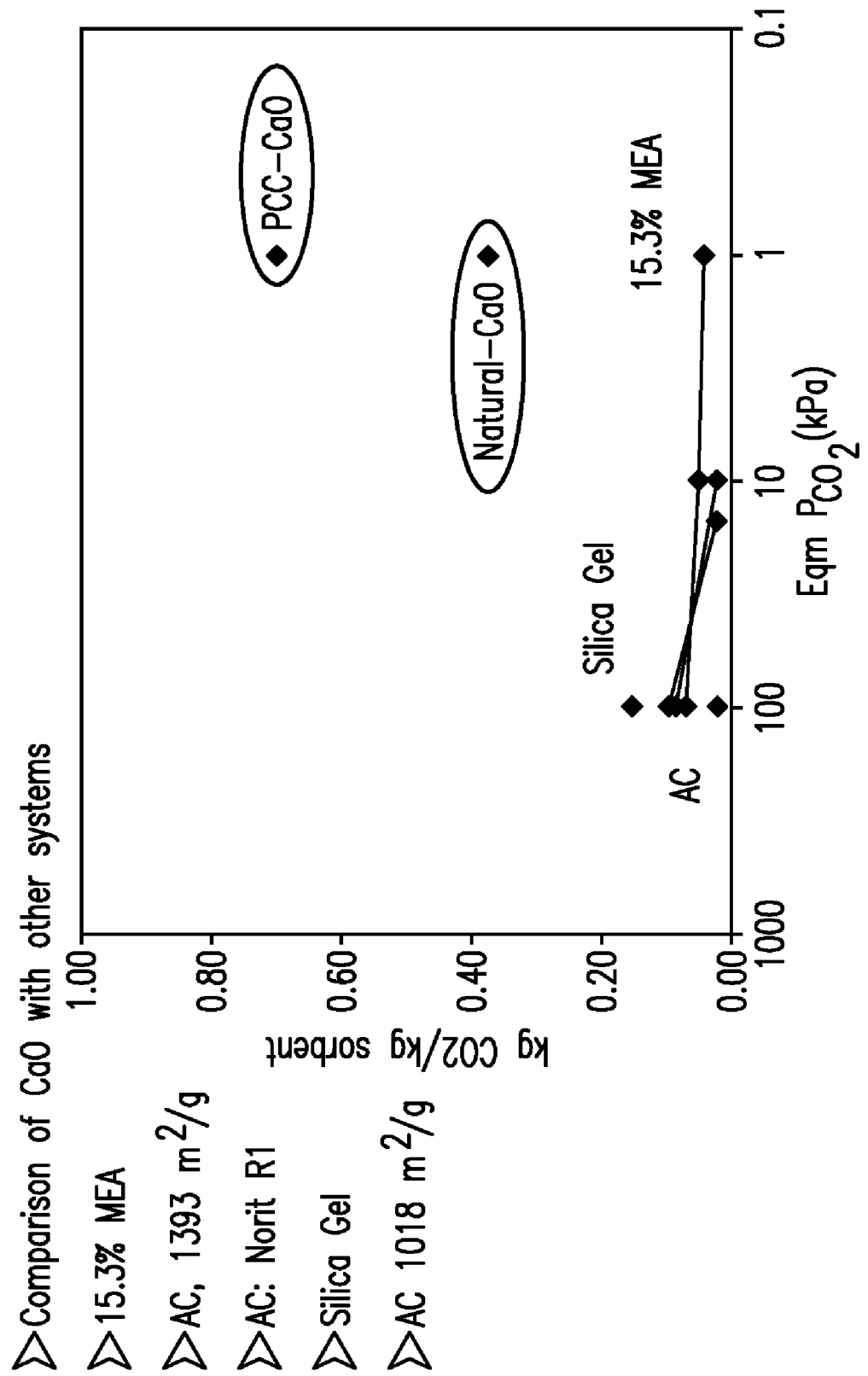
FIG. 63 is a graphical representation of $CO_2$ Sorption Capacity.
Figure 64:
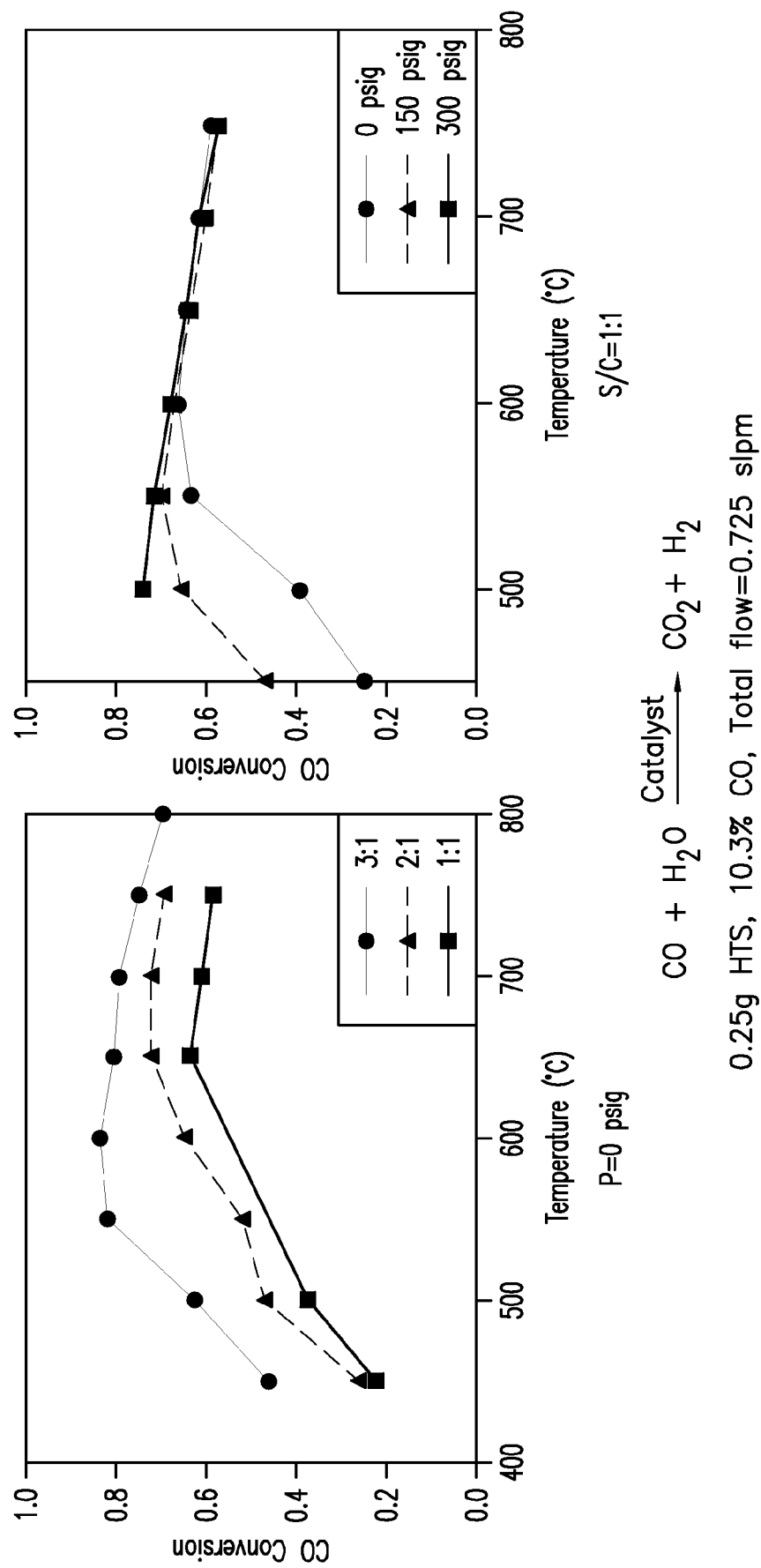
FIG. 64 is a graphical representation of the WGS catalyst testing without sorbent.
Figure 65:
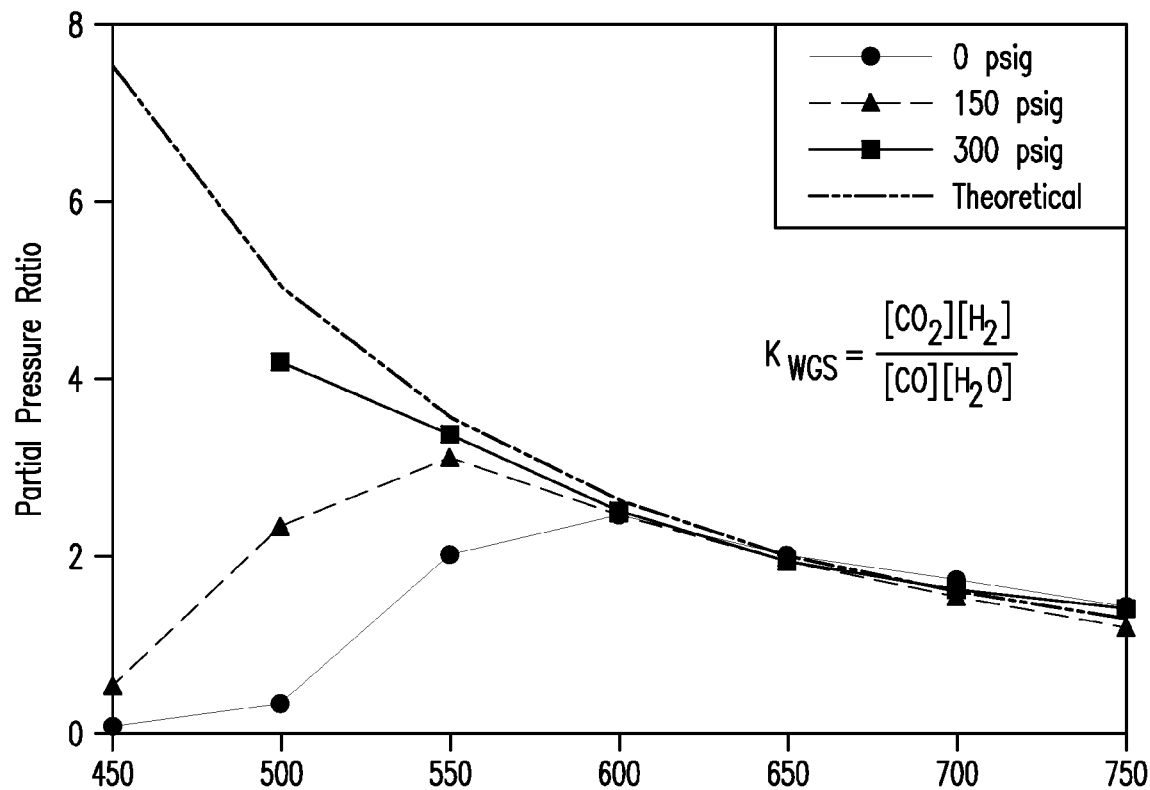
FIG. 65 is a graphical representation of the WGS catalyst testing without sorbent.
Figure 66:
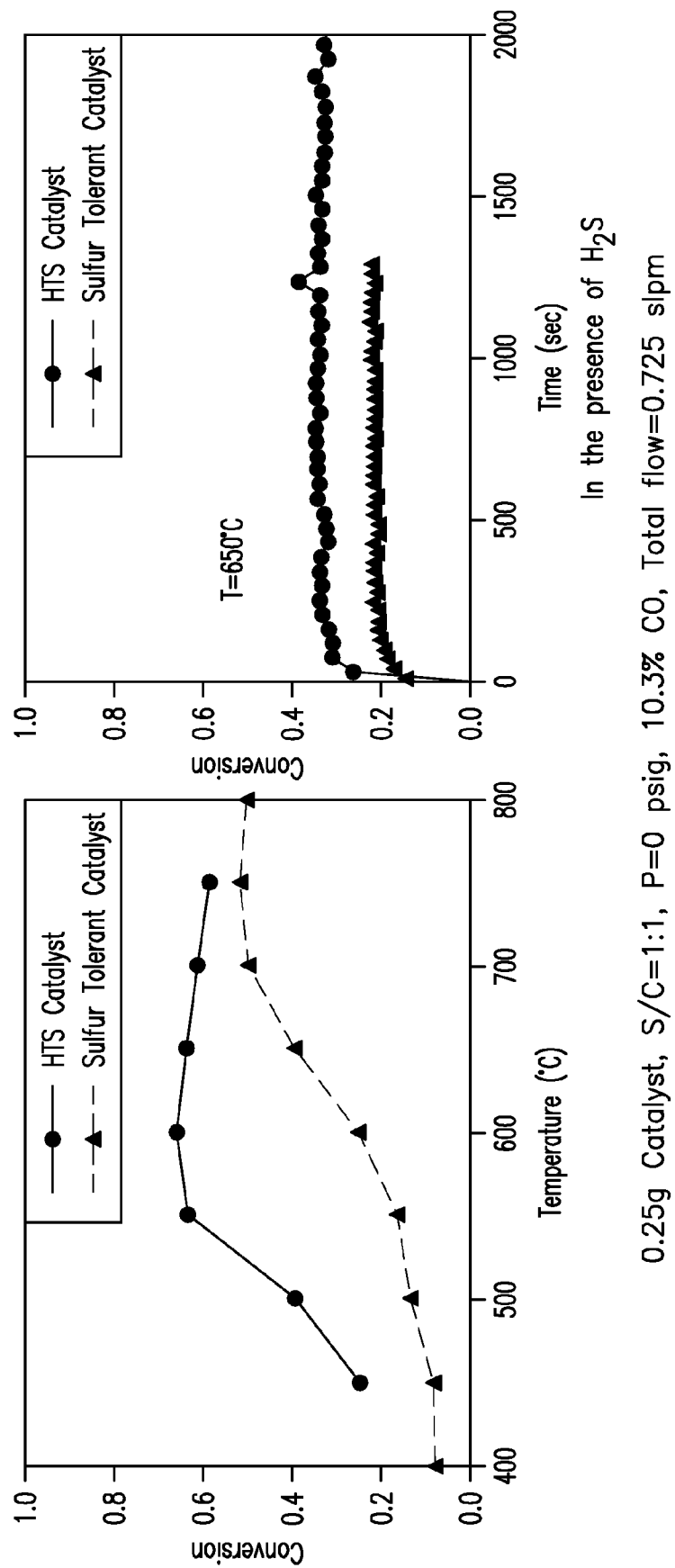
FIG. 66 is a graphical representation of the WGS catalyst testing without sorbent.
Figure 67:
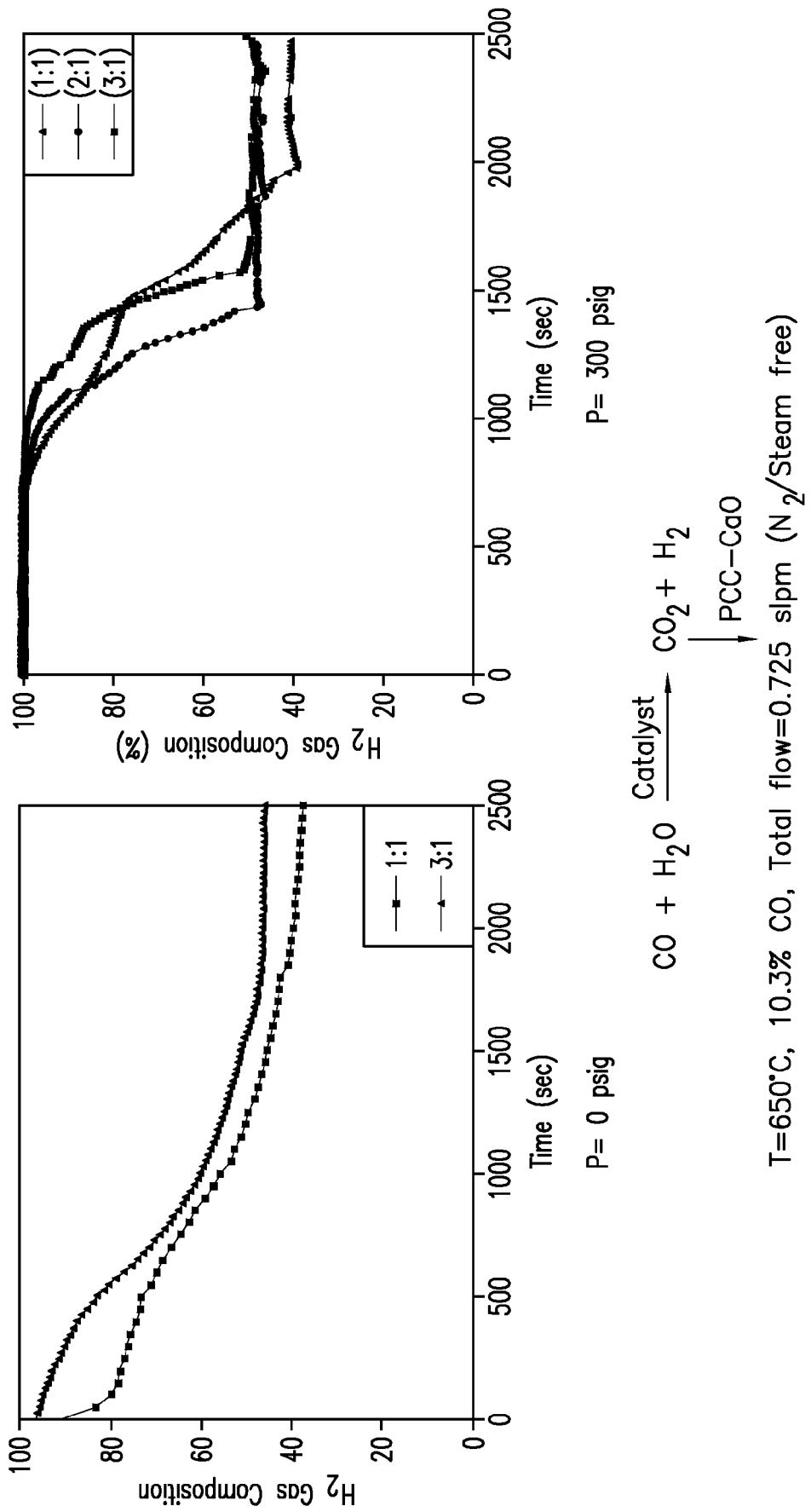
FIG. 67 is a graphical comparison of a PCC-Sorbent WGS system at 0 psig and 300 psig.
Figure 70:
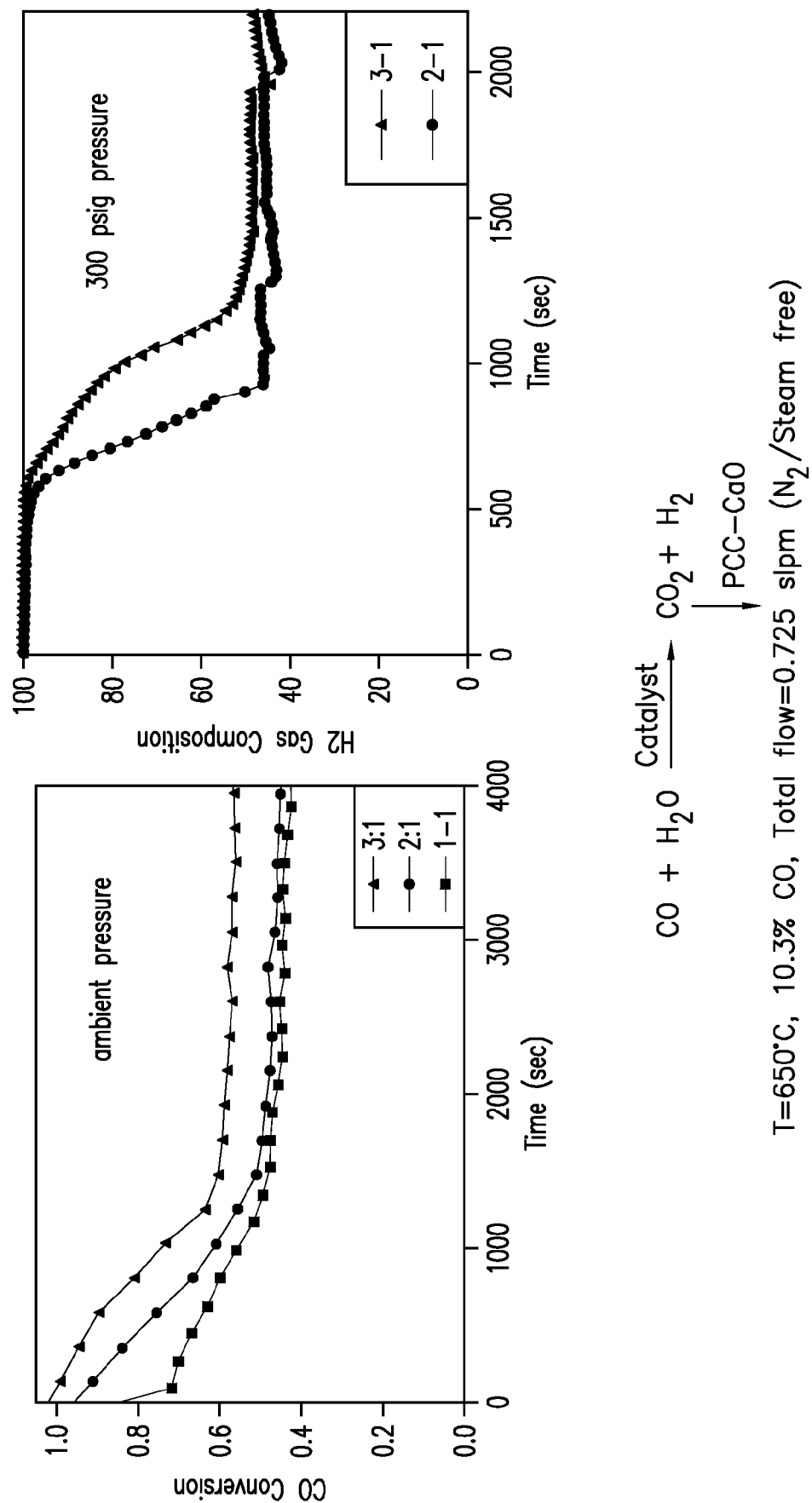
FIG. 70 is a graphical representation of non-catalytic PCC-Sorbent WGS systems at differing pressures.
Figure 71:
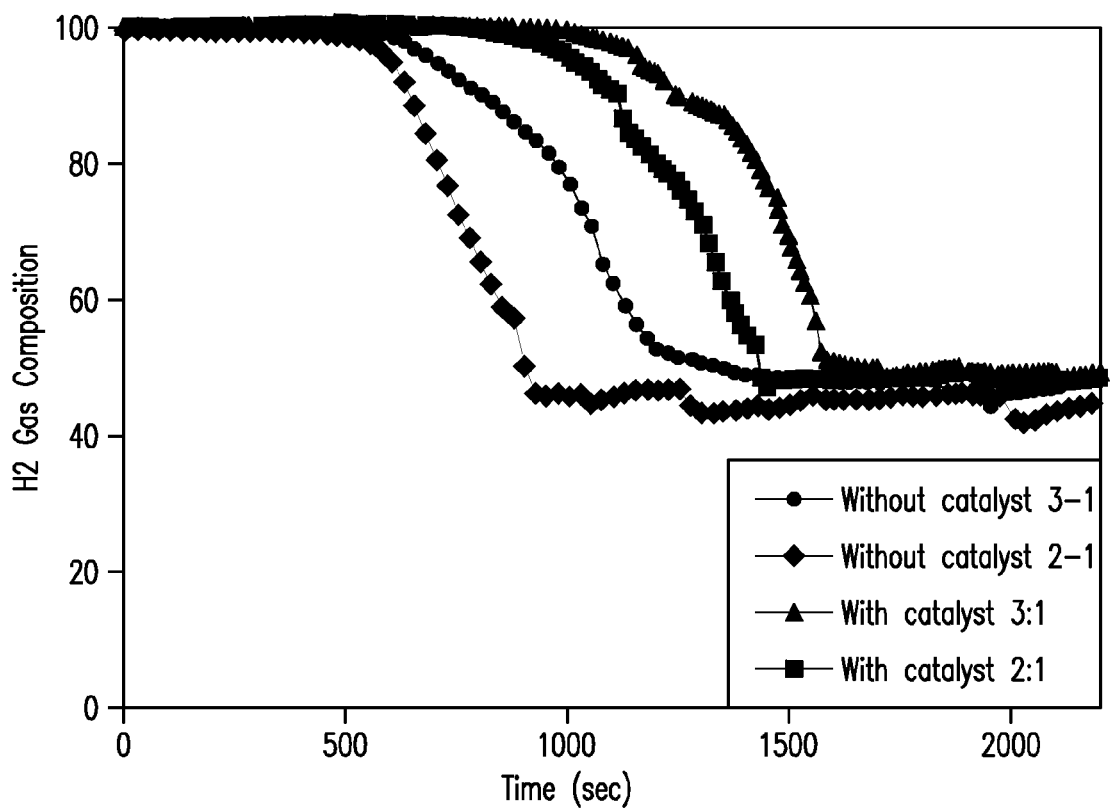
FIG. 71 is a graphical representation of non-catalytic PCC-Sorbent WGS systems at differing ratios.
Figure 72:
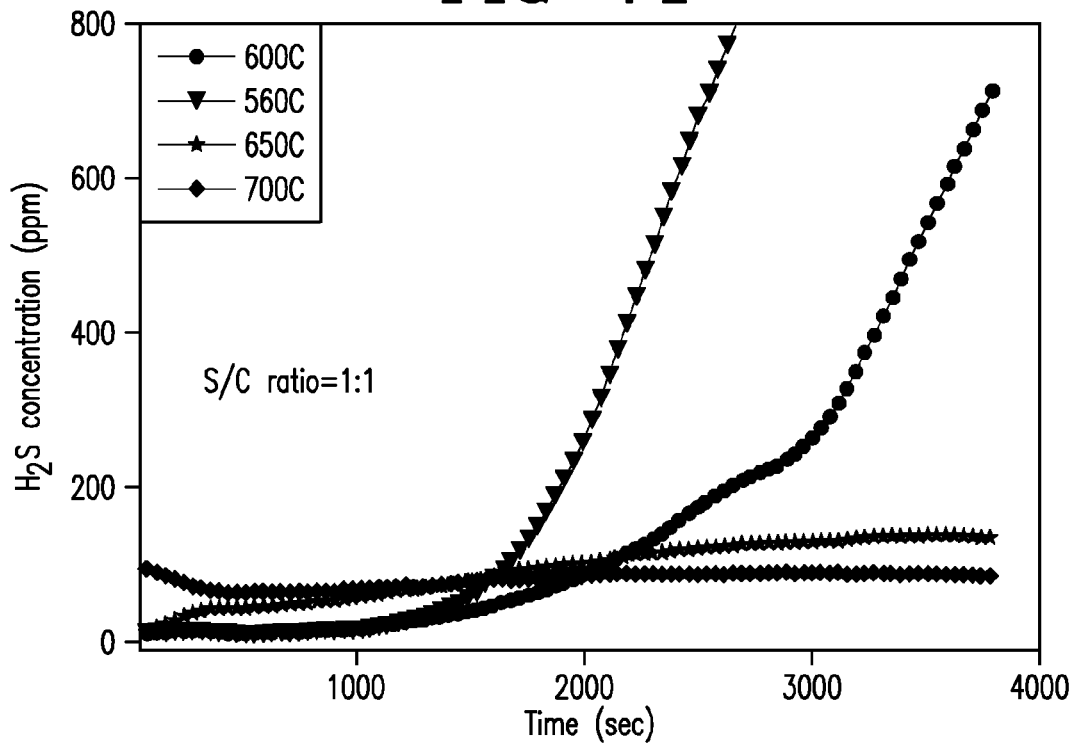
FIG. 72 is a graphical representation detailing the effect of temperature on a non-catalytic PCC-WGS system with $H_2S$ removal.
Figure 73:
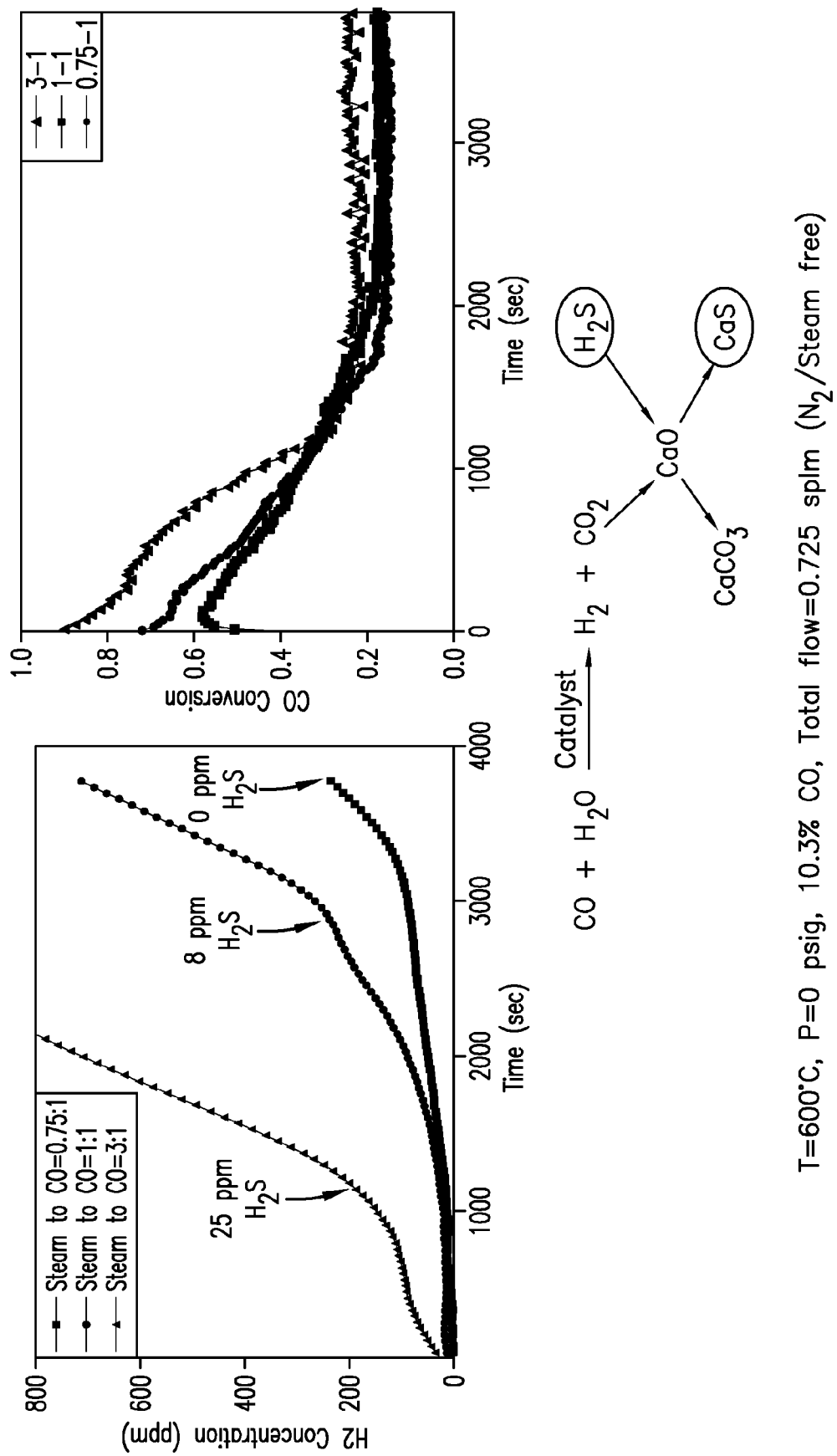
FIG. 73 is a graphical representation of a non-catalytic PCC-WGS system with $H_2S$ removal.
Figure 74A:
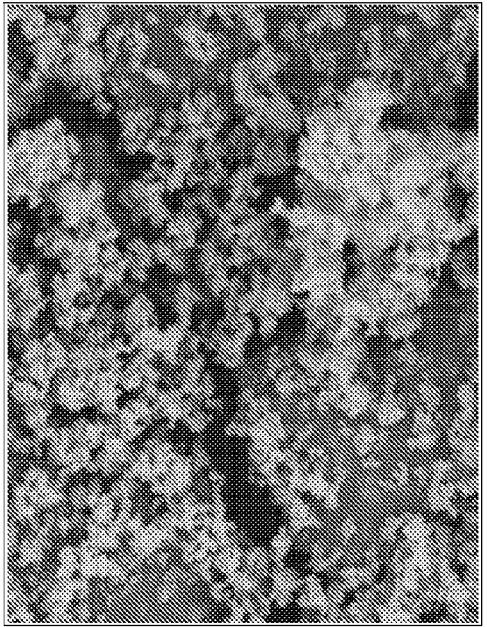
FIG. 74(a) is illustration of PCC.
Figure 74B:
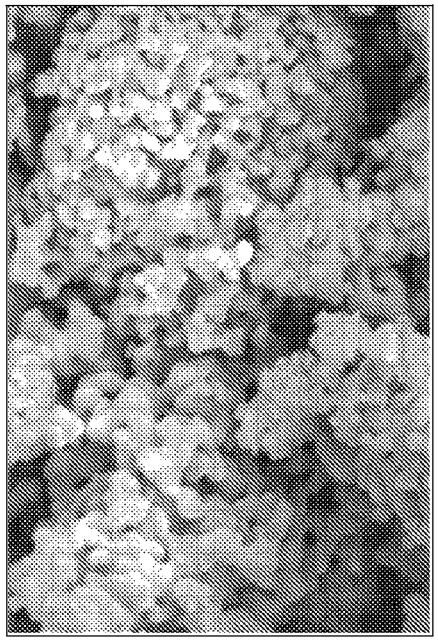
FIG. 74(b) is an illustration of PCC calcined.
Figure 74C:
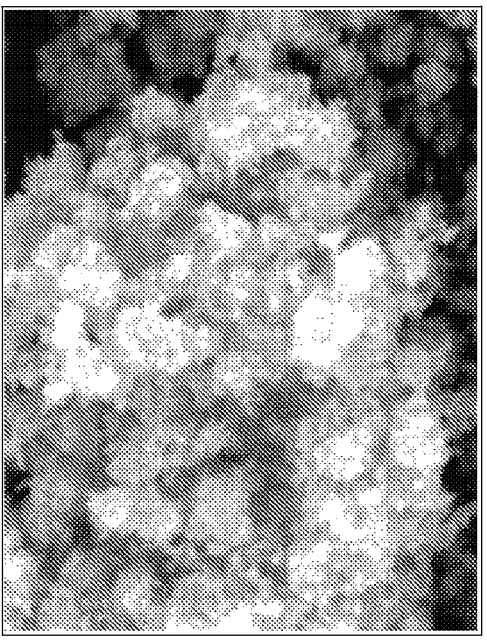
FIG. 74(c) is an illustration of PCC carbonated and sulfided at 0 psig.
Figure 74D:
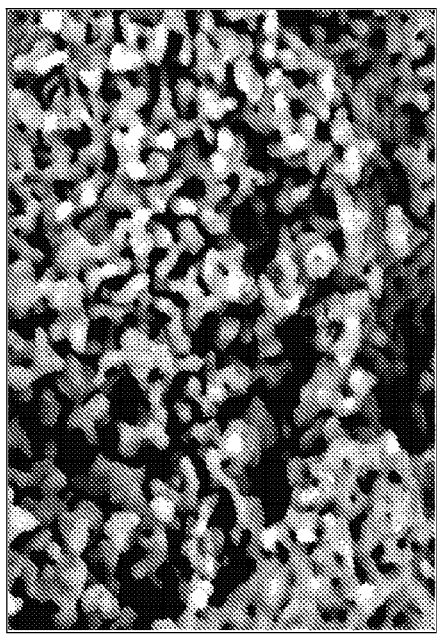
FIG. 74(d) is an illustration of PCC carbonated and silfided at 300 psig.
Figure 78:
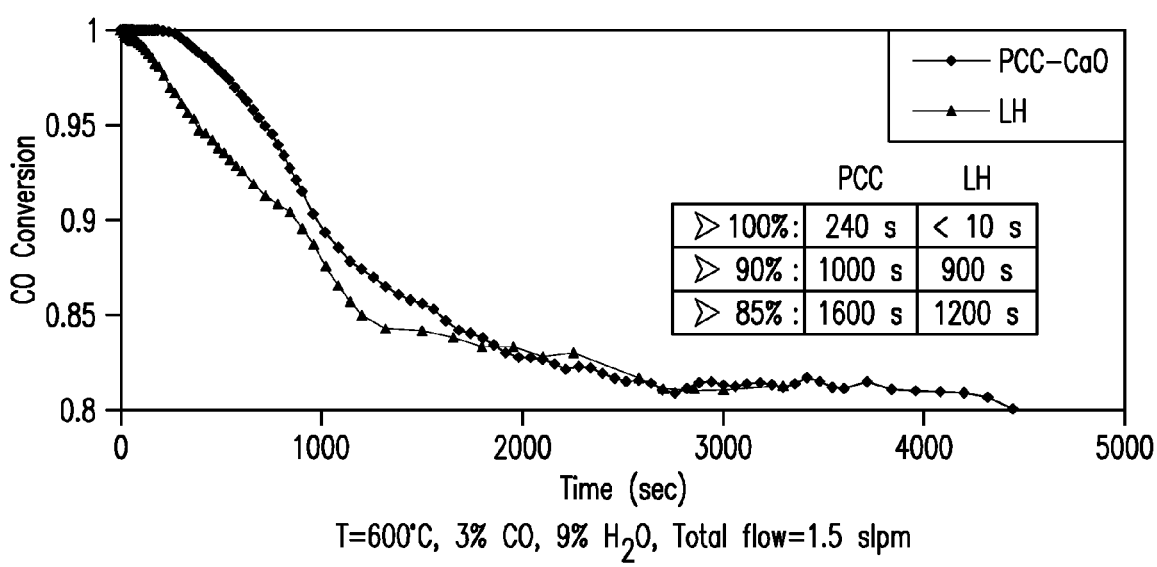
FIG. 78 is an illustration comparing PCC and LH.
Figure 79:
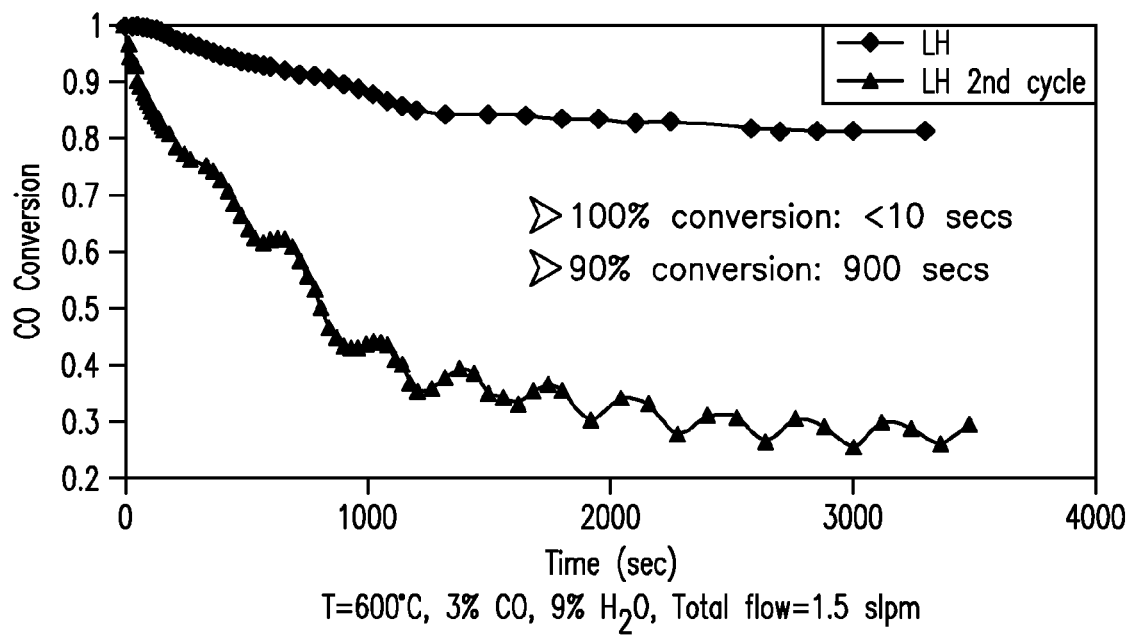
FIG. 79 is graphical representation of the performance of Linwood Hydrate.
Figure 80:
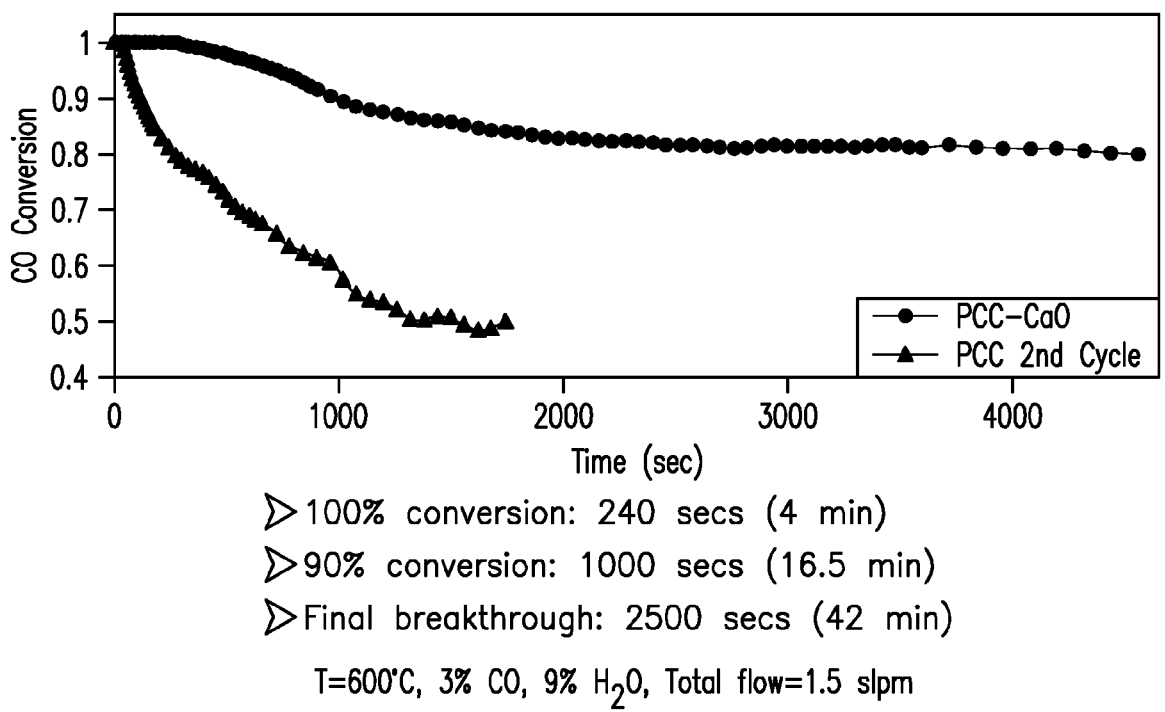
FIG. 80 is graphical representation of the performance of PCC-CaO.
Figure 81:
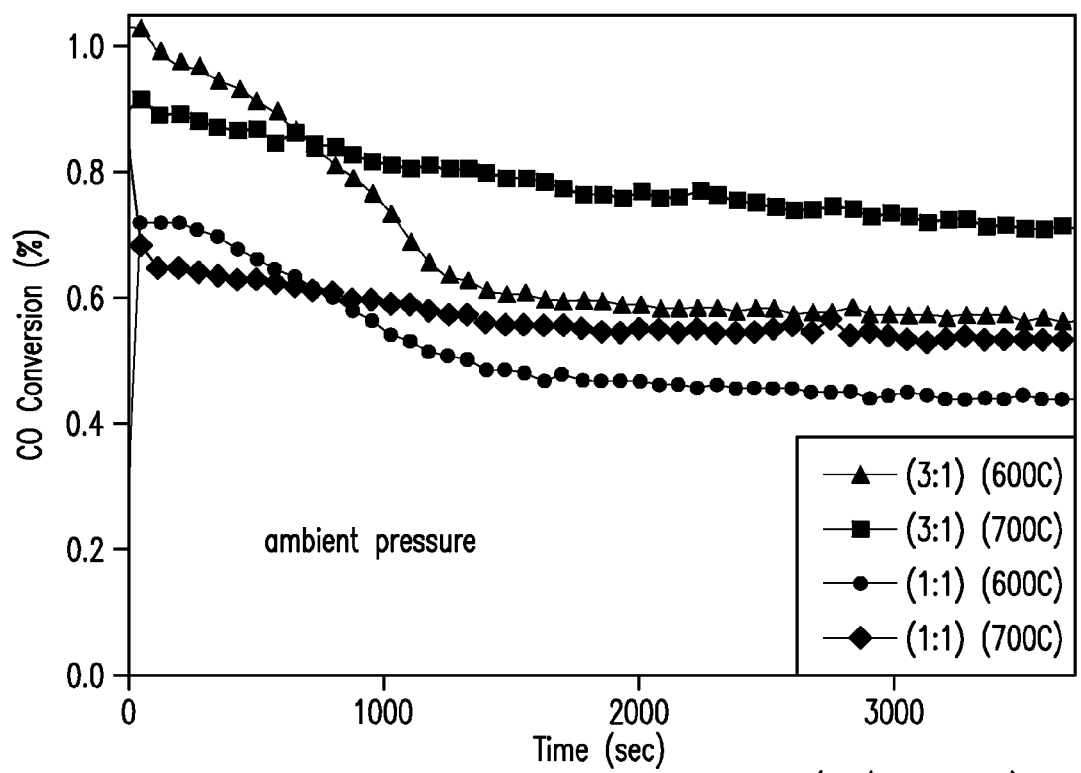
FIG. 81 is a graphical representation of a non-catalytic PCC-Sorbent WGS system at ambient pressure.
Figure 82:
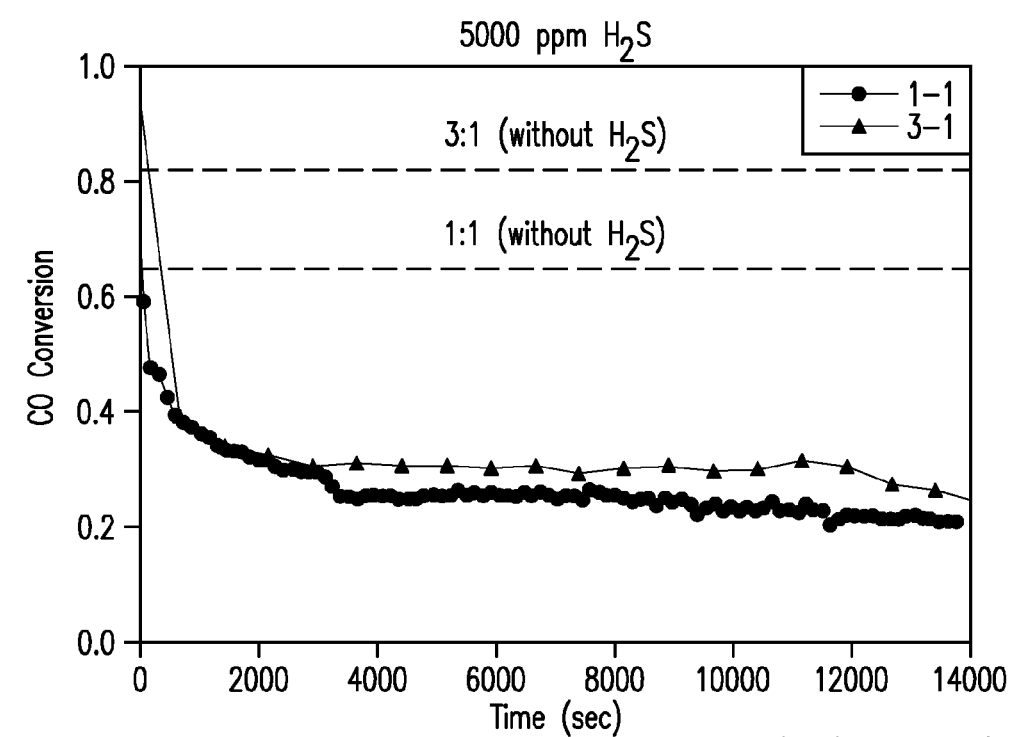
FIG. 82 is a graphical representation of the effect of $H_2S$ on HTS catalyst activity.
Figure 83:
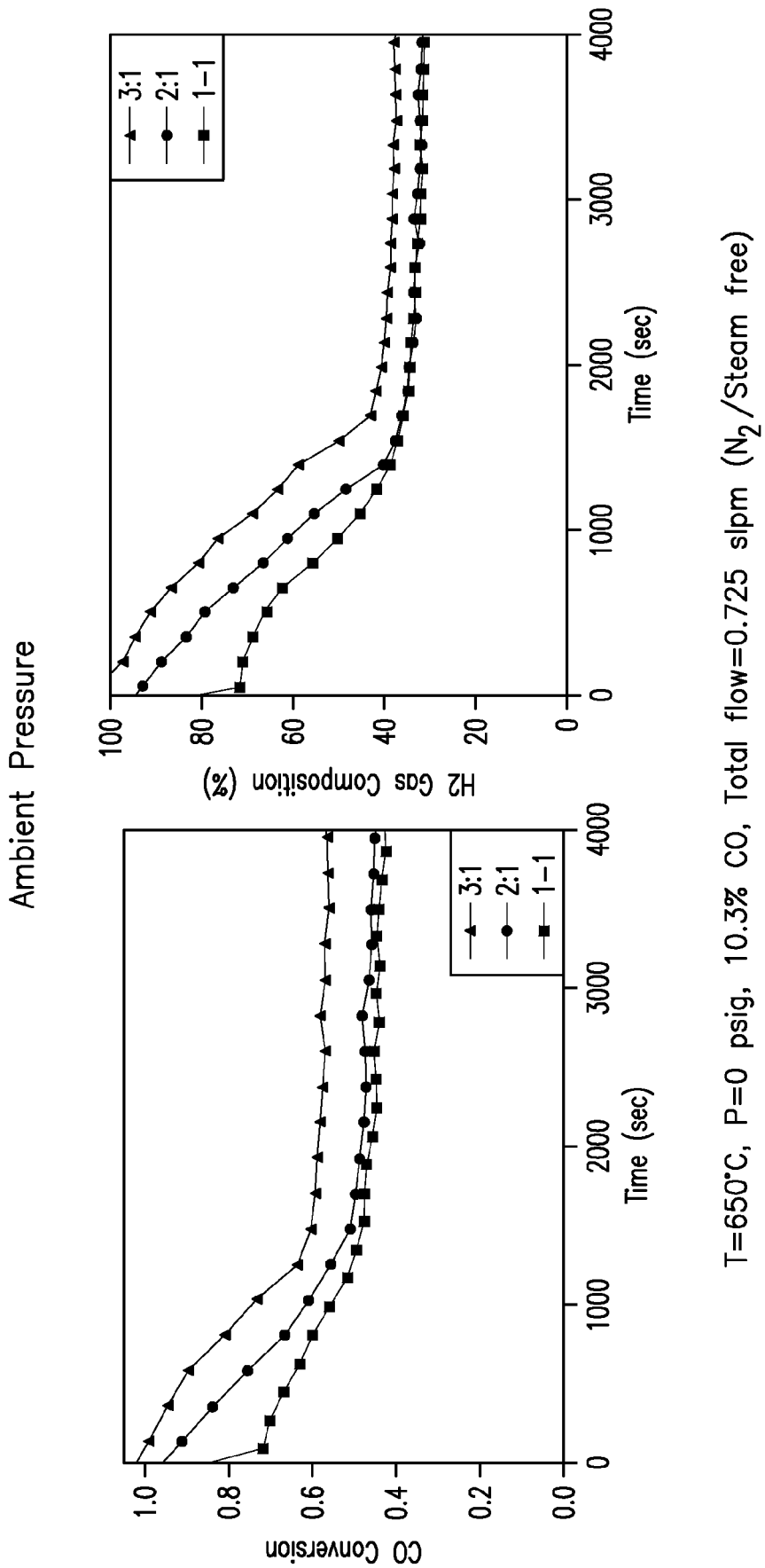
FIG. 83 is a graphical representation of a non-catalytic PCC-Sorbent WGS system at ambient pressure.
Figure 89:
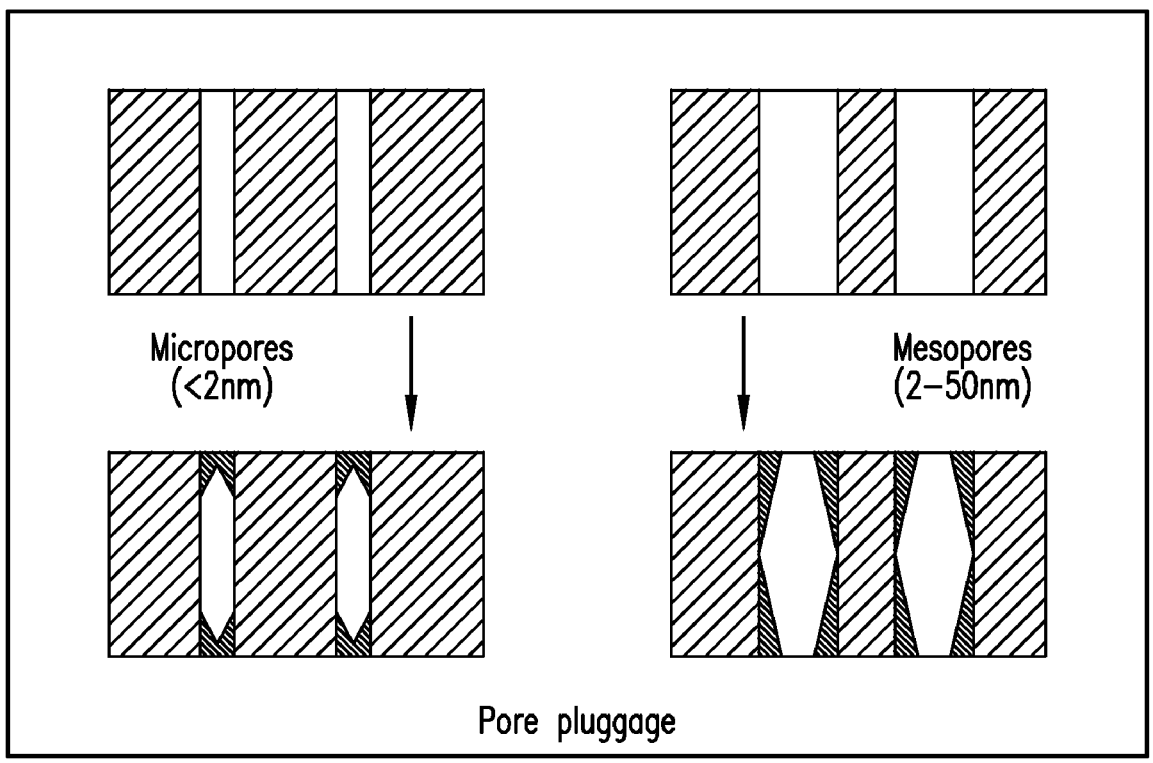
FIG. 89 shows the effect of pore structure on ultimate sorbent conversion.
Figure 91:
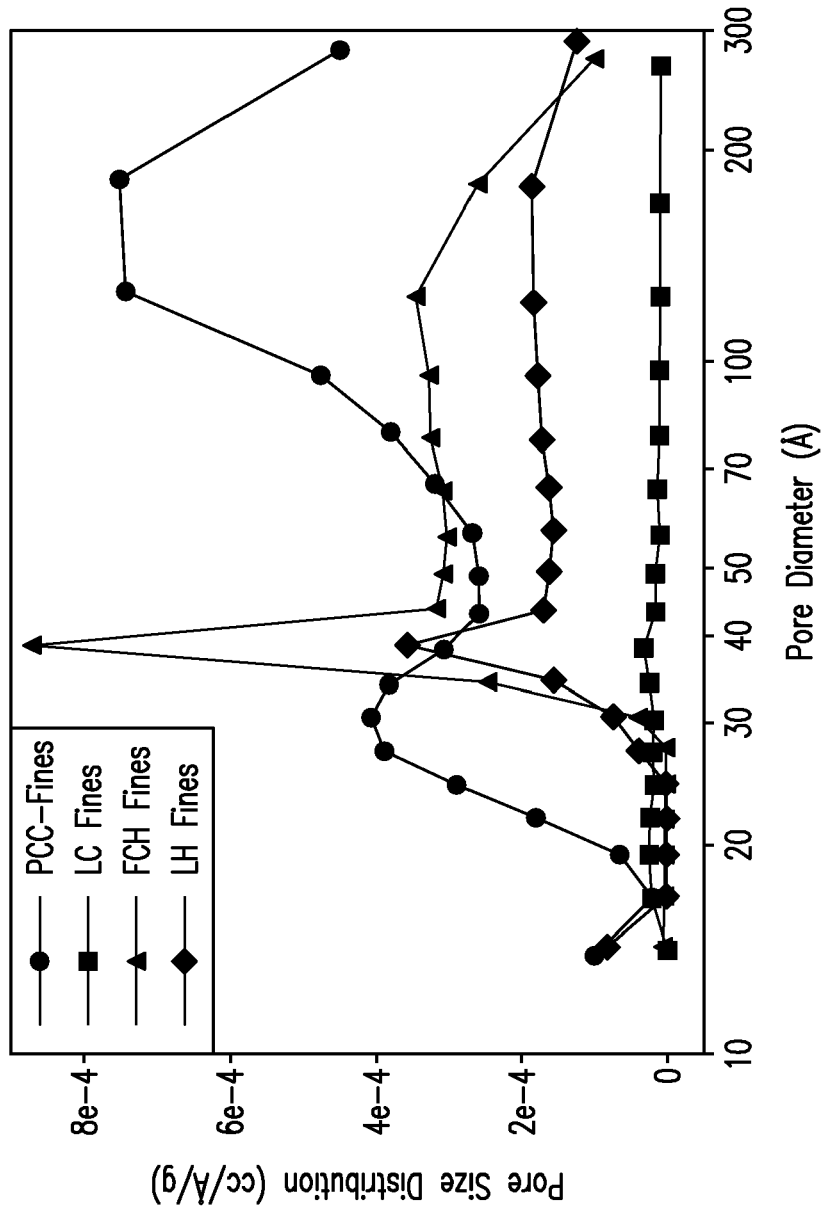
FIG. 91 addresses optimization of surface area.
Figure 92:
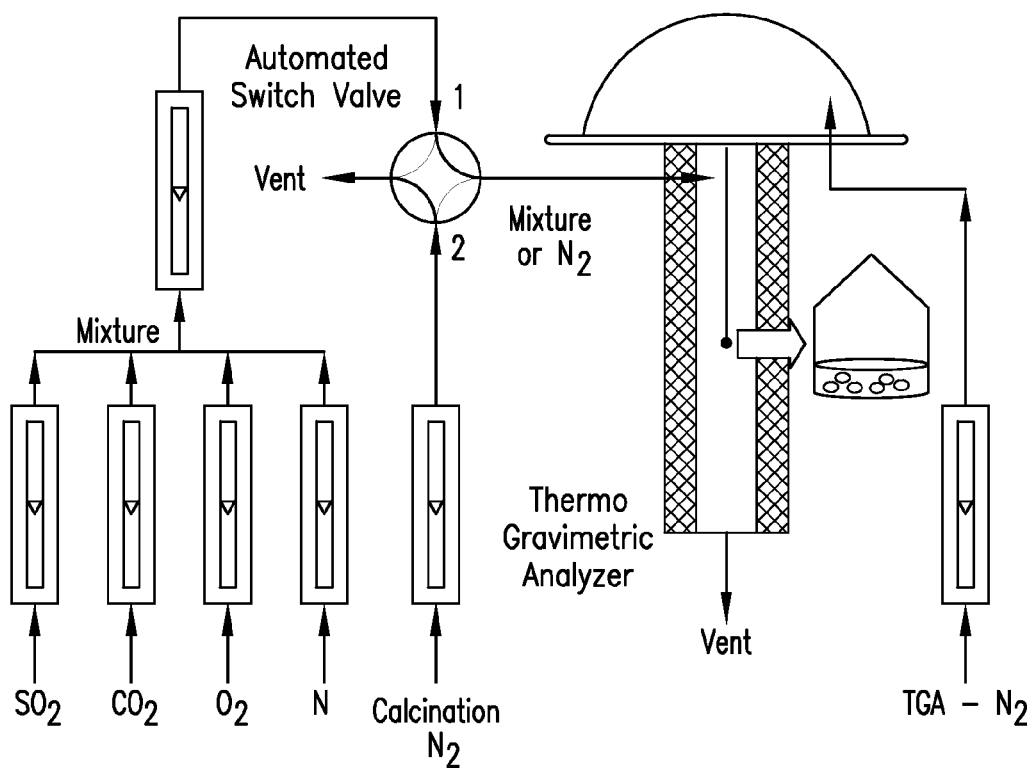
FIG. 92 is an equipment flow sheet.
Figure 93:
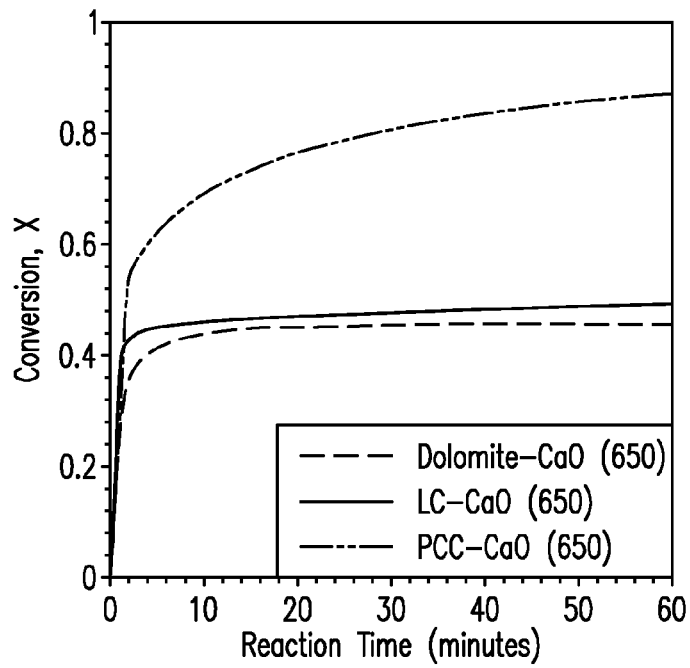
FIG. 93 shows the effect of initial sorbent morphology (carbonation of CaO sorbents).
Figure 95:
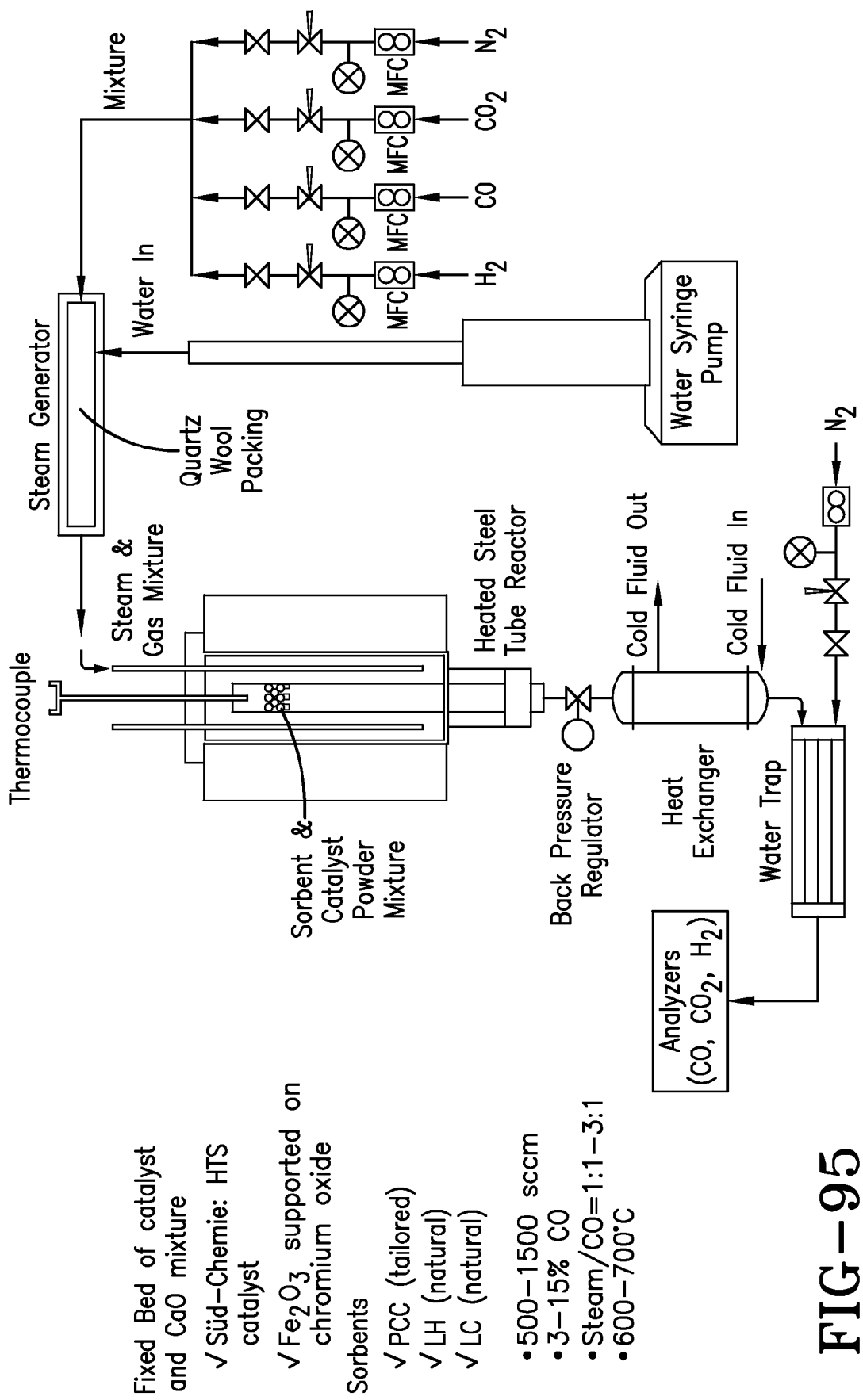
FIG. 95 provides an experimental set-up for combined WGSR and carbonation.
Figure 96:
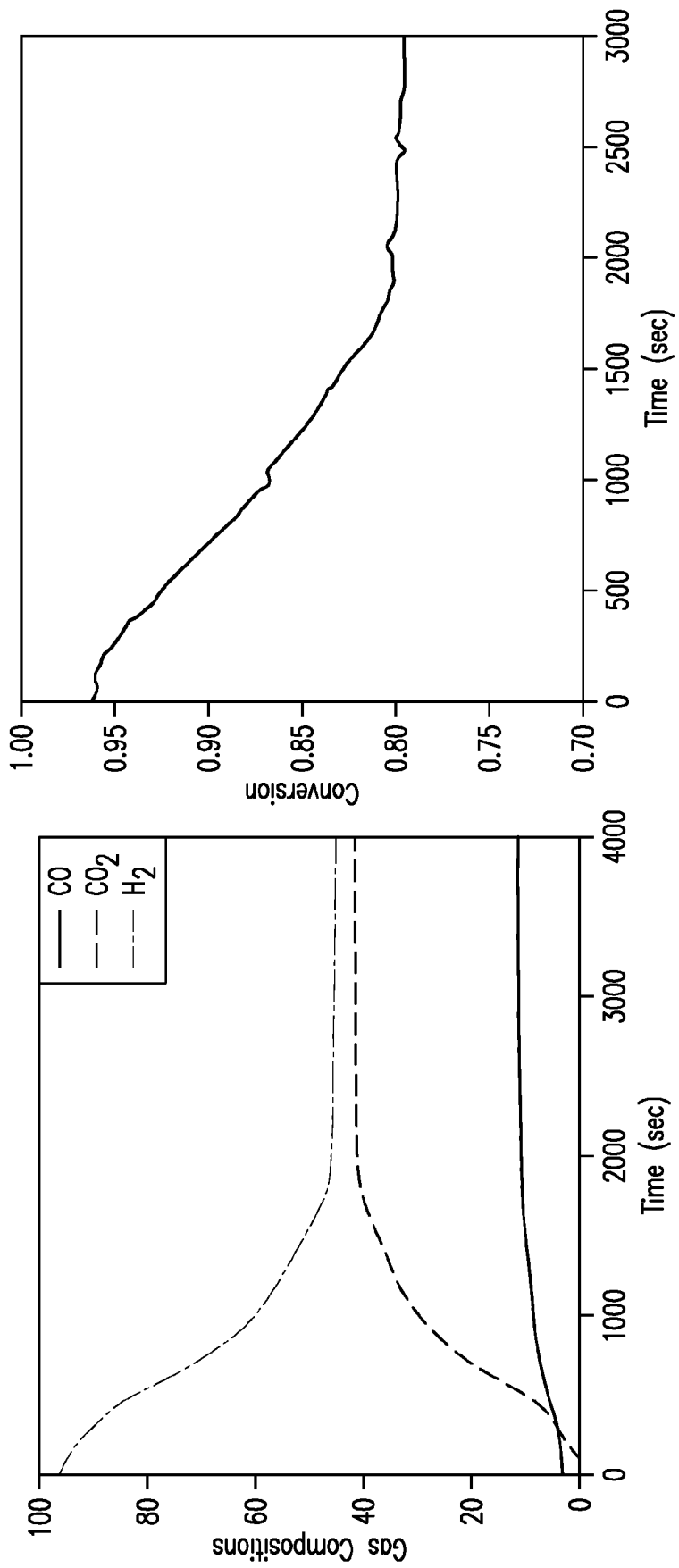
FIG. 96 shows the behavior of the PCC-sorbent WGS system at ambient pressure.
Figure 98:
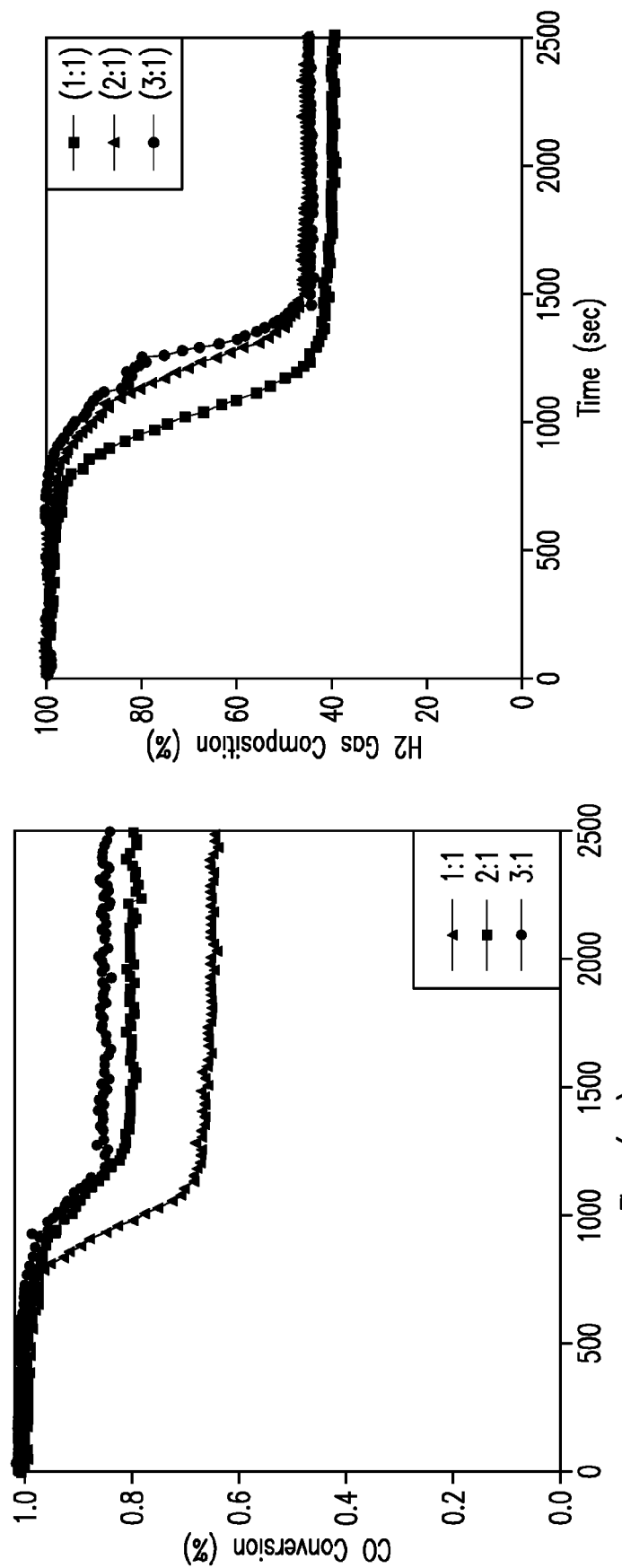
FIG. 98 shows the behavior of the PCC-sorbent WGS system at 150 psig.
Figures 100, 101:
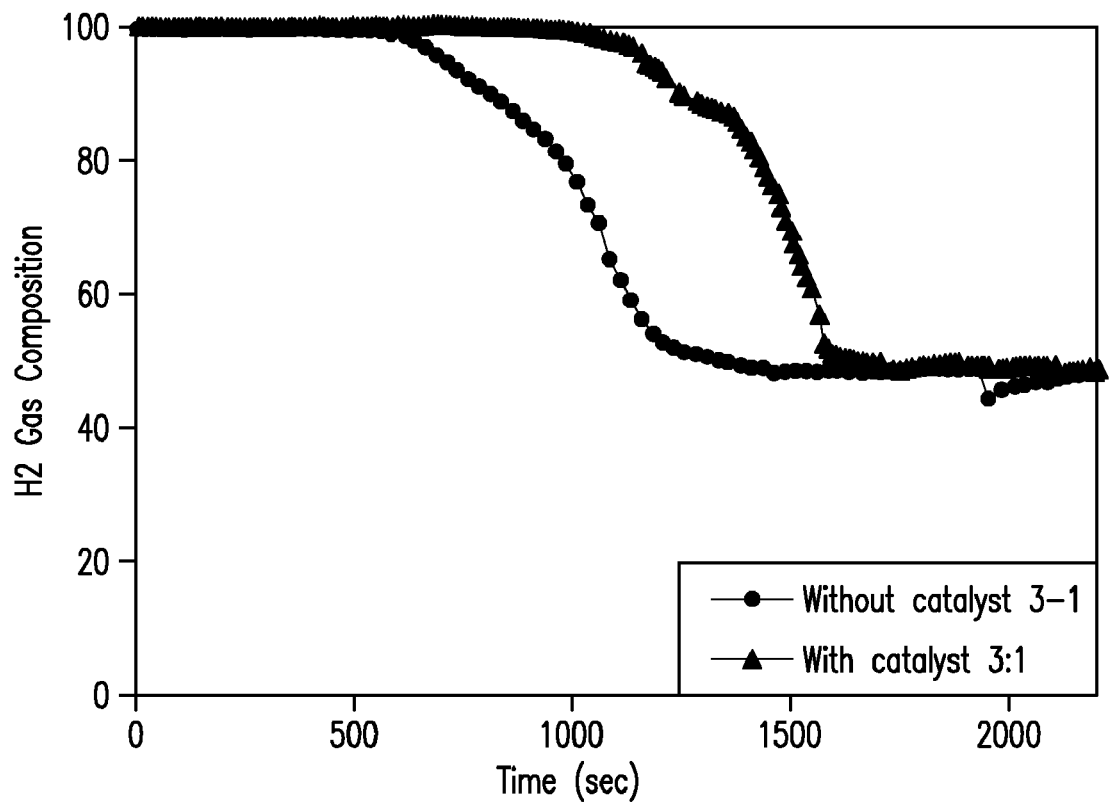
FIG. 100 shows the behavior of the PCC-sorbent WGS system (non-catalytic).
FIG. 101 shows the integrated H2 production, CO capture and H2S removal via PCC-WGS system.
Figure 106:
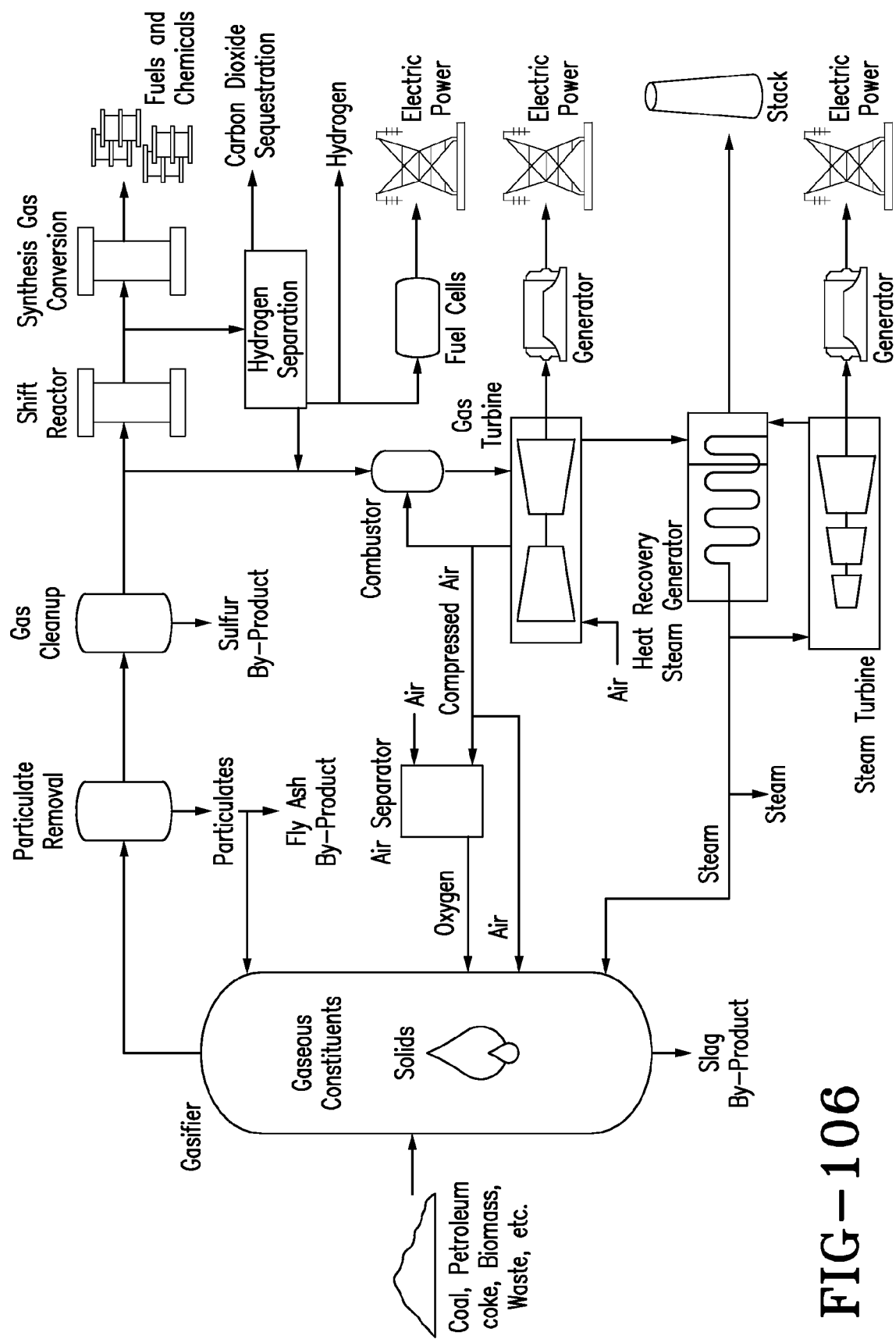
FIG. 106 shows various gasification-based energy production system concepts.
Figure 108:
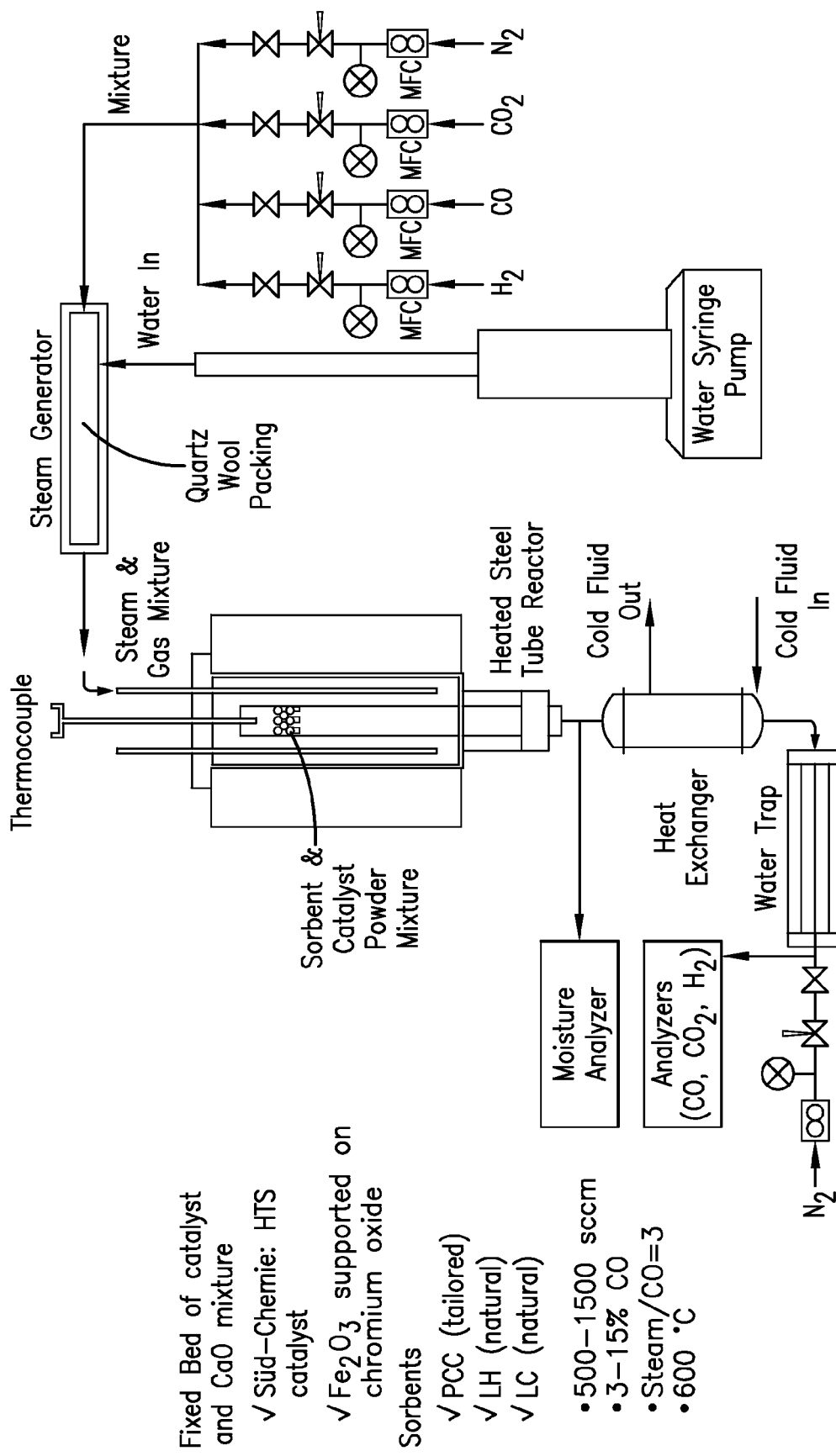
FIG. 108 shows the experimental set-up for combined WGSR and carbonation.

FIG. 22(a) illustrates the break through curves in $H_2S$ composition for experiments conducted at ambient pressure and 15 atm. It can be seen that in the prebreakthrough region of the curve the calcium oxide sorbent undergoes sulfidation removing $H_2S$ to levels of less than 1 ppm at ambient pressure. At a higher pressure of 15 atm, lower levels of $H_2S$ in the ppb range were detected in the outlet stream. This clearly shows that when stoichiometric quantity of steam is used very high $H_2S$ removal is achieved in the system. FIG. 22(a) illustrates the break through curve for $H_2$ composition in the same experiment. A very distinct pre breakthrough region is observed in the curve which shows that the CaO is very effective in driving the water gas shift reaction in the forward direction. At ambient pressure, 70% $H_2$ purity is obtained while at 15 atms, 99.97% purity of $H_2$ is obtained. From this it can be understood that the high reactivity of the OSU patented calcium oxide results in rapid carbonation and high conversions (80%) of the sorbent which will greatly reduce the amount of solid loading in the system.

Three different cases of steam:CO(S/C) ratios without catalyst at ambient pressures. The data is as follows:

CASE 1: (Best case of H2S removal)
For S/C ratio of 0.75/1
Lowest H2S concentration achieved is 0 ppm (the analyzer cannot read in ppb).
H2:CO ratio in the outlet stream=1.3
CASE 2:
For S/C ratio of 1/1
Lowest H2S concentration achieved is 8 ppm
H2:CO ratio in the outlet stream=2.5
CASE 3: (Best case of H2 purity)
For S/C ratio of 3/1
Lowest H2S concentration achieved is 25 ppm
Percentage of H2 in the outlet stream: 95%

While the invention has been described in connection with what is presently considered to be the most practical and preferred embodiments, it is to be understood that the invention is not to be limited to the disclosed embodiment(s), but on the contrary, is intended to cover various modifications and equivalent arrangements included within the spirit and scope of the appended claims, which are incorporated herein by reference.

REFERENCES AND PRIOR ART

Adanez, J.; Garcia-Labiano, F.; Abad, A.; de Diego L. F.; Gayan, P. "Regeneration of Sulfided Dolomite with Steam and Carbon Dioxide". *Energy and Fuels*. 2001, 15, 85-94.

Agnihotri, R.; Mahuli, S. K.; Chauk, S. S.; Fan, L-S. "Influence of Surface Modifiers on the Structure of Precipitated Calcium Carbonate". *Ind. Eng. Chem. Res.* 1999, 38, 2283-2291.

Balasubramanian, B.; Lopez-Ortiz, A.; Kaytakoglu, S.; Harrison D. P. "Hydrogen from Methane in a Single-Step Process". *Chem. Engng. Sci.*, 1999, 54, 3543-3552.

Barker, R. "The Reversibility of the Reaction $CaCO_3 = CaO + CO_2$". *J. Appl. Chem. Biotechnol.* 1973, 23, 733-742.

Beruto, D.; Searcy, A. W. "Calcium Oxides of High Reactivity." *Nature*. 1976, 263, 221-222.

Beruto, D.; Barco, L.; Searcy, A. W.; and Spinolo, G. "Characterization of the Porous CaO Particles Formed by Decomposition of $CaCO_3$ and $Ca(OH)_2$ in Vacuum". *J. Am. Cer. Soc.* 1980, 63, 439-443.

Bohlbro H., "An Investigation on the Kinetics of Conversion of Carbon Monoxide with Water Vapour over Iron Oxide Based Catalysts". Second Edition, Haldor Topsoe, Denmark (1969).

Chauk, S. S.; Agnihotri, R.; Jadhav R. A.; Misro S. K.; Fan, L-S. "Kinetics of High-Pressure Removal of Hydrogen Sulfide Using Calcium Oxide Powder". *AIChE J.* 2000, 46, 1157-1167.

David N. S. "The Water-Gas Shift Reaction". *Catal. Rev. Sci. Eng.* 1980, 21, 275-318.

Dash, S.; Kamruddin, M.; Ajikumar, P. K.; Tyagi, A. K.; Raj, B. "Nanocrystalline and Metastable Phase Formation in Vacuum Thermal Decomposition of Calcium Carbonate". *Thermochimica acta.* 2000, 363, 129-135.

Doong, Shain; Ong, Estela; Atroshenko, Mike; Lau, Francis; Roberts, Mike. "A Novel Membrane Reactor for Direct Hydrogen Production from Coal". DOE Final Technical Report. January 2006. http://www.osti.gov/bridge/servlets/purl/876470-v2h bxY/876470. PD F.

Fan, L-S.; Ghosh-Dastidar, A.; Mahuli, S. "Calcium Carbonate Sorbent and Methods of Making and Using Same". U.S. Pat. No. 5,779,464, Jul. 14 (1998).

Fan, L-S.; Jadhav R. A. "Clean Coal Technologies: OSCAR and CARBONOX Commercial Demonstrations". *AIChE J.* 2002, 48, 2115-2123.

Gerhartz W., "Ullmann's Encyclopedia of Industrial Chemistry", A12, 5$^{th}$ edn., VCH, New York pp. 179-242 (1993).

Ghosh-Dastidar, A.; Mahuli, S. K.; Agnihotri, R.; Fan, L-S. "Investigation of High-Reactivity Calcium Carbonate Sorbent for Enhanced $SO_2$ Capture". *Ind. Eng. Chem. Res.* 1996, 35, 598-606.

Gupta, H.; Fan, L-S. "Carbonation-Calcination Cycle Using High Reactivity Calcium Oxide for Carbon Dioxide Separation from Flue Gas", *Ind. Eng. Chem. Res.* 2002, 41, 4035-4042.

Gupta, H; Iyer, M. V.; Sakadjian, B. B.; and Fan, L.-S., Proceedings from Fuel Cell Seminar, San Antonio, Tex., 2004.

Hufton, J. R.; Mayorga, S.; Sircar, S. "Sorption-Enhanced Reaction Process for Hydrogen Production." *AIChE J.* 1999, 45, 248-256.

Iyer, M. V.; Gupta, H.; Sakadjian, B. B.; Fan, L.-S. "Multicyclic Study on the Simultaneous Carbonation and Sulfation of High-Reactivity CaO". *Ind. Eng. Chem. Res.* 2004, 43, 3939-3947.

Kato, M.; Yoshikawa, S.; Nakagawa, K. "Carbon Dioxide Absorption by Lithium Orthosilicate in a Wide Range of Temperature and Carbon Dioxide Concentrations". *J. Mat. Sci. Lett.* 2002, 21, 485-487.

Lin, Shi-Ying; Suzuki, Yoshizo; Hatano, Hiroyuki; Harada, Michiaki. "Developing an Innovative Method, HyPr-RING, to Produce Hydrogen from Hydrocarbons." *Energy Conversion and Management.* 2002, 43, 1283-1290.

Lin S.; Harada M. Suzuki Y.; Hatano H. "Process Analysis for Hydrogen Production by Reaction Integrated Novel Gasification (HyPr-RING)". *Energy Conv. Mgmt.* 2005, 46, 869-880.

Lopez-Ortiz, A.; Harrison D. P. "Hydrogen Production Using Sorption Enhanced Reaction". *Ind. Eng. Chem. Res.* 2001, 40, 5102-5109.

Nakagawa, K. "Lithium Silicates for the Separation of $CO_2$ from Flue Gas". Carbon Dioxide Capture Workshop at NETL, Pittsburgh, February (2003).

Ortiz, A. L.; Harrison D. P. "Hydrogen Production Using Sorption Enhanced Reaction". *Ind. Eng. Chem. Res.,* 2001, 40, 5102-5109.

Rosen, M. A. "Thermodynamic Comparison of Hydrogen Production Processes", *Int. J. Hydrogen Energy.* 1996, 21, 349-365.

Rosen, M. A.; Scott, D. S. "Comparative Efficiency Assessments for a Range of Hydrogen Production Processes". *Int. J. Hydrogen Energy.* 1998, 23, 653-659.

Roark, S. E.; Mackay, R.; Sammells, A. F. "Hydrogen Separation Membranes for Vision 21 Energy Plants". *Proceedings of the International Technical Conference on Coal Utilization & Fuel Systems.* 2002, 27 (Vol. 1), 101-112.

Ruth, L. A.; Varga, G. M. Jr. "Developing Regenerable Sulfur Dioxide Sorbents for Fluidized Bed Coal Combustion Using Thermogravimetric Analysis". *Thermochimica Acta.* 1978, 26, 241-255.

Stiegel, Gary J.; Ramezan, Massood. "Hydrogen from Coal Gasification: An Economical Pathway to a Sustainable Energy Future". *International Journal of Coal Geology.* 2006, 65, 173-190.

Turkdogan, E. T.; Rice, B. B. "Desulfurization of Limestone and Burnt Lime" *Trans. Society of Min. Eng of AIME.* 1973, 254, 28-33.

Wei, S-H.; Mahuli, S. K.; Agnihotri, R.; Fan, L-S. "High Surface Area Calcium Carbonate: Pore Structural Properties and Sulfation Characteristics". *Ind. Eng. Chem. Res.* 1997, 36, 2141-2148.

White, C. M.; Strazisar, B. R.; Granite, E. J.; Hoffman, J. S.; Pennline, H. W. "Separation and Capture of $CO_2$ from Large Stationary Sources and Sequestration in Geological Formations—Coalbeds and Deep Saline Aquifers". *J. Air & Waste Manage. Assoc.* 2003, 53, 645-715.

Wu, S.; Uddin, M. A.; Su, C.; Nagamine, S.; Sasaoka, E. "Effect of Pore-Size Distribution of Lime on the Reactivity for the Removal of $SO_2$ in the Presence of High-Concentration $CO_2$ at High Temperature". *Ind. Eng. Chem. Res.* 2002, 41, 5455-5458.

Ziock, H.-J; Lackner, K. S.; Harrison, D. P. "Zero Emission Coal Power, a New Concept." http://www.netl.doe.gov/publications/proceedings/01/carbon_seq/2b2.pdf.

What is claimed is:

1. A process for producing hydrogen, comprising the steps of:

gasifying a fuel into a raw synthesis gas comprising CO, hydrogen, steam and sulfur and halide contaminants in the form of $H_2S$, COS and HX, where X is a halide;

injecting said raw synthesis gas, CaO and steam simultaneously into a water gas shift reactor (WGSR) wherein said raw synthesis gas transforms into a shifted gas;

allowing said shifted gas to react with said CaO in said water gas shift reactor so as to remove sulfur and halides in a solid-phase calcium-containing product comprising $CaCO_3$, CaS and $CaX_2$;

separating the solid-phase calcium-containing product from an enriched gaseous hydrogen product; and regenerating the CaO by calcining the solid-phase calcium-containing product at a condition selected from the group consisting of: in the presence of steam, in the presence of $CO_2$, in the presence of synthesis gas, in the presence of $H_2$ and $O_2$, under partial vacuum, and combinations thereof.

2. The process of claim 1 additionally comprising the step of:

recycling at least a portion of a product stream from a Fischer-Tropsch reactor, fed by the WGSR, so as to introduce a chemical species selected from the group consisting of: methane, C1-C4 hydrocarbons, CO, hydrogen and combinations thereof back into the WGSR.

3. The process of claim 1 wherein said WSGR has disposed therein a catalyst.

4. The process of claim 3 wherein said catalyst includes a material selected from the group consisting of: Fe, Cu, Co, Mo, W, Cs, Pt, Ph, Pd, other precious metal catalysts, oxides thereof, sulfides thereof, and combinations thereof.

5. The process of claim 2 wherein said WSGR has disposed therein a catalyst.

6. The process of claim 1 wherein said enriched hydrogen product has a purity in the range of from about 70% to about 99.99% H2, a temperature in the range of from about 400 to about 1000 C, and a pressure in the range of from about 1 to about 100 atmosphere.

7. The process of claim 1 wherein said CaO has a surface area of at least 12.0 m2/g and a pore volume of at least 0.015 cm3/g, said CaO having a sorption capacity of at least about 70 grams of CO2 per kilogram of CaO.

8. The process of claim 2 wherein said CaO has a surface area of at least 12.0 m2/g and a pore volume of at least 0.015 cm3/g, said CaO having a sorption capacity of at least about 70 grams of CO2 per kilogram of CaO.

9. A process for producing hydrogen, comprising the steps of:
   reforming a gaseous hydrocarbon fuel in the presence of CaO and steam to remove CO2, sulfur and halide contaminants in the form of $H_2S$, COS and HX, where X is a halide, in a solid-phase calcium-containing product comprising $CaCO_3$, CaS and $CaX_2$, thereby producing a mixture of CO and hydrogen;
   separating the solid-phase calcium-containing product from an enriched gaseous hydrogen product; and
   regenerating the CaO by calcining the solid-phase calcium-containing product at a condition selected from the group consisting of: in the presence of steam, in the presence of $CO_2$, in the presence of synthesis gas, in the presence of $H_2$ and $O_2$, under partial vacuum, and combinations thereof.

10. The process of claim 9 additionally comprising the step of:
    recycling at least a portion of a product stream from a Fischer-Tropsch reactor, fed by the reformer, so as to introduce a chemical species selected from the group consisting of: methane, C1-C4 hydrocarbons, CO, hydrogen and combinations thereof back into the reformer.

11. The process of claim 9 wherein said reforming step is conducted in the presence of a catalyst.

12. The process of claim 11 wherein said catalyst is selected from the group consisting of: Ni, Pt, Rh, Pd, Ru, W, Mo, oxide thereof, carbides thereof, and sulfides thereof.

13. The process of claim 10 wherein said reforming step is conducted in the presence of a catalyst.

14. The process of claim 9 wherein said enriched hydrogen product has a purity in the range of from about 70% to about 99.99% H2, a temperature in the range of from about 400 to about 1000 C, and a pressure in the range of from about 1 to about 100 atmosphere.

15. The process of claim 9 wherein said CaO has a surface area of at least 12.0 m2/g and a pore volume of at least 0.015 cm3/g, said CaO having a sorption capacity of at least about 70 grams of CO2 per kilogram of CaO.

16. The process of claim 10 wherein said CaO has a surface area of at least 12.0 m2/g and a pore volume of at least 0.015 cm3/g, said CaO having a sorption capacity of at least about 70 grams of CO2 per kilogram of CaO.

17. A process for producing hydrogen, comprising the steps of:
    at least partially oxidizing a fuel into a raw gas comprising CO, hydrogen, steam and sulfur and halide contaminants in the form of $H_2S$, COS and HX, where X is a halide;
    injecting said raw synthesis gas, CaO and steam simultaneously into a water gas shift reactor (WGSR) wherein said raw synthesis gas transforms into a shifted gas;
    allowing said shifted gas to react with said CaO in said water gas shift reactor so as to remove sulfur and halides in a solid-phase calcium-containing product comprising $CaCO_3$, CaS and $CaX_2$;
    separating the solid-phase calcium-containing product from an enriched gaseous hydrogen product; and
    regenerating the CaO by calcining the solid-phase calcium-containing product at a condition selected from the group consisting of: in the presence of steam, in the presence of $CO_2$, in the presence of synthesis gas, in the presence of $H_2$ and $O_2$, under partial vacuum, and combinations thereof.

18. The process of claim 17 wherein said WSGR has disposed therein a catalyst.

19. The process of claim 18 wherein said catalyst includes a material selected from the group consisting of: Fe, Cu, Co, Mo, W, Cs, Pt, Ph, Pd, other precious metal catalysts, oxides thereof, sulfides thereof, and combinations thereof.

20. The process of claim 17 wherein said enriched hydrogen product has a purity in the range of from about 70% to about 99.99% H2, a temperature in the range of from about 400 to about 1000 C, and a pressure in the range of from about 1 to about 100 atmosphere.

21. The process of claim 17 wherein said CaO has a surface area of at least 12.0 m2/g and a pore volume of at least 0.015 cm3/g, said CaO having a sorption capacity of at least about 70 grams of CO2 per kilogram of CaO.

\* \* \* \* \*

UNITED STATES PATENT AND TRADEMARK OFFICE
CERTIFICATE OF CORRECTION

PATENT NO. : 7,837,975 B2  
APPLICATION NO. : 12/409843  
DATED : November 23, 2010  
INVENTOR(S) : Iyer et al.

Page 1 of 1

It is certified that error appears in the above-identified patent and that said Letters Patent is hereby corrected as shown below:

On the title page, item (56) References Cited, Foreign Patent Documents, please delete "DE 265559 A1 3/1989" and insert -- DD 265559 A1 3/1989 --.

On the title page, item (56) References Cited, Foreign Patent Documents, please delete "EP 1251948 10/2002" and insert -- EP 1251948 A0 10/2002 --.

In column 3, line 23, please delete "70°" and insert -- 700 --.

In column 9, line 39, please delete "WGSR)" and insert -- (WGSR) --.

In column 11, line 32, please delete "(WGSR)CO+H$_2$O<=>CO$_2$+H$_2$ ($\Delta$H=-40.6 kJ/mol)    (4)" and insert -- (WGSR) CO + H$_2$O <=> CO$_2$ + H$_2$          ($\Delta$H = - 40.6 kJ/mol) ---      (4) --.

In column 12, line 40, please delete "CaO(s)+CO$_2$(g)→CaCO$_3$(s)($\Delta$H=-183 kJ/mol)    (5)" and insert -- CaO (s) + CO$_2$ (g) → CaCO$_3$ (s)          ($\Delta$H = - 183 kJ/mol) -----      (5) --.

In column 12, line 56, please delete "CaCO$_3$(s)→CaO(s)+CO$_2$(g)($\Delta$H=+183 kJ/mol)    (6)" and insert -- CaCO$_3$ (s) → CaO (s) + CO$_2$ (g)          ($\Delta$H = + 183 kJ/mol)-----      (6) --.

Signed and Sealed this  
First Day of March, 2011

David J. Kappos  
*Director of the United States Patent and Trademark Office*